US006650640B1

United States Patent
Muller et al.

(10) Patent No.: US 6,650,640 B1
(45) Date of Patent: Nov. 18, 2003

(54) METHOD AND APPARATUS FOR MANAGING A NETWORK FLOW IN A HIGH PERFORMANCE NETWORK INTERFACE

(75) Inventors: Shimon Muller, Sunnyvale, CA (US); Denton E. Gentry, Jr., Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/259,932

(22) Filed: Mar. 1, 1999

(51) Int. Cl.[7] .............................................. G06F 13/00
(52) U.S. Cl. ...................................... 370/392; 370/473
(58) Field of Search ................................ 370/225, 230, 370/231, 235, 236, 241, 389, 392, 401, 427, 428, 473

(56) References Cited

U.S. PATENT DOCUMENTS

| | | | | |
|---|---|---|---|---|
| 4,858,232 A | * | 8/1989 | Diaz et al. .................. | 370/465 |
| 5,414,704 A | | 5/1995 | Spinney ....................... | 370/60 |
| 5,583,940 A | | 12/1996 | Vidrascu et al. .............. | 380/49 |

(List continued on next page.)

FOREIGN PATENT DOCUMENTS

| | | | | |
|---|---|---|---|---|
| EP | 0 447 725 | 9/1991 | ........... | G06F/15/16 |
| EP | 0 573 739 | 12/1993 | ........... | H04L/12/56 |
| EP | 0 853 411 | 7/1998 | ........... | H04L/29/06 |
| EP | 0 865 180 | 9/1998 | ........... | H04L/12/56 |
| JP | 09247172 | * 9/1997 | ........... | H04L/12/28 |
| WO | WO 95/14269 | 5/1995 | ............ | G06F/7/08 |
| WO | WO 97/28505 | 8/1997 | ........... | G06F/13/14 |
| WO | WO 99/00737 | 1/1999 | ........... | G06F/13/00 |
| WO | WO 99/00945 | 1/1999 | ........... | H04L/12/46 |
| WO | WO 99/00948 | 1/1999 | ........... | H04L/12/56 |
| WO | WO 99/00949 | 1/1999 | ........... | H04L/12/56 |

OTHER PUBLICATIONS

Newman, Peter, et al., "IP Switching and Gigabit Routers" IEEE Communications Magazine, vol. 335, No. 1, Jan. 1997, pp. 64–69.

Le Faucheur, Francois, "IETF Multiprotocol Label Switching (MPLS) Architecture" IEEE International Conference, Jun. 22, 1998 pp. 6–15.

Hallsall,F., "Data Communications, Computer Networks and Open Systems", Electronic Systems Engineering Series, 1996, pp. 451–452.

Cole, R., et al., "IP Over ATM: A Framework Document" IETF Online, Apr. 1996, pp. 1–31.

(List continued on next page.)

Primary Examiner—Wellington Chin
Assistant Examiner—William Schultz
(74) Attorney, Agent, or Firm—Park, Vaughan & Fleming, LLP

(57) ABSTRACT

A system and method are provided for managing information concerning a network flow comprising packets sent from a source entity to a destination entity served by a network interface. A network flow is established for each datagram sent from the source entity to the destination entity. A flow key, identifying the source and destination entities, is stored in a data structure along with information concerning validity of the flow, sequence of data in the flow datagram and how recently the flow was active. Once a flow is established, it is updated each time a packet containing data from the flow's datagram is received. When such a packet is received, an operation code is generated for identifying whether the packet is suitable for a particular network interface function. An operation code may, for example, indicate that a packet contains data to be re-assembled with other data from the same flow. Another operation code may indicate that a packet is not suitable for data re-assembly. Another operation code may specify that the packet is simply a control packet, has no data, or that the packet was received out of order.

59 Claims, 49 Drawing Sheets

U.S. PATENT DOCUMENTS

| | | | | |
|---|---|---|---|---|
| 5,684,954 A | | 11/1997 | Kaiserswerth et al. ... | 295/200.2 |
| 5,742,765 A | * | 4/1998 | Wong et al. ................ | 709/230 |
| 5,748,905 A | | 5/1998 | Hauser et al. .......... | 395/200.79 |
| 5,758,089 A | | 5/1998 | Gentry et al. .......... | 395/200.64 |
| 5,778,180 A | | 7/1998 | Gentry et al. .......... | 395/200.42 |
| 5,778,414 A | | 7/1998 | Winter et al. ................... | 711/5 |
| 5,781,549 A | * | 7/1998 | Dai ............................. | 370/398 |
| 5,787,255 A | | 7/1998 | Parlan et al. .......... | 395/200.63 |
| 5,793,954 A | | 8/1998 | Baker et al. ............. | 395/200.8 |
| 5,818,842 A | * | 10/1998 | Burwell et al. ............. | 370/250 |
| 5,848,067 A | * | 12/1998 | Osawa et al. ............... | 370/394 |
| 5,870,394 A | | 2/1999 | Oprea ........................ | 370/392 |
| 5,949,786 A | * | 9/1999 | Bellenger .................. | 370/401 |
| 6,157,955 A | * | 12/2000 | Narad et al. ................ | 709/228 |

OTHER PUBLICATIONS

Pending U.S. patent application Ser. No. 09/259,445, entitled "Method and Apparatus for Distributing Network Processing on a Multiprocessor Computer," by Shimon Muller et al., filed Mar. 1, 1999.

Pending U.S. patent application Ser. No. 09/260,367, entitled "Method and Apparatus for Suppressing Interrupts in a High–Speed Network Environment," by Denton Gentry, filed Mar. 1, 1999.

Pending U.S. patent application Ser. No. 09/259,736, entitled "Method and Apparatus for Modulating Interrupts in a Network Interface," by Denton Gentry et al., filed Mar. 1, 1999.

Pending U.S. patent application Ser. No. 09/259,765, entitled "A High Performance Network Interface," by Shimon Muller et al., filed Mar. 1, 1999.

Pending U.S. patent application Ser. No. 09/260,618, entitled "Method and Apparatus for Classifying Network Traffic in a High Performance Network Interface," by Shimon Muller et al., filed Mar. 1, 1999.

Pending U.S. patent application Ser. No. 09/260,324, entitled "Method and Apparatus for Dynamic Packet Batching with a High Performance Network Interface," by Shimon Muller et al., filed Mar. 1, 1999.

Pending U.S. patent application Ser. No. 09/258,952, entitled "Method and Apparatus for Early Random Discard of Packets," by Shimon Muller et al., filed Mar. 1, 1999.

Pending U.S. patent application Ser. No. 09/260,333, entitled "Method and Apparatus for Data Re–Assembly with a High Performance Network Interface," by Shimon Muller et al., filed Mar. 1, 1999.

Pending U.S. patent application Ser. No. 09/258,955, entitled "Dynamic Parsing in a High Performance Network Interface," by Denton Gentry, filed Mar. 1, 1999.

Pending U.S. patent application Ser. No. 09/259,936, entitled "Method and Apparatus for Indicating an Interrupt in a Network Interface," by Denton Gentry et al., filed Mar. 1, 1999.

Toong Shoon Chan, et al., "Parallel Architecture Support for High–Speed Protocol Processing," Feb. 1, 1997, *Microprocessors And Microsystems*, vol. 20, No. 6, pp. 325–339.

Sally Floyd & Van Jacobson, *Random Early Detection Gateways for Congestion Avoidance*, Aug., 1993, IEEE/ACM Transactions on Networking.

U.S. patent application Ser. No. 08/893,862, entitled "Mechanism for Reducing Interrupt Overhead in Device Drivers," filed Jul. 11, 1997, inventor Denton Gentry.

* cited by examiner

FLOW RE-ASSEMBLY TABLE 1004

| VALIDITY INDICATOR 1106 | NEXT ADDRESS 1104 | FLOW RE-ASSEMBLY BUFFER INDEX 1102 | PACKET # |
|---|---|---|---|
| | | | 0 |
| | | | ⋮ |
| | | | 63 |

HEADER TABLE 1006

| VALIDITY INDICATOR 1116 | NEXT ADDRESS 1114 | HEADER BUFFER INDEX 1112 |
|---|---|---|
| | | |

MTU TABLE 1008

| VALIDITY INDICATOR 1126 | NEXT ADDRESS 1124 | MTU BUFFER INDEX 1122 |
|---|---|---|
| | | |

JUMBO TABLE 1010

| VALIDITY INDICATOR 1136 | NEXT ADDRESS 1134 | JUMBO BUFFER INDEX 1132 |
|---|---|---|
| | | |

FIG. 11

| INSTR. NO. 2302 | INSTR. NAME 2304 | INSTRUCTION CONTENT 2306 (EXTRACTION MASK, COMPARE VALUE, OPERATOR, SUCCESS OFFSET, SUCCESS INSTRUCTION, FAILURE OFFSET, FAILURE INSTRUCTION, OUTPUT OPERATION, OPERATION ARGUMENT, OPERATION ENABLER, SHIFT, OUTPUT MASK) |
|---|---|---|
| 0 | WAIT | 0xFFFF, 0x0000, NP, 6, VLAN, 0, WAIT, CLR_REG, 0x3FF, 1, 0, 0x0000 |
| 1 | VLAN | 0xFFFF, 0x8100, EQ, 1, CFI, 0, 802.3, IM_CTL, 0x00A, 3, 0, 0xFFFF |
| 2 | CFI | 0x1000, 0x1000, EQ, 0, DONE, 1, 802.3, NONE, 0x000, 0, 0, 0x0000 |
| 3 | 802.3 | 0xFFFF, 0x0600, LT, 1, LLC_1, 0, IPV4_1, NONE, 0x000, 0, 0, 0x0000 |
| 4 | LLC_1 | 0xFFFF, 0xAAAA, EQ, 1, LLC_2, 0, DONE, NONE, 0x000, 0, 0, 0x0000 |
| 5 | LLC_2 | 0xFF00, 0x0300, EQ, 2, IPV4_1, 0, DONE, NONE, 0x000, 0, 0, 0x0000 |
| 6 | IPV4_1 | 0xFFFF, 0x0800, EQ, 1, IPV4_2, 0, IPV6_1, LD_SAP, 0x100, 3, 0, 0xFFFF |
| 7 | IPV4_2 | 0xFF00, 0x4500, EQ, 3, IPV4_3, 0, DONE, LD_SUM, 0x00A, 1, 0, 0x0000 |
| 8 | IPV4_3 | 0x3FFF, 0x0000, EQ, 1, IPV4_4, 0, DONE, LD_LEN, 0x03E, 1, 0, 0xFFFF |
| 9 | IPV4_4 | 0x00FF, 0x0006, EQ, 7, TCP_1, 0, DONE, LD_FID, 0x182, 1, 0, 0xFFFF |
| 10 | IPV6_1 | 0xFFFF, 0x86DD, EQ, 1, IPV6_2, 0, DONE, LD_SUM, 0x015, 1, 0, 0x0000 |
| 11 | IPV6_2 | 0xF000, 0x6000, EQ, 0, IPV6_3, 0, DONE, IM_R1, 0x114, 1, 0, 0xFFFF |
| 12 | IPV6_3 | 0x0000, 0x0000, EQ, 3, IPV6_4, 0, DONE, LD_FID, 0x484, 1, 0, 0xFFFF |
| 13 | IPV6_4 | 0xFF00, 0x0600, EQ, 18, TCP_1, 0, DONE, LD_LEN, 0x03F, 1, 0xFFFF |
| 14 | TCP_1 | 0x0000, 0x0000, EQ, 0, TCP_2, 4, TCP_2, LD_SEQ, 0x081, 3, 0, 0xFFFF |
| 15 | TCP_2 | 0x0000, 0x0000, EQ, 0, TCP_3, 0, TCP_3, ST_FLAG, 0x145, 3, 0, 0x002F |
| 16 | TCP_3 | 0x0000, 0x0000, EQ, 0, TCP_4, 0, TCP_4, LD_R1, 0x205, 3, 0xB, 0xF000 |
| 17 | TCP_4 | 0x0000, 0x0000, EQ, 0, WAIT, 0, WAIT, LD_HDR, 0x0FF, 3, 0, 0xFFFF |
| 18 | DONE | 0x0000, 0x0000, EQ, 0, WAIT, 0, WAIT, IM_CTL, 0x001, 3, 0, 0x0000 |

PROGRAM 2300

FIG. 23

METHOD AND APPARATUS FOR MANAGING A NETWORK FLOW IN A HIGH PERFORMANCE NETWORK INTERFACE

TABLE OF CONTENTS

BACKGROUND
SUMMARY
BRIEF DESCRIPTION OF THE FIGURES
DETAILED DESCRIPTION
  Introduction
  One Embodiment of a High Performance Network Interface Circuit
  An Illustrative Packet
  One Embodiment of a Header Parser
  Dynamic Header Parsing Instructions in One Embodiment of the Invention
  One Embodiment of a Flow Database
  One Embodiment of a Flow Database Manager
  One Embodiment of a Load Distributor
  One Embodiment of a Packet Queue
  One Embodiment of a Control Queue
  One Embodiment of a DMA Engine
  Methods of Transferring a Packet Into a Memory Buffer by a DMA Engine
  A Method of Transferring a Packet with Operation Code 0
  A Method of Transferring a Packet with Operation Code 1
  A Method of Transferring a Packet with Operation Code 2
  A Method of Transferring a Packet with Operation Code 3
  A Method of Transferring a Packet with Operation Code 4
  A Method of Transferring a Packet with Operation Code 5
  A Method of Transferring a Packet with Operation Code 6 or 7
  One Embodiment of a Dynamic Packet Batching Module
  Early Random Packet Discard in One Embodiment of the Invention
CLAIMS

BACKGROUND

This invention relates to the fields of computer systems and computer networks. In particular, the present invention relates to a Network Interface Circuit (NIC) for processing communication packets exchanged between a computer network and a host computer system.

The interface between a computer and a network is often a bottleneck for communications passing between the computer and the network. While computer performance (e.g., processor speed) has increased exponentially over the years and computer network transmission speeds have undergone similar increases, inefficiencies in the way network interface circuits handle communications have become more and more evident. With each incremental increase in computer or network speed, it becomes ever more apparent that the interface between the computer and the network cannot keep pace. These inefficiencies involve several basic problems in the way communications between a network and a computer are handled.

Today's most popular forms of networks tend to be packet-based. These types of networks, including the Internet and many local area networks, transmit information in the form of packets. Each packet is separately created and transmitted by an originating endstation and is separately received and processed by a destination endstation. In addition, each packet may, in a bus topology network for example, be received and processed by numerous stations located between the originating and destination endstations.

One basic problem with packet networks is that each packet must be processed through multiple protocols or protocol levels (known collectively as a "protocol stack") on both the origination and destination endstations. When data transmitted between stations is longer than a certain minimal length, the data is divided into multiple portions, and each portion is carried by a separate packet. The amount of data that a packet can carry is generally limited by the network that conveys the packet and is often expressed as a maximum transfer unit (MTU). The original aggregation of data is sometimes known as a "datagram," and each packet carrying part of a single datagram is processed very similarly to the other packets of the datagram.

Communication packets are generally processed as follows. In the origination endstation, each separate data portion of a datagram is processed through a protocol stack. During this processing multiple protocol headers (e.g., TCP, IP, Ethernet) are added to the data portion to form a packet that can be transmitted across the network. The packet is received by a network interface circuit, which transfers the packet to the destination endstation or a host computer that serves the destination endstation. In the destination endstation, the packet is processed through the protocol stack in the opposite direction as in the origination endstation. During this processing the protocol headers are removed in the opposite order in which they were applied. The data portion is thus recovered and can be made available to a user, an application program, etc.

Several related packets (e.g., packets carrying data from one datagram) thus undergo substantially the same process in a serial manner (i.e., one packet at a time). The more data that must be transmitted, the more packets must be sent, with each one being separately handled and processed through the protocol stack in each direction. Naturally, the more packets that must be processed, the greater the demand placed upon an endstation's processor. The number of packets that must be processed is affected by factors other than just the amount of data being sent in a datagram. For example, as the amount of data that can be encapsulated in a packet increases, fewer packets need to be sent. As stated above, however, a packet may have a maximum allowable size, depending on the type of network in use (e.g., the maximum transfer unit for standard Ethernet traffic is approximately 1,500 bytes). The speed of the network also affects the number of packets that a NIC may handle in a given period of time. For example, a gigabit Ethernet network operating at peak capacity may require a NIC to receive approximately 1.48 million packets per second. Thus, the number of packets to be processed through a protocol stack may place a significant burden upon a computer's processor. The situation is exacerbated by the need to process each packet separately even though each one will be processed in a substantially similar manner.

A related problem to the disjoint processing of packets is the manner in which data is moved between "user space" (e.g., an application program's data storage) and "system space" (e.g., system memory) during data transmission and receipt. Presently, data is simply copied from one area of memory assigned to a user or application program into another area of memory dedicated to the processor's use. Because each portion of a datagram that is transmitted in a packet may be copied separately (e.g., one byte at a time), there is a nontrivial amount of processor time required and frequent transfers can consume a large amount of the memory bus' bandwidth. Illustratively, each byte of data in a packet received from the network may be read from the system space and written to the user space in a separate copy operation, and vice versa for data transmitted over the network. Although system space generally provides a protected memory area (e.g., protected from manipulation by user programs), the copy operation does nothing of value when seen from the point of view of a network interface circuit. Instead, it risks over-burdening the host processor and retarding its ability to rapidly accept additional network traffic from the NIC. Copying each packet's data separately can therefore be very inefficient, particularly in a high-speed network environment.

In addition to the inefficient transfer of data (e.g., one packet's data at a time), the processing of headers from packets received from a network is also inefficient. Each packet carrying part of a single datagram generally has the same protocol headers (e.g., Ethernet, IP and TCP), although there may be some variation in the values within the packets' headers for a particular protocol. Each packet, however, is individually processed through the same protocol stack, thus requiring multiple repetitions of identical operations for related packets. Successively processing unrelated packets through different protocol stacks will likely be much less efficient than progressively processing a number of related packets through one protocol stack at a time.

Another basic problem concerning the interaction between present network interface circuits and host computer systems is that the combination often fails to capitalize on the increased processor resources that are available in multi-processor computer systems. In other words, present attempts to distribute the processing of network packets (e.g., through a protocol stack) among a number of protocols in an efficient manner are generally ineffective. In particular, the performance of present NICs does not come close to the expected or desired linear performance gains one may expect to realize from the availability of multiple processors. In some multi-processor systems, little improvement in the processing of network traffic is realized from the use of more than 4–6 processors, for example.

In addition, the rate at which packets are transferred from a network interface circuit to a host computer or other communication device may fail to keep pace with the rate of packet arrival at the network interface. One element or another of the host computer (e.g., a memory bus, a processor) may be over-burdened or otherwise unable to accept packets with sufficient alacrity. In this event one or more packets may be dropped or discarded. Dropping packets may cause a network entity to re-transmit some traffic and, if too many packets are dropped, a network connection may require re-initialization. Further, dropping one packet or type of packet instead of another may make a significant difference in overall network traffic. If, for example, a control packet is dropped, the corresponding network connection may be severely affected and may do little to alleviate the packet saturation of the network interface circuit because of the typically small size of a control packet. Therefore, unless the dropping of packets is performed in a manner that distributes the effect among many network connections or that makes allowance for certain types of packets, network traffic may be degraded more than necessary.

Thus, present NICs fail to provide adequate performance to interconnect today's high-end computer systems and high-speed networks. In addition, a network interface circuit that cannot make allowance for an over-burdened host computer may degrade the computer's performance.

SUMMARY

In one embodiment of the invention, a system and method are provided for managing communication flows, or connections, received at a communication device such as a network interface. In particular, communication flows are set up and torn down as network traffic is received at a network interface. Information concerning a flow is maintained for the duration of the flow to assist in determining the suitability of flow packets for certain enhanced processing operations. For example, such operations may be suitable for packets adhering to one or more pre-selected communication protocols.

In this embodiment of the invention a high performance network interface includes a flow database and a flow database manager module. A flow database in this embodiment contains an entry for each valid or active communication flow received by the network interface. Each flow may be identified by a flow key, stored in the flow's database entry, and may be indexed by a flow number.

For each valid flow, the flow database stores information indicating how recently a packet was received for the flow and sequence information concerning a datagram (e.g., a collection of data sent via multiple packets) being passed to the destination entity by the source entity. The sequence information may be used to verify correct receipt of data in the flow.

A communication flow in this embodiment comprises one or more packets sent from a source entity to a destination entity served by the network interface. A flow is thus similar, but not identical, to an end-to-end TCP (Transport Control Protocol) connection. Illustratively, a flow key comprises a combination of identifiers of the source and destination entities. In one embodiment of the invention a flow key is a combination of source and destination addresses extracted from the packet's layer three (e.g., IP or Internet Protocol) protocol header and source and destination port numbers extracted from the layer four (e.g., TCP) protocol header.

When a flow packet is received at the network interface, a flow database manager receives the packet's flow key. The flow key may be assembled by a header parser module that parses a header portion of the packet. The flow database manager may also receive control information concerning the packet, such as an indication of the size of a data portion of the packet, a flow sequence number used to identify the position of the packet data within the datagram, an indicator of the status of one or more flags in the packet's header(s), etc. Using the flow key, the flow database is searched and a database entry is added in the case of a new flow, or updated if the flow already exists.

In one embodiment of the invention, the flow database manager associates an operation code with the received packet to indicate how the packet may be further processed by the network interface and/or a host computer. The specific operation code assigned for a packet may indicate whether the packet contains data that can be re-assembled with other data passed in the flow, whether the packet is a control packet or is otherwise devoid of data, whether the packet should not be processed through a particular network interface function (e.g., due to a flag in a header of the packet), etc.

Information derived from the packet, including the flow key and control information, may be used by other portions of the network interface and/or a host computer system. Illustratively, the information may be used to re-assemble data sent from the source entity to the destination entity, to collectively process multiple packets from one flow, to distribute the processing of network traffic among multiple processors, to verify the integrity of the packet (e.g., by checksum), etc.

BRIEF DESCRIPTION OF THE FIGURES

FIG. 11 includes diagrams of data structures for managing the storage of network packets in host memory buffers in accordance with an embodiment of the invention.

FIG. 23 depicts one set of dynamic instructions for parsing a packet in accordance with an embodiment of the invention.

DETAILED DESCRIPTION

Figure 1A:
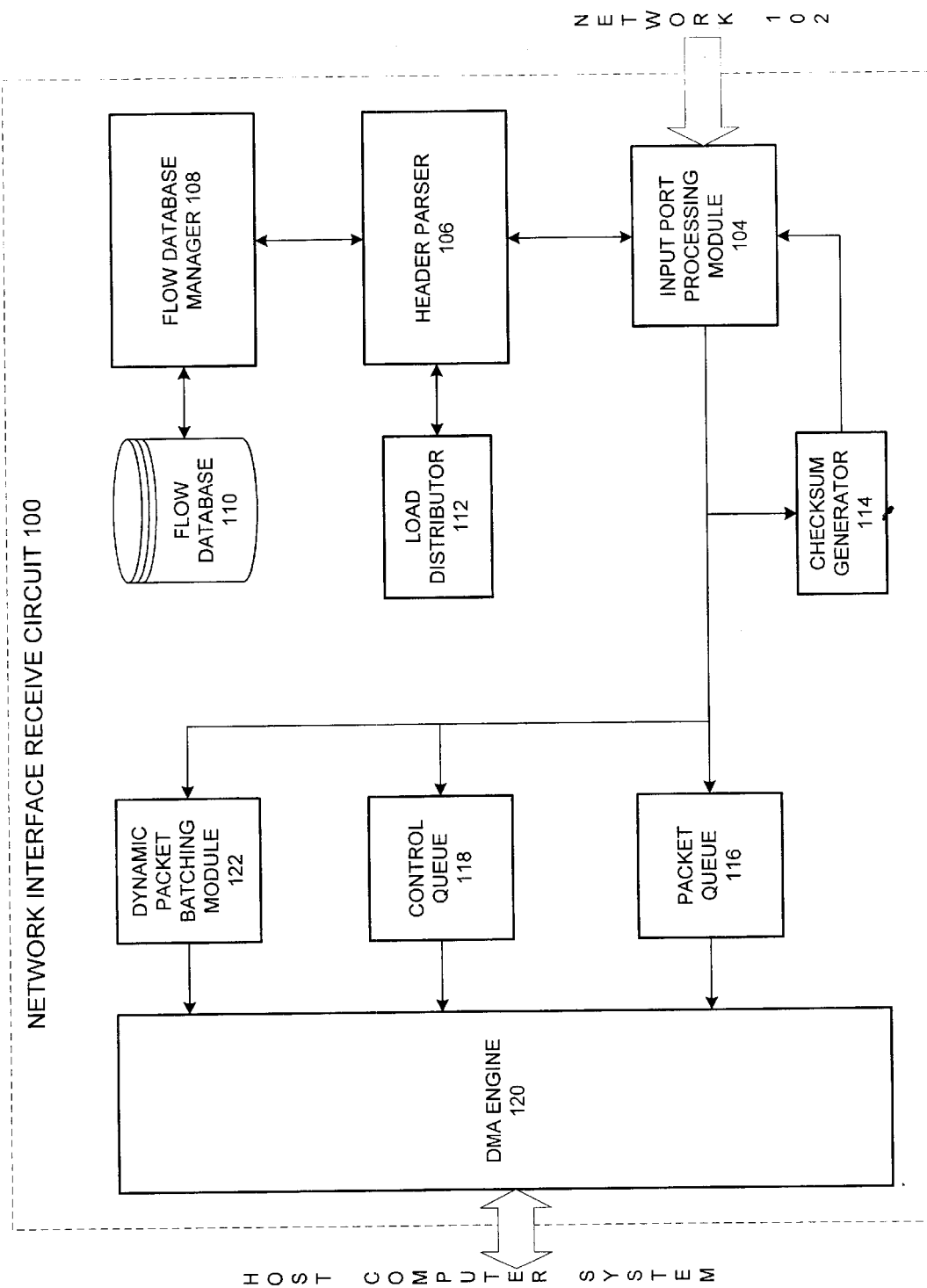
FIG. 1A is a block diagram depicting a network interface circuit (NIC) for receiving a packet from a network in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, embodiments of the invention are described below in the form of a network interface circuit (NIC) receiving communication packets formatted in accordance with certain communication protocols compatible with the Internet. One skilled in the art will recognize, however, that the present invention is not limited to communication protocols compatible with the Internet and may be readily adapted for use with other protocols and in communication devices other than a NIC.

The program environment in which a present embodiment of the invention is executed illustratively incorporates a general-purpose computer or a special purpose device such a hand-held computer. Details of such devices (e.g., processor, memory, data storage, input/output ports and display) are well known and are omitted for the sake of clarity.

It should also be understood that the techniques of the present invention might be implemented using a variety of technologies. For example, the methods described herein may be implemented in software running on a programmable microprocessor, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or other computer-readable medium.

Introduction

In one embodiment of the present invention, a network interface circuit (NIC) is configured to receive and process communication packets exchanged between a host computer system and a network such as the Internet. In particular, the NIC is configured to receive and manipulate packets formatted in accordance with a protocol stack (e.g., a combination of communication protocols) supported by a network coupled to the NIC.

A protocol stack may be described with reference to the seven-layer ISO-OSI (International Standards Organization-Open Systems Interconnection) model framework. Thus, one illustrative protocol stack includes the Transport Control Protocol (TCP) at layer four, Internet Protocol (IP) at layer three and Ethernet at layer two. For purposes of discussion, the term "Ethernet" may be used herein to refer collectively to the standardized IEEE (Institute of Electrical and Electronics Engineers) 802.3 specification as well as version two of the non-standardized form of the protocol. Where different forms of the protocol need to be distinguished, the standard form may be identified by including the "802.3" designation.

Other embodiments of the invention are configured to work with communications adhering to other protocols, both known (e.g., AppleTalk, IPX (Internetwork Packet Exchange), etc.) and unknown at the present time. One skilled in the art will recognize that the methods provided by this invention are easily adaptable for new communication protocols.

In addition, the processing of packets described below may be performed on communication devices other than a NIC. For example, a modem, switch, router or other communication port or device (e.g., serial, parallel, USB, SCSI) may be similarly configured and operated.

In embodiments of the invention described below, a NIC receives a packet from a network on behalf of a host computer system or other communication device. The NIC analyzes the packet (e.g., by retrieving certain fields from one or more of its protocol headers) and takes action to increase the efficiency with which the packet is transferred or provided to its destination entity. Equipment and methods discussed below for increasing the efficiency of processing or transferring packets received from a network may also be used for packets moving in the reverse direction (i.e., from the NIC to the network).

One technique that may be applied to incoming network traffic involves examining or parsing one or more headers of an incoming packet (e.g., headers for the layer two, three and four protocols) in order to identify the packet's source and destination entities and possibly retrieve certain other information. Using identifiers of the communicating entities as a key, data from multiple packets may be aggregated or re-assembled. Typically, a datagram sent to one destination entity from one source entity is transmitted via multiple packets. Aggregating data from multiple related packets (e.g., packets carrying data from the same datagram) thus allows a datagram to be re-assembled and collectively transferred to a host computer. The datagram may then be provided to the destination entity in a highly efficient manner. For example, rather than providing data from one packet at a time (and one byte at a time) in separate "copy" operations, a "page-flip" operation may be performed. In a page-flip, an entire memory page of data may be provided to the destination entity, possibly in exchange for an empty or unused page.

In another technique, packets received from a network are placed in a queue to await transfer to a host computer. While awaiting transfer, multiple related packets may be identified to the host computer. After being transferred, they may be processed as a group by a host processor rather than being processed serially (e.g., one at a time).

Yet another technique involves submitting a number of related packets to a single processor of a multi-processor host computer system. By distributing packets conveyed between different pairs of source and destination entities among different processors, the processing of packets through their respective protocol stacks can be distributed while still maintaining packets in their correct order.

The techniques discussed above for increasing the efficiency with which packets are processed may involve a combination of hardware and software modules located on a network interface and/or a host computer system. In one particular embodiment, a parsing module on a host computer's NIC parses header portions of packets. Illustratively, the parsing module comprises a microsequencer operating according to a set of replaceable instructions stored as micro-code. Using information extracted from the packets, multiple packets from one source entity to one destination entity may be identified. A hardware re-assembly module on the NIC may then gather the data from the multiple packets. Another hardware module on the NIC is configured to recognize related packets awaiting transfer to the host computer so that they may be processed through an appropriate protocol stack collectively, rather than serially. The re-assembled data and the packet's headers may then be provided to the host computer so that appropriate software (e.g., a device driver for the NIC) may process the headers and deliver the data to the destination entity.

Where the host computer includes multiple processors, a load distributor (which may also be implemented in hardware on the NIC) may select a processor to process the headers of the multiple packets through a protocol stack.

In another embodiment of the invention, a system is provided for randomly discarding a packet from a NIC when the NIC is saturated or nearly saturated with packets awaiting transfer to a host computer.

One Embodiment of a High Performance Network Interface Circuit

FIG. 1A depicts NIC 100 configured in accordance with an illustrative embodiment of the invention. A brief description of the operation and interaction of the various modules of NIC 100 in this embodiment follows. Descriptions incorporating much greater detail are provided in subsequent sections.

A communication packet may be received at NIC 100 from network 102 by a medium access control (MAC) module (not shown in FIG. 1A). The MAC module performs low-level processing of the packet such as reading the packet from the network, performing some error checking, detecting packet fragments, detecting over-sized packets, removing the layer one preamble, etc.

Input Port Processing (IPP) module 104 then receives the packet. The IPP module stores the entire packet in packet queue 116, as received from the MAC module or network, and a portion of the packet is copied into header parser 106. In one embodiment of the invention IPP module 104 may act as a coordinator of sorts to prepare the packet for transfer to a host computer system. In such a role, IPP module 104 may receive information concerning a packet from various modules of NIC 100 and dispatch such information to other modules.

Header parser 106 parses a header portion of the packet to retrieve various pieces of information that will be used to identify related packets (e.g., multiple packets from one same source entity for one destination entity) and that will affect subsequent processing of the packets. In the illustrated embodiment, header parser 106 communicates with flow database manager (FDBM) 108, which manages flow database (FDB) 110. In particular, header parser 106 submits a query to FDBM 108 to determine whether a valid communication flow (described below) exists between the source entity that sent a packet and the destination entity. The destination entity may comprise an application program, a communication module, or some other element of a host computer system that is to receive the packet.

In the illustrated embodiment of the invention, a communication flow comprises one or more datagram packets from one source entity to one destination entity. A flow may be identified by a flow key assembled from source and destination identifiers retrieved from the packet by header parser 106. In one embodiment of the invention a flow key comprises address and/or port information for the source and destination entities from the packet's layer three (e.g., IP) and/or layer four (e.g., TCP) protocol headers.

For purposes of the illustrated embodiment of the invention, a communication flow is similar to a TCP end-to-end connection but is generally shorter in duration. In particular, in this embodiment the duration of a flow may be limited to the time needed to receive all of the packets associated with a single datagram passed from the source entity to the destination entity.

Thus, for purposes of flow management, header parser 106 passes the packet's flow key to flow database manager 108. The header parser may also provide the flow database manager with other information concerning the packet that was retrieved from the packet (e.g., length of the packet).

Flow database manager 108 searches FDB 110 in response to a query received from header parser 106. Illustratively, flow database 110 stores information concerning each valid communication flow involving a destination entity served by NIC 100. Thus, FDBM 108 updates FDB 110 as necessary, depending upon the information received from header parser 106. In addition, in this embodiment of the invention FDBM 108 associates an operation or action code with the received packet. An operation code may be used to identify whether a packet is part of a new or existing flow, whether the packet includes data or just control information, the amount of data within the packet, whether the packet data can be re-assembled with related data (e.g., other data in a datagram sent from the source entity to the destination entity), etc. FDBM 108 may use information retrieved from the packet and provided by header parser 106 to select an appropriate operation code. The packet's operation code is then passed back to the header parser, along with an index of the packet's flow within FDB 110.

In one embodiment of the invention the combination of header parser 106, FDBM 108 and FDB 110, or a subset of these modules, may be known as a traffic classifier due to their role in classifying or identifying network traffic received at NIC 100.

In the illustrated embodiment, header parser 106 also passes the packet's flow key to load distributor 112. In a host computer system having multiple processors, load distributor 112 may determine which processor an incoming packet is to be routed to for processing through the appropriate protocol stack. For example, load distributor 112 may ensure that related packets are routed to a single processor. By sending all packets in one communication flow or end-to-end connection to a single processor, the correct ordering of packets can be enforced. Load distributor 112 may be omitted in one alternative embodiment of the invention. In another alternative embodiment, header parser 106 may also communicate directly with other modules of NIC 100 besides the load distributor and flow database manager.

Thus, after header parser 106 parses a packet FDBM 108 alters or updates FDB 110 and load distributor 112 identifies a processor in the host computer system to process the packet. After these actions, the header parser passes various information back to IPP module 104. Illustratively, this information may include the packet's flow key, an index of the packet's flow within flow database 110, an identifier of a processor in the host computer system, and various other data concerning the packet (e.g., its length, a length of a packet header).

Now the packet may be stored in packet queue 116, which holds packets for manipulation by DMA (Direct Memory Access) engine 120 and transfer to a host computer. In addition to storing the packet in a packet queue, a corresponding entry for the packet is made in control queue 118 and information concerning the packet's flow may also be passed to dynamic packet batching module 122. Control queue 118 contains related control information for each packet in packet queue 116.

Packet batching module 122 draws upon information concerning packets in packet queue 116 to enable the batch (i.e., collective) processing of headers from multiple related packets. In one embodiment of the invention packet batching module 122 alerts the host computer to the availability of headers from related packets so that they may be processed together.

Although the processing of a packet's protocol headers is performed by a processor on a host computer system in one embodiment of the invention, in another embodiment the protocol headers may be processed by a processor located on NIC 100. In the former embodiment, software on the host computer (e.g., a device driver for NIC 100) can reap the advantages of additional memory and a replaceable or upgradeable processor (e.g., the memory may be supplemented and the processor may be replaced by a faster model).

During the storage of a packet in packet queue 116, checksum generator 114 may perform a checksum operation. The checksum may be added to the packet queue as a trailer to the packet. Illustratively, checksum generator 114 generates a checksum from a portion of the packet received from network 102. In one embodiment of the invention, a checksum is generated from the TCP portion of a packet (e.g., the TCP header and data). If a packet is not formatted according to TCP, a checksum may be generated on another portion of the packet and the result may be adjusted in later processing as necessary. For example, if the checksum calculated by checksum generator 114 was not calculated on the correct portion of the packet, the checksum may be adjusted to capture the correct portion. This adjustment may be made by software operating on a host computer system (e.g., a device driver). Checksum generator 114 may be omitted or merged into another module of NIC 100 in an alternative embodiment of the invention.

From the information obtained by header parser 106 and the flow information managed by flow database manager 108, the host computer system served by NIC 100 in the illustrated embodiment is able to process network traffic very efficiently. For example, data portions of related packets may be re-assembled by DMA engine 120 to form aggregations that can be more efficiently manipulated. And, by assembling the data into buffers the size of a memory page, the data can be more efficiently transferred to a destination entity through "page-flipping," in which an entire memory page filled by DMA engine 120 is provided at once. One page-flip can thus take the place of multiple copy operations. Meanwhile, the header portions of the re-assembled packets may similarly be processed as a group through their appropriate protocol stack.

As already described, in another embodiment of the invention the processing of network traffic through appropriate protocol stacks may be efficiently distributed in a multi-processor host computer system. In this embodiment, load distributor 112 assigns or distributes related packets (e.g., packets in the same communication flow) to the same processor. In particular, packets having the same source and destination addresses in their layer three protocol (e.g., IP) headers and/or the same source and destination ports in their layer four protocol (e.g., TCP) headers may be sent to a single processor.

In the NIC illustrated in FIG. 1A, the processing enhancements discussed above (e.g., re-assembling data, batch processing packet headers, distributing protocol stack processing) are possible for packets received from network 102 that are formatted according to one or more pre-selected protocol stacks. In this embodiment of the invention network 102 is the Internet and NIC 100 is therefore configured to process packets using one of several protocol stacks compatible with the Internet. Packets not configured according to the pre-selected protocols are also processed, but may not receive the benefits of the full suite of processing efficiencies provided to packets meeting the pre-selected protocols.

For example, packets not matching one of the pre-selected protocol stacks may be distributed for processing in a multi-processor system on the basis of the packets' layer two (e.g., medium access control) source and destination addresses rather than their layer three or layer four addresses. Using layer two identifiers provides less granularity to the load distribution procedure, thus possibly distributing the processing of packets less evenly than if layer three/four identifiers were used.

Figure 1B:
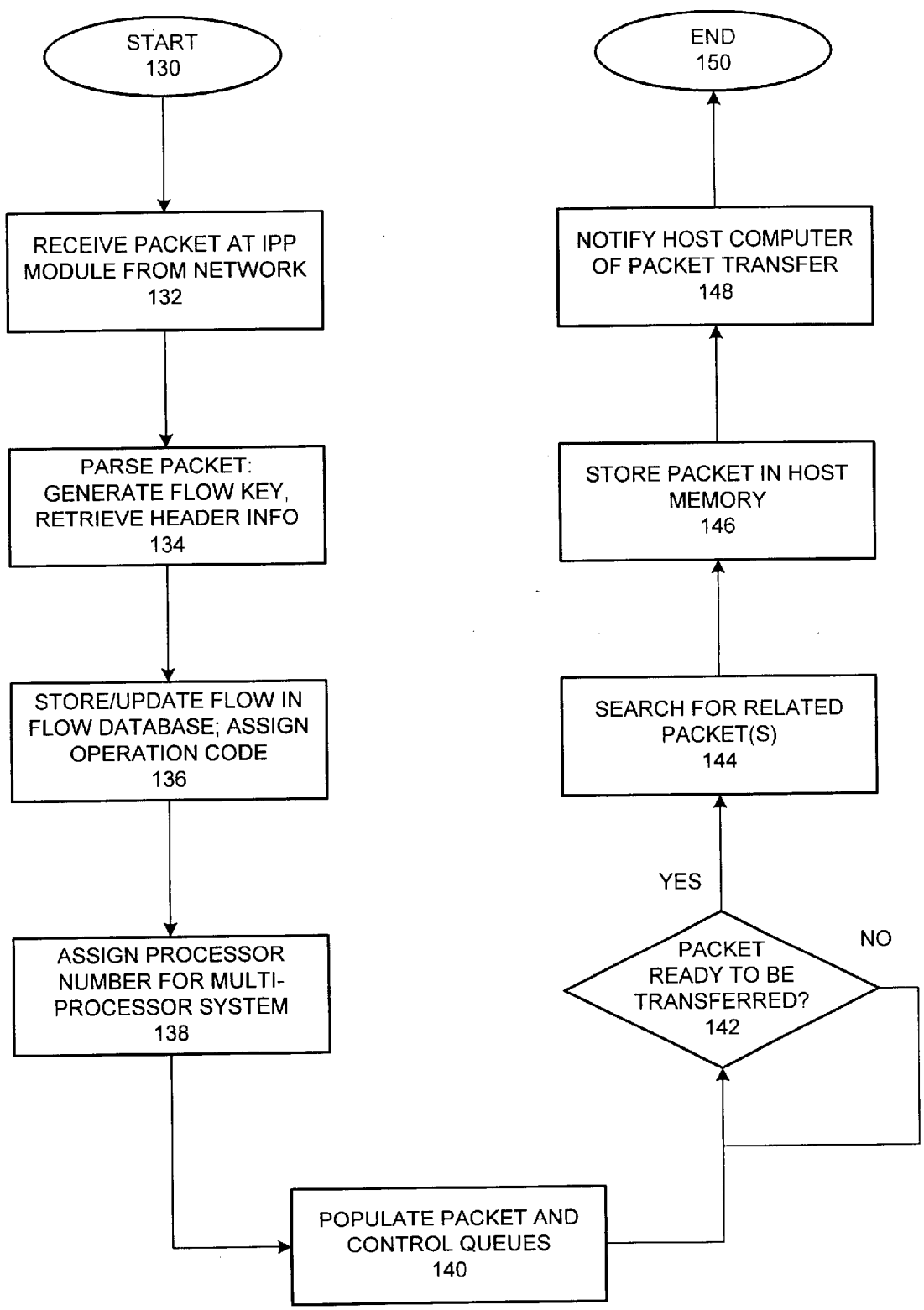
FIG. 1B is a flow chart demonstrating one method of operating the NIC of FIG. 1A to transfer a packet received from a network to a host computer in accordance with an embodiment of the invention.

FIG. 1B depicts one method of using NIC 100 of FIG. 1A to receive one packet from network 102 and transfer it to a host computer. State 130 is a start state, possibly characterized by the initialization or resetting of NIC 100.

In state 132, a packet is received by NIC 100 from network 102. As already described, the packet may be formatted according to a variety of communication protocols. The packet may be received and initially manipulated by a MAC module before being passed to an IPP module.

In state 134, a portion of the packet is copied and passed to header parser 106. Header parser 106 then parses the packet to extract values from one or more of its headers and/or its data. A flow key is generated from some of the retrieved information to identify the communication flow that includes the packet. The degree or extent to which the packet is parsed may depend upon its protocols, in that the header parser may be configured to parse headers of different protocols to different depths. In particular, header parser 106 may be optimized (e.g., its operating instructions configured) for a specific set of protocols or protocol stacks. If the packet conforms to one or more of the specified protocols it may be parsed more fully than a packet that does not adhere to any of the protocols.

In state 136, information extracted from the packet's headers is forwarded to flow database manager 108 and/or load distributor 112. The FDBM uses the information to set up a flow in flow database 110 if one does not already exist for this communication flow. If an entry already exists for the packet's flow, it may be updated to reflect the receipt of a new flow packet. Further, FDBM 108 generates an operation code to summarize one or more characteristics or conditions of the packet. The operation code may be used by other modules of NIC 100 to handle the packet in an appropriate manner, as described in subsequent sections. The operation code is returned to the header parser, along with an index (e.g., a flow number) of the packet's flow in the flow database.

In state 138, load distributor 112 assigns a processor number to the packet, if the host computer includes multiple processors, and returns the processor number to the header processor. Illustratively, the processor number identifies which processor is to conduct the packet through its protocol stack on the host computer. State 138 may be omitted in an alternative embodiment of the invention, particularly if the host computer consists of only a single processor.

In state 140, the packet is stored in packet queue 116. As the contents of the packet are placed into the packet queue, checksum generator 114 may compute a checksum. The checksum generator may be informed by IPP module 104 as to which portion of the packet to compute the checksum on. The computed checksum is added to the packet queue as a trailer to the packet. In one embodiment of the invention, the packet is stored in the packet queue at substantially the same time that a copy of a header portion of the packet is provided to header parser 106.

Also in state 140, control information for the packet is stored in control queue 118 and information concerning the packet's flow (e.g., flow number, flow key) may be provided to dynamic packet batching module 122.

In state 142, NIC 100 determines whether the packet is ready to be transferred to host computer memory. Until it is ready to be transferred, the illustrated procedure waits.

When the packet is ready to be transferred (e.g., the packet is at the head of the packet queue or the host computer receives the packet ahead of this packet in the packet queue), in state 144 dynamic packet batching module 122 determines whether a related packet will soon be transferred. If so, then when the present packet is transferred to host memory the host computer is alerted that a related packet will soon follow. The host computer may then process the packets (e.g., through their protocol stack) as a group.

In state 146, the packet is transferred (e.g., via a direct memory access operation) to host computer memory. And, in state 148, the host computer is notified that the packet was transferred. The illustrated procedure then ends at state 150.

One skilled in the art of computer systems and networking will recognize that the procedure described above is just one method of employing the modules of NIC 100 to receive a single packet from a network and transfer it to a host computer system. Other suitable methods are also contemplated within the scope of the invention.

An Illustrative Packet

Figure 2:
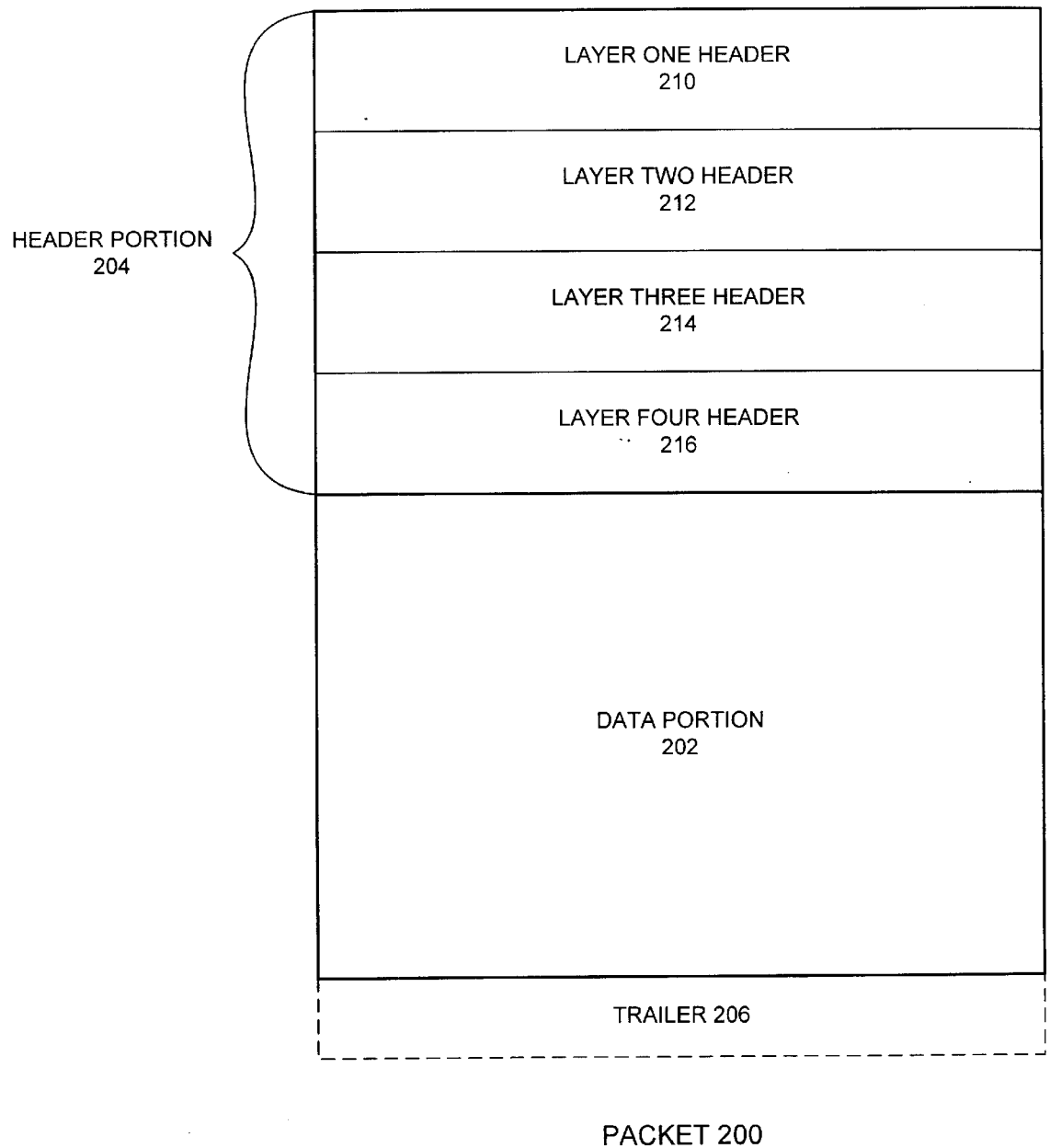
FIG. 2 is a diagram of a packet transmitted over a network and received at a network interface circuit in one embodiment of the invention.

FIG. 2 is a diagram of an illustrative packet received by NIC 100 from network 102. Packet 200 comprises data portion 202 and header portion 204, and may also contain trailer portion 206. Depending upon the network environment traversed by packet 200, its maximum size (e.g., its maximum transfer unit or MTU) may be limited.

In the illustrated embodiment, data portion 202 comprises data being provided to a destination or receiving entity within a computer system (e.g., user, application program, operating system) or a communication subsystem of the computer. Header portion 204 comprises one or more headers prefixed to the data portion by the source or originating entity or a computer system comprising the source entity. Each header normally corresponds to a different communication protocol.

In a typical network environment, such as the Internet, individual headers within header portion 204 are attached (e.g., prepended) as the packet is processed through different layers of a protocol stack (e.g., a set of protocols for communicating between entities) on the transmitting computer system. For example, FIG. 2 depicts protocol headers 210, 212, 214 and 216, corresponding to layers one through four, respectively, of a suitable protocol stack. Each protocol header contains information to be used by the receiving computer system as the packet is received and processed through the protocol stack. Ultimately, each protocol header is removed and data portion 202 is retrieved.

As described in other sections, in one embodiment of the invention a system and method are provided for parsing packet 200 to retrieve various bits of information. In this embodiment, packet 200 is parsed in order to identify the beginning of data portion 202 and to retrieve one or more values for fields within header portion 204. Illustratively, however, layer one protocol header or preamble 210 corresponds to a hardware-level specification related to the coding of individual bits. Layer one protocols are generally only needed for the physical process of sending or receiving the packet across a conductor. Thus, in this embodiment of the invention layer one preamble 210 is stripped from packet 200 shortly after being received by NIC 100 and is therefore not parsed.

The extent to which header portion 204 is parsed may depend upon how many, if any, of the protocols represented in the header portion match a set of pre-selected protocols. For example, the parsing procedure may be abbreviated or aborted once it is determined that one of the packet's headers corresponds to an unsupported protocol.

In particular, in one embodiment of the invention NIC 100 is configured primarily for Internet traffic. Thus, in this embodiment packet 200 is extensively parsed only when the layer two protocol is Ethernet (either traditional Ethernet or 802.3 Ethernet, with or without tagging for Virtual Local Area Networks), the layer three protocol is IP (Internet Protocol) and the layer four protocol is TCP (Transport Control Protocol). Packets adhering to other protocols may be parsed to some (e.g., lesser) extent. NIC 100 may, however, be configured to support and parse virtually any communication protocol's header. Illustratively, the protocol headers that are parsed, and the extent to which they are parsed, are determined by the configuration of a set of instructions for operating header parser 106.

As described above, the protocols corresponding to headers 212, 214 and 216 depend upon the network environment in which a packet is sent. The protocols also depend upon the communicating entities. For example, a packet received by a network interface may be a control packet exchanged between the medium access controllers for the source and destination computer systems. In this case, the packet would be likely to include minimal or no data, and may not include layer three protocol header 214 or layer four protocol header 216. Control packets are typically used for various purposes related to the management of individual connections.

Another communication flow or connection could involve two application programs. In this case, a packet may include headers 212, 214 and 216, as shown in FIG. 2, and may also include additional headers related to higher layers of a protocol stack (e.g., session, presentation and application layers in the ISO-OSI model). In addition, some applications may include headers or header-like information within data portion 202. For example, for a Network File System (NFS) application, data portion 202 may include NFS headers related to individual NFS datagrams. A datagram may be defined as a collection of data sent from one entity to another, and may comprise data transmitted in multiple packets. In other words, the amount of data constituting a datagram may be greater than the amount of data that can be included in one packet.

One skilled in the art will appreciate that the methods for parsing a packet that are described in the following section are readily adaptable for packets formatted in accordance with virtually any communication protocol.

One Embodiment of a Header Parser

Figure 3:
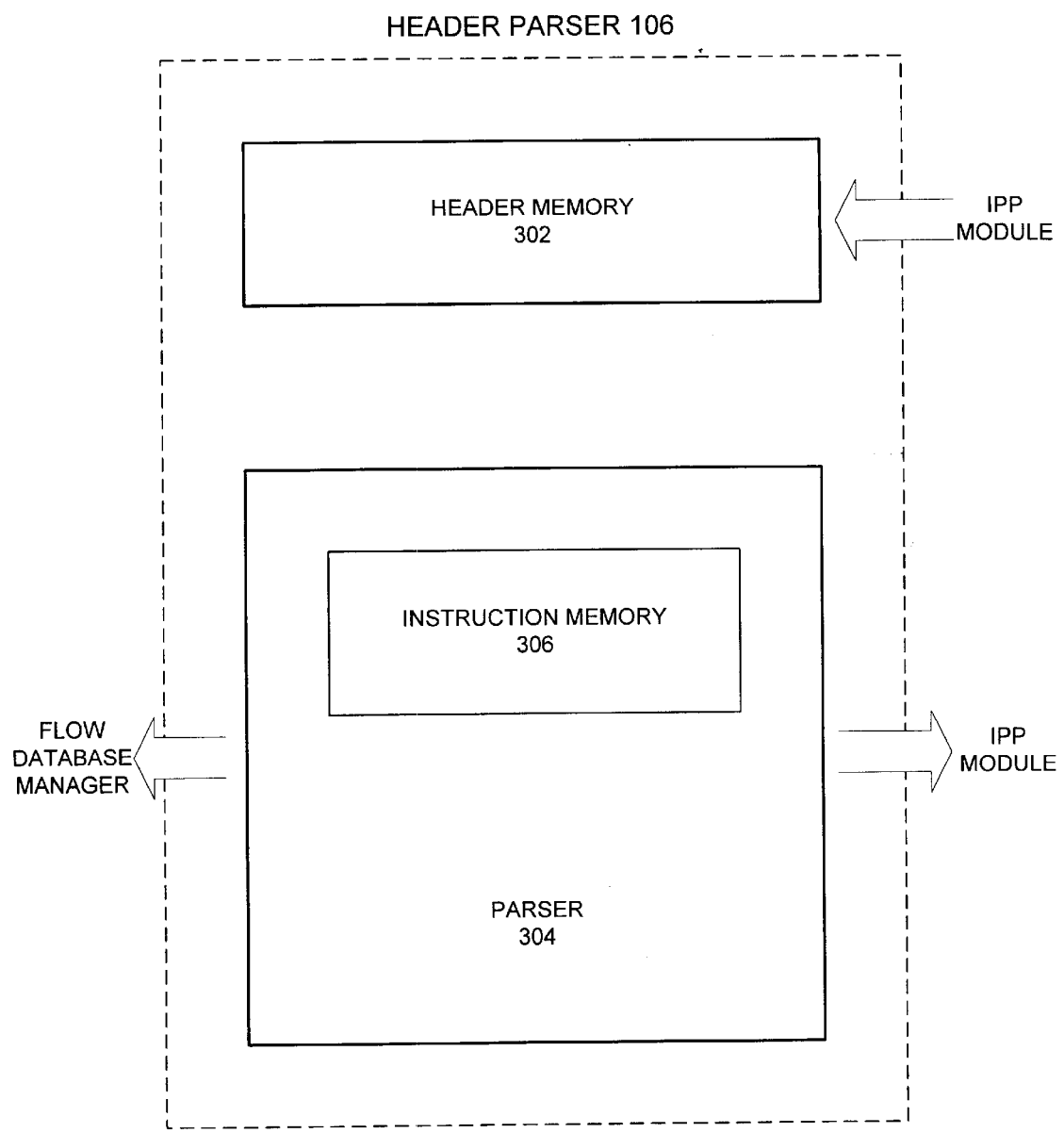
FIG. 3 is a block diagram depicting a header parser of a network interface circuit for parsing a packet in accordance with an embodiment of the invention.

FIG. 3 depicts header parser 106 of FIG. 1A in accordance with a present embodiment of the invention. Illustratively, header parser 106 comprises header memory 302 and parser 304, and parser 304 comprises instruction memory 306. Although depicted as distinct modules in FIG. 3, in an alternative embodiment of the invention header memory 302 and instruction memory 306 are contiguous.

In the illustrated embodiment, parser 304 parses a header stored in header memory 302 according to instructions stored in instruction memory 306. The instructions are designed for the parsing of particular protocols or a particular protocol stack, as discussed above. In one embodiment of the invention, instruction memory 306 is modifiable (e.g., the memory is implemented as RAM, EPROM, EEPROM or the like), so that new or modified parsing instructions may be downloaded or otherwise installed. Instructions for parsing a packet are further discussed in the following section.

In FIG. 3, a header portion of a packet stored in IPP module 104 (shown in FIG. 1A) is copied into header memory 302. Illustratively, a specific number of bytes (e.g., 114) at the beginning of the packet are copied. In an alternative embodiment of the invention, the portion of a packet that is copied may be of a different size. The particular amount of a packet copied into header memory 302 should be enough to capture one or more protocol headers, or at least enough information (e.g., whether included in a header or data portion of the packet) to retrieve the information described below. The header portion stored in header memory 302 may not include the layer one header, which may be removed prior to or in conjunction with the packet being processed by IPP module 104.

After a header portion of the packet is stored in header memory 302, parser 304 parses the header portion according to the instructions stored in instruction memory 306. In the presently described embodiment, instructions for operating parser 304 apply the formats of selected protocols to step through the contents of header memory 302 and retrieve specific information. In particular, specifications of communication protocols are well known and widely available. Thus, a protocol header may be traversed byte by byte or some other fashion by referring to the protocol specifications. In a present embodiment of the invention the parsing algorithm is dynamic, with information retrieved from one field of a header often altering the manner in which another part is parsed.

For example, it is known that the Type field of a packet adhering to the traditional, form of Ethernet (e.g., version two) begins at the thirteenth byte of the (layer two) header. By comparison, the Type field of a packet following the IEEE 802.3 version of Ethernet begins at the twenty-first byte of the header. The Type field is in yet other locations if the packet forms part of a Virtual Local Area Network (VLAN) communication (which illustratively involves tagging or encapsulating an Ethernet header). Thus, in a present embodiment of the invention, the values in certain fields are retrieved and tested in order to ensure that the information needed from a header is drawn from the correct portion of the header. Details concerning the form of a VLAN packet may be found in specifications for the IEEE 802.3p and IEEE 802.3q forms of the Ethernet protocol.

The operation of header parser 106 also depends upon other differences between protocols, such as whether the packet uses version four or version six of the Internet Protocol, etc. Specifications for versions four and six of IP may be located in IETF (Internet Engineering Task Force) RFCs (Request for Comment) 791 and 2460, respectively.

The more protocols that are "known" by parser 304, the more protocols a packet may be tested for, and the more complicated the parsing of a packet's header portion may become. One skilled in the art will appreciate that the protocols that may be parsed by parser 304 are limited only by the instructions according to which it operates. Thus, by augmenting or replacing the parsing instructions stored in instruction memory 306, virtually all known protocols may be handled by header parser 106 and virtually any information may be retrieved from a packet's headers.

If, of course, a packet header does not conform to an expected or suspected protocol, the parsing operation may be terminated. In this case, the packet may not be suitable for one more of the efficiency enhancements offered by NIC 100 (e.g., data re-assembly, packet batching, load distribution).

Illustratively, the information retrieved from a packet's headers is used by other portions of NIC 100 when processing that packet. For example, as a result of the packet parsing performed by parser 304 a flow key is generated to identify the communication flow or communication connection that comprises the packet. Illustratively, the flow key is assembled by concatenating one or more addresses corresponding to one or more of the communicating entities. In a present embodiment, a flow key is formed from a combination of the source and destination addresses drawn from the IP header and the source and destination ports taken from the TCP header. Other indicia of the communicating entities may be used, such as the Ethernet source and destination addresses (drawn from the layer two header), NFS file handles or source and destination identifiers for other application datagrams drawn from the data portion of the packet.

One skilled in the art will appreciate that the communicating entities may be identified with greater resolution by using indicia drawn from the higher layers of the protocol stack associated with a packet. Thus, a combination of IP and TCP indicia may identify the entities with greater particularity than layer two information.

Besides a flow key, parser 304 also generates a control or status indicator to summarize additional information concerning the packet. In one embodiment of the invention a control indicator includes a sequence number (e.g., TCP sequence number drawn from a TCP header) to ensure the correct ordering of packets when re-assembling their data. The control indicator may also reveal whether certain flags in the packet's headers are set or cleared, whether the packet contains any data, and, if the packet contains data, whether the data exceeds a certain size. Other data are also suitable for inclusion in the control indicator, limited only by the information that is available in the portion of the packet parsed by parser 304.

In one embodiment of the invention, header parser 106 provides the flow key and all or a portion of the control indicator to flow database manager 108. As discussed in a following section, FDBM 108 manages a database or other data structure containing information relevant to communication flows passing through NIC 100.

In other embodiments of the invention, parser 304 produces additional information derived from the header of a packet for use by other modules of NIC 100. For example, header parser 106 may report the offset, from the beginning of the packet or from some other point, of the data or payload portion of a packet received from a network. As described above, the data portion of a packet typically follows the header portion and may be followed by a trailer portion. Other data that header parser 106 may report include the location in the packet at which a checksum operation should begin, the location in the packet at which the layer three and/or layer four headers begin, diagnostic data, payload information, etc. The term "payload" is often used to refer to the data portion of a packet. In particular, in one embodiment of the invention header parser 106 provides a payload offset and payload size to control queue 118.

In appropriate circumstances, header parser 106 may also report (e.g., to IPP module 104 and/or control queue 118) that the packet is not formatted in accordance with the protocols that parser 304 is configured to manipulate. This report may take the form of a signal (e.g., the No_Assist signal described below), alert, flag or other indicator. The signal may be raised or issued whenever the packet is found to reflect a protocol other than the pre-selected protocols that are compatible with the processing enhancements described above (e.g., data re-assembly, batch processing of packet headers, load distribution). For example, in one embodiment of the invention parser 304 may be configured to parse and efficiently process packets using TCP at layer four, IP at layer three and Ethernet at layer two. In this embodiment, an IPX (Internetwork Packet Exchange) packet would not be considered compatible and IPX packets therefore would not be gathered for data re-assembly and batch processing.

At the conclusion of parsing in one embodiment of the invention, the various pieces of information described above are disseminated to appropriate modules of NIC 100. After this (and as described in a following section), flow database manager 108 determines whether an active flow is associated with the flow key derived from the packet and sets an operation code to be used in subsequent processing. In addition, IPP module 104 transmits the packet to packet queue 116. IPP module 104 may also receive some of the information extracted by header parser 106, and pass it to another module of NIC 100.

In the embodiment of the invention depicted in FIG. 3, an entire header portion of a received packet to be parsed is copied and then parsed in one evolution, after which the header parser turns its attention to another packet. However, in an alternative embodiment multiple copy and/or parsing operations may be performed on a single packet. In particular, an initial header portion of the packet may be copied into and parsed by header parser 106 in a first evolution, after which another header portion may be copied into header parser 106 and parsed in a second evolution. A header portion in one evolution may partially or completely overlap the header portion of another evolution. In this manner, extensive headers may be parsed even if header memory 302 is of limited size. Similarly, it may require more than one operation to load a full set of instructions for parsing a packet into instruction memory 306. Illustratively, a first portion of the instructions may be loaded and executed, after which other instructions are loaded.

Figure 4A:
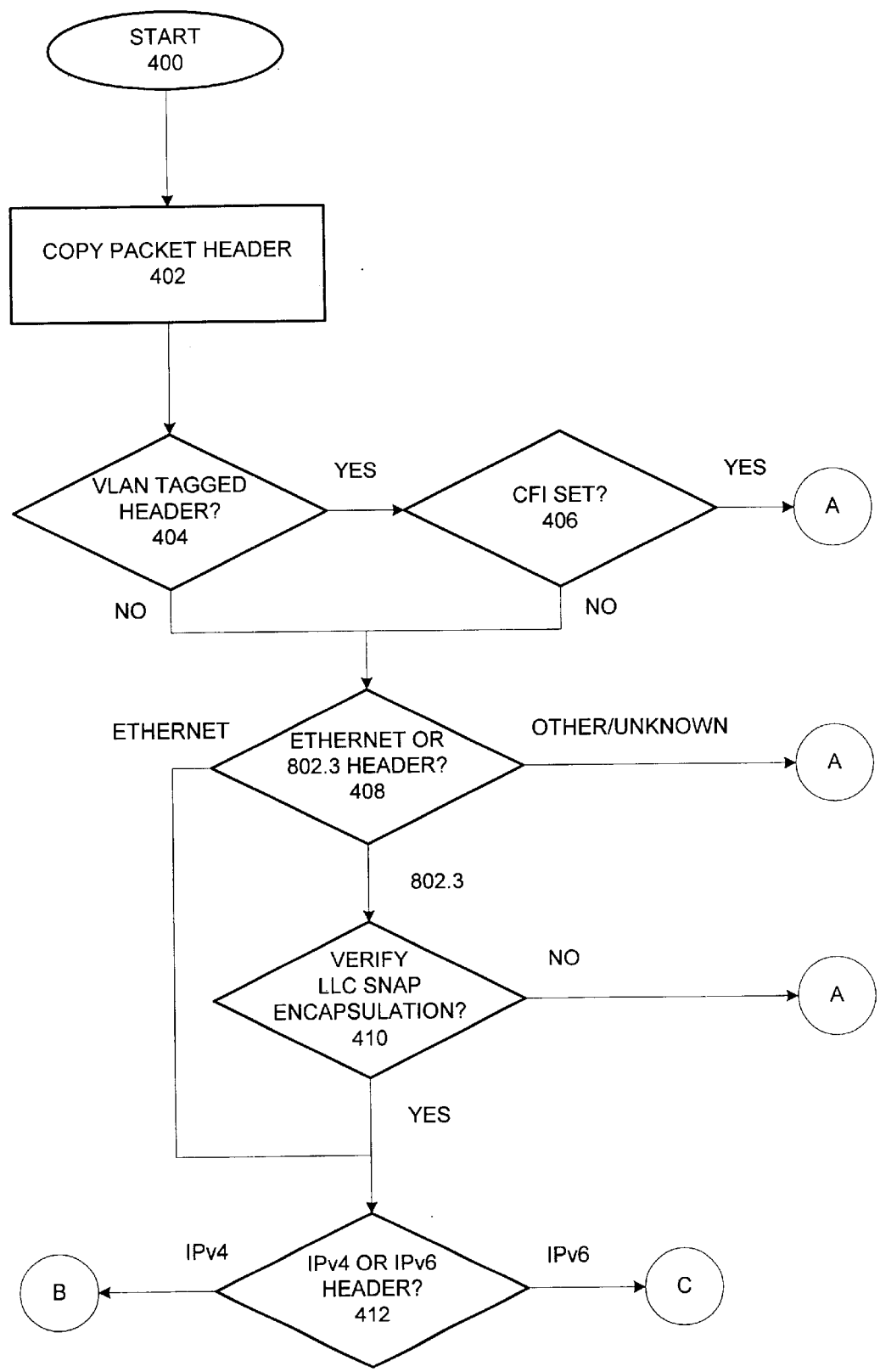
FIGS. 4A–4B comprise a flow chart demonstrating one method of parsing a packet received from a network at a network interface circuit in accordance with an embodiment of the present invention.
Figure 4B:
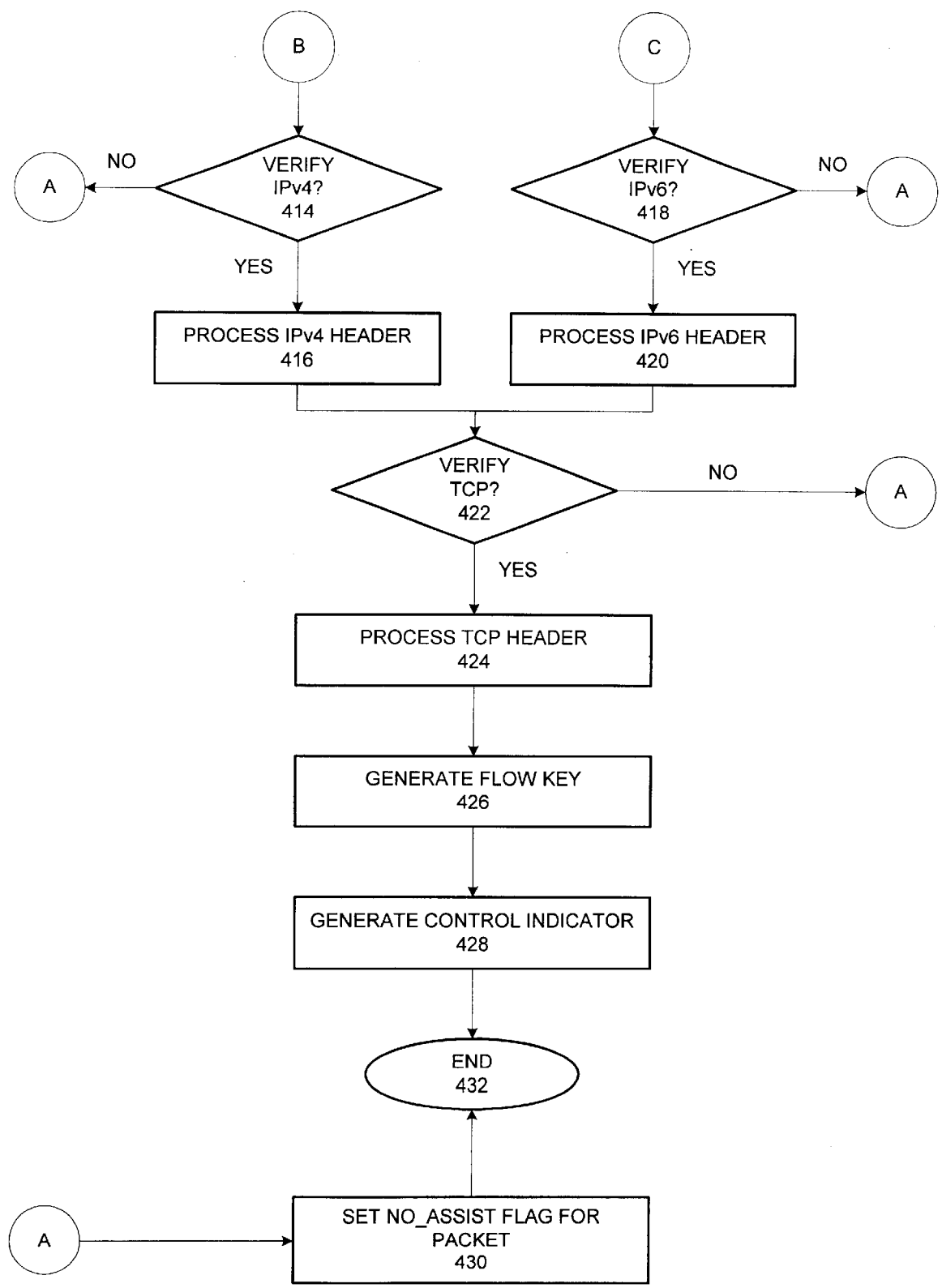

With reference now to FIGS. 4A–4B, a flow chart is presented to illustrate one method by which a header parser may parse a header portion of a packet received at a network interface circuit from a network. In this implementation, the header parser is configured, or optimized, for parsing packets conforming to a set of pre-selected protocols (or protocol stacks). For packets meeting these criteria, various information is retrieved from the header portion to assist in the re-assembly of the data portions of related packets (e.g., packets comprising data from a single datagram). Other enhanced features of the network interface circuit may also be enabled.

The information generated by the header parser includes, in particular, a flow key with which to identify the communication flow or communication connection that comprises the received packet. In one embodiment of the invention, data from packets having the same flow key may be identified and re-assembled to form a datagram. In addition, headers of packets having the same flow key may be processed collectively through their protocol stack (e.g., rather than serially).

In another embodiment of the invention, information retrieved by the header parser is also used to distribute the processing of network traffic received from a network. For example, multiple packets having the same flow key may be submitted to a single processor of a multi-processor host computer system.

In the method illustrated in FIGS. 4A–4B, the set of pre-selected protocols corresponds to communication protocols frequently transmitted via the Internet. In particular, the set of protocols that may be extensively parsed in this method include the following. At layer two: Ethernet (traditional version), 802.3 Ethernet, Ethernet VLAN (Virtual Local Area Network) and 802.3 Ethernet VLAN. At layer three: IPv4 (with no options) and IPv6 (with no options). Finally, at layer four, only TCP protocol headers (with or without options) are parsed in the illustrated method. Header parsers in alternative embodiments of the invention parse packets formatted through other protocol stacks. In particular, a NIC may be configured in accordance with the most common protocol stacks in use on a given network, which may or may not include the protocols compatible with the header parser method illustrated in FIGS. 4A–4B.

As described below, a received packet that does not correspond to the protocols parsed by a given method may be flagged and the parsing algorithm terminated for that packet. Because the protocols under which a packet has been formatted can only be determined, in the present method, by examining certain header field values, the determination that a packet does not conform to the selected set of protocols may be made at virtually any time during the procedure. Thus, the illustrated parsing method has as one goal the identification of packets not meeting the formatting criteria for re-assembly of data.

Various protocol header fields appearing in headers for the selected protocols are discussed below. Communication protocols that may be compatible with an embodiment of the present invention (e.g., protocols that may be parsed by a header parser) are well known to persons skilled in the art and are described with great particularity in a number of references. They therefore need not be visited in minute detail herein. In addition, the illustrated method of parsing a header portion of a packet for the selected protocols is merely one method of gathering the information described below. Other parsing procedures capable of doing so are equally suitable.

In a present embodiment of the invention, the illustrated procedure is implemented as a combination of hardware and software. For example, updateable micro-code instructions for performing the procedure may be executed by a microsequencer. Alternatively, such instructions may be fixed (e.g., stored in read-only memory) or may be executed by a processor or microprocessor.

In FIGS. 4A–4B, state 400 is a start state during which a packet is received by NIC 100 (shown in FIG. 1A) and initial processing is performed. NIC 100 is coupled to the Internet for purposes of this procedure. Initial processing may include basic error checking and the removal of the layer one preamble. After initial processing, the packet is held by IPP module 104 (also shown in FIG. 1A). In one embodiment of the invention, state 400 comprises a logical loop in which the header parser remains in an idle or wait state until a packet is received.

In state 402, a header portion of the packet is copied into memory (e.g., header memory 302 of FIG. 3). In a present embodiment of the invention a predetermined number of bytes at the beginning (e.g., 114 bytes) of the packet are copied. Packet portions of different sizes are copied in alternative embodiments of the invention, the sizes of which are guided by the goal of copying enough of the packet to capture and/or identify the necessary header information. Illustratively, the full packet is retained by IPP module 104 while the following parsing operations are performed, although the packet may, alternatively, be stored in packet queue 116 prior to the completion of parsing.

Also in state 402, a pointer to be used in parsing the packet may be initialized. Because the layer one preamble was removed, the header portion copied to memory should begin with the layer two protocol header. Illustratively, therefore, the pointer is initially set to point to the twelfth byte of the layer two protocol header and the two-byte value at the pointer position is read. As one skilled in the art will recognize, these two bytes may be part of a number of different fields, depending upon which protocol constitutes layer two of the packet's protocol stack. For example, these two bytes may comprise the Type field of a traditional Ethernet header, the Length field of an 802.3 Ethernet header or the TPID (Tag Protocol IDentifier) field of a VLAN-tagged header.

In state 404, a first examination is made of the layer two header to determine if it comprises a VLAN-tagged layer two protocol header. Illustratively, this determination depends upon whether the two bytes at the pointer position store the hexadecimal value 8100. If so, the pointer is probably located at the TPID field of a VLAN-tagged header. If not a VLAN header, the procedure proceeds to state 408.

If, however, the layer two header is a VLAN-tagged header, in state 406 the CFI (Canonical Format Indicator) bit is examined. If the CFI bit is set (e.g., equal to one), the illustrated procedure jumps to state 430, after which it exits. In this embodiment of the invention the CFI bit, when set, indicates that the format of the packet is not compatible with (i.e., does not comply with) the pre-selected protocols (e.g., the layer two protocol is not Ethernet or 802.3 Ethernet). If the CFI bit is clear (e.g., equal to zero), the pointer is incremented (e.g., by four bytes) to position it at the next field that must be examined.

In state 408, the layer two header is further tested. Although it is now known whether this is or is not a VLAN-tagged header, depending upon whether state 408 was reached through state 406 or directly from state 404, respectively, the header may reflect either the traditional Ethernet format or the 802.3 Ethernet format. At the beginning of state 408, the pointer is either at the twelfth or sixteenth byte of the header, either of which may correspond to a Length field or a Type field. In particular, if the two-byte value at the position identified by the pointer is less than 0600 (hexadecimal), then the packet corresponds to 802.3 Ethernet and the pointer is understood to identify a Length field. Otherwise, the packet is a traditional (e.g., version two) Ethernet packet and the pointer identifies a Type field.

If the layer two protocol is 802.3 Ethernet, the procedure continues at state 410. If the layer two protocol is traditional Ethernet, the Type field is tested for the hexadecimal values of 0800 and 08DD. If the tested field has one of these values, then it has also been determined that the packet's layer three protocol is the Internet Protocol. In this case the illustrated procedure continues at state 412. Lastly, if the field is a Type field having a value other than 0800 or 86DD (hexadecimal), then the packet's layer three protocol does not match the pre-selected protocols according to which the header parser was configured. Therefore, the procedure continues at state 430 and then ends.

In one embodiment of the invention the packet is examined in state 408 to determine if it is a jumbo Ethernet frame. This determination would likely be made prior to deciding whether the layer two header conforms to Ethernet or 802.3 Ethernet. Illustratively, the jumbo frame determination may be made based on the size of the packet, which may be reported by IPP module 104 or a MAC module. If the packet is a jumbo frame, the procedure may continue at state 410; otherwise, it may resume at state 412.

In state 410, the procedure verifies that the layer two protocol is 802.3 Ethernet with LLC SNAP encapsulation. In particular, the pointer is advanced (e.g., by two bytes) and the six-byte value following the Length field in the layer two header is retrieved and examined. If the header is an 802.3 Ethernet header, the field is the LLC_SNAP field and should have a value of AAAA03000000 (hexadecimal). The original specification for an LLC SNAP header may be found in the specification for IEEE 802.2. If the value in the packet's LLC_SNAP field matches the expected value the pointer is incremented another six bytes, the two-byte 802.3 Ethernet Type field is read and the procedure continues at state 412. If the values do not match, then the packet does not conform to the specified protocols and the procedure enters state 430 and then ends.

In state 412, the pointer is advanced (e.g., another two bytes) to locate the beginning of the layer three protocol header. This pointer position may be saved for later use in quickly identifying the beginning of this header. The packet is now known to conform to an accepted layer two protocol (e.g., traditional Ethernet, Ethernet with VLAN tagging, or 802.3 Ethernet with LLC SNAP) and is now checked to ensure that the packet's layer three protocol is IP. As discussed above, in the illustrated embodiment only packets conforming to the IP protocol are extensively processed by the header parser.

Illustratively, if the value of the Type field in the layer two header (retrieved in state 402 or state 410) is 0800 (hexadecimal), the layer three protocol is expected to be IP, version four. If the value is 86DD (hexadecimal), the layer three protocol is expected to be IP, version six. Thus, the Type field is tested in state 412 and the procedure continues at state 414 or state 418, depending upon whether the hexadecimal value is 0800 or 86DD, respectively.

In state 414, the layer three header's conformity with version four of IP is verified. In one embodiment of the invention the Version field of the layer three header is tested to ensure that it contains the hexadecimal value 4, corresponding to version four of IP. If in state 414 the layer three header is confirmed to be IP version four, the procedure continues at state 416; otherwise, the procedure proceeds to state 430 and then ends at state 432.

In state 416, various pieces of information from the IP header are saved. This information may include the IHL (IP Header Length), Total Length, Protocol and/or Fragment Offset fields. The IP source address and the IP destination addresses may also be stored. The source and destination address values are each four bytes long in version four of IP. These addresses are used, as described above, to generate a flow key that identifies the communication flow in which this packet was sent. The Total Length field stores the size of the IP segment of this packet, which illustratively comprises the IP header, the TCP header and the packet's data portion. The TCP segment size of the packet (e.g., the size of the TCP header plus the size of the data portion of the packet) may be calculated by subtracting twenty bytes (the size of the IP version four header) from the Total Length value. After state 416, the illustrated procedure advances to state 422.

In state 418, the layer three header's conformity with version six of IP is verified by testing the Version field for the hexadecimal value 6. If the Version field does not contain this value, the illustrated procedure proceeds to state 430.

In state 420, the values of the Payload Length (e.g., the size of the TCP segment) and Next Header field are saved, plus the IP source and destination addresses. Source and destination addresses are each sixteen bytes long in version six of IP.

In state 422 of the illustrated procedure, it is determined whether the IP header (either version four or version six) indicates that the layer four header is TCP. Illustratively, the Protocol field of a version four IP header is tested while the Next Header field of a version six header is tested. In either case, the value should be 6 (hexadecimal). The pointer is then incremented as necessary (e.g., twenty bytes for IP version four, forty bytes for IP version six) to reach the beginning of the TCP header. If it is determined in state 422 that the layer four header is not TCP, the procedure advances to state 430 and ends at end state 432.

In one embodiment of the invention, other fields of a version four IP header may be tested in state 422 to ensure that the packet meets the criteria for enhanced processing by NIC 100. For example, an IHL field value other than 5 (hexadecimal) indicates that IP options are set for this packet, in which case the parsing operation is aborted. A fragmentation field value other than zero indicates that the IP segment of the packet is a fragment, in which case parsing is also aborted. In either case, the procedure jumps to state 430 and then ends at end state 432.

In state 424, the packet's TCP header is parsed and various data are collected from it. In particular, the TCP source port and destination port values are saved. The TCP sequence number, which is used to ensure the correct re-assembly of data from multiple packets, is also saved. Further, the values of several components of the Flags field—illustratively, the URG (urgent), PSH (push), RST (reset), SYN (synch) and FIN (finish) bits—are saved. As will be seen in a later section, in one embodiment of the invention these flags signal various actions to be performed or statuses to be considered in the handling of the packet.

Other signals or statuses may be generated in state 424 to reflect information retrieved from the TCP header. For example, the point from which a checksum operation is to begin may be saved (illustratively, the beginning of the TCP header); the ending point of a checksum operation may also be saved (illustratively, the end of the data portion of the packet). An offset to the data portion of the packet may be identified by multiplying the value of the Header Length field of the TCP header by four. The size of the data portion may then be calculated by subtracting the offset to the data portion from the size of the entire TCP segment.

In state 426, a flow key is assembled by concatenating the IP source and destination addresses and the TCP source and destination ports. As already described, the flow key may be used to identify a communication flow or communication connection, and may be used by other modules of NIC 100 to process network traffic more efficiently. Although the sizes of the source and destination addresses differ between IP versions four and six (e.g., four bytes each versus sixteen bytes each, respectively), in the presently described embodiment of the invention all flow keys are of uniform size. In particular, in this embodiment they are thirty-six bytes long, including the two-byte TCP source port and two-byte TCP destination port. Flow keys generated from IP, version four, packet headers are padded as necessary (e.g., with twenty-four clear bytes) to fill the flow key's allocated space.

In state 428, a control or status indicator is assembled to provide various information to one or more modules of NIC 100. In one embodiment of the invention a control indicator includes the packet's TCP sequence number, a flag or identifier (e.g., one or more bits) indicating whether the packet contains data (e.g., whether the TCP payload size is greater than zero), a flag indicating whether the data portion of the packet exceeds a pre-determined size, and a flag indicating whether certain entries in the TCP Flags field are equivalent to pre-determined values. The latter flag may, for example, be used to inform another module of NIC 100 that components of the Flags field do or do not have a particular configuration. After state 428, the illustrated procedure ends with state 432.

State 430 may be entered at several different points of the illustrated procedure. This state is entered, for example, when it is determined that a header portion that is being parsed by a header parser does not conform to the pre-selected protocol stacks identified above. As a result, much of the information described above is not retrieved. A practical consequence of the inability to retrieve this information is that it then cannot be provided to other modules of NIC 100 and the enhanced processing described above and in following sections may not be performed for this packet. In particular, and as discussed previously, in a present embodiment of the invention one or more enhanced operations may be performed on parsed packets to increase the efficiency with which they are processed. Illustrative operations that may be applied include the re-assembly of data from related packets (e.g., packets containing data from a single datagram), batch processing of packet headers through a protocol stack, load distribution or load sharing of protocol stack processing, efficient transfer of packet data to a destination entity, etc.

In the illustrated procedure, in state 430 a flag or signal (illustratively termed No_Assist) is set or cleared to indicate that the packet presently held by IPP module 104 (e.g., which was just processed by the header parser) does not conform to any of the pre-selected protocol stacks. This flag or signal may be relied upon by another module of NIC 100 when deciding whether to perform one of the enhanced operations.

Another flag or signal may be set or cleared in state 430 to initialize a checksum parameter indicating that a checksum operation, if performed, should start at the beginning of the packet (e.g., with no offset into the packet). Illustratively, incompatible packets cannot be parsed to determine a more appropriate point from which to begin the checksum operation. After state 430, the procedure ends with end state 432.

After parsing a packet, the header parser may distribute information generated from the packet to one or more modules of NIC 100. For example, in one embodiment of the invention the flow key is provided to flow database manager 108, load distributor 112 and one or both of control queue 118 and packet queue 116. Illustratively, the control indicator is provided to flow database manager 108. This and other control information, such as TCP payload size, TCP payload offset and the No_Assist signal may be returned to IPP module 104 and provided to control queue 118. Yet additional control and/or diagnostic information, such as offsets to the layer three and/or layer four headers, may be provided to IPP module 104, packet queue 116 and/or control queue 118.

Checksum information (e.g., a starting point and either an ending point or other means of identifying a portion of the packet from which to compute a checksum) may be provided to checksum generator 114.

As discussed in a following section, although a received packet is parsed on NIC 100 (e.g., by header parser 106), the packets are still processed (e.g., through their respective protocol stacks) on the host computer system in the illustrated embodiment of the invention. However, after parsing a packet in an alternative embodiment of the invention, NIC 100 also performs one or more subsequent processing steps. For example, NIC 100 may include one or more protocol processors for processing one or more of the packet's protocol headers.

Dynamic Header Parsing Instructions in One Embodiment of the Invention

In one embodiment of the present invention, header parser 106 parses a packet received from a network according to a dynamic sequence of instructions. The instructions may be stored in the header parser's instruction memory (e.g., RAM, SRAM, DRAM, flash) that is re-programmable or that can otherwise be updated with new or additional instructions. In one embodiment of the invention software operating on a host computer (e.g., a device driver) may download a set of parsing instructions for storage in the header parser memory.

The number and format of instructions stored in a header parser's instruction memory may be tailored to one or more specific protocols or protocol stacks. An instruction set configured for one collection of protocols, or a program constructed from that instruction set, may therefore be updated or replaced by a different instruction set or program. For packets received at the network interface that are formatted in accordance with the selected protocols (e.g., "compatible" packets), as determined by analyzing or parsing the packets, various enhancements in the handling of network traffic become possible as described in the following sections. In particular, packets from one datagram that are configured according to a selected protocol may be re-assembled for efficient transfer in a host computer. In addition, header portions of such packets may be processed collectively rather than serially. And, the processing of packets from different datagrams by a multi-processor host computer may be shared or distributed among the processors. Therefore, one objective of a dynamic header parsing operation is to identify a protocol according to which a received packet has been formatted or determine whether a packet header conforms to a particular protocol.

FIG. 23, discussed in detail shortly, presents an illustrative series of instructions for parsing the layer two, three and four headers of a packet to determine if they are Ethernet, IP and TCP, respectively. The illustrated instructions comprise one possible program or microcode for performing a parsing operation. As one skilled in the art will recognize, after a particular set of parsing instructions is loaded into a parser memory, a number of different programs may be assembled. FIG. 23 thus presents merely one of a number of programs that may be generated from the stored instructions. The instructions presented in FIG. 23 may be performed or executed by a microsequencer, a processor, a microprocessor or other similar module located within a network interface circuit.

In particular, other instruction sets and other programs may be derived for different communication protocols, and may be expanded to other layers of a protocol stack. For example, a set of instructions could be generated for parsing NFS (Network File System) packets. Illustratively, these instructions would be configured to parse layer five and six headers to determine if they are Remote Procedure Call (RPC) and External Data Representation (XDR), respectively. Other instructions could be configured to parse a portion of the packet's data (which may be considered layer seven). An NFS header may be considered a part of a packet's layer six protocol header or part of the packet's data.

One type of instruction executed by a microsequencer may be designed to locate a particular field of a packet (e.g., at a specific offset within the packet) and compare the value stored at that offset to a value associated with that field in a particular communication protocol. For example, one instruction may require the microsequencer to examine a value in a packet header at an offset that would correspond to a Type field of an Ethernet header. By comparing the value actually stored in the packet with the value expected for the protocol, the microsequencer can determine if the packet appears to conform to the Ethernet protocol. Illustratively, the next instruction applied in the parsing program depends upon whether the previous comparison was successful. Thus, the particular instructions applied by the microsequencer, and the sequence in which applied, depend upon which protocols are represented by the packet's headers.

The microsequencer may test one or more field values within each header included in a packet. The more fields that are tested and that are found to comport with the format of a known protocol, the greater the certainty that the packet conforms to that protocol. As one skilled in the art will appreciate, one communication protocol may be quite different than another protocol, thus requiring examination of different parts of packet headers for different protocols. Illustratively, the parsing of one packet may end in the event of an error or because it was determined that the packet being parsed does or does not conform to the protocol(s) the instructions are designed for.

Each instruction in FIG. 23 may be identified by a number and/or a name. A particular instruction may perform a variety of tasks other than comparing a header field to an expected value. An instruction may, for example, call another instruction to examine another portion of a packet header, initialize, load or configure a register or other data structure, prepare for the arrival and parsing of another packet, etc. In particular, a register or other storage structure may be configured in anticipation of an operation that is performed in the network interface after the packet is parsed. For example, a program instruction in FIG. 23 may identify an output operation that may or may not be performed, depending upon the success or failure of the comparison of a value extracted from a packet with an expected value. An output operation may store a value in a register, configure a register (e.g., load an argument or operator) for a post-parsing operation, clear a register to await a new packet, etc.

A pointer may be employed to identify an offset into a packet being parsed. In one embodiment, such a pointer is initially located at the beginning of the layer two protocol header. In another embodiment, however, the pointer is situated at a specific location within a particular header (e.g., immediately following the layer two destination and/or source addresses) when parsing commences. Illustratively, the pointer is incremented through the packet as the parsing procedure executes. In one alternative embodiment, however, offsets to areas of interest in the packet may be computed from one or more known or computed locations.

In the parsing program depicted in FIG. 23, a header is navigated (e.g., the pointer is advanced) in increments of two bytes (e.g., sixteen-bit words). In addition, where a particular field of a header is compared to a known or expected value, up to two bytes are extracted at a time from the field. Further, when a value or header field is copied for storage in a register or other data structure, the amount of data that may be copied in one operation may be expressed in multiples of two-byte units or in other units altogether (e.g., individual bytes). This unit of measurement (e.g., two bytes) may be increased or decreased in an alternative embodiment of the invention. Altering the unit of measurement may alter the precision with which a header can be parsed or a header value can be extracted.

In the embodiment of the invention illustrated in FIG. 23, a set of instructions loaded into the header parser's instruction memory comprises a number of possible operations to be performed while testing a packet for compatibility with selected protocols. Program 2300 is generated from the instruction set. Program 2300 is thus merely one possible program, microcode or sequence of instructions that can be formed from the available instruction set.

In this embodiment, the loaded instruction set enables the following sixteen operations that may be performed on a packet that is being parsed. Specific implementations of these operations in program 2300 are discussed in additional detail below. These instructions will be understood to be illustrative in nature and do not limit the composition of instruction sets in other embodiments of the invention. In addition, any subset of these operations may be employed in a particular parsing program or microcode. Further, multiple instructions may employ the same operation and have different effects.

A CLR_REG operation allows the selective initialization of registers or other data structures used in program 2300 and, possibly, data structures used in functions performed after a packet is parsed. Initialization may comprise storing the value zero. A number of illustrative registers that may be initialized by a CLR_REG operation are identified in the remaining operations.

A LD_FID operation copies a variable amount of data from a particular offset within the packet into a register configured to store a packet's flow key or other flow identifier. This register may be termed a FLOWID register. The effect of an LD_FID operation is cumulative. In other words, each time it is invoked for one packet the generated data is appended to the flow key data stored previously.

A LD_SEQ operation copies a variable amount of data from a particular offset within the packet into a register configured to store a packet's sequence number (e.g., a TCP sequence number). This register may be assigned the label SEQNO. This operation is also cumulative—the second and subsequent invocations of this operation for the packet cause the identified data to be appended to data stored previously.

A LD_CTL operation loads a value from a specified offset in the packet into a CONTROL register. The CONTROL register may comprise a control indicator discussed in a previous section for identifying whether a packet is suitable for data re-assembly, packet batching, load distribution or other enhanced functions of NIC 100. In particular, a control indicator may indicate whether a No_Assist flag should be raised for the packet, whether the packet includes any data, whether the amount of packet data is larger than a predetermined threshold, etc. Thus, the value loaded into a CONTROL register in a LD_CTL operation may affect the post-parsing handling of the packet.

A LD_SAP operation loads a value into the CONTROL register from a variable offset within the packet. The loaded value may comprise the packet's ethertype. In one option that may be associated with a LD_SAP operation, the offset of the packet's layer three header may also be stored in the CONTROL register or elsewhere. As one skilled in the art will recognize, a packet's layer three header may immediately follow its layer two ethertype field if the packet conforms to the Ethernet and IP protocols.

A LD_R1 operation may be used to load a value into a temporary register (e.g., named R1) from a variable offset within the packet. A temporary register may be used for a variety of tasks, such as accumulating values to determine the length of a header or other portion of the packet. A LD_R1 operation may also cause a value from another variable offset to be stored in a second temporary register (e.g., named R2). The values stored in the R1 and/or R2 registers during the parsing of a packet may or may not be cumulative.

A LD_L3 operation may load a value from the packet into a register configured to store the location of the packet's layer three header. This register may be named L3OFFSET. In one optional method of invoking this operation, it may be used to load a fixed value into the L3OFFSET register. As another option, the LD_L3 operation may add a value stored in a temporary register (e.g., R1) to the value being stored in the L3OFFSET register.

A LD_SUM operation stores the starting point within the packet from which a checksum should be calculated. The register in which this value is stored may be named a CSUMSTART register. In one alternative invocation of this operation, a fixed or predetermined value is stored in the register. As another option, the LD_SUM operation may add a value stored in a temporary register (e.g., R1) to the value being stored in the CSUMSTART register.

A LD_HDR operation loads a value into a register configured to store the location within the packet at which the header portion may be split. The value that is stored may, for example, be used during the transfer of the packet to the host computer to store a data portion of the packet in a separate location than the header portion. The loaded value may thus identify the beginning of the packet data or the beginning of a particular header. In one invocation of a LD_HDR operation, the stored value may be computed from a present position of a parsing pointer described above. In another invocation, a fixed or predetermined value may be store. As yet another alternative, a value stored in a temporary register (e.g., R1) and/or a constant may be added to the loaded value.

A LD_LEN operation stores the length of the packet's payload into a register (e.g., a PAYLOADLEN register).

An IM_FID operation appends or adds a fixed or predetermined value to the existing contents of the FLOWID register described above.

An IM_SEQ operation appends or adds a fixed or predetermined value to the contents of the SEQNO register described above.

An IM_SAP operation loads or stores a fixed or predetermined value in the CSUMSTART register described above.

An IM_R1 operation may add or load a predetermined value in one or more temporary registers (e.g., R1, R2).

An IM_CTL operation loads or stores a fixed or predetermined value in the CONTROL register described above.

A ST_FLAG operation loads a value from a specified offset in the packet into a FLAGS register. The loaded value may comprise one or more fields or flags from a packet header.

One skilled in the art will recognize that the labels assigned to the operations and registers described above and elsewhere in this section are merely illustrative in nature and in no way limit the operations and parsing instructions that may be employed in other embodiments of the invention.

Instructions in program 2300 comprise instruction number field 2302, which contains a number of an instruction within the program, and instruction name field 2304, which contains a name of an instruction. In an alternative embodiment of the invention instruction number and instruction name fields may be merged or one of them may be omitted.

Instruction content field 2306 includes multiple portions for executing an instruction. An "extraction mask" portion of an instruction is a two-byte mask in hexadecimal notation. An extraction mask identifies a portion of a packet header to be copied or extracted, starting from the current packet offset (e.g., the current position of the parsing pointer). Illustratively, each bit in the packet's header that corresponds to a one in the hexadecimal value is copied for comparison to a comparison or test value. For example, a value of 0xFF00 in the extraction mask portion of an instruction signifies that the entire first byte at the current packet offset is to be copied and that the contents of the second byte are irrelevant. Similarly, an extraction mask of 0x3FFF signifies that all but the two most significant bits of the first byte are to be copied. A two-byte value is constructed from the extracted contents, using whatever was copied from the packet. Illustratively, the remainder of the value is padded with zeros. One skilled in the art will appreciate that the format of an extraction mask (or an output mask, described below) may be adjusted as necessary to reflect little endian or big endian representation.

One or more instructions in a parsing program may not require any data extracted from the packet at the pointer location to be able to perform its output operation. These instructions may have an extraction mask value of 0x0000 to indicate that although a two-byte value is still retrieved from the pointer position, every bit of the value is masked off. Such an extraction mask thus yields a definite value of zero. This type of instruction may be used when, for example, an output operation needs to be performed before another substantive portion of header data is extracted with an extraction mask other than 0x0000.

A "compare value" portion of an instruction is a two-byte hexadecimal value with which the extracted packet contents are to be compared. The compare value may be a value known to be stored in a particular field of a specific protocol header. The compare value may comprise a value that the extracted portion of the header should match or have a specified relationship to in order for the packet to be considered compatible with the pre-selected protocols.

An "operator" portion of an instruction identifies an operator signifying how the extracted and compare values are to be compared. Illustratively, EQ signifies that they are tested for equality, NE signifies that they are tested for inequality, LT signifies that the extracted value must be less than the compare value for the comparison to succeed, GE signifies that the extracted value must be greater than or equal to the compare value, etc. An instruction that awaits arrival of a new packet to be parsed may employ an operation of NP. Other operators for other functions may be added and the existing operators may be assigned other monikers.

A "success offset" portion of an instruction indicates the number of two-byte units that the pointer is to advance if the comparison between the extracted and test values succeeds. A "success instruction" portion of an instruction identifies the next instruction in program 2300 to execute if the comparison is successful.

Similarly, "failure offset" and "failure instruction" portions indicate the number of two-byte units to advance the pointer and the next instruction to execute, respectively, if the comparison fails. Although offsets are expressed in units of two bytes (e.g., sixteen-bit words) in this embodiment of the invention, in an alternative embodiment of the invention they may be smaller or larger units. Further, as mentioned above an instruction may be identified by number or name.

Not all of the instructions in a program are necessarily used for each packet that is parsed. For example, a program may include instructions to test for more than one type or version of a protocol at a particular layer. In particular, program 2300 tests for either version four or six of the IP protocol at layer three. The instructions that are actually executed for a given packet will thus depend upon the format of the packet. Once a packet has been parsed as much as possible with a given program or it has been determined that the packet does or does not conform to a selected protocol, the parsing may cease or an instruction for halting the parsing procedure may be executed. Illustratively, a next instruction portion of an instruction (e.g., "success instruction" or "failure instruction") with the value "DONE" indicates the completion of parsing of a packet. A DONE, or similar, instruction may be a dummy instruction. In other words, "DONE" may simply signify that parsing to be terminated for the present packet. Or, like instruction eighteen of program 2300, a DONE instruction may take some action to await a new packet (e.g., by initializing a register).

The remaining portions of instruction content field 2306 are used to specify and complete an output or other data storage operation. In particular, in this embodiment an "output operation" portion of an instruction corresponds to the operations included in the loaded instruction set. Thus, for program 2300, the output operation portion of an instruction identifies one of the sixteen operations described above. The output operations employed in program 2300 are further described below in conjunction with individual instructions.

An "operation argument" portion of an instruction comprises one or more arguments or fields to be stored, loaded or otherwise used in conjunction with the instruction's output operation. Illustratively, the operation argument portion takes the form of a multi-bit hexadecimal value. For program 2300, operation arguments are eleven bits in size. An argument or portion of an argument may have various meanings, depending upon the output operation. For example, an operation argument may comprise one or more numerical values to be stored in a register or to be used to locate or delimit a portion of a header. Or, an argument bit may comprise a flag to signal an action or status. In particular, one argument bit may specify that a particular register is to be reset; a set of argument bits may comprise an offset into a packet header to a value to be stored in a register, etc. Illustratively, the offset specified by an operation argument is applied to the location of the parsing pointer position before the pointer is advanced as specified by the applicable success offset or failure offset. The operation arguments used in program 2300 are explained in further detail below.

An "operation enabler" portion of an instruction content field specifies whether or when an instruction's output operation is to be performed. In particular, in the illustrated embodiment of the invention an instruction's output operation may or may not be performed, depending on the result of the comparison between a value extracted from a header and the compare value. For example, an output enabler may be set to a first value (e.g., zero) if the output operation is never to be performed. It may take different values if it is to be performed only when the comparison does or does not satisfy the operator (e.g., one or two, respectively). An operation enabler may take yet another value (e.g., three) if it is always to be performed.

A "shift" portion of an instruction comprises a value indicating how an output value is to be shifted. A shift may be necessary because different protocols sometime require values to be formatted differently. In addition, a value indicating a length or location of a header or header field may require shifting in order to reflect the appropriate magnitude represented by the value. For example, because program 2300 is designed to use two-byte units, a value may need to be shifted if it is to reflect other units (e.g., bytes). A shift value in a present embodiment indicates the number of positions (e.g., bits) to right-shift an output value. In another embodiment of the invention a shift value may represent a different shift type or direction.

Finally, an "output mask" specifies how a value being stored in a register or other data structure is to be formatted. As stated above, an output operation may require an extracted, computed or assembled value to be stored. Similar to the extraction mask, the output mask is a two-byte hexadecimal value. For every position in the output mask that contains a one, in this embodiment of the invention the corresponding bit in the two-byte value identified by the output operation and/or operation argument is to be stored. For example, a value of 0xFFFF indicates that the specified two-byte value is to be stored as is. Illustratively, for every position in the output mask that contains a zero, a zero is stored. Thus, a value of 0xF000 indicates that the most significant four bits of the first byte are to be stored, but the rest of the stored value is irrelevant, and may be padded with zeros.

An output operation of "NONE" may be used to indicate that there is no output operation to be performed or stored, in which case other instruction portions pertaining to output may be ignored or may comprise specified values (e.g., all zeros). In the program depicted in FIG. 23, however, a CLR_REG output operation, which allows the selective re-initialization of registers, may be used with an operation argument of zero to effectively perform no output. In particular, an operation argument of zero for the CLR_REG operation indicates that no registers are to be reset. In an alternative embodiment of the invention the operation enabler portion of an instruction could be set to a value (e.g., zero) indicating that the output operation is never to be performed.

The format and sequence of instructions in FIG. 23 will be understood to represent just one method of parsing a packet to determine whether it conforms to a particular communication protocol. In particular, the instructions are designed to examine one or more portions of one or more packet headers for comparison to known or expected values and to configure or load a register or other storage location as necessary. As one skilled in the art will appreciate, instructions for parsing a packet may take any of a number of forms and be performed in a variety of sequences without exceeding the scope of the invention.

With reference now to FIG. 23, instructions in program 2300 may be described in detail. Prior to execution of the program depicted in FIG. 23, a parsing pointer is situated at the beginning of a packet's layer two header. The position of the parsing pointer may be stored in a register for easy reference and update during the parsing procedure. In particular, the position of the parsing pointer as an offset (e.g., from the beginning of the layer two header) may be used in computing the position of a particular position within a header.

Program 2300 begins with a WAIT instruction (e.g., instruction zero) that waits for a new packet (e.g., indicated by operator NP) and, when one is received, sets a parsing pointer to the twelfth byte of the layer two header. This offset to the twelfth byte is indicated by the success offset portion of the instruction. Until a packet is received, the WAIT instruction loops on itself. In addition, a CLR_REG operation is conducted, but the operation enabler setting indicates that it is only conducted when the comparison succeeds (e.g., when a new packet is received).

The specified CLR_REG operation operates according to the WAIT instruction's operation argument (i.e., 0x3FF). In this embodiment, each bit of the argument corresponds to a register or other data structure. The registers initialized in this operation may include the following: ADDR (e.g., to store the parsing pointer's address or location), FLOWID (e.g., to store the packet's flow key), SEQNO (e.g., to store a TCP sequence number), SAP (e.g., the packet's ethertype) and PAYLOADLEN (e.g., payload length). The following registers configured to store certain offsets may also be reset: FLOWOFF (e.g., offset within FLOWID register), SEQOFF (e.g., offset within SEQNO register), L3OFFSET (e.g., offset of the packet's layer three header), HDRSPLIT (e.g., location to split packet) and CSUMSTART (e.g., starting location for computing a checksum). Also, one or more status or control indicators (e.g., CONTROL or FLAGS register) for reporting the status of one or more flags of a packet header may be reset. In addition, one or more temporary registers (e.g., R1, R2) or other data structures may also be initialized. These registers are merely illustrative of he data structures that may be employed in one embodiment of the invention. Other data structures may be employed in other embodiments for the same or different output operations.

Temporary registers such as R1 and/or R2 may be used in program 2300 to track various headers and header fields. One skilled in the art will recognize the number of possible combinations of communication protocols and the effect of those various combinations on the structure and format of a packet's headers. More information may need to be examined or gathered from a packet conforming to one protocol or set of protocols than from a packet conforming to another protocol or set of protocols. For example, if extension headers are used with an Internet Protocol header, values from those extension headers and/or their lengths may need to be stored, which values are not needed if extension headers are not used. When calculating a particular offset, such as an offset to the beginning of a packet's data portion for example, multiple registers may need to be maintained and their values combined or added. In this example, one register or temporary register may track the size or format of an extension header, while another register tracks the base IP header.

Instruction VLAN (e.g., instruction one) examines the two-byte field at the parsing pointer position (possibly a Type, Length or TPID field) for a value indicating a VLAN-tagged header (e.g., 8100 in hexadecimal). If the header is VLAN-tagged, the pointer is incremented a couple of bytes (e.g., one two-byte unit) and execution continues with instruction CFI; otherwise, execution continues with instruction 802.3. In either event, the instruction's operation enabler indicates that an IM_CTL operation is always to be performed.

As described above, an IM_CTL operation causes a control register or other data structure to be populated with one or more flags to report the status or condition of a packet. As described in the previous section, a control indicator may indicate whether a packet is suitable for enhanced processing (e.g., whether a No_Assist signal should be generated for the packet), whether a packet includes any data and, if so, whether the size of the data portion exceeds a specified threshold. The operation argument 0x00A for instruction VLAN comprises the value to be stored in the control register, with individual bits of the argument corresponding to particular flags. Illustratively, flags associated with the conditions just described may be set to one, or true, in this IM_CTL operation.

Instruction CFI (e.g., instruction two) examines the CFI bit or flag in a layer two header. If the CFI bit is set, then the packet is not suitable for the processing enhancements described in other sections and the parsing procedure ends by calling instruction DONE (e.g., instruction eighteen). If the CFI bit is not set, then the pointer is incremented another couple of bytes and execution continues with instruction 802.3. As explained above, a null output operation (e.g., "NONE") indicates that no output operation is performed. In addition, the output enabler value (e.g., zero) further ensures that no output operation is performed.

In instruction 802.3 (e.g., instruction three), a Type or Length field (depending on the location of the pointer and format of the packet) is examined to determine if the packet's layer two format is traditional Ethernet or 802.3 Ethernet. If the value in the header field appears to indicate 802.3 Ethernet (e.g., contains a hexadecimal value less than 0600), the pointer is incremented two bytes (to what should be an LLC SNAP field) and execution continues with instruction LLC_1. Otherwise, the layer two protocol may be considered traditional Ethernet and execution continues with instruction IPV4_1. Instruction 802.3 in this embodiment of the invention does not include an output operation.

In instructions LLC_1 and LLC_2 (e.g., instructions four and five), a suspected layer two LLC SNAP field is examined to ensure that the packet conforms to the 802.3 Ethernet protocol. In instruction LLC_1, a first part of the field is tested and, if successful, the pointer is incremented two bytes and a second part is tested in instruction LLC_2. If instruction LLC_2 succeeds, the parsing pointer is advanced four bytes to reach what should be a Type field and execution continues with instruction IPV4_1. If either test fails, however, the parsing procedure exits. In the illustrated embodiment of the invention, no output operation is performed while testing the LLC SNAP field.

In instruction IPV4_1 (e.g., instruction six), the parsing pointer should be at an Ethernet Type field. This field is examined to determine if the layer three protocol appears to correspond to version four of the Internet Protocol. If this test is successful (e.g., the Type field contains a hexadecimal value of 0800), the pointer is advanced two bytes to the beginning of the layer three header and execution of program 2300 continues with instruction IPV4_2. If the test is unsuccessful, then execution continues with instruction IPV6_1. Regardless of the test results, the operation enabler value (e.g., three) indicates that the specified LD_SAP output operation is always performed.

As described previously, in a LD_SAP operation a packet's ethertype (or Service Access Point) is stored in a register. Part of the operation argument of 0x100, in particular the right-most six bits (e.g., zero) constitute an offset to a two-byte value comprising the ethertype. The offset in this example is zero because, in the present context, the parsing pointer is already at the Type field that contains the ethertype. In the presently described embodiment, the remainder of the operation argument constitutes a flag specifying that the starting position of the layer three header (e.g., an offset from the beginning of the packet) is also to be saved (e.g., in the L3OFFSET register). In particular, the beginning of the layer three header is known to be located immediately after the two-byte Type field.

Instruction IPV4_2 (e.g., instruction seven) tests a suspected layer three version field to ensure that the layer three protocol is version four of IP. In particular, a specification for version four of IP specifies that the first four bits of the layer three header contain a value of 0x4. If the test fails, the parsing procedure ends with instruction DONE. If the test succeeds, the pointer advances six bytes and instruction IPV4_3 is called.

The specified LD_SUM operation, which is only performed if the comparison in instruction IPV4_2 succeeds, indicates that an offset to the beginning of a point from which a checksum may be calculated should be stored. In particular, in the presently described embodiment of the invention a checksum should be calculated from the beginning of the TCP header (assuming that the layer four header is TCP). The value of the operation argument (e.g., 0x00A) indicates that the checksum is located twenty bytes (e.g., ten two-byte increments) from the current pointer. Thus, a value of twenty bytes is added to the parsing pointer position and the result is stored in a register or other data structure (e.g., the CSUMSTART register).

Instruction IPV4_3 (e.g., instruction eight) is designed to determine whether the packet's IP header indicates IP fragmentation. If the value extracted from the header in accordance with the extraction mask does not equal the comparison value, then the packet indicates fragmentation. If fragmentation is detected, the packet is considered unsuitable for the processing enhancements described in other sections and the procedure exits (e.g., through instruction DONE). Otherwise, the pointer is incremented two bytes and instruction IPV4_4 is called after performing a LD_LEN operation.

In accordance with the LD_LEN operation, the length of the IP segment is saved. The illustrated operation argument (e.g., 0x03E) comprises an offset to the Total Length field where this value is located. In particular, the least-significant six bits constitute the offset. Because the pointer has already been advanced past this field, the operation argument comprises a negative value. One skilled in the art will recognize that this binary value (e.g., 111110) may be used to represent the decimal value of negative two. Thus, the present offset of the pointer, minus four bytes (e.g., two two-byte units), is saved in a register or other data structure (e.g., the PAYLOADLEN register). Any other suitable method of representing a negative offset may be used. Or, the IP segment length may be saved while the pointer is at a location preceding the Total Length field (e.g., during a previous instruction).

In instruction IPV4_4 (e.g., instruction nine), a one-byte Protocol field is examined to determine whether the layer four protocol appears to be TCP. If so, the pointer is advanced fourteen bytes and execution continues with instruction TCP_1; otherwise the procedure ends.

The specified LD_FID operation, which is only performed when the comparison in instruction IPV4_4 succeeds, involves retrieving the packet's flow key and storing it in a register or other location (e.g., the FLOWID register). One skilled in the art will appreciate that in order for the comparison in instruction IPV4_4 to be successful, the packet's layer three and four headers must conform to IP (version four) and TCP, respectively. If so, then the entire flow key (e.g., IP source and destination addresses plus TCP source and destination port numbers) is stored contiguously in the packet's header portion. In particular, the flow key comprises the last portion of the IP header and the initial portion of the TCP header and may be extracted in one operation. The operation argument (e.g., 0x182) thus comprises two values needed to locate and delimit the flow key. Illustratively, the right-most six bits of the argument (e.g., 0x02) identify an offset from the pointer position, in two-byte units, to the beginning of the flow key. The other five bits of the argument (e.g., 0x06) identify the size of the flow key, in two-byte units, to be stored.

In instruction IPV6_1 (e.g., instruction ten), which follows the failure of the comparison performed by instruction IPV4_1, the parsing pointer should be at a layer two Type field. If this test is successful (e.g., the Type field holds a hexadecimal value of 86DD), instruction IPV6_2 is executed after a LD_SUM operation is performed and the pointer is incremented two bytes to the beginning of the layer three protocol. If the test is unsuccessful, the procedure exits.

The indicated LD_SUM operation in instruction IPV6_1 is similar to the operation conducted in instruction IPV4_2 but utilizes a different argument. Again, the checksum is to be calculated from the beginning of the TCP header (assuming the layer four header is TCP). The specified operation argument (e.g., 0x015) thus comprises an offset to the beginning of the TCP header—twenty-one two-byte steps ahead. The indicated offset is added to the present pointer position and saved in a register or other data structure (e.g., the CSUMSTART register).

Instruction IPV6_2 (e.g., instruction eleven) tests a suspected layer three version field to further ensure that the layer three protocol is version six of IP. If the comparison fails, the parsing procedure ends with the invocation of instruction DONE. If it succeeds, instruction IPV6_3 is called. Operation IM_R1, which is performed only when the comparison succeeds in this embodiment, saves the length of the IP header from a Payload Length field. As one skilled in the art will appreciate, the Total Length field (e.g., IP segment size) of an IP, version four, header includes the size of the version four header. However, the Payload Length field (e.g., IP segment size) of an IP, version six, header does not include the size of the version six header. Thus, the size of the version six header, which is identified by the right-most eight bits of the output argument (e.g., 0x14, indicating twenty two-byte units) is saved. Illustratively, the remainder of the argument identifies the data structure in which to store the header length (e.g., temporary register R1). Because of the variation in size of layer three headers between protocols, in one embodiment of the invention the header size is indicated in different units to allow greater precision. In particular, in one embodiment of the invention the size of the header is specified in bytes in instruction IPV6_2, in which case the output argument could be 0x128.

Instruction IPV6_3 (e.g., instruction twelve) in this embodiment does not examine a header value. In this embodiment, the combination of an extraction mask of 0x0000 with a comparison value of 0x0000 indicates that an output operation is desired before the next examination of a portion of a header. After the LD_FID operation is performed, the parsing pointer is advanced six bytes to a Next Header field of the version six IP header. Because the extraction mask and comparison values are both 0x0000, the comparison should never fail and the failure branch of instruction should never be invoked.

As described previously, a LD_FID operation stores a flow key in an appropriate register or other data structure (e.g., the FLOWID register). Illustratively, the operation argument of 0x484 comprises two values for identifying and delimiting the flow key. In particular, the right-most six bits (e.g., 0x04) indicates that the flow key portion is located at an offset of eight bytes (e.g., four two-byte increments) from the current pointer position. The remainder of the operation argument (e.g., 0x12) indicates that thirty-six bytes (e.g., the decimal equivalent of 0x12 two-byte units) are to be copied from the computed offset. In the illustrated embodiment of the invention the entire flow key is copied intact, including the layer three source and destination addresses and layer four source and destination ports.

In instruction IPV6_4 (e.g., instruction thirteen), a suspected Next Header field is examined to determine whether the layer four protocol of the packet's protocol stack appears to be TCP. If so, the procedure advances thirty-six bytes (e.g., eighteen two-byte units) and instruction TCP_1 is called; otherwise the procedure exits (e.g., through instruction DONE). Operation LD_LEN is performed if the value in the Next Header field is 0x06. As described above, this operation stores the IP segment size. Once again the argument (e.g., 0x03F) comprises a negative offset, in this case negative one. This offset indicates that the desired Payload Length field is located two bytes before the pointer's present position. Thus, the negative offset is added to the present pointer offset and the result saved in an appropriate register or other data structure (e.g., the PAYLOADLEN register).

In instructions TCP_1, TCP_2, TCP_3 and TCP_4 (e.g., instructions fourteen through seventeen), no header values—other than certain flags specified in the instruction's output operations—are examined, but various data from the packet's TCP header are saved. In the illustrated embodiment, the data that is saved includes a TCP sequence number, a TCP header length and one or more flags. For each instruction, the specified operation is performed and the next instruction is called. As described above, a comparison between the comparison value of 0x0000 and a null extraction value, as used in each of these instructions, will never fail. After instruction TCP_4, the parsing procedure returns to instruction WAIT to await a new packet.

For operation LD_SEQ in instruction TCP_1, the operation argument (e.g., 0x081) comprises two values to identify and extract a TCP sequence number. The right-most six bits (e.g., 0x01) indicate that the sequence number is located two bytes from the pointer's current position. The rest of the argument (e.g., 0x2) indicates the number of two-byte units that must be copied from that position in order to capture the sequence number. Illustratively, the sequence number is stored in the SEQNO register.

For operation ST_FLAG in instruction TCP_2, the operation argument (e.g., 0x145) is used to configure a register (e.g., the FLAGS register) with flags to be used in a post-parsing task. The right-most six bits (e.g., 0x05) constitute an offset, in two-byte units, to a two-byte portion of the TCP header that contains flags that may affect whether the packet is suitable for post-parsing enhancements described in other sections. For example, URG, PSH, RST, SYN and FIN flags may be located at the offset position and be used to configure the register. The output mask (e.g., 0x002F) indicates that only particular portions (e.g., bits) of the TCP header's Flags field are stored.

Operation LD_R1 of instruction TCP_3 is similar to the operation conducted in instruction IPV6_2. Here, an operation argument of 0x205 includes a value (e.g., the least-significant six bits) identifying an offset of five two-byte units from the current pointer position. That location should include a Header Length field to be stored in a data structure identified by the remainder of the argument (e.g., temporary register R1). The output mask (e.g., 0xF000) indicates that only the first four bits are saved (e.g., the Header Length field is only four bits in size).

As one skilled in the art may recognize, the value extracted from the Header Length field may need to be adjusted in order to reflect the use of two-byte units (e.g., sixteen bit words) in the illustrated embodiment. Therefore, in accordance with the shift portion of instruction TCP_3, the value extracted from the field and configured by the output mask (e.g., 0xF000) is shifted to the right eleven positions when stored in order to simplify calculations.

Operation LD_HDR of instruction TCP_4 causes the loading of an offset to the first byte of packet data following the TCP header. As described in a later section, packets that are compatible with a pre-selected protocol stack may be separated at some point into header and data portions. Saving an offset to the data portion now makes it easier to split the packet later. Illustratively, the right-most seven bits of the 0x0FF operation argument comprise a first element of the offset to the data. One skilled in the art will recognize the bit pattern (e.g., 1111111) as equating to negative one. Thus, an offset value equal to the current parsing pointer (e.g., the value in the ADDR register) minus two bytes—which locates the beginning of the TCP header—is saved. The remainder of the argument signifies that the value of a temporary data structure (e.g., temporary register R1) is to be added to this offset. In this particular context, the value saved in the previous instruction (e.g., the length of the TCP header) is added. These two values combine to form an offset to the beginning of the packet data, which is stored in an appropriate register or other data structure (e.g., the HDRSPLIT register).

Finally, and as mentioned above, instruction DONE (e.g., instruction eighteen) indicates the end of parsing of a packet when it is determined that the packet does not conform to one or more of the protocols associated with the illustrated instructions. This may be considered a "clean-up" instruction. In particular, output operation LD_CTL, with an operation argument of 0x001 indicates that a No_Assist flag is to be set (e.g., to one) in the control register described above in conjunction with instruction VLAN. The No_Assist flag, as described elsewhere, may be used to inform other modules of the network interface that the present packet, is unsuitable for one or more processing enhancements described elsewhere.

It will be recognized by one skilled in the art that the illustrated program or microcode merely provides one method of parsing a packet. Other programs, comprising the same instructions in a different sequence or different instructions altogether, with similar or dissimilar formats, may be employed to examine and store portions of headers and to configure registers and other data structures.

The efficiency gains to be realized from the application of the enhanced processing described in following sections more than offset the time required to parse a packet with the illustrated program. Further, even though a header parser parses a packet on a NIC in a current embodiment of the invention, the packet may still need to be processed through its protocol stack (e.g., to remove the protocol headers) by a processor on a host computer. Doing so avoids burdening the communication device (e.g., network interface) with such a task.

One Embodiment of a Flow Database

Figure 5:
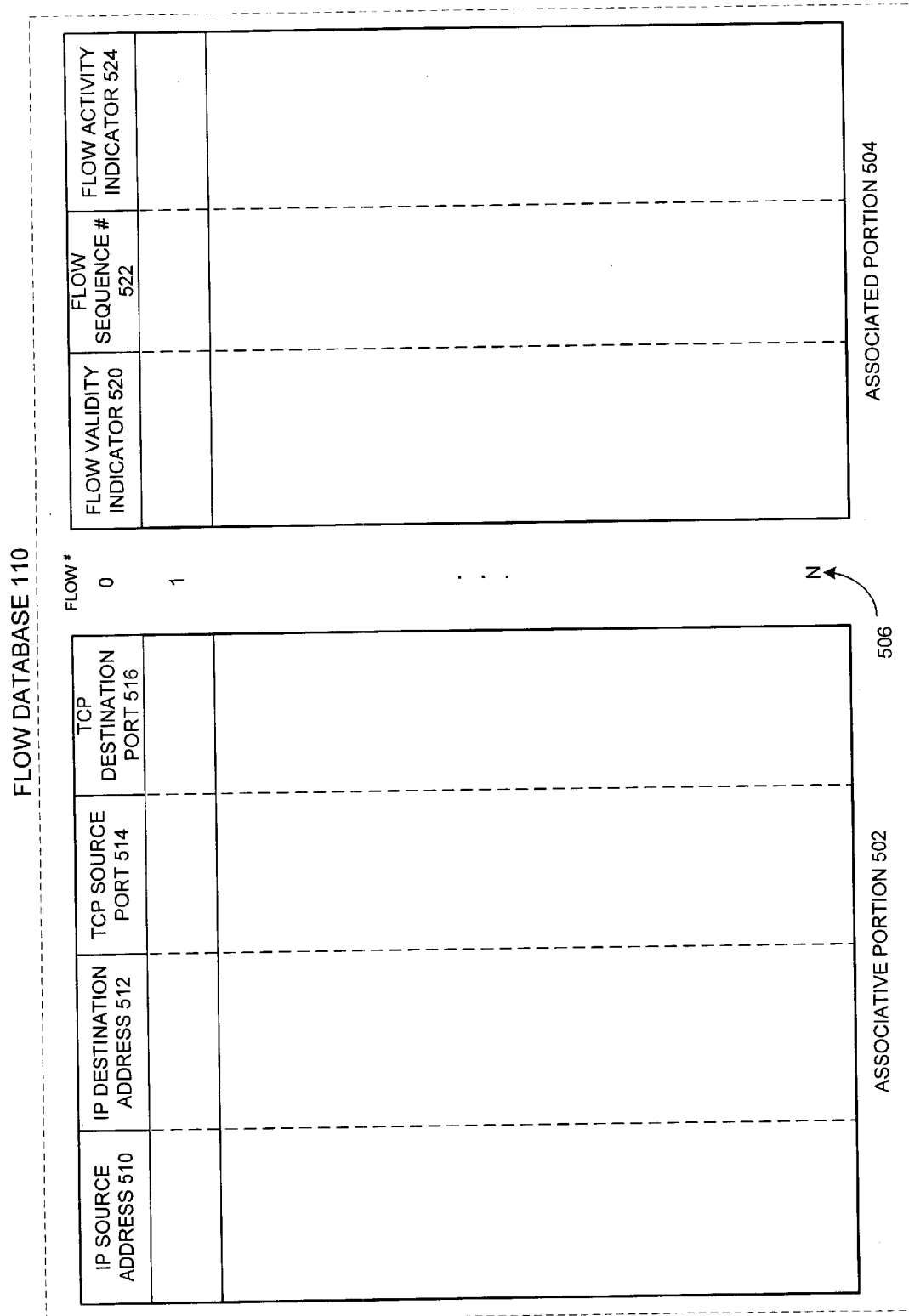
FIG. 5 is a block diagram depicting a network interface circuit flow database in accordance with an embodiment of the invention.

FIG. 5 depicts flow database (FDB) 110 according to one embodiment of the invention. Illustratively FDB 110 is implemented as a CAM (Content Addressable Memory) using a re-writeable memory component (e.g., RAM, SRAM, DRAM). In this embodiment, FDB 110 comprises associative portion 502 and associated portion 504, and may be indexed by flow number 506.

The scope of the invention does not limit the form or structure of flow database 110. In alternative embodiments of the invention virtually any form of data structure may be employed (e.g., database, table, queue, list, array), either monolithic or segmented, and may be implemented in hardware or software. The illustrated form of FDB 110 is merely one manner of maintaining useful information concerning communication flows through NIC 100. As one skilled in the art will recognize, the structure of a CAM allows highly efficient and fast associative searching.

In the illustrated embodiment of the invention, the information stored in FDB 110 and the operation of flow database manager (FDBM) 108 (described below) permit functions such as data re-assembly, batch processing of packet headers, and other enhancements. These functions are discussed in detail in other sections but may be briefly described as follows.

One form of data re-assembly involves the re-assembly or combination of data from multiple related packets (e.g., packets from a single communication flow or a single datagram). One method for the batch processing of packet headers entails processing protocol headers from multiple related packets through a protocol stack collectively rather than one packet at a time. Another illustrative function of NIC 100 involves the distribution or sharing of such protocol stack processing (and/or other functions) among processors in a multi-processor host computer system. Yet another possible function of NIC 100 is to enable the transfer of re-assembled data to a destination entity (e.g., an application program) in an efficient aggregation (e.g., a memory page), thereby avoiding piecemeal and highly inefficient transfers of one packet's data at a time. Thus, in this embodiment of the invention, one purpose of FDB 110 and FDBM 108 is to generate information for the use of NIC 100 and/or a host computer system in enabling, disabling or performing one or more of these functions.

Associative portion 502 of FDB 110 in FIG. 5 stores the flow key of each valid flow destined for an entity served by NIC 100. Thus, in one embodiment of the invention associative portion 502 includes IP source address 510, IP destination address 512, TCP source port 514 and TCP destination port 516. As described in a previous section these fields may be extracted from a packet and provided to FDBM 108 by header parser 106.

Although each destination entity served by NIC 100 may participate in multiple communication flows or end-to-end TCP connections, only one flow at a time will exist between a particular source entity and a particular destination entity. Therefore, each flow key in associative portion 502 that corresponds to a valid flow should be unique from all other valid flows. In alternative embodiments of the invention, associative portion 502 is composed of different fields, reflecting alternative flow key forms, which may be determined by the protocols parsed by the header parser and the information used to identify communication flows.

Associated portion 504 in the illustrated embodiment comprises flow validity indicator 520, flow sequence number 522 and flow activity indicator 524. These fields provide information concerning the flow identified by the flow key stored in the corresponding entry in associative portion 502. The fields of associated portion 504 may be retrieved and/or updated by FDBM 108 as described in the following section.

Flow validity indicator 520 in this embodiment indicates whether the associated flow is valid or invalid. Illustratively, the flow validity indicator is set to indicate a valid flow when the first packet of data in a flow is received, and may be reset to reassert a flow's validity every time a portion of a flow's datagram (e.g., a packet) is correctly received.

Flow validity indicator 520 may be marked invalid after the last packet of data in a flow is received. The flow validity indicator may also be set to indicate an invalid flow whenever a flow is to be torn down (e.g., terminated or aborted) for some reason other than the receipt of a final data packet. For example, a packet may be received out of order from other packets of a datagram, a control packet indicating that a data transfer or flow is being aborted may be received, an attempt may be made to re-establish or re-synchronize a flow (in which case the original flow is terminated), etc. In one embodiment of the invention flow validity indicator 520 is a single bit, flag or value.

Flow sequence number 522 in the illustrated embodiment comprises a sequence number of the next portion of data that is expected in the associated flow. Because the datagram being sent in a flow is typically received via multiple packets, the flow sequence number provides a mechanism to ensure that the packets are received in the correct order. For example, in one embodiment of the invention NIC 100 re-assembles data from multiple packets of a datagram. To perform this re-assembly in the most efficient manner, the packets need to be received in order. Thus, flow sequence number 522 stores an identifier to identify the next packet or portion of data that should be received.

In one embodiment of the invention, flow sequence number 522 corresponds to the TCP sequence number field found in TCP protocol headers. As one skilled in the art will recognize, a packet's TCP sequence number identifies the position of the packet's data relative to other data being sent in a datagram. For packets and flows involving protocols other than TCP, an alternative method of verifying or ensuring the receipt of data in the correct order may be employed.

Flow activity indicator 524 in the illustrated embodiment reflects the recency of activity of a flow or, in other words, the age of a flow. In this embodiment of the invention flow activity indicator 524 is associated with a counter, such as a flow activity counter (not depicted in FIG. 5). The flow activity counter is updated (e.g., incremented) each time a packet is received as part of a flow that is already stored in flow database 110. The updated counter value is then stored in the flow activity indicator field of the packet's flow. The flow activity counter may also be incremented each time a first packet of a new flow that is being added to the database is received. In an alternative embodiment, a flow activity counter is only updated for packets containing data (e.g., it is not updated for control packets). In yet another alternative embodiment, multiple counters are used for updating flow activity indicators of different flows.

Because it can not always be determined when a communication flow has ended (e.g., the final packet may have been lost), the flow activity indicator may be used to identify flows that are obsolete or that should be torn down for some other reason. For example, if flow database 110 appears to be fully populated (e.g., flow validity indicator 520 is set for each flow number) when the first packet of a new flow is received, the flow having the lowest flow activity indicator may be replaced by the new flow.

In the illustrated embodiment of the invention, the size of fields in FDB 110 may differ from one entry to another. For example, IP source and destination addresses are four bytes large in version four of the protocol, but are sixteen bytes large in version six. In one alternative embodiment of the invention, entries for a particular field may be uniform in size, with smaller entries being padded as necessary.

In another alternative embodiment of the invention, fields within FDB 110 may be merged. In particular, a flow's flow key may be stored as a single entity or field instead of being stored as a number of separate fields as shown in FIG. 5.

Similarly, flow validity indicator 520, flow sequence number 522 and flow activity indicator 524 are depicted as separate entries in FIG. 5. However, in an alternative embodiment of the invention one or more of these entries may be combined. In particular, in one alternative embodiment flow validity indicator 520 and flow activity indicator 524 comprise a single entry having a first value (e.g., zero) when the entry's associated flow is invalid. As long as the flow is valid, however, the combined entry is incremented as packets are received, and is reset to the first value upon termination of the flow.

In one embodiment of the invention FDB 110 contains a maximum of sixty-four entries, indexed by flow number 506, thus allowing the database to track sixty-four valid flows at a time. In alternative embodiments of the invention, more or fewer entries may be permitted, depending upon the size of memory allocated for flow database 110. In addition to flow number 506, a flow may be identifiable by its flow key (stored in associative portion 502).

In the illustrated embodiment of the invention, flow database 110 is empty (e.g., all fields are filled with zeros) when NIC 100 is initialized. When the first packet of a flow is received header parser 106 parses a header portion of the packet. As described in a previous section, the header parser assembles a flow key to identify the flow and extracts other information concerning the packet and/or the flow. The flow key, and other information, is passed to flow database manager 108. FDBM 108 then searches FDB 110 for an active flow associated with the flow key. Because the database is empty, there is no match.

In this example, the flow key is therefore stored (e.g., as flow number zero) by copying the IP source address, IP destination address, TCP source port and TCP destination port into the corresponding fields. Flow validity indicator 520 is then set to indicate a valid flow, flow sequence number 522 is derived from the TCP sequence number (illustratively provided by the header parser), and flow activity indicator 524 is set to an initial value (e.g., one), which may be derived from a counter. One method of generating an appropriate flow sequence number, which may be used to verify that the next portion of data received for the flow is received in order, is to add the TCP sequence number and the size of the packet's data. Depending upon the configuration of the packet (e.g., whether the SYN bit in a Flags field of the packet's TCP header is set), however, the sum may need to be adjusted (e.g., by adding one) to correctly identify the next expected portion of data.

As described above, one method of generating an appropriate initial value for a flow activity indicator is to copy a counter value that is incremented for each packet received as part of a flow. For example, for the first packet received after NIC 100 is initialized, a flow activity counter may be incremented to the value of one. This value may then be stored in flow activity indicator 524 for the associated flow. The next packet received as part of the same (or a new) flow causes the counter to be incremented to two, which value is stored in the flow activity indicator for the associated flow. In this example, no two flows should have the same flow activity indicator except at initialization, when they may all equal zero or some other predetermined value.

Upon receipt and parsing of a later packet received at NIC 100, the flow database is searched for a valid flow matching that packet's flow key. Illustratively, only the flow keys of active flows (e.g., those flows for which flow validity indicator 520 is set) are searched. Alternatively, all flow keys (e.g., all entries in associative portion 502) may be searched but a match is only reported if its flow validity indicator indicates a valid flow. With a CAM such as FDB 110 in FIG. 5, flow keys and flow validity indicators may be searched in parallel.

If a later packet contains the next portion of data for a previous flow (e.g., flow number zero), that flow is updated appropriately. In one embodiment of the invention this entails updating flow sequence number 522 and incrementing flow activity indicator 524 to reflect its recent activity. Flow validity indicator 520 may also be set to indicate the validity of the flow, although it should already indicate that the flow is valid.

As new flows are identified, they are added to FDB 110 in a similar manner to the first flow. When a flow is terminated or torn down, the associated entry in FDB 110 is invalidated. In one embodiment of the invention, flow validity indicator 520 is merely cleared (e.g., set to zero) for the terminated flow. In another embodiment, one or more fields of a terminated flow are cleared or set to an arbitrary or predetermined value. Because of the bursty nature of network packet traffic, all or most of the data from a datagram is generally received in a short amount of time. Thus, each valid flow in FDB 110 normally only needs to be maintained for a short period of time, and its entry can then be used to store a different flow.

Due to the limited amount of memory available for flow database 110 in one embodiment of the invention, the size of each field may be limited. In this embodiment, sixteen bytes are allocated for IP source address 510 and sixteen bytes are allocated for IP destination address 512. For IP addresses shorter than sixteen bytes in length, the extra space may be padded with zeros. Further, TCP source port 514 and TCP destination port 516 are each allocated two bytes. Also in this embodiment, flow validity indicator 520 comprises one bit, flow sequence number 522 is allocated four bytes and flow activity indicator 524 is also allocated four bytes.

As one skilled in the art will recognize from the embodiments described above, a flow is similar, but not identical, to an end-to-end TCP connection. A TCP connection may exist for a relatively extended period of time, sufficient to transfer multiple datagrams from a source entity to a destination entity. A flow, however, may exist only for one datagram. Thus, during one end-to-end TCP connection, multiple flows may be set up and torn down (e.g., once for each datagram). As described above, a flow may be set up (e.g., added to FDB 110 and marked valid) when NIC 100 detects the first portion of data in a datagram and may be torn down (e.g., marked invalid in FDB 110) when the last portion of data is received. Illustratively, each flow set up during a single end-to-end TCP connection will have the same flow key because the layer three and layer four address and port identifiers used to form the flow key will remain the same.

In the illustrated embodiment, the size of flow database 110 (e.g., the number of flow entries) determines the maximum number of flows that may be interleaved (e.g., simultaneously active) at one time while enabling the functions of data re-assembly and batch processing of protocol headers. In other words, in the embodiment depicted in FIG. 5, NIC 100 can set up sixty-four flows and receive packets from up to sixty-four different datagrams (i.e., sixty-four flows may be active) without tearing down a flow. If a maximum number of flows through NIC 100 were known, flow database 110 could be limited to the corresponding number of entries.

The flow database may be kept small because a flow only lasts for one datagram in the presently described embodiment and, because of the bursty nature of packet traffic, a datagram's packets are generally received in a short period of time. The short duration of a flow compensates for a limited number of entries in the flow database. In one embodiment of the invention, if FDB 110 is filled with active flows and a new flow is commenced (i.e., a first portion of data in a new datagram), the oldest (e.g., the least recently active) flow is replaced by the new one.

In an alternative embodiment of the invention, flows may be kept active for any number of datagrams (or other measure of network traffic) or for a specified length or range of time. For example, when one datagram ends its flow in FDB 110 may be kept "open" (i.e., not torn down) if the database is not full (e.g., the flow's entry is not needed for a different flow). This scheme may further enhance the efficient operation of NIC 100 if another datagram having the same flow key is received. In particular, the overhead involved in setting up another flow is avoided and more data re-assembly and packet batching (as described below) may be performed. Advantageously, a flow may be kept open in flow database 110 until the end-to-end TCP connection that encompasses the flow ends.

One Embodiment of a Flow Database Manager

FIGS. 6A–6E depict one method of operating a flow database manager (FDBM), such as flow database manager 108 of FIG. 1A, for managing flow database (FDB) 110. Illustratively, FDBM 108 stores and updates flow information stored in flow database 110 and generates an operation code for a packet received by NIC 100. FDBM 108 also tears down a flow (e.g., replaces, removes or otherwise invalidates an entry in FDB 110) when the flow is terminated or aborted.

In one embodiment of the invention a packet's operation code reflects the packet's compatibility with pre-determined criteria for performing one or more functions of NIC 100 (e.g., data re-assembly, batch processing of packet headers, load distribution). In other words, depending upon a packet's operation code, other modules of NIC 100 may or may not perform one of these functions, as described in following sections.

In another embodiment of the invention, an operation code indicates a packet status. For example, an operation code may indicate that a packet: contains no data, is a control packet, contains more than a specified amount of data, is the first packet of a new flow, is the last packet of an existing flow, is out of order, contains a certain flag (e.g., in a protocol header) that does not have an expected value (thus possibly indicating an exceptional circumstance), etc.

The operation of flow database manager 108 depends upon packet information provided by header parser 106 and data drawn from flow database 110. After FDBM 108 processes the packet information and/or data, control information (e.g., the packet's operation code) is stored in control queue 118 and FDB 110 may be altered (e.g., a new flow may be entered or an existing one updated or torn down).

With reference now to FIGS. 6A–6E, state 600 is a start state in which FDBM 108 awaits information drawn from a packet received by NIC 100 from network 102. In state 602, header parser 106 or another module of NIC 100 notifies FDBM 108 of a new packet by providing the packet's flow key and some control information. Receipt of this data may be interpreted as a request to search FDB 110 to determine whether a flow having this flow key already exists.

In one embodiment of the invention the control information passed to FDBM 108 includes a sequence number (e.g., a TCP sequence number) drawn from a packet header. The control information may also indicate the status of certain flags in the packet's headers, whether the packet includes data and, if so, whether the amount of data exceeds a certain size. In this embodiment, FDBM 108 also receives a No_Assist signal for a packet if the header parser determines that the packet is not formatted according to one of the pre-selected protocol stacks (i.e., the packet is not "compatible"), as discussed in a previous section. Illustratively, the No_Assist signal indicates that one or more functions of NIC 100 (e.g., data re-assembly, batch processing, load-balancing) may not be provided for the packet.

Figure 6A:
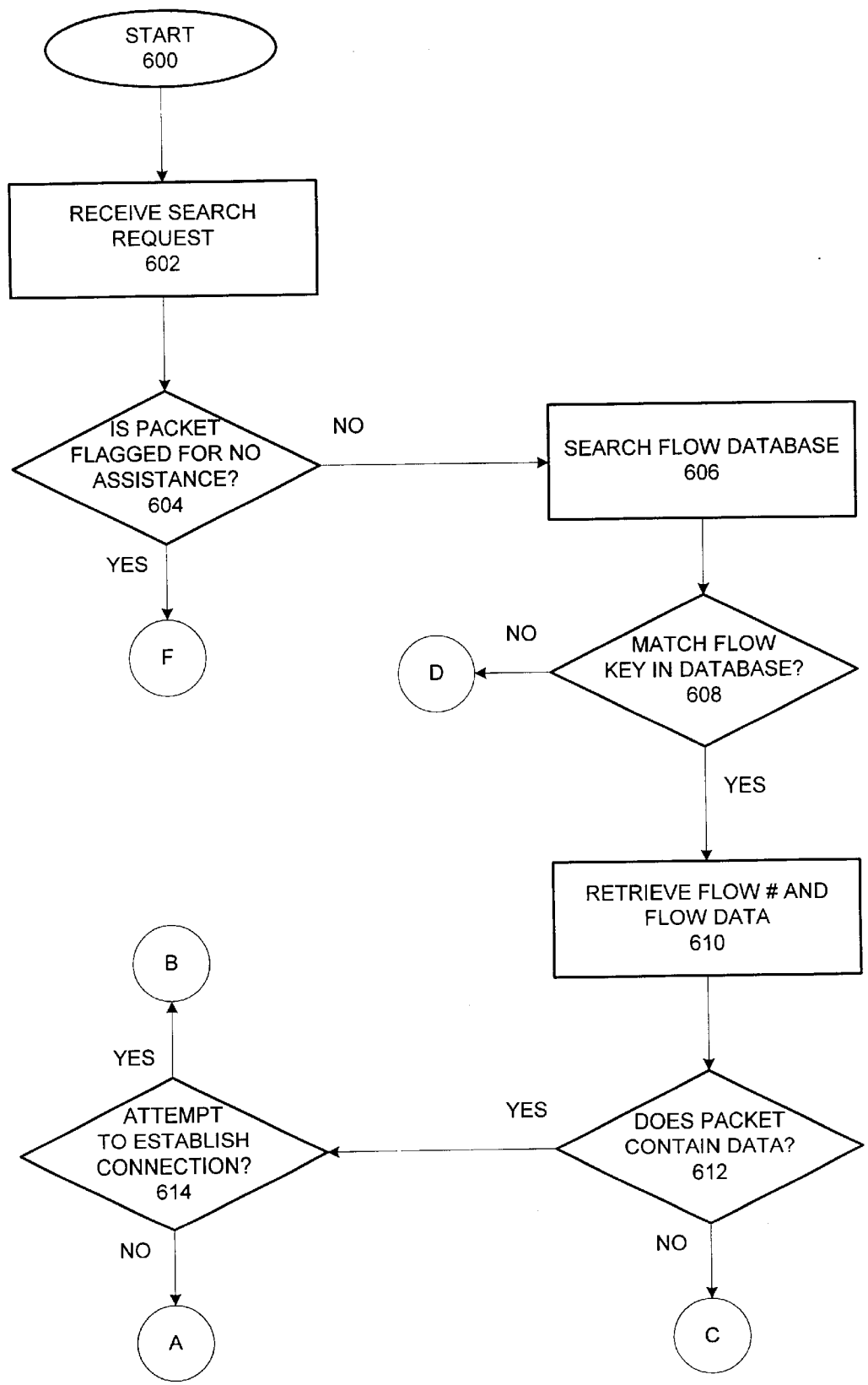
FIGS. 6A–6E comprise a flowchart illustrating one method of managing a network interface circuit flow database in accordance with an embodiment of the invention.
Figure 6B:
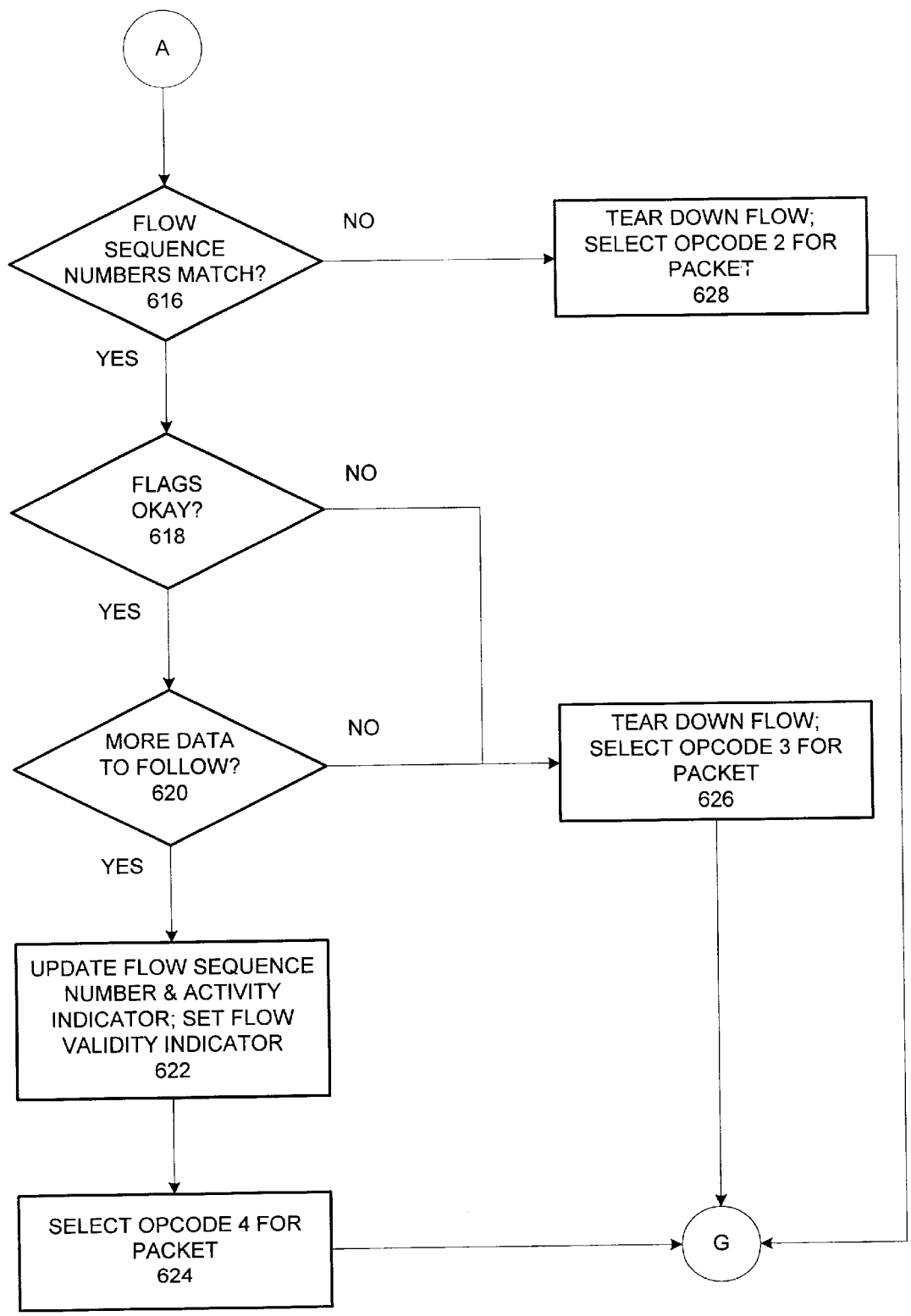
Figure 6C:
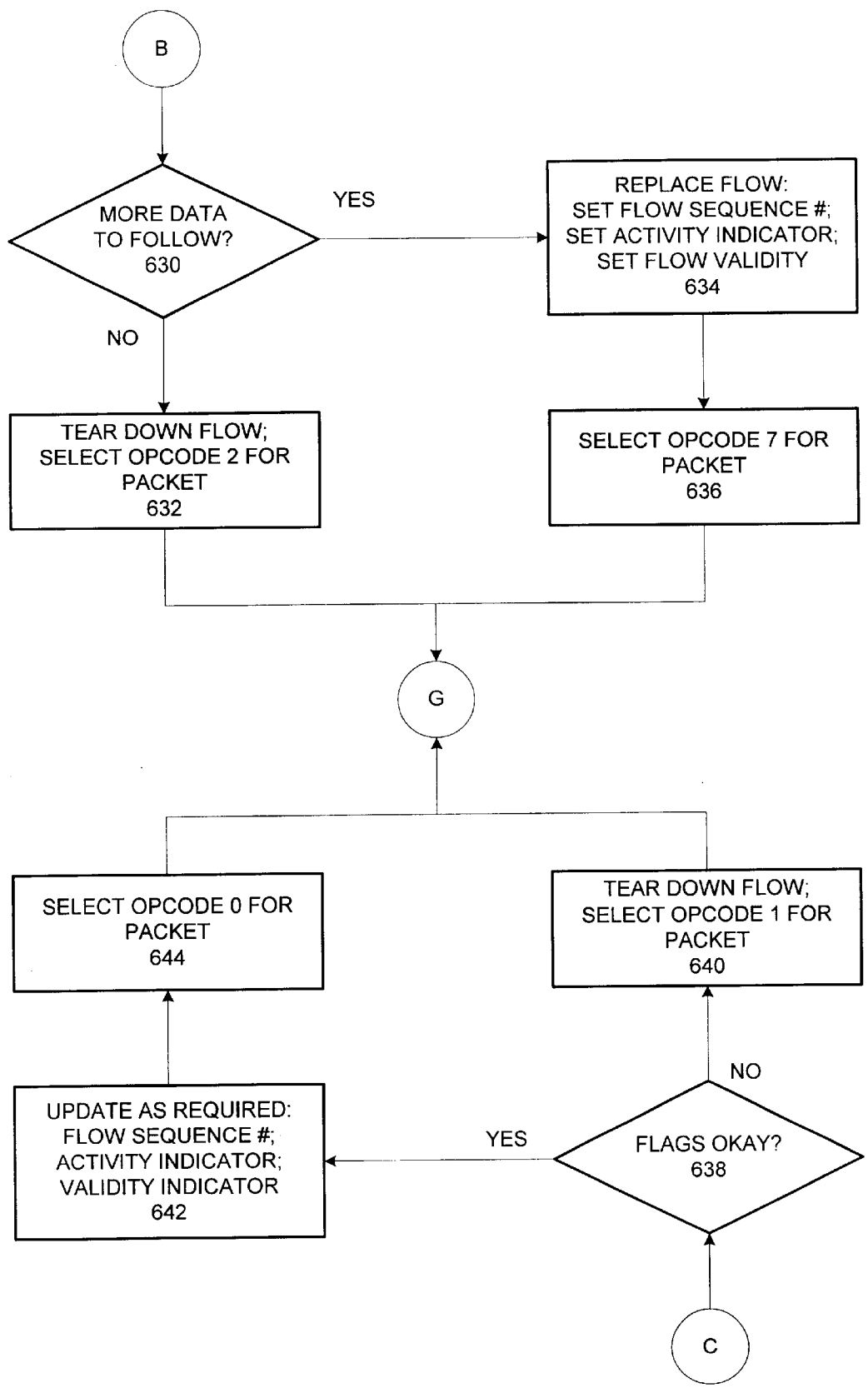
Figure 6D:
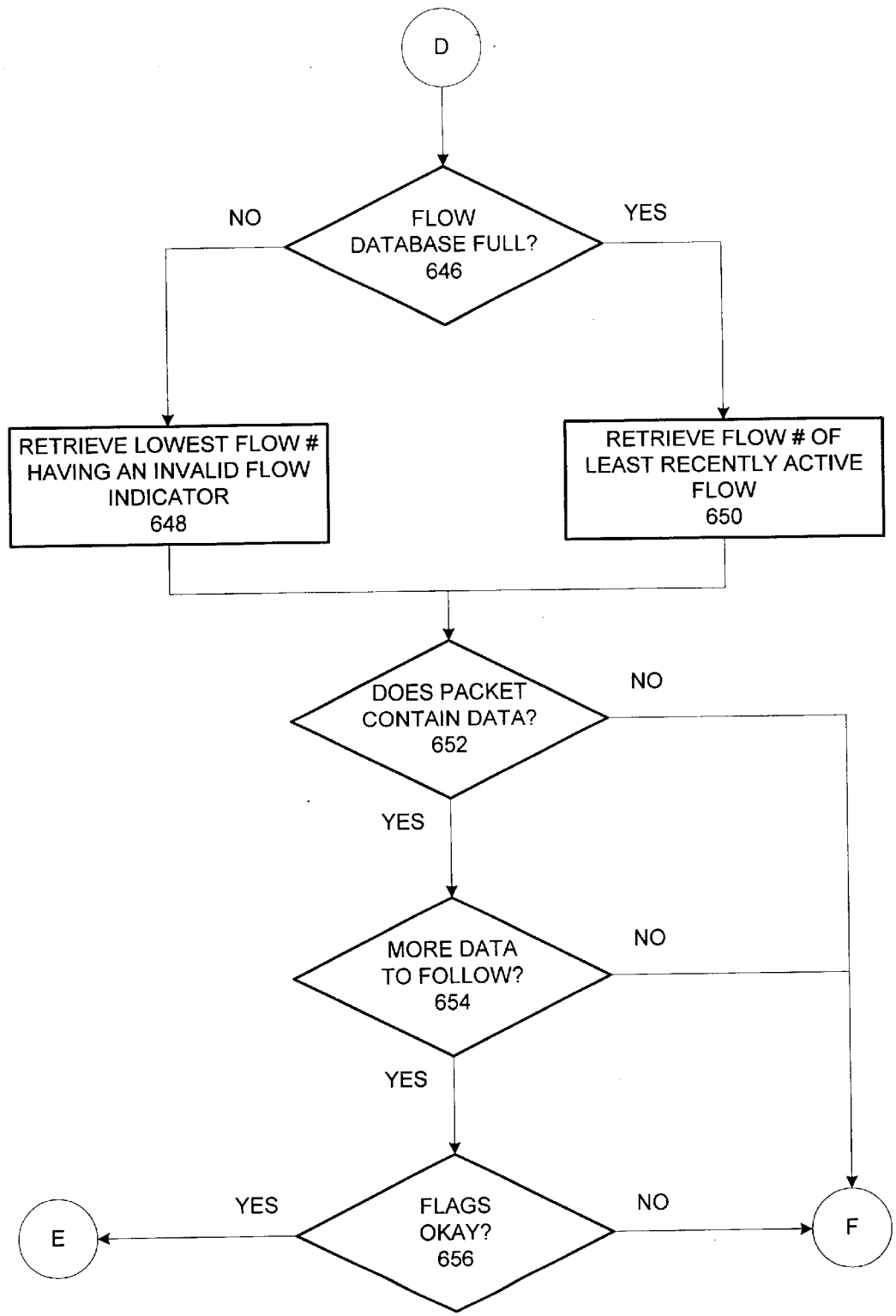
Figure 6E:
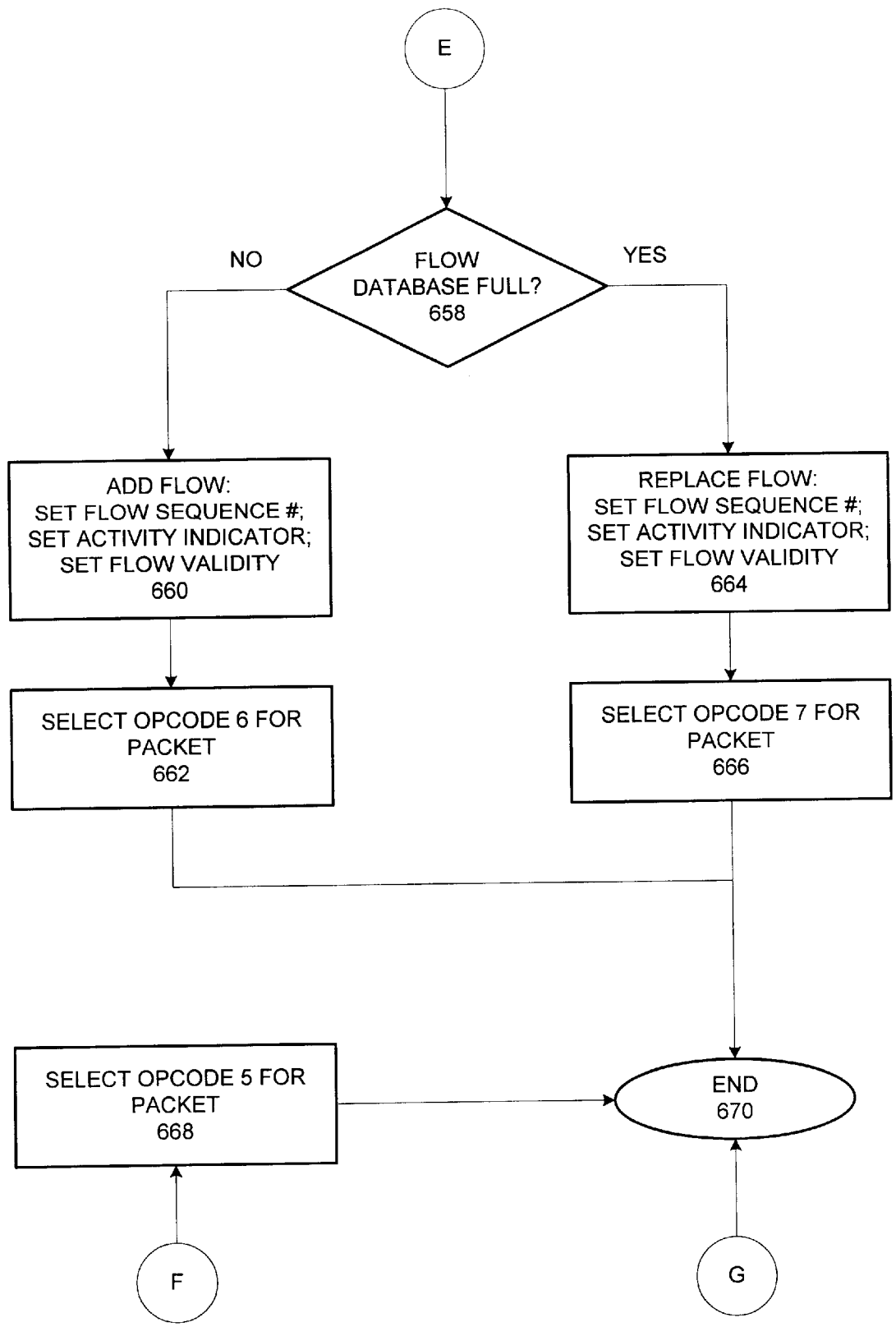

In state 604, FDBM 108 determines whether a No_Assist signal was asserted for the packet. If so, the procedure proceeds to state 668 (FIG. 6E). Otherwise, FDBM 108 searches FDB 110 for the packet's flow key in state 606. In one embodiment of the invention only valid flow entries in the flow database are searched. As discussed above, a flow's validity may be reflected by a validity indicator such as flow validity indicator 520 (shown in FIG. 5). If, in state 608, it is determined that the packet's flow key was not found in the database, or that a match was found but the associated flow is not valid, the procedure advances to state 646 (FIG. 6D).

If a valid match is found in the flow database, in state 610 the flow number (e.g., the flow database index for the matching entry) of the matching flow is noted and flow information stored in FDB 110 is read. Illustratively, this information includes flow validity indicator 520, flow sequence number 522 and flow activity indicator 524 (shown in FIG. 5).

In state 612, FDBM 108 determines from information received from header parser 106 whether the packet contains TCP payload data. If not, the illustrated procedure proceeds to state 638 (FIG. 6C); otherwise the procedure continues to state 614.

In state 614, the flow database manager determines whether the packet constitutes an attempt to reset a communication connection or flow. Illustratively, this may be determined by examining the state of a SYN bit in one of the packet's protocol headers (e.g., a TCP header). In one embodiment of the invention the value of one or more control or flag bits (such as the SYN bit) are provided to the FDBM by the header parser. As one skilled in the art will recognize, one TCP entity may attempt to reset a communication flow or connection with another entity (e.g., because of a problem on one of the entity's host computers) and send a first portion of data along with the re-connection request. This is the situation the flow database manager attempts to discern in state 614. If the packet is part of an attempt to re-connect or reset a flow or connection, the procedure continues at state 630 (FIG. 6C).

In state 616, flow database manager 108 compares a sequence number (e.g., a TCP sequence number) extracted from a packet header with a sequence number (e.g., flow sequence number 522 of FIG. 5) of the next expected portion of data for this flow. As discussed in a previous section, these sequence numbers should correlate if the packet contains the flow's next portion of data. If the sequence numbers do not match, the procedure continues at state 628.

In state 618, FDBM 108 determines whether certain flags extracted from one or more of the packet's protocol headers match expected values. For example, in one embodiment of the invention the URG, PSH, RST and FIN flags from the packet's TCP header are expected to be clear (i.e., equal to zero). If any of these flags are set (e.g., equal to one) an exceptional condition may exist, thus making it possible that one or more of the functions (e.g., data re-assembly, batch processing, load distribution) offered by NIC 100 should not be performed for this packet. As long as the flags are clear, the procedure continues at state 620; otherwise the procedure continues at state 626.

In state 620, the flow database manager determines whether more data is expected during this flow. As discussed above, a flow may be limited in duration to a single datagram. Therefore, in state 620 the FDBM determines if this packet appears to be the final portion of data for this flow's datagram. Illustratively, this determination is made on the basis of the amount of data included with the present packet. As one skilled in the art will appreciate, a datagram comprising more data than can be carried in one packet is sent via multiple packets. The typical manner of disseminating a datagram among multiple packets is to put as much data as possible into each packet. Thus, each packet except the last is usually equal or nearly equal in size to the maximum transfer unit (MTU) allowed for the network over which the packets are sent. The last packet will hold the remainder, usually causing it to be smaller than the MTU.

Therefore, one manner of identifying the final portion of data in a flow's datagram is to examine the size of each packet and compare it to a figure (e.g., MTU) that a packet is expected to exceed except when carrying the last data portion. It was described above that control information is received by FDBM 108 from header parser 106. An indication of the size of the data carried by a packet may be included in this information. In particular, header parser 106 in one embodiment of the invention is configured to compare the size of each packet's data portion to a pre-selected value. In one embodiment of the invention this value is programmable. This value is set, in the illustrated embodiment of the invention, to the maximum amount of data a packet can carry without exceeding MTU. In one alternative embodiment, the value is set to an amount somewhat less than the maximum amount of data that can be carried.

Thus, in state 620, flow database manager 108 determines whether the received packet appears to carry the final portion of data for the flow's datagram. If not, the procedure continues to state 626.

In state 622, it has been ascertained that the packet is compatible with pre-selected protocols and is suitable for one or more functions offered by NIC 100. In particular, the packet has been formatted appropriately for one or more of the functions discussed above. FDBM 108 has determined that the received packet is part of an existing flow, is compatible with the pre-selected protocols and contains the next portion of data for the flow (but not the final portion). Further, the packet is not part of an attempt to re-set a flow/connection, and important flags have their expected values. Thus, flow database 110 can be updated as follows.

The activity indicator (e.g., flow activity indicator 524 of FIG. 5) for this flow is modified to reflect the recent flow activity. In one embodiment of the invention flow activity indicator 524 is implemented as a counter, or is associated with a counter, that is incremented each time data is received for a flow. In another embodiment of the invention, an activity indicator or counter is updated every time a packet having a flow key matching a valid flow (e.g., whether or not the packet includes data) is received.

In the illustrated embodiment, after a flow activity indicator or counter is incremented it is examined to determine if it "rolled over" to zero (i.e., whether it was incremented past its maximum value). If so, the counter and/or the flow activity indicators for each entry in flow database 110 are set to zero and the current flow's activity indicator is once again incremented. Thus, in one embodiment of the invention the rolling over of a flow activity counter or indicator causes the re-initialization of the flow activity mechanism for flow database 110. Thereafter, the counter is incremented and the flow activity indicators are again updated as described previously. One skilled in the art will recognize that there are many other suitable methods that may be applied in an embodiment of the present invention to indicate that one flow was active more recently than another was.

Also in state 622, flow sequence number 522 is updated. Illustratively, the new flow sequence number is determined by adding the size of the newly received data to the existing flow sequence number. Depending upon the configuration of the packet (e.g., values in its headers), this sum may need to be adjusted. For example, this sum may indicate simply the total amount of data received thus far for the flow's datagram. Therefore, a value may need to be added (e.g., one byte) in order to indicate a sequence number of the next byte of data for the datagram. As one skilled in the art will recognize, other suitable methods of ensuring that data is received in order may be used in place of the scheme described here.

Finally, in state 622 in one embodiment of the invention, flow validity indicator 520 is set or reset to indicate the flow's validity.

Then, in state 624, an operation code is associated with the packet. In the illustrated embodiment of the invention, operation codes comprise codes generated by flow database manager 108 and stored in control queue 118. In this embodiment, an operation code is three bits in size, thus allowing for eight operation codes. Operation codes may have a variety of other forms and ranges in alternative embodiments. For the illustrated embodiment of the invention, TABLE 1 describes each operation code in terms of the criteria that lead to each code's selection and the ramifications of that selection. For purposes of TABLE 1, setting up a flow comprises inserting a flow into flow database 110. Tearing down a flow comprises removing or invalidating a flow in flow database 110. The re-assembly of data is discussed in a following section describing DMA engine 120.

In the illustrated embodiment of the invention, operation code 4 is selected in state 624 for packets in the present context of the procedure (e.g., compatible packets carrying the next, but not last, data portion of a flow). Thus, the existing flow is not torn down and there is no need to set up a new flow. As described above, a compatible packet in this embodiment is a packet conforming to one or more of the pre-selected protocols. By changing or augmenting the pre-selected protocols, virtually any packet may be compatible in an alternative embodiment of the invention.

Returning now to FIGS. 6A–6E, after state 624 the illustrated procedure ends at state 670.

In state 626 (reached from state 618 or state 620), operation code 3 is selected for the packet. Illustratively, operation code 3 indicates that the packet is compatible and matches a valid flow (e.g., the packet's flow key matches the flow key of a valid flow in FDB 110). Operation code 3 may also signify that the packet contains data, does not constitute an attempt to re-synchronize or reset a communication flow/connection and the packet's sequence number matches the expected sequence number (from flow database 110). But, either an important flag (e.g., one of the TCP flags URG, PSH, RST or FIN) is set (determined in state 618) or the packet's data is less than the threshold value described above (in state 620), thus indicating that no more data is likely to follow this packet in this flow. Therefore, the existing flow is torn down but no new flow is created. Illustratively, the flow may be torn down by clearing the flow's validity indicator (e.g., setting it to zero). After state 626, the illustrated procedure ends at state 670.

In state 628 (reached from state 616), operation code 2 is selected for the packet. In the present context, operation code 2 may indicate that the packet is compatible, matches a valid flow (e.g., the packet's flow key matches the flow key of a valid flow in FDB 110), contains data and does not constitute an attempt to re-synchronize or reset a communication flow/connection. However, the sequence number extracted from the packet (in state 616) does not match the expected sequence number from flow database 110. This may occur, for example, when a packet is received out of order. Thus, the existing flow is torn down but no new flow is established. Illustratively, the flow may be torn down by clearing the flow's validity indicator (e.g., setting it to zero). After state 628, the illustrated procedure ends at state 670.

State 630 is entered from state 614 when it is determined that the received packet constitutes an attempt to reset a communication flow or connection (e.g., the TCP SYN bit is set). In state 630, flow database manager 108 determines whether more data is expected to follow. As explained in conjunction with state 620, this determination may be made on the basis of control information received by the flow database manager from the header parser. If more data is expected (e.g., the amount of data in the packet equals or exceeds a threshold value), the procedure continues at state 634.

In state 632, operation code 2 is selected for the packet. Operation code 2 was also selected in state 628 in a different context. In the present context, operation code 2 may indicate that the packet is compatible, matches a valid flow and contains data. Operation code 2 may also signify in this context that the packet constitutes an attempt to re-synchronize or reset a communication flow or connection, but that no more data is expected once the flow/connection is reset. Therefore, the existing flow is torn down and no new flow is established. Illustratively, the flow may be torn down by clearing the flow's validity indicator (e.g., setting it to zero). After state 632, the illustrated procedure ends at state 670.

In state 634, flow database manager 108 responds to an attempt to reset or re-synchronize a communication flow/connection whereby additional data is expected. Thus, the existing flow is torn down and replaced as follows. The existing flow may be identified by the flow number retrieved in state 610 or by the packet's flow key. The flow's sequence number (e.g., flow sequence number 522 in FIG. 5) is set to the next expected value. Illustratively, this value depends upon the sequence number (e.g., TCP sequence number) retrieved from the packet (e.g., by header parser 106) and the amount of data included in the packet. In one embodiment of the invention these two values are added to determine a new flow sequence number. As discussed previously, this sum may need to be adjusted (e.g., by adding one). Also in state 634, the flow activity indicator is updated (e.g., incremented). As explained in conjunction with state 622, if the flow activity indicator rolls over, the activity indicators for all flows in the database are set to zero and the present flow is again incremented. Finally, the flow validity indicator is set to indicate that the flow is valid.

In state 636, operation code 7 is selected for the packet. In the present context, operation code 7 indicates that the packet is compatible, matches a valid flow and contains data. Operation code 7 may further signify, in this context, that the packet constitutes an attempt to re-synchronize or reset a communication flow/connection and that additional data is expected once the flow/connection is reset. In effect, therefore, the existing flow is torn down and a new one (with the same flow key) is stored in its place. After state 636, the illustrated procedure ends at end state 670.

State 638 is entered after state 612 when it is determined that the received packet contains no data. This often indicates that the packet is a control packet. In state 638, flow database manager 108 determines whether one or more flags extracted from the packet by the header parser match expected or desired values. For example, in one embodiment of the invention the TCP flags URG, PSH, RST and FIN must be clear in order for DMA engine 120 to re-assemble data from multiple related packets (e.g., packets having an identical flow key). As discussed above, the TCP SYN bit may also be examined. In the present context (e.g., a packet with no data), the SYN bit is also expected to be clear (e.g., to store a value of zero). If the flags (and SYN bit) have their expected values the procedure continues at state 642. If, however, any of these flags are set, an exceptional condition may exist, thus making it possible that one or more functions offered by NIC 100 (e.g., data re-assembly, batch processing, load distribution) are unsuitable for this packet, in which case the procedure proceeds to state 640.

In state 640, operation code 1 is selected for the packet. Illustratively, operation code 1 indicates that the packet is compatible and matches a valid flow, but does not contain any data and one or more important flags or bits in the packet's header(s) are set. Thus, the existing flow is torn down and no new flow is established. Illustratively, the flow may be torn down by clearing the flow's validity indicator (e.g., setting it to zero). After state 640, the illustrated procedure ends at end state 670.

In state 642, the flow's activity indicator is updated (e.g., incremented) even though the packet contains no data. As described above in conjunction with state 622, if the activity indicator rolls over, in a present embodiment of the invention all flow activity indicators in the database are set to zero and the current flow is again incremented. The flow's validity indicator may also be reset, as well as the flow's sequence number.

In state 644, operation code 0 is selected for the packet. Illustratively, operation code 0 indicates that the packet is compatible, matches a valid flow, and that the packet does not contain any data. The packet may, for example, be a control packet. Operation code 0 further indicates that none of the flags checked by header parser 106 and described above (e.g., URG, PSH, RST and FIN) are set. Thus, the existing flow is not torn down and no new flow is established. After state 644, the illustrated procedure ends at end state 670.

State 646 is entered from state 608 if the packet's flow key does not match any of the flow keys of valid flows in the flow database. In state 646, FDBM 108 determines whether flow database 110 is full and may save some indication of whether the database is full. In one embodiment of the invention the flow database is considered full when the validity indicator (e.g., flow validity indicator 520 of FIG. 5) is set for every flow number (e.g., for every flow in the database). If the database is full, the procedure continues at state 650, otherwise it continues at state 648.

In state 648, the lowest flow number of an invalid flow (e.g., a flow for which the associated flow validity indicator is equal to zero) is determined. Illustratively, this flow number is where a new flow will be stored if the received packet warrants the creation of a new flow. After state 648, the procedure continues at state 652.

In state 650, the flow number of the least recently active flow is determined. As discussed above, in the illustrated embodiment of the invention a flow's activity indicator (e.g., flow activity indicator 524 of FIG. 5) is updated (e.g., incremented) each time data is received for a flow. Therefore, in this embodiment the least recently active flow can be identified as the flow having the least recently updated (e.g., lowest) flow activity indicator. Illustratively, if multiple flows have flow activity indicators set to a common value (e.g., zero), one flow number may be chosen from them at random or by some other criteria. After state 650, the procedure continues at state 652.

In state 652, flow database manager 108 determines whether the packet contains data. Illustratively, the control information provided to FDBM 108 by the header parser indicates whether the packet has data. If the packet does not include data (e.g., the packet is a control packet), the illustrated procedure continues at state 668.

In state 654, flow database manager 108 determines whether the data received with the present packet appears to contain the final portion of data for the associated datagram/flow. As described in conjunction with state 620, this determination may be made on the basis of the amount of data included with the packet. If the amount of data is less than a threshold value (a programmable value in the illustrated embodiment), then no more data is expected and this is likely to be the only data for this flow. In this case the procedure continues at state 668. If, however, the data meets or exceeds the threshold value, in which case more data may be expected, the procedure proceeds to state 656.

In state 656, the values of certain flags are examined. These flags may include, for example, the URG, PSH, RST, FIN bits of a TCP header. If any of the examined flags do not have their expected or desired values (e.g., if any of the flags are set), an exceptional condition may exist making one or more of the functions of NIC 100 (e.g., data re-assembly, batch processing, load distribution) unsuitable for this packet. In this case the procedure continues at state 668; otherwise the procedure proceeds to state 658.

In state 658, the flow database manager retrieves the information stored in state 646 concerning whether flow database 110 is full. If the database is full, the procedure continues at state 664; otherwise the procedure continues at state 660.

In state 660, a new flow is added to flow database 110 for the present packet. Illustratively, the new flow is stored at the flow number identified or retrieved in state 648. The addition of a new flow may involve setting a sequence number (e.g., flow sequence number 522 from FIG. 5). Flow sequence number 522 may be generated by adding a sequence number (e.g., TCP sequence number) retrieved from the packet and the amount of data included in the packet. As discussed above, this sum may need to be adjusted (e.g., by adding one).

Storing a new flow may also include initializing an activity indicator (e.g., flow activity indicator 524 of FIG. 5). In one embodiment of the invention this initialization involves storing a value retrieved from a counter that is incremented each time data is received for a flow. Illustratively, if the counter or a flow activity indicator is incremented past its maximum storable value, the counter and all flow activity indicators are cleared or reset. Also in state 660, a validity indicator (e.g., flow validity indicator 520 of FIG. 5) is set to indicate that the flow is valid. Finally, the packet's flow key is also stored in the flow database, in the entry corresponding to the assigned flow number.

In state 662, operation code 6 is selected for the packet. Illustratively, operation code 6 indicates that the packet is compatible, did not match any valid flows and contains the first portion of data for a new flow. Further, the packet's flags have their expected or necessary values, additional data is expected in the flow and the flow database is not full. Thus, operation code 6 indicates that there is no existing flow to tear down and that a new flow has been stored in the flow database. After state 662, the illustrated procedure ends at state 670.

In state 664, an existing entry in the flow database is replaced so that a new flow, initiated by the present packet, can be stored. Therefore, the flow number of the least recently active flow, identified in state 650, is retrieved. This flow may be replaced as follows. The sequence number of the existing flow (e.g., flow sequence number 522 of FIG. 5) is replaced with a value derived by combining a sequence number extracted from the packet (e.g., TCP sequence number) with the size of the data portion of the packet. This sum may need to be adjusted (e.g., by adding one). Then the existing flow's activity indicator (e.g., flow activity indicator 524) is replaced. For example, the value of a flow activity counter may be copied into the flow activity indicator, as discussed above. The flow's validity indicator (e.g., flow validity indicator 520 of FIG. 5) is then set to indicate that the flow is valid. Finally, the flow key of the new flow is stored.

In state 666, operation code 7 is selected for the packet. Operation code 7 was also selected in state 636. In the present context, operation code 7 may indicate that the packet is compatible, did not match the flow key of any valid flows and contains the first portion of data for a new flow. Further, the packet's flags have compatible values and additional data is expected in the flow. Lastly, however, in this context operation code 7 indicates that the flow database is full, so an existing entry was torn down and the new one stored in its place. After state 666, the illustrated procedure ends at end state 670.

In state 668, operation code 5 is selected for the packet. State 668 is entered from various states and operation code 5 thus represents a variety of possible conditions or situations. For example, operation code 5 may be selected when a No_Assist signal is detected (in state 604) for a packet. As discussed above, the No_Assist signal may indicate that the corresponding packet is not compatible with a set of pre-selected protocols. In this embodiment of the invention, incompatible packets are ineligible for one or more of the various functions of NIC 100 (e.g., data re-assembly, batch processing, load distribution).

State 668 may also be entered, and operation code 5 selected, from state 652, in which case the code may indicate that the received packet does not match any valid flow keys and, further, contains no data (e.g., it may be a control packet).

State 668 may also be entered from state 654. In this context operation code 5 may indicate that the packet does not match any valid flow keys. It may further indicate that the packet contains data, but that the size of the data portion is less than the threshold discussed in conjunction with state 654. In this context, it appears that the packet's data is complete (e.g., comprises all of the data for a datagram), meaning that there is no other data to re-assemble with this packet's data and therefore there is no reason to make a new entry in the database for this one-packet flow.

Finally, state 668 may also be entered from state 656. In this context, operation code 5 may indicate that the packet does not match any valid flow keys, contains data, and more data is expected, but at least one flag in one or more of the packet's protocol headers does not have its expected value. For example, in one embodiment of the invention the TCP flags URG, PSH, RST and FIN are expected to be clear. If any of these flags are set an exceptional condition may exist, thus making it possible that one of the functions offered by NIC 100 is unsuitable for this packet.

As TABLE 1 reflects, there is no flow to tear down and no new flow is established when operation code 5 is selected. Following state 668, the illustrated procedure ends at state 670.

One skilled in the art will appreciate that the procedure illustrated in FIGS. 6A–6E and discussed above is but one suitable procedure for maintaining and updating a flow database and for determining a packet's suitability for certain processing functions. In particular, different operation codes may be utilized or may be implemented in a different manner, a goal being to produce information for later processing of the packet through NIC 100.

Although operation codes are assigned for all packets by a flow database manager in the illustrated procedure, in an alternative procedure an operation code assigned by the FDBM may be replaced or changed by another module of NIC 100. This may be done to ensure a particular method of treating certain types of packets. For example, in one embodiment of the invention IPP module 104 assigns a predetermined operation code (e.g., operation code 2 of TABLE 1) to jumbo packets (e.g., packets greater in size than MTU) so that DMA engine 120 will not re-assemble them. In particular, the IPP module may independently determine that the packet is a jumbo packet (e.g., from information provided by a MAC module) and therefore assign the predetermined code. Illustratively, header parser 106 and FDBM 108 perform their normal functions for a jumbo packet and IPP module 104 receives a first operation code assigned by the FDBM. However, the IPP module replaces that code before storing the jumbo packet and information concerning the packet. In one alternative embodiment header parser 106 and/or flow database manager 108 may be configured to recognize a particular type of packet (e.g., jumbo) and assign a predetermined operation code.

The operation codes applied in the embodiment of the invention illustrated in FIGS. 6A–6E are presented and explained in the following TABLE 1. TABLE 1 includes illustrative criteria used to select each operation code and illustrative results or effects of each code.

TABLE 1

| Op. Code | Criteria for Selection | Result of Operation Code |
| --- | --- | --- |
| 0 | Compatible control packet with clear flags; a flow was previously established for this flow key. | Do not set up a new flow; Do not tear down existing flow; Do not re-assemble data (packet contains no data). |
| 1 | Compatible control packet with at least one flag or SYN bit set; a flow was previously established. | Do not set up a new flow; Tear down existing flow; Do no re-assemble data (packet contains no data). |
| 2 | Compatible packet whose sequence number does not match sequence number in flow database, or SYN bit is set (indicating attempt to re-establish a connection) but there is no more data to come; a flow was previously established. -- Or -- Jumbo packet. | Do not set up a new flow; Tear down existing flow; Do not re-assemble packet data. |
| 3 | A compatible packet carrying a final portion of flow data, or a flag is set (but packet is in sequence, unlike operation code 2); a flow was previously established. | Do not set up a new flow; Tear down existing flow; Re-assemble data with previous packets. |
| 4 | Receipt of next compatible packet in sequence; a flow was previously established. | Do not set up a new flow; Do not tear down existing flow; Re-assemble data with other packets. |
| 5 | Packet cannot be re-assembled because: incompatible, a flag is set, packet contains no data or there is no more data to come. No flow was previously established. | Do not set up a flow; There is no flow to tear down; Do not re-assemble. |
| 6 | First compatible packet of a new flow; no flow was previously established. | Set up a new flow; There is no flow to tear down; Re-assemble data with packets to follow. |
| 7 | First compatible packet of a new flow, but flow database is full; no flow was previously established. -- Or -- Compatible packet, SYN bit is set and additional data will follow; a flow was previously established. | Replace existing flow; Re-assemble data with packets to follow. |

One Embodiment of a Load Distributor

In one embodiment of the invention, load distributor 112 enables the processing of packets through their protocol stacks to be distributed among a number of processors. Illustratively, load distributor 112 generates an identifier (e.g., a processor number) of a processor to which a packet is to be submitted. The multiple processors may be located within a host computer system that is served by NIC 100. In one alternative embodiment, one or more processors for manipulating packets through a protocol stack are located on NIC 100.

Without an effective method of sharing or distributing the processing burden, one processor could become overloaded if it were required to process all or most network traffic received at NIC 100, particularly in a high-speed network environment. The resulting delay in processing network traffic could deteriorate operations on the host computer system as well as other computer systems communicating with the host system via the network.

As one skilled in the art will appreciate, simply distributing packets among processors in a set of processors (e.g., such as in a round-robin scheme) may not be an efficient plan. Such a plan could easily result in packets being processed out of order. For example, if two packets from one communication flow or connection that are received at a network interface in the correct order were submitted to two different processors, the second packet may be processed before the first. This could occur, for example, if the processor that received the first packet could not immediately process the packet because it was busy with another task. When packets are processed out of order a recovery scheme must generally be initiated, thus introducing even more inefficiency and more delay.

Therefore, in a present embodiment of the invention packets are distributed among multiple processors based upon their flow identities. As described above, a header parser may generate a flow key from layer three (e.g., IP) and layer four (e.g., TCP) source and destination identifiers retrieved from a packet's headers. The flow key may be used to identify the communication flow to which the packet belongs. Thus, in this embodiment of the invention all packets having an identical flow key are submitted to a single processor. As long as the packets are received in order by NIC 100, they should be provided to the host computer and processed in order by their assigned processor.

Illustratively, multiple packets sent from one source entity to one destination entity will have the same flow key even if the packets are part of separate datagrams, as long as their layer three and layer four identifiers remain the same. As discussed above, separate flows are set up and torn down for each datagram within one TCP end-to-end connection. Therefore, just as all packets within one flow are sent to one processor, all packets within a TCP end-to-end connection will also be sent to the same processor. This helps ensure the correct ordering of packets for the entire connection, even between datagrams.

Depending upon the network environment in which NIC 100 operates (e.g., the protocols supported by network 102), the flow key may be too large to use as an identifier of a processor. In one embodiment of the invention described above, for example, a flow key measures 288 bits. Meanwhile, the number of processors participating in the load-balancing scheme may be much smaller. For example, in the embodiment of the invention described below in conjunction with FIG. 7, a maximum of sixty-four processors is supported. Thus, in this embodiment only a six-bit number is needed to identify the selected processor. The larger flow key may therefore be mapped or hashed into a smaller range of values.

Figure 7:
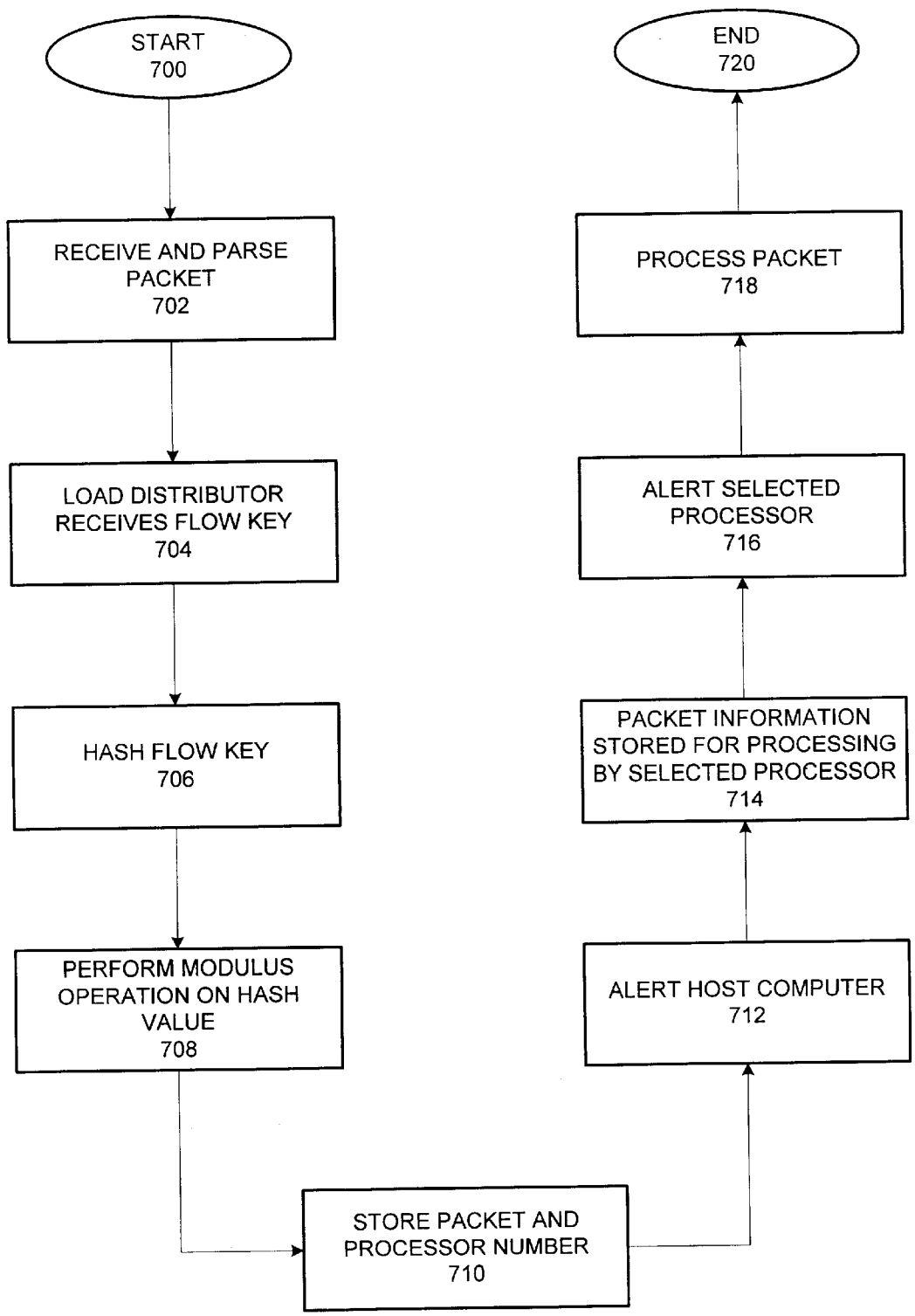
FIG. 7 is a flow chart demonstrating one method of distributing the processing of network packets among multiple processors on a host computer in accordance with an embodiment of the invention.

FIG. 7 depicts one method of generating an identifier (e.g., a processor number) to specify a processor to process a packet received by NIC 100, based on the packet's flow key. In this embodiment of the invention, network 102 is the Internet and a received packet is formatted according to a compatible protocol stack (e.g., Ethernet at layer two, IP at layer three and TCP at layer four).

State 700 is a start state. In state 702 a packet is received by NIC 100 and a header portion of the packet is parsed by header parser 106 (a method of parsing a packet is described in a previous section). In state 704, load distributor 112 receives the packet's flow key that was generated by header parser 106.

Because a packet's flow key is 288 bits wide in this embodiment, in state 706 a hashing function is performed to generate a value that is smaller in magnitude. The hash operation may, for example, comprise a thirty-two bit CRC (cyclic redundancy check) function such as ATM (Asynchronous Transfer Mode) Adaptation Layer 5 (AAL5). AAL5 generates thirty-two bit numbers that are fairly evenly distributed among the $2^{32}$ possible values. Another suitable method of hashing is the standard Ethernet CRC-32 function. Other hash functions that are capable of generating relatively small numbers from relatively large flow keys, where the numbers generated are well distributed among a range of values, are also suitable.

With the resulting hash value, in state 708 a modulus operation is performed over the number of processors available for distributing or sharing the processing. Illustratively, software executing on the host computer (e.g., a device driver for NIC 100) programs or stores the number of processors such that it may be read or retrieved by load distributor 112 (e.g., in a register). The number of processors available for load balancing may be all or a subset of the number of processors installed on the host computer system. In the illustrated embodiment, the number of processors available in a host computer system is programmable, with a maximum value of sixty-four. The result of the modulus operation in this embodiment, therefore, is the number of the processor (e.g., from zero to sixty-three) to which the packet is to be submitted for processing. In this embodiment of the invention, load distributor 112 is implemented in hardware, thus allowing rapid execution of the hashing and modulus functions. In an alternative embodiment of the invention, virtually any number of processors may be accommodated.

In state 710, the number of the processor that will process the packet through its protocol stack is stored in the host computer's memory. Illustratively, state 710 is performed in parallel with the storage of the packet in a host memory buffer. As described in a following section, in one embodiment of the invention a descriptor ring in the host computer's memory is constructed to hold the processor number and possibly other information concerning the packet (e.g., a pointer to the packet, its size, its TCP checksum).

A descriptor ring in this embodiment is a data structure comprising a number of entries, or "descriptors," for storing information to be used by a network interface circuit's host computer system. In the illustrated embodiment, a descriptor temporarily stores packet information after the packet has been received by NIC 100, but before the packet is processed by the host computer system. The information stored in a descriptor may be used, for example, by the device driver for NIC 100 or for processing the packet through its protocol stack.

In state 712, an interrupt or other alert is issued to the host computer to inform it that a new packet has been delivered from NIC 100. In an embodiment of the invention in which NIC 100 is coupled to the host computer by a PCI (Peripheral Component Interconnect) bus, the INTA signal may be asserted across the bus. A PCI controller in the host receives the signal and the host operating system is alerted (e.g., via an interrupt).

In state 714, software operating on the host computer (e.g., a device driver for NIC 100) is invoked (e.g., by the host computer's operating system interrupt handler) to act upon a newly received packet. The software gathers information from one or more descriptors in the descriptor ring and places information needed to complete the processing of each new packet into a queue for the specified processor (i.e., according to the processor number stored in the packet's descriptor). Illustratively, each descriptor corresponds to a separate packet. The information stored in the processor queue for each packet may include a pointer to a buffer containing the packet, the packet's TCP checksum, offsets of one or more protocol headers, etc. In addition, each processor participating in the load distribution scheme may have an associated queue for processing network packets. In an alternative embodiment of the invention, multiple queues may be used (e.g., for multiple priority levels or for different protocol stacks).

Illustratively, one processor on the host computer system is configured to receive all alerts and/or interrupts associated with the receipt of network packets from NIC 100 and to alert the appropriate software routine or device driver. This initial processing may, alternatively, be distributed among multiple processors. In addition, in one embodiment of the invention a portion of the retrieval and manipulation of descriptor contents is performed as part of the handling of the interrupt that is generated when a new packet is stored in the descriptor ring. The processor selected to process the packet will perform the remainder of the retrieval/manipulation procedure.

In state 716, the processor designated to process a new packet is alerted or woken. In an embodiment of the invention operating on a Solaris™ workstation, individual processes executed by the processor are configured as "threads." A thread is a process running in a normal mode (e.g., not at an interrupt level) so as to have minimal impact on other processes executing on the workstation. A normal mode process may, however, execute at a high priority. Alternatively, a thread may run at a relatively low interrupt level.

A thread responsible for processing an incoming packet may block itself when it has no packets to process, and awaken when it has work to do. A "condition variable" may be used to indicate whether the thread has a packet to process. Illustratively, the condition variable is set to a first value when the thread is to process a packet (e.g., when a packet is received for processing by the processor) and is set to a second value when there are no more packets to process. In the illustrated embodiment of the invention, one condition variable may be associated with each processor's queue.

In an alternative embodiment, the indicated processor is alerted in state 716 by a "cross-processor call." A cross-processor call is one way of communicating among processors whereby one processor is interrupted remotely by another processor. Other methods by which one processor alerts, or dispatches a process to, another processor may be used in place of threads and cross-processor calls.

In state 718, a thread or other process on the selected processor begins processing the packet that was stored in the processor's queue. Methods of processing a packet through its protocol stack are well known to those skilled in the art and need not be described in detail. The illustrated procedure then ends with end state 720.

In one alternative embodiment of the invention, a high-speed network interface is configured to receive and process ATM (Asynchronous Transfer Mode) traffic. In this embodiment, a load distributor is implemented as a set of instructions (e.g., as software) rather than as a hardware module. As one skilled in the art is aware, ATM traffic is connection-oriented and may be identified by a virtual connection identifier (VCI), which corresponds to a virtual circuit established between the packet's source and destination entities. Each packet that is part of a virtual circuit includes the VCI in its header.

Advantageously, a VCI is relatively small in size (e.g., sixteen bits). In this alternative embodiment, therefore, a packet's VCI may be used in place of a flow key for the purpose of distributing or sharing the burden of processing packets through their protocol stacks. Illustratively, traffic from different VCIs is sent to different processors, but, to ensure correct ordering of packets, all packets having the same VCI are sent to the same processor. When an ATM packet is received at a network interface, the VCI is retrieved from its header and provided to the load distributor. The modulus of the VCI over the number of processors that are available for load distribution is then computed. Similar to the illustrated embodiment, the packet and its associated processor number are then provided to the host computer.

As described above, load distribution in a present embodiment of the invention is performed on the basis of a packet's layer three and/or layer four source and destination entity identifiers. In an alternative embodiment of the invention, however, load distribution may be performed on the basis of layer two addresses. In this alternative embodiment, packets having the same Ethernet source and destination addresses, for example, are sent to a single processor.

As one of skill in the art will recognize, however, this may result in a processor receiving many more packets than it would if layer three and/or layer four identifiers were used. For example, if a large amount of traffic is received through a router situated near (in a logical sense) to the host computer, the source Ethernet address for all of the traffic may be the router's address even though the traffic is from a multitude of different end users and/or computers. In contrast, if the host computer is on the same Ethernet segment as all of the end users/computers, the layer two source addresses will show greater variety and allow more effective load sharing.

Other methods of distributing the processing of packets received from a network may differ from the embodiment illustrated in FIG. 7 without exceeding the scope of the invention. In particular, one skilled in the art will appreciate that many alternative procedures for assigning a flow's packets to a processor and delivering those packets to the processor may be employed.

One Embodiment of a Packet Queue

Figure 8:
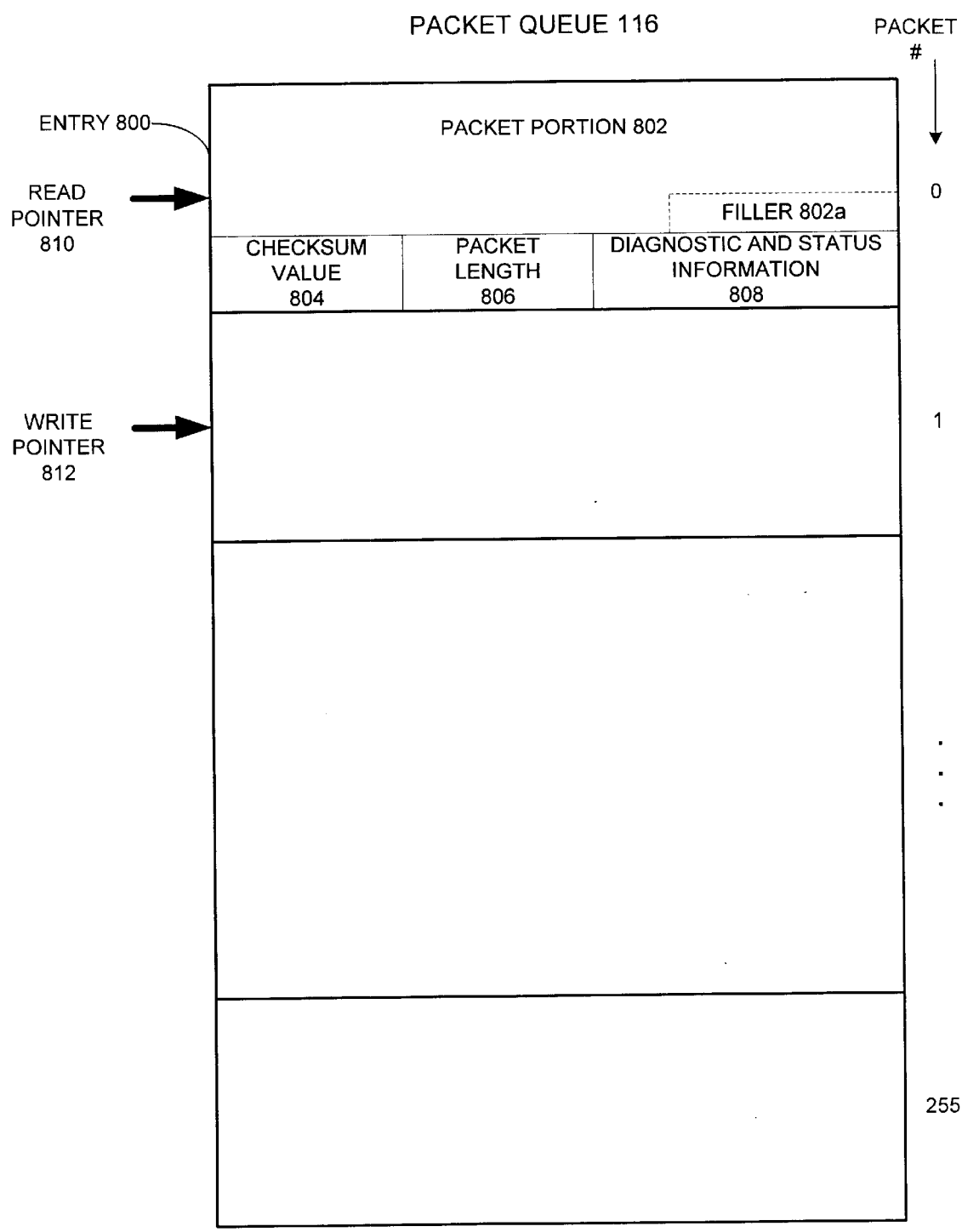
FIG. 8 is a diagram of a packet queue for a network interface circuit in accordance with an embodiment of the invention.

As described above, packet queue 116 stores packets received from IPP module 104 prior to their re-assembly by DMA engine 120 and their transfer to the host computer system. FIG. 8 depicts packet queue 116 according to one embodiment of the invention.

In the illustrated embodiment, packet queue 116 is implemented as a FIFO (First-In First-Out) queue containing up to 256 entries. Each packet queue entry in this embodiment stores one packet plus various information concerning the packet. For example, entry 800 includes packet portion 802 plus a packet status portion. Because packets of various sizes are stored in packet queue 116, packet portion 802 may include filler 802a to supplement the packet so that the packet portion ends at an appropriate boundary (e.g., byte, word, double word).

Filler 802a may comprise random data or data having a specified pattern. Filler 802a may be distinguished from the stored packet by the pattern of the filler data or by a tag field.

Illustratively, packet status information includes TCP checksum value 804 and packet length 806 (e.g., length of the packet stored in packet portion 802). Storing the packet length may allow the packet to be easily identified and retrieved from packet portion 802. Packet status information may also include diagnostic/status information 808. Diagnostic/status information 808 may include a flag indicating that the packet is bad (e.g., incomplete, received with an error), an indicator that a checksum was or was not computed for the packet, an indicator that the checksum has a certain value, an offset to the portion of the packet on which the checksum was computed, etc. Other flags or indicators may also be included for diagnostics, filtering, or other purposes. In one embodiment of the invention, the packet's flow key (described above and used to identify the flow comprising the packet) and/or flow number (e.g., the corresponding index of the packet's flow in flow database 110) are included in diagnostic/status information 808. In another embodiment, a tag field to identify or delimit filler 802a is included in diagnostic/status information 808.

In one alternative embodiment of the invention, any or all of the packet status information described above is stored in control queue 118 rather than packet queue 116.

In the illustrated embodiment of the invention packet queue 116 is implemented in hardware (e.g., as random access memory). In this embodiment, checksum value 804 is sixteen bits in size and may be stored by checksum generator 114. Packet length 806 is fourteen bits large and may be stored by header parser 106. Finally, portions of diagnostic/status information 808 may be stored by one or more of IPP module 104, header parser 106, flow database manager 108, load distributor 112 and checksum generator 114.

Packet queue 116 in FIG. 8 is indexed with two pointers. Read pointer 810 identifies the next entry to be read from the queue, while write pointer 812 identifies the entry in which the next received packet and related information is to be stored. As explained in a subsequent section, the packet stored in packet portion 802 of an entry is extracted from packet queue 116 when its data is to be-reassembled by DMA engine 120 and/or transferred to the host computer system.

One Embodiment of a Control Queue

In one embodiment of the invention, control queue 118 stores control and status information concerning a packet received by NIC 100. In this embodiment, control queue 118 retains information used to enable the batch processing of protocol headers and/or the re-assembly of data from multiple related packets. Control queue 118 may also store information to be used by the host computer or a series of instructions operating on a host computer (e.g., a device driver for NIC 100). The information stored in control queue 118 may supplement or duplicate information stored in packet queue 116.

Figure 9:
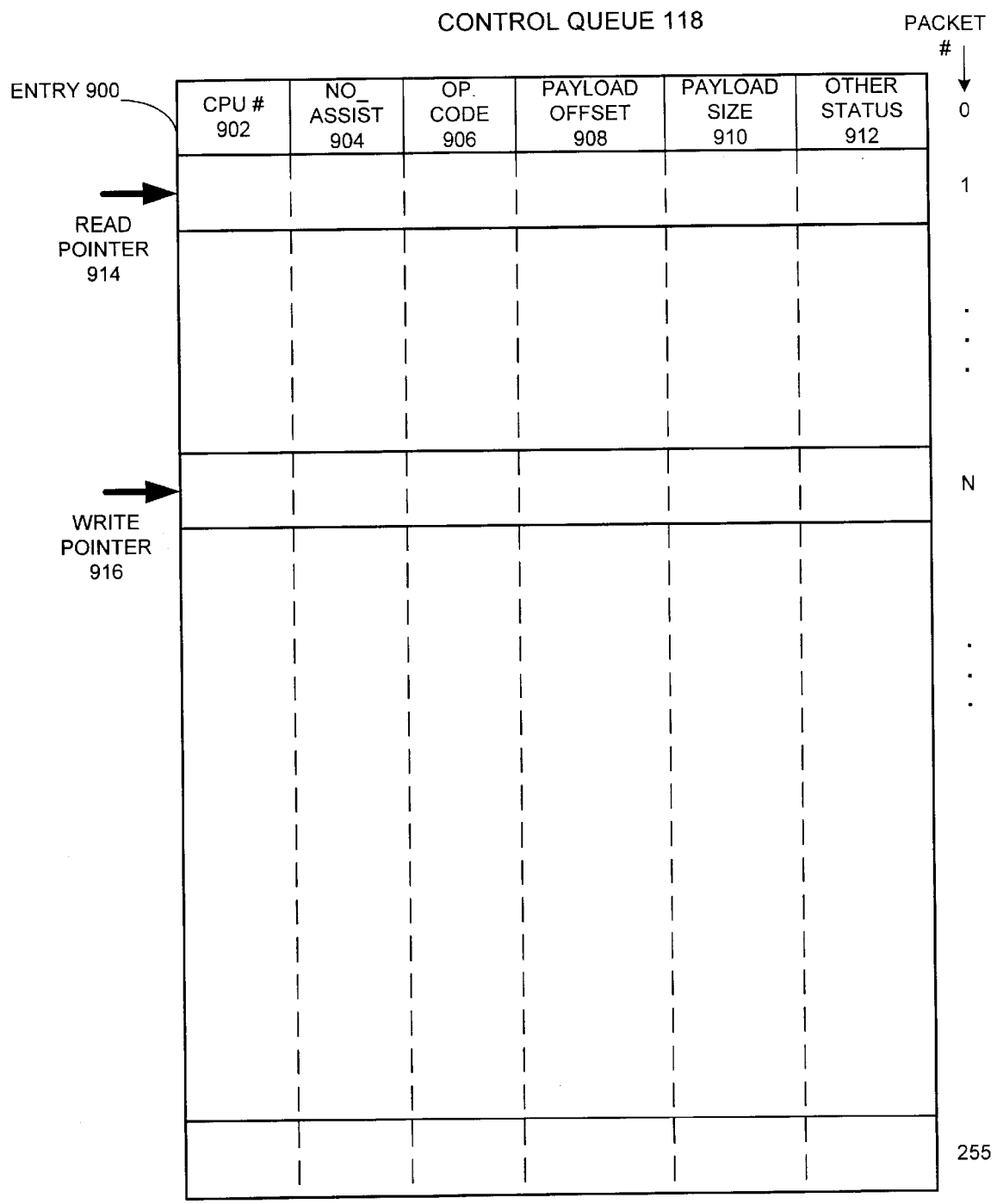
FIG. 9 is a diagram of a control queue for a network interface circuit in accordance with an embodiment of the invention.

FIG. 9 depicts control queue 118 in one embodiment of the invention. The illustrated control queue contains one entry for each packet stored in packet queue 116 (e.g., up to 256 entries). In one embodiment of the invention each entry in control queue 118 corresponds to the entry (e.g., packet) in packet queue 116 having the same number. FIG. 9 depicts entry 900 having various fields, such as CPU number 902, No_Assist signal 904, operation code 906, payload offset 908, payload size 910 and other status information 912. An entry may also include other status or control information (not shown in FIG. 9). Entries in control queue 118 in alternative embodiments of the invention may comprise different information.

CPU (or processor) number 902, discussed in a previous section, indicates which one of multiple processors on the host computer system should process the packet's protocol headers. Illustratively, CPU number 902 is six bits in size. No_Assist signal 904, also described in a preceding section, indicates whether the packet is compatible with (e.g., is formatted according to) any of a set of pre-selected protocols that may be parsed by header parser 106. No_Assist signal 904 may comprise a single flag (e.g. one bit). In one embodiment of the invention the state or value of No_Assist signal 904 may be used by flow database manager 108 to determine whether a packet's data is re-assembleable and/or whether its headers may be processed with those of related packets. In particular, the FDBM may use the No_Assist signal in determining which operation code to assign to the packet.

Operation code 906 provides information to DMA engine 120 to assist in the re-assembly of the packet's data. As described in a previous section, an operation code may indicate whether a packet includes data or whether a packet's data is suitable for re-assembly. Illustratively, operation code 906 is three bits in size. Payload offset 908 and payload size 910 correspond to the offset and size of the packet's TCP payload (e.g., TCP data), respectively. These fields may be seven and fourteen bits large, respectively.

In the illustrated embodiment, other status information 912 includes diagnostic and/or status information concerning the packet. Status information 912 may include a starting position for a checksum calculation (which may be seven bits in size), an offset of the layer three (e.g., IP) protocol header (which may also be seven bits in size), etc. Status information 912 may also include an indicator as to whether the size of the packet exceeds a first threshold (e.g., whether the packet is greater than 1522 bytes) or falls under a second threshold (e.g., whether the packet is 256 bytes or less). This information may be useful in re-assembling packet data. Illustratively, these indicators comprise single-bit flags.

In one alternative embodiment of the invention, status information 912 includes a packet's flow key and/or flow number (e.g., the index of the packet's flow in flow database 110). The flow key or flow number may, for example, be used for debugging or other diagnostic purposes. In one embodiment of the invention, the packet's flow number may be stored in status information 912 so that multiple packets in a single flow may be identified. Such related packet may then be collectively transferred to and/or processed by a host computer.

FIG. 9 depicts a read pointer and a write pointer for indexing control queue 118. Read pointer 914 indicates an entry to be read by DMA engine 120. Write pointer 916 indicates the entry in which to store information concerning the next packet stored in packet queue 116.

In an alternative embodiment of the invention, a second read pointer (not shown in FIG. 9) may be used for indexing control queue 118. As described in a later section, when a packet is to be transferred to the host computer, information drawn from entries in the control queue is searched to determine whether a related packet (e.g., a packet in the same flow as the packet to be transferred) is also going to be transferred. If so, the host computer is alerted so that protocol headers from the related packets may be processed collectively. In this alternative embodiment of the invention, related packets are identified by matching their flow numbers (or flow keys) in status information 912. The second read pointer may be used to look ahead in the control queue for packets with matching flow numbers.

In one embodiment of the invention CPU number 902 may be stored in the 10 control queue by load distributor 112 and No_Assist signal 904 may be stored by header parser 106. Operation code 906 may be stored by flow database manager 108, and payload offset 908 and payload size 910 may be stored by header parser 106. Portions of other status information may be written by the preceding modules and/or others, such as IPP module 104 and checksum generator 114. In one particular embodiment of the invention, however, many of these items of information are stored by IPP module 104 or some other module acting in somewhat of a coordinator role.

One Embodiment of a DMA Engine

Figure 10:
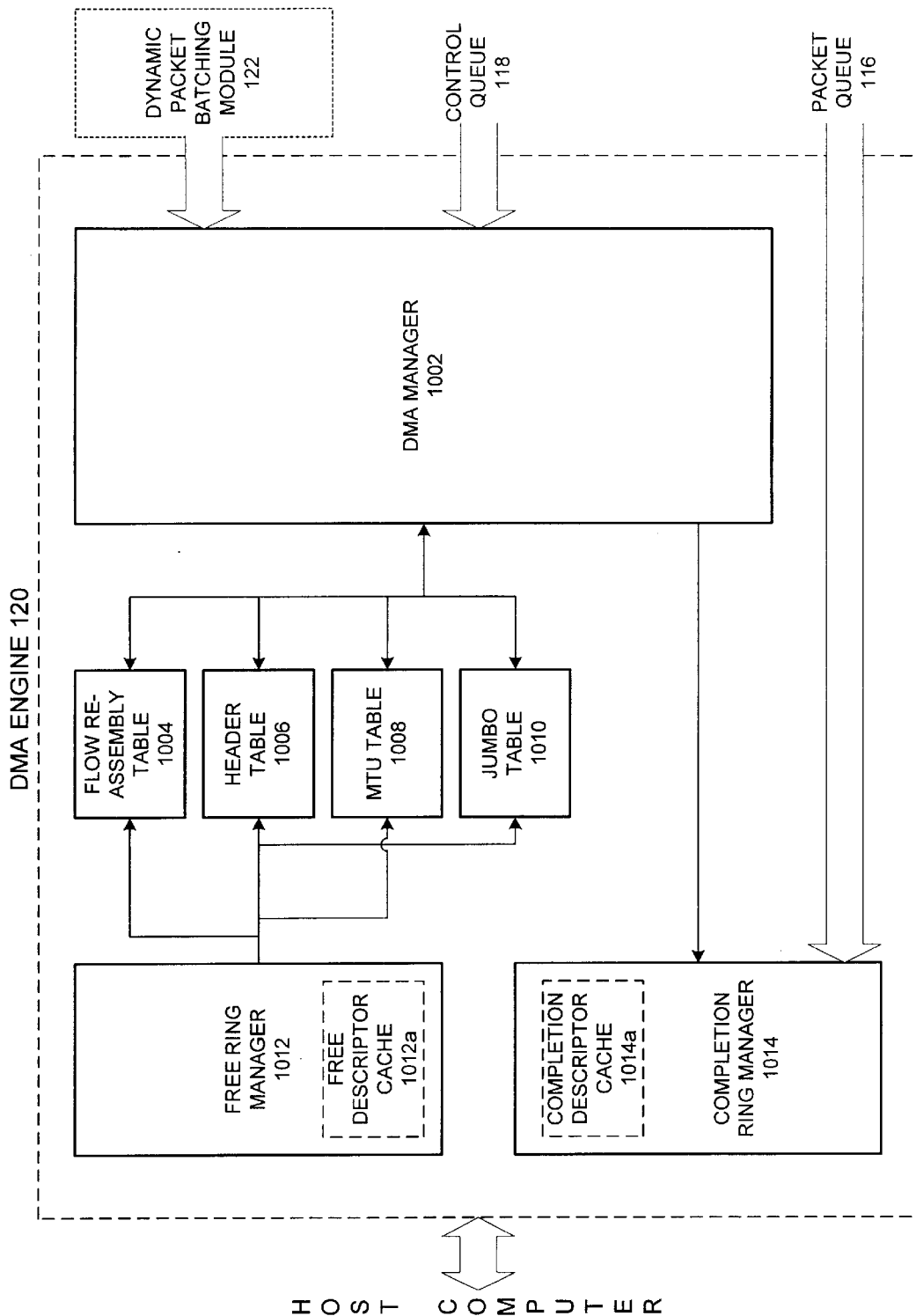
FIG. 10 is a block diagram of a DMA engine for transferring a packet received from a network to a host computer in accordance with an embodiment of the invention.

FIG. 10 is a block diagram of DMA (Direct Memory Access) engine 120 in one embodiment of the invention. One purpose of DMA engine 120 in this embodiment is to transfer packets from packet queue 116 into buffers in host computer memory. Because related packets (e.g., packets that are part of one flow) can be identified by their flow numbers or flow keys, data from the related packets may be transferred together (e.g., in the same buffer). By using one buffer for data from one flow, the data can be provided to an application program or other destination in a highly efficient manner. For example, after the host computer receives the data, a page-flip operation may be performed to transfer the data to an application's memory space rather than performing numerous copy operations.

With reference back to FIGS. 1A–B, a packet that is to be transferred into host memory by DMA engine 120 is stored in packet queue 116 after being received from network 102. Header parser 106 parses a header portion of the packet and generates a flow key, and flow database manager 108 assigns an operation code to the packet. In addition, the communication flow that includes the packet is registered in flow database 110. The packet's flow may be identified by its flow key or flow number (e.g., the index of the flow in flow database 110). Finally, information concerning the packet (e.g., operation code, a packet size indicator, flow number) is stored in control queue 118 and, possibly, other portions or modules of NIC 100, and the packet is transferred to the host computer by DMA engine 120. During the transfer process, the DMA engine may draw upon information stored in the control queue to copy the packet into an appropriate buffer, as described below. Dynamic packet batching module 122 may also use information stored in the control queue, as discussed in detail in a following section.

With reference now to FIG. 10, one embodiment of a DMA engine is presented. In this embodiment, DMA manager 1002 manages the transfer of a packet, from packet queue 116, into one or more buffers in host computer memory. Free ring manager 1012 identifies or receives empty buffers from host memory and completion ring manager 1014 releases the buffers to the host computer, as described below. The free ring manager and completion ring managers may be controlled with logic contained in DMA manager 1002. In the illustrated embodiment, flow re-assembly table 1004, header table 1006, MTU table 1008 and jumbo table 1010 store information concerning buffers used to store different types of packets (as described below). Information stored in one of these tables may include a reference to, or some other means of identifying, a buffer. In FIG. 10, DMA engine 120 is partially or fully implemented in hardware.

Empty buffers into which packets may be stored are identified via a free descriptor ring that is maintained in host memory. As one skilled in the art is aware, a descriptor ring is a data structure that is logically arranged as a circular queue. A descriptor ring contains descriptors for storing information (e.g., data, flag, pointer, address). In one embodiment of the invention, each descriptor stores its index within the free descriptor ring and an identifier (e.g., memory address, pointer) of a free buffer that may be used to store packets. In this embodiment a buffer is identified in a descriptor by its address in memory, although other means of identifying a memory buffer are also suitable. In one embodiment of the invention a descriptor index is thirteen bits large, allowing for a maximum of 8,192 descriptors in the ring, and a buffer address is sixty-four bits in size.

In the embodiment of FIG. 10, software that executes on a host computer, such as a device driver for NIC 100, maintains a free buffer array or other data structure (e.g., list, table) for storing references to (e.g., addresses of) the buffers identified in free descriptors. As descriptors are retrieved from the ring their buffer identifiers are placed in the array. Thus, when a buffer is needed for the storage of a packet, it may be identified by its index (e.g., cell, element) in the free buffer array. Then, when the buffer is no longer needed, it may be released to the host computer by placing its array index or reference in a completion descriptor. A packet stored in the buffer can then be retrieved by accessing the buffer identified in the specified element of the array. Thus, in this embodiment of the invention the size of a descriptor index (e.g., thirteen bits) may not limit the number of buffers that may be assigned by free ring manager 1012. In particular, virtually any number of buffers or descriptors could be managed by the software. For example, in one alternative embodiment of the invention buffer identifiers may be stored in one or more linked lists after being retrieved from descriptors in a free descriptor ring. When the buffer is released to the host computer, a reference to the head of the buffer's linked list may be provided. The list could then be navigated to locate the particular buffer (e.g., by its address).

As one skilled in the art will appreciate, the inclusion of a limited number of descriptors in the free descriptor ring (e.g., 8,192 in this embodiment) means that they may be re-used in a round-robin fashion. In the presently described embodiment, a descriptor is just needed long enough to retrieve its buffer identifier (e.g., address) and place it in the free buffer array, after which it may be re-used relatively quickly. In other embodiments of the invention free descriptor rings having different numbers of free descriptors may be used, thus allowing some control over the rate at which free descriptors must be re-used.

In one alternative embodiment of the invention, instead of using a separate data structure to identify a buffer for storing a packet, a buffer may be identified within DMA engine 120 by the index of the free descriptor within the free descriptor ring that referenced the buffer. One drawback to this scheme when the ring contains a limited number of descriptors, however, is that a particular buffer's descriptor may need to be re-used before its buffer has been released to the host computer. Thus, either a method of avoiding or skipping the re-use of such a descriptor must be implemented or the buffer referenced by the descriptor must be released before the descriptor is needed again. Or, in another alternative, a free descriptor ring may be of such a large size that a lengthy or even virtually infinite period of time may pass from the time a free descriptor is first used until it needs to be re-used.

Thus, in the illustrated embodiment of the invention free ring manager 1012 retrieves a descriptor from the free descriptor ring, stores its buffer identifier (e.g., memory address) in a free buffer array, and provides the array index and/or buffer identifier to flow re-assembly table 1004, header table 1006, MTU table 1008 or jumbo table 1010.

Free ring manager 1012 attempts to ensure that a buffer is always available for a packet. Thus, in one embodiment of the invention free ring manager 1012 includes descriptor cache 1012a configured to store a number of descriptors (e.g., up to eight) at a time. Whenever there are less than a threshold number of entries in the cache (e.g., five), additional descriptors may be retrieved from the free descriptor ring. Advantageously, the descriptors are of such a size (e.g., sixteen bytes) that some multiple (e.g., four) of them can be efficiently retrieved in a sixty-four byte cache line transfer from the host computer.

Returning now to the illustrated embodiment of the invention, each buffer in host memory is one memory page in size. However, buffers and the packets stored in the buffers may be divided into multiple categories based on packet size and whether a packet's data is being re-assembled. Re-assembly refers to the accumulation of data from multiple packets of a single flow into one buffer for efficient transfer from kernel space to user or application space within host memory. In particular, re-assembleable packets may be defined as packets that conform to a pre-selected protocol (e.g., a protocol that is parseable by header parser 106). By filling a memory page with data for one destination, page-flipping may be performed to provide a page in kernel space to the application or user space. A packet's category (e.g., whether re-assembleable or non-re-assembleable) may be determined from information retrieved from the control queue or flow database manager. In particular, and as described previously, an operation code may be used to determine whether a packet contains a re-assembleable portion of data.

In the illustrated embodiment of the invention, data portions of related, re-assembleable, packets are placed into a first category of buffers—which may be termed re-assembly buffers. A second category of buffers, which may be called header buffers, stores the headers of those packets whose data portions are being re-assembled and may also store small packets (e.g., those less than or equal to 256 bytes in size). A third category of buffers, MTU buffers, stores non-re-assembleable packets that are larger than 256 bytes, but no larger than MTU size (e.g., 1522 bytes). Finally, a fourth category of buffers, jumbo buffers, stores jumbo packets (e.g., large packets that are greater than 1522 bytes in size) that are not being re-assembled. Illustratively, a jumbo packet may be stored intact (e.g., its headers and data portions kept together in one buffer) or its headers may be stored in a header buffer while its data portion is stored in an appropriate (e.g., jumbo) non-re-assembly buffer.

In one alternative embodiment of the invention, no distinction is made between MTU and jumbo packets. Thus, in this alternative embodiment, just three types of buffers are used: re-assembly and header buffers, as described above, plus non-re-assembly buffers. Illustratively, all non-small packets (e.g., larger than 256 bytes) that are-not re-assembled are placed in a non-re-assembly buffer.

In another alternative embodiment, jumbo packets may be re-assembled in jumbo buffers. In particular, in this embodiment data portions of packets smaller than a predetermined size (e.g., MTU) are re-assembled in normal re-assembly buffers while data portions of jumbo packets (e.g., packets greater in size than MTU) are re-assembled in jumbo buffers. Re-assembly of jumbo packets may be particularly effective for a communication flow that comprises jumbo frames of a size such that multiple frames can fit in one buffer. Header portions of both types of packets may be stored in one type of header buffer or, alternatively, different header buffers may be used for the headers of the different types of re-assembleable packets.

In yet another alternative embodiment of the invention buffers may be of varying sizes and may be identified in different descriptor rings or other data structures. For example, a first descriptor ring or other mechanism may be used to identify buffers of a first size for storing large or jumbo packets. A second ring may store descriptors referencing buffers for MTU-sized packets, and another ring may contain descriptors for identifying page-sized buffers (e.g., for data re-assembly).

A buffer used to store portions of more than one type of packet—such as a header buffer used to store headers and small packets, or a non-re-assembly buffer used to store MTU and jumbo packets—may be termed a "hybrid" buffer.

Illustratively, each time a packet or a portion of a packet is stored in a buffer, completion ring manager 1014 populates a descriptor in a completion descriptor ring with information concerning the packet. Included in the information stored in a completion descriptor in this embodiment is a number or reference identifying the free buffer array cell or element in which an identifier (e.g., memory address) of a buffer in which a portion of the packet is stored. The information may also include an offset into the buffer (e.g., to the beginning of the packet portion), the identity of another free buffer array entry that stores a buffer identifier for a buffer containing another portion of the packet, a size of the packet, etc. A packet may be stored in multiple buffers, for example, if the packet data and header are stored separately (e.g., the packet's data is being re-assembled in a re-assembly buffer while the packet's header is placed in a header buffer). In addition, data portions of a jumbo packet or a re-assembly packet may span two or more buffers, depending on the size of the data portion.

A distinction should be kept in mind between a buffer identifier (e.g., the memory address of a buffer) and the entry in the free buffer array in which the buffer identifier is stored. In particular, it has been described above that when a memory buffer is released to a host computer it is identified to the host computer by its position within a free buffer array (or other suitable data structure) rather than by its buffer identifier. The host computer retrieves the buffer identifier from the specified array element and accesses the specified buffer to locate a packet stored in the buffer. As one skilled in the art will appreciate, identifying memory buffers in completion descriptors by the buffers' positions in a free buffer array can be more efficient than identifying them by their memory addresses. In particular, in FIG. 10 buffer identifiers are sixty-four bits in size while an index in a free buffer array or similar data structure will likely be far smaller. Using array positions thus saves space compared to using buffer identifiers. Nonetheless, buffer identifiers may be used to directly identify buffers in an alternative embodiment of the invention, rather than filtering access to them through a free buffer array. However, completion descriptors would have to be correspondingly larger in order to accommodate them.

A completion descriptor may also include one or more flags indicating the type or size of a packet, whether the packet data should be re-assembled, whether the packet is the last of a datagram, whether the host computer should delay processing the packet to await a related packet, etc. As described in a following section, in one embodiment of the invention dynamic packet batching module 122 determines, at the time a packet is transferred to the host computer, whether a related packet will be sent shortly. If so, the host computer may be advised to delay processing the transferred packet and await the related packet in order to allow more efficient processing.

A packet's completion descriptor may be marked appropriately when the buffer identified by its buffer identifier is to be released to the host computer. For example, a flag may be set in the descriptor to indicate that the packet's buffer is being released from DMA engine 120 to the host computer or software operating on the host computer (e.g., a driver associated with NIC 100). In one embodiment of the invention, completion ring manager 1014 includes completion descriptor cache 1014a. Completion descriptor cache 1014a may store one or more completion descriptors for collective transfer from DMA engine 120 to the host computer.

Thus, empty buffers are retrieved from a free ring and used buffers are released to the host computer through a completion ring. One reason that a separate ring is employed to release used buffers to the host computer is that buffers may not be released in the order in which they were taken. In one embodiment of the invention, a buffer (especially a flow re-assembly buffer) may not be released until it is full. Alternatively, a buffer may be released at virtually any time, such as when the end of a communication flow is detected. Free descriptors and completion descriptors are further described below in conjunction with FIG. 12.

Another reason that separate rings are used for free and completion descriptors is that the number of completion descriptors that are required in an embodiment of the invention may exceed the number of free descriptors provided in a free descriptor ring. For example, a buffer provided by a free descriptor may be used to store multiple headers and/or small packets. Each time a header or small packet is stored in the header buffer, however, a separate completion descriptor is generated. In an embodiment of the invention in which a header buffer is eight kilobytes in size, a header buffer may store up to thirty-two small packets. For each packet stored in the header buffer, another completion descriptor is generated.

FIG. 11 includes diagrams of illustrative embodiments of flow re-assembly table 1004, header table 1006, MTU table 1008 and jumbo table 1010. One alternative embodiment of the invention includes a non-re-assembly table in place of MTU table 1008 and jumbo table 1010, corresponding to a single type of non-re-assembly buffer for both MTU and jumbo packets. Jumbo table 1010 may also be omitted in another alternative embodiment of the invention in which jumbo buffers are retrieved or identified only when needed. Because a jumbo buffer is used only once in this alternative embodiment, there is no need to maintain a table to track its use.

Flow re-assembly table 1004 in the illustrated embodiment stores information concerning the re-assembly of packets in one or more communication flows. For each flow that is active through DMA engine 120, separate flow re-assembly buffers may be used to store the flow's data. More than one buffer may be used for a particular flow, but each flow has one entry in flow re-assembly table 1004 with which to track the use of a buffer. As described in a previous section, one embodiment of the invention supports the interleaving of up to sixty-four flows. Thus, flow re-assembly buffer table 1004 in this embodiment maintains up to sixty-four entries. A flow's entry in the flow re-assembly table may match its flow number (e.g., the index of the flow's flow key in flow database 110) or, in an alternative embodiment, an entry may be used for any flow.

In FIG. 11, an entry in flow re-assembly table 1004 includes flow re-assembly buffer index 1102, next address 1104. and validity indicator 1106. Flow re-assembly buffer index 1102 comprises the index, or position, within a free buffer array or other data structure for storing buffer identifiers identified in free descriptors, of a buffer for storing data from the associated flow. Illustratively, this value is written into each completion descriptor associated with a packet whose data portion is stored in the buffer. This value may be used by software operating on the host computer to access the buffer and process the data. Next address 1104 identifies the location within the buffer (e.g., a memory address) at which to store the next portion of data. Illustratively, this field is updated each time data is added to the buffer. Validity indicator 1106 indicates whether the entry is valid. Illustratively, each entry is set to a valid state (e.g., stores a first value) when a first portion of data is stored in the flow's re-assembly buffer and is invalidated (e.g., stores a second value) when the buffer is full. When an entry is invalidated, the buffer may be released or returned to the host computer (e.g., because it is full).

Header table 1006 in the illustrated embodiment stores information concerning one or more header buffers in which packet headers and small packets are stored. In the illustrated embodiment of the invention, only one header buffer is active at a time. That is, headers and small packets are stored in one buffer until it is released, at which time a new buffer is used. In this embodiment, header table 1006 includes header buffer index 1112, next address 1114 and validity indicator 1116. Similar to flow re-assembly table 1004, header buffer index 1112 identifies the cell or element in the free buffer array that contains a buffer identifier for a header buffer. Next address 1114 identifies the location within the header buffer at which to store the next header or small packet. This identifier, which may be a counter, may be updated each time a header or small packet is stored in the header buffer. Validity indicator 116 indicates whether the header buffer table and/or the header buffer is valid. This indicator may be set to valid when a first packet or header is stored in a header buffer and may be invalidated when it is released to the host computer.

MTU table 1008 stores information concerning one or more MTU buffers for storing MTU packets (e.g., packets larger than 256 bytes but less than 1523 bytes) that are not being re-assembled. MTU buffer index 1122 identifies the free buffer array element that contains a buffer identifier (e.g., address) of a buffer for storing MTU packets. Next address 1124 identifies the location in the current MTU buffer at which to store the next packet. Validity indicator 1126 indicates the validity of the table entry. The validity indicator may be set to a valid state when a first packet is stored in the MTU buffer and an invalid state when the buffer is to be released to the host computer.

Jumbo table 1010 stores information concerning one or more jumbo buffers for storing jumbo packets (e.g., packets larger than 1522 bytes) that are not being re-assembled. Jumbo buffer index 1132 identifies the element within the free buffer array that stores a buffer identifier corresponding to a jumbo buffer. Next address 1134 identifies the location in the jumbo buffer at which to store the next packet. Validity indicator 1136 indicates the validity of the table entry. Illustratively, the validity indicator is set to a valid state when a first packet is stored in the jumbo buffer and is set to an invalid state when the buffer is to be released to the host computer.

In the embodiment of the invention depicted in FIG. 11, a packet larger than a specified size (e.g., 256 bytes) is not re-assembled if it is incompatible with the pre-selected protocols for NIC 100 (e.g., TCP, IP, Ethernet) or if the packet is too large (e.g., greater than 1522 bytes). Although two types of buffers (e.g., MTU and jumbo) are used for non-re-assembleable packets in this embodiment, in an alternative embodiment of the invention any number may be used, including one. Packets less than the specified size are generally not re-assembled. Instead, as described above, they are stored intact in a header buffer.

In the embodiment of the invention depicted in FIG. 11, next address fields may store a memory address, offset, pointer, counter or other means of identifying a position within a buffer. Advantageously, the next address field of a table or table entry is initially set to the address of the buffer assigned to store packets of the type associated with the table (and, for re-assembly table 1004, the particular flow). As the buffer is populated, the address is updated to identify the location in the buffer at which to store the next packet or portion of a packet.

Illustratively, each validity indicator stores a first value (e.g., one) to indicate validity, and a second value (e.g., zero) to indicate invalidity. In the illustrated embodiment of the invention, each index field is thirteen bits, each address field is sixty-four bits and the validity indicators are each one bit in size.

Tables 1004, 1006, 1008 and 1010 may take other forms and remain within the scope of the invention as contemplated. For example, these data structures may take the form of arrays, lists, databases, etc., and may be implemented in hardware or software. In the illustrated embodiment of the invention, header table 1006, MTU table 1008 and jumbo table 1010 each contain only one entry at a time. Thus, only one header buffer, MTU buffer and jumbo buffer are active (e.g., valid) at a time in this embodiment. In an alternative embodiment of the invention, multiple header buffers, MTU buffers and/or jumbo buffers may be used (e.g., valid) at once.

In one embodiment of the invention, certain categories of buffers (e.g., header, non-re-assembly) may store a predetermined number of packets or packet portions. For example, where the memory page size of a host computer processor is eight kilobytes, a header buffer may store a maximum of thirty-two entries, each of which is 256 bytes. Illustratively, even when one packet or header is less than 256 bytes, the next entry in the buffer is stored at the next 256-byte boundary. A counter may be associated with the buffer and decremented (or incremented) each time a new entry is stored in the buffer. After thirty-two entries have been made, the buffer may be released.

In one embodiment of the invention, buffers other than header buffers may be divided into fixed-size regions. For example, in an eight-kilobyte MTU buffer, each MTU packet may be allocated two kilobytes. Any space remaining in a packet's area after the packet is stored may be left unused or may be padded.

In one alternative embodiment of the invention, entries in a header buffer and/or non-re-assembly buffer (e.g., MTU, jumbo) are aligned for more efficient transfer. In particular, two bytes of padding (e.g., random bytes) are stored at the beginning of each entry in such a buffer. Because a packet's layer two Ethernet header is fourteen bytes long, by adding two pad bytes each packet's layer three protocol header (e.g., IP) will be aligned with a sixteen-byte boundary. Sixteen-byte alignment, as one skilled in the art will appreciate, allows efficient copying of packet contents (such as the layer three header). The addition of two bytes may, however, decrease the size of the maximum packet that may be stored in a header buffer (e.g., to 254 bytes).

As explained above, counters and/or padding may also be used with non-re-assembly buffers. Some non-re-assembleable packets (e.g., jumbo packets) may, however, be split into separate header and data portions, with each portion being stored in a separate buffer—similar to the re-assembly of flow packets. In one embodiment of the invention padding is only used with header portions of split packets. Thus, when a non-re-assembled (e.g., jumbo) packet is split, padding may be applied to the header/small buffer in which the packet's header portion is stored but not to the non-re-assembly buffer in which the packet's data portion is stored. When, however, a non-re-assembly packet is stored with its header and data together in a non-re-assembly buffer, then padding may be applied to that buffer.

In another alternative embodiment of the invention, a second level of padding may be added to each entry in a buffer that stores non-re-assembled packets that are larger than 256 bytes (e.g., MTU packets and jumbo packets that are not split). In this alternative embodiment, a cache line of storage (e.g., sixty-four bytes for a Solaris™ workstation) is skipped in the buffer before storing each packet. The extra padding area may be used by software that processes the packets and/or their completion descriptors. The software may use the extra padding area for routing or as temporary storage for information needed in a secondary or later phase of processing.

For example, before actually processing the packet, the software may store some data that promotes efficient multi-tasking in the padding area. The information is then available when the packet is finally extracted from the buffer. In particular, in one embodiment of the invention a network interface may generate one or more data values to identify multicast or alternate addresses that correspond to a layer two address of a packet received from a network. The multicast or alternate addresses may be stored in a network interface memory by software operating on a host computer (e.g., a device driver). By storing the data value(s) in the padding, enhanced routing functions can be performed when the host computer processes the packet.

Reserving sixty-four bytes at the beginning of a buffer also allows header information to be modified or prepended if necessary. For example, a regular Ethernet header of a packet may, because of routing requirements, need to be replaced with a much larger FDDI (Fiber Distributed Data Interface) header. One skilled in the art will recognize the size disparity between these headers. Advantageously, the reserved padding area may be used for the FDDI header rather than allocating another block of memory.

In a present embodiment of the invention DMA engine 120 may determine which category a packet belongs in, and which type of buffer to store the packet in, by examining the packet's operation code. As described in a previous section, an operation code may be stored in control queue 118 for each packet stored in packet queue 116. Thus, when DMA engine 120 detects a packet in packet queue 116, it may fetch the corresponding information in the control queue and act appropriately.

An operation code may indicate whether a packet is compatible with the protocols pre-selected for NIC 100. In an illustrative embodiment of the invention, only compatible packets are eligible for data re-assembly and/or other enhanced operations offered by NIC 100 (e.g., packet batching or load distribution). An operation code may also reflect the size of a packet (e.g., less than or greater than a predetermined size), whether a packet contains data or is a control packet, and whether a packet initiates, continues or ends a flow. In this embodiment of the invention, eight different operation codes are used. In alternative embodiments of the invention more or less than eight codes may be used. TABLE 1 lists operation codes that may be used in one embodiment of the invention.

Figure 12A:
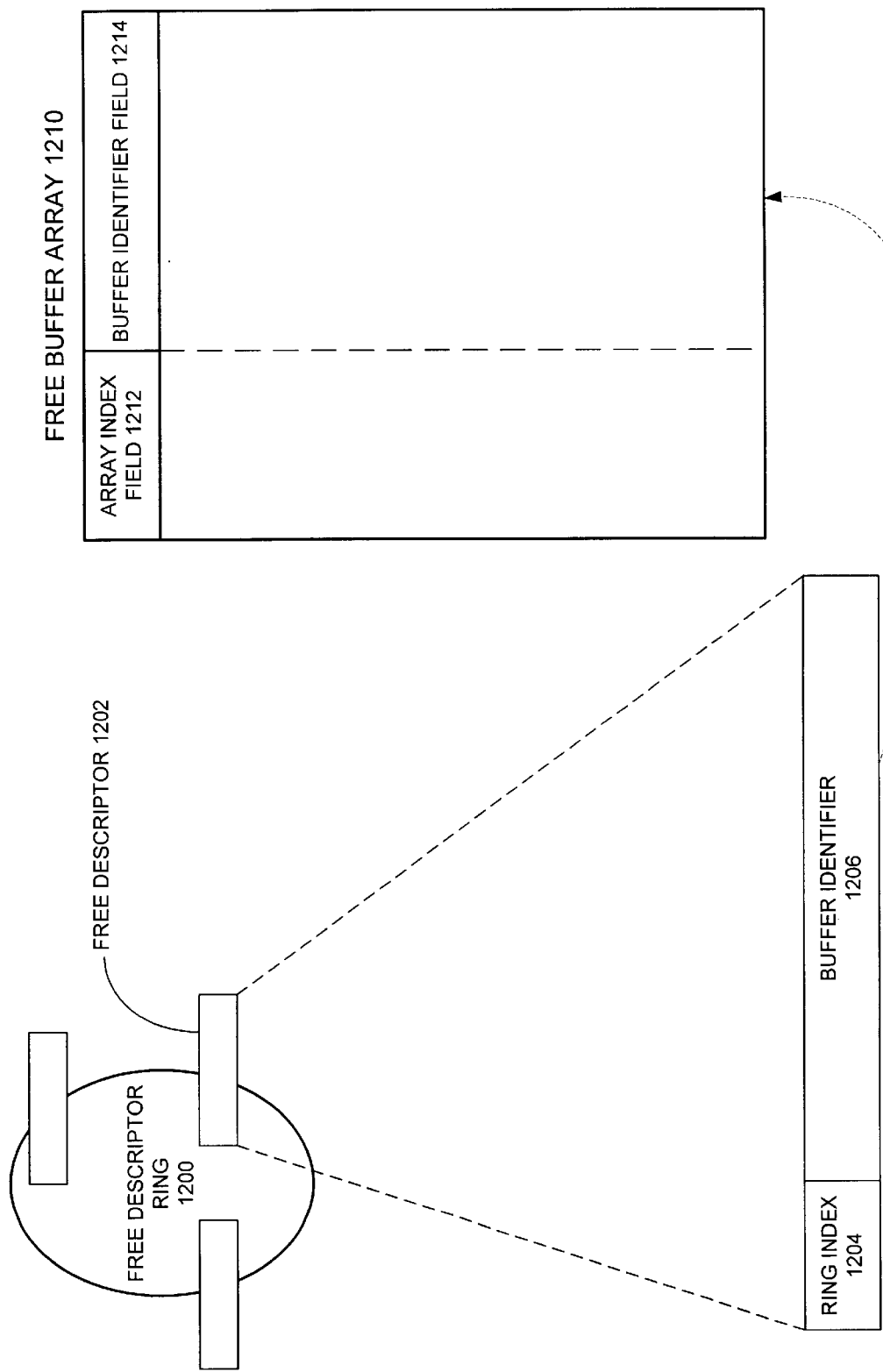
FIGS. 12A–12B are diagrams of a free descriptor, a completion descriptor and a free buffer array in accordance with an embodiment of the invention.
Figure 12B:
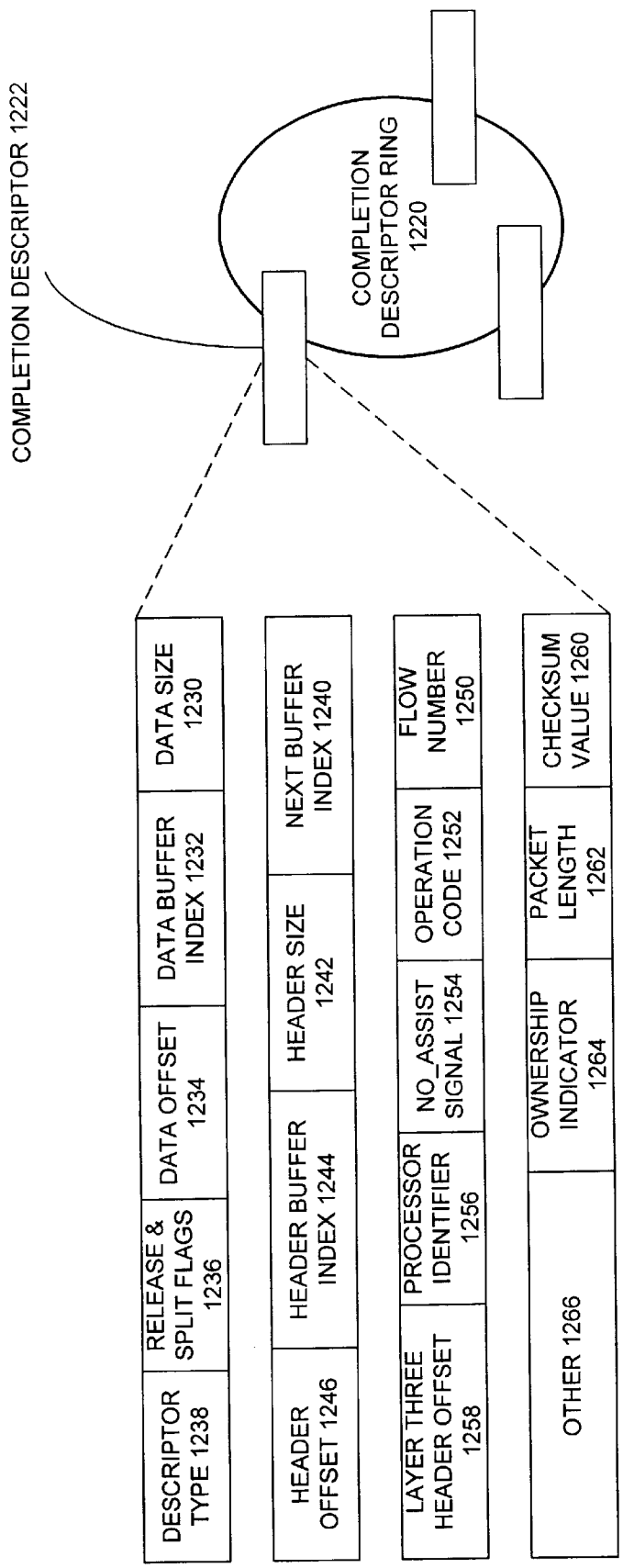

FIGS. 12A–12B illustrate descriptors from a free descriptor ring and a completion descriptor ring in one embodiment of the invention. FIG. 12A also depicts a free buffer array for storing buffer identifiers retrieved from free descriptors.

Free descriptor ring 1200 is maintained in host memory and is populated with descriptors such as free descriptor 1202. Illustratively, free descriptor 1202 comprises ring index 1204, the index of descriptor 1202 in free ring 1200, and buffer identifier 1206. A buffer identifier in this embodiment is a memory address, but may, alternatively, comprise a pointer or any other suitable means of identifying a buffer in host memory.

In the illustrated embodiment, free buffer array 1210 is constructed by software operating on a host computer (e.g., a device driver). An entry in free buffer array 1210 in this embodiment includes array index field 1212, which may be used to identify the entry, and buffer identifier field 1214. Each entry's buffer identifier field thus stores a buffer identifier retrieved from a free descriptor in free descriptor ring 1200.

In one embodiment of the invention, free ring manager 1012 of DMA engine 120 retrieves descriptor 1202 from the ring and stores buffer identifier 1206 in free buffer array 1210. The free ring manager also passes the buffer identifier to flow re-assembly table 1004, header table 1006, MTU table 1008 or jumbo table 1010 as needed. In another embodiment the free ring manager extracts descriptors from the free descriptor ring and stores them in a descriptor cache until a buffer is needed, at which time the buffer's buffer identifier is stored in the free buffer array. In yet another embodiment, a descriptor may be used (e.g., the buffer that it references may be used to store a packet) while still in the cache.

In one embodiment of the invention descriptor 1202 is sixteen bytes in length. In this embodiment, ring index 1204 is thirteen bits in size, buffer identifier 1206 (and buffer identifier field 1214 in free buffer array 1210) is sixty-four bits, and the remaining space may store other information or may not be used.

The size of array index field 1212 depends upon the dimensions of array 1210; in one embodiment the field is thirteen bits in size.

Completion descriptor ring 1220 is also maintained in host memory. Descriptors in completion ring 1220 are written or configured when a packet is transferred to the host computer by DMA engine 120. The information written to a descriptor, such as descriptor 1222, is used by software operating on the host computer (e.g., a driver associated with NIC 100) to process the packet. Illustratively, an ownership indicator (described below) in the descriptor indicates whether DMA engine 120 has finished using the descriptor. For example, this field may be set to a particular value (e.g., zero) when the DMA engine finishes using the descriptor and a different value (e.g., one) when it is available for use by the DMA engine. However, in another embodiment of the invention, DMA engine 120 issues an interrupt to the host computer when it releases a completion descriptor. Yet another means of alerting the host computer may be employed in an alternative embodiment. Descriptor 1222, in one embodiment of the invention, is thirty-two bytes in length.

In the illustrated embodiment of the invention, information stored in descriptor 1222 concerns a transferred packet and/or the buffer it was stored in, and includes the following fields. Data size 1230 reports the amount of data in the packet (e.g., in bytes). The data size field may contain a zero if there is no data portion in the packet or no data buffer (e.g., flow re-assembly buffer, non-re-assembly buffer, jumbo buffer, MTU buffer) was used. Data buffer index 1232 is the index, within free buffer array 1210, of the buffer identifier for the flow re-assembly buffer, non-re-assembly buffer, jumbo buffer or MTU buffer in which the packet's data was stored. When the descriptor corresponds to a small packet fully stored in a header buffer, this field may store a zero or remain unused. Data offset 1234 is the offset of the packet's data within the flow re-assembly buffer, non-re-assembly buffer, jumbo buffer or MTU buffer (e.g., the location of the first byte of data within the data buffer).

In FIG. 12B, flags field 1236 includes one or more flags concerning a buffer or packet. For example, if a header buffer or data is being released (e.g., because it is full), a release header or release data flag, respectively, is set. A release flow flag may be used to indicate whether a flow has, at least temporarily, ended. In other words, if a release flow flag is set (e.g., stores a value of one), this indicates that there are no other packets waiting in the packet queue that are in the same flow as the packet associated with descriptor 1222. Otherwise, if this flag is not set (e.g., stores a value of zero), software operating on the host computer may queue this packet to await one or more additional flow packets so that they may be processed collectively. A split flag may be included in flags field 1236 to identify whether a packet's contents (e.g., data) spans multiple buffers. Illustratively, if the split flag is set, there will be an entry in next data buffer index 1240, described below.

Descriptor type 1238, in the presently described embodiment of the invention, may take any of three values. A first value (e.g., one) indicates that DMA engine 120 is releasing a flow buffer for a flow that is stale (e.g., no packet has been received in the flow for some period of time). A second value (e.g., two) may indicate that a non-re-assembleable packet was stored in a buffer. A third value (e.g., three) may be used to indicate that a flow packet (e.g., a packet that is part of a flow through NIC 100) was stored in a buffer.

Next buffer index 1240 stores an index, in free buffer array 1210, of an entry containing a buffer identifier corresponding to a buffer storing a subsequent portion of a packet if the entire packet, or its data, could not fit into the first assigned buffer. The offset in the next buffer may be assumed to be zero. Header size 1242 reports the length of the header (e.g., in bytes). The header size may be set to zero if the header buffer was not used for this packet (e.g., the packet is not being re-assembled and is not a small packet). Header buffer index 1244 is the index, in free buffer array 1210, of the buffer identifier for the header buffer used to store this packet's header. Header offset 1246 is the offset of the packet's header within the buffer (e.g., header buffer) in which the header was stored. The header offset may take the form of a number of bytes into the buffer at which the header can be found. Alternatively, the offset may be an index value, reporting the index position of the header. For example, in one embodiment of the invention mentioned above, entries in a header buffer are stored in 256-byte units. Thus, each entry begins at a 256-byte boundary regardless of the actual size of the entries. The 256-byte entries may be numbered or indexed within the buffer.

In the illustrated embodiment, flow number 1250 is the packet's flow number (e.g., the index in flow database 110 of the packet's flow key). Flow number 1250 may be used to identify packets in the same flow. Operation code 1252 is a code generated by flow database manager 108, as described in a previous section, and used by DMA engine 120 to process the packet and transfer it into an appropriate buffer. Methods of transferring a packet depending upon its operation code are described in detail in the following section. No_Assist signal 1254, also described in a previous section, may be set or raised when the packet is not compatible with the protocols pre-selected for NIC 100. One result of incompatibility is that header parser 106 may not extensively parse the packet, in which case the packet will not receive the subsequent benefits. Processor identifier 1256, which may be generated by load distributor 112, identifies a host computer system processor for processing the packet. As described in a previous section, load distributor 112 attempts to share or distribute the load of processing network packets among multiple processors by having all packets within one flow processed by the same processor. Layer three header offset 1258 reports an offset within the packet of the first byte of the packet's layer three protocol (e.g., IP) header. With this value, software operating on the host computer may easily strip off one or more headers or header portions.

Checksum value 1260 is a checksum computed for this packet by checksum generator 114. Packet length 1262 is the length (e.g., in bytes) of the entire packet.

Ownership indicator 1264 is used in the presently described embodiment of the invention to indicate whether NIC 100 or software operating on the host computer "owns" completion descriptor 1222. In particular, a first value (e.g., zero) is placed in the ownership indicator field when NIC 100 (e.g., DMA engine 120) has completed configuring the descriptor. Illustratively, this first value is understood to indicate that the software may now process the descriptor. When finished processing the descriptor, the software may store a second value (e.g., one) in the ownership indicator to indicate that NIC 100 may now use the descriptor for another packet.

One skilled in the art will recognize that there are numerous methods that may be used to inform host software that a descriptor has been used by, or returned to, DMA engine 120. In one embodiment of the invention, for example, one or more registers, pointers or other data structures are maintained to indicate which completion descriptors in a completion descriptor ring have or have not been used. In particular, a head register may be used to identify a first of a series of descriptors that are owned by host software, while a tail register identifies the last descriptor in the series. DMA engine 120 may update these registers as it configures and releases descriptors. Thus, by examining these registers the host software and the DMA engine can determine how many descriptors have or have not been used.

Finally, other information, flags and indicators may be stored in other field 1266. Other information that may be stored in one embodiment of the invention includes the length and/or offset of a TCP payload, flags indicating a small packet (e.g., less than 257 bytes) or a jumbo packet (e.g., more than 1522 bytes), a flag indicating a bad packet (e.g., CRC error), a checksum starting position, etc.

In alternative embodiments of the invention only information and flags needed by the host computer (e.g., driver software) are included in descriptor 1222. Thus, in one alternative embodiment one or more fields other than the following may be omitted: data size 1230, data buffer index 1232, data offset 1234, a split flag, next data buffer index 1240, header size 1242, header buffer index 1244, header offset 1246 and ownership indicator 1264.

In addition, a completion descriptor may be organized in virtually any form; the order of the fields of descriptor 1222 in FIG. 12 is merely one possible configuration. It is advantageous, however, to locate ownership indicator 1264 towards the end of a completion descriptor since this indicator may be used to inform host software when the DMA engine has finished populating the descriptor. If the ownership indicator were placed in the beginning of the descriptor, the software may read it and attempt to use the descriptor before the DMA engine has finished writing to it.

One skilled in the art will recognize that other systems and methods than those described in this section may be implemented to identify storage areas in which to place packets being transferred from a network to a host computer without exceeding the scope of the invention.

Methods of Transferring a Packet into a Memory Buffer by a DMA Engine

FIGS. 13–20 are flow charts describing procedures for transferring a packet into a host memory buffer. In these procedures, a packet's operation code helps determine which buffer or buffers the packet is stored in. An illustrative selection of operation codes that may be used in this procedure are listed and explained in TABLE 1.

The illustrated embodiments of the invention employ four categories of host memory buffers, the sizes of which are programmable. The buffer sizes are programmable in order to accommodate various host platforms, but are programmed to be one memory page in size in present embodiments in order to enhance the efficiency of handling and processing network traffic. For example, the embodiments discussed in this section are directed to the use of a host computer system employing a SPARC™ processor, and so each buffer is eight kilobytes in size. These embodiments are easily adjusted, however, for host computer systems employing memory pages having other dimensions.

One type of buffer is for re-assembling data from a flow, another type is for headers of packets being re-assembled and for small packets (e.g., those less than or equal to 256 bytes in size) that are not re-assembled. A third type of buffer stores packets up to MTU size (e.g., 1522 bytes) that are not re-assembled, and a fourth type stores jumbo packets that are greater than MTU size and which are not re-assembled. These buffers are called flow re-assembly, header, MTU and jumbo buffers, respectively.

The procedures described in this section make use of free descriptors and completion descriptors as depicted in FIG. 12. In particular, in these procedures free descriptors retrieved from a free descriptor ring store buffer identifiers (e.g., memory addresses, pointers) for identifying buffers in which to store a portion of a packet. A used buffer may be returned to a host computer by identifying the location within a free buffer array or other data structure used to store the buffer's buffer identifier. One skilled in the art will recognize that these procedures may be readily adapted to work with alternative methods of obtaining and returning buffers for storing packets.

Figure 13:
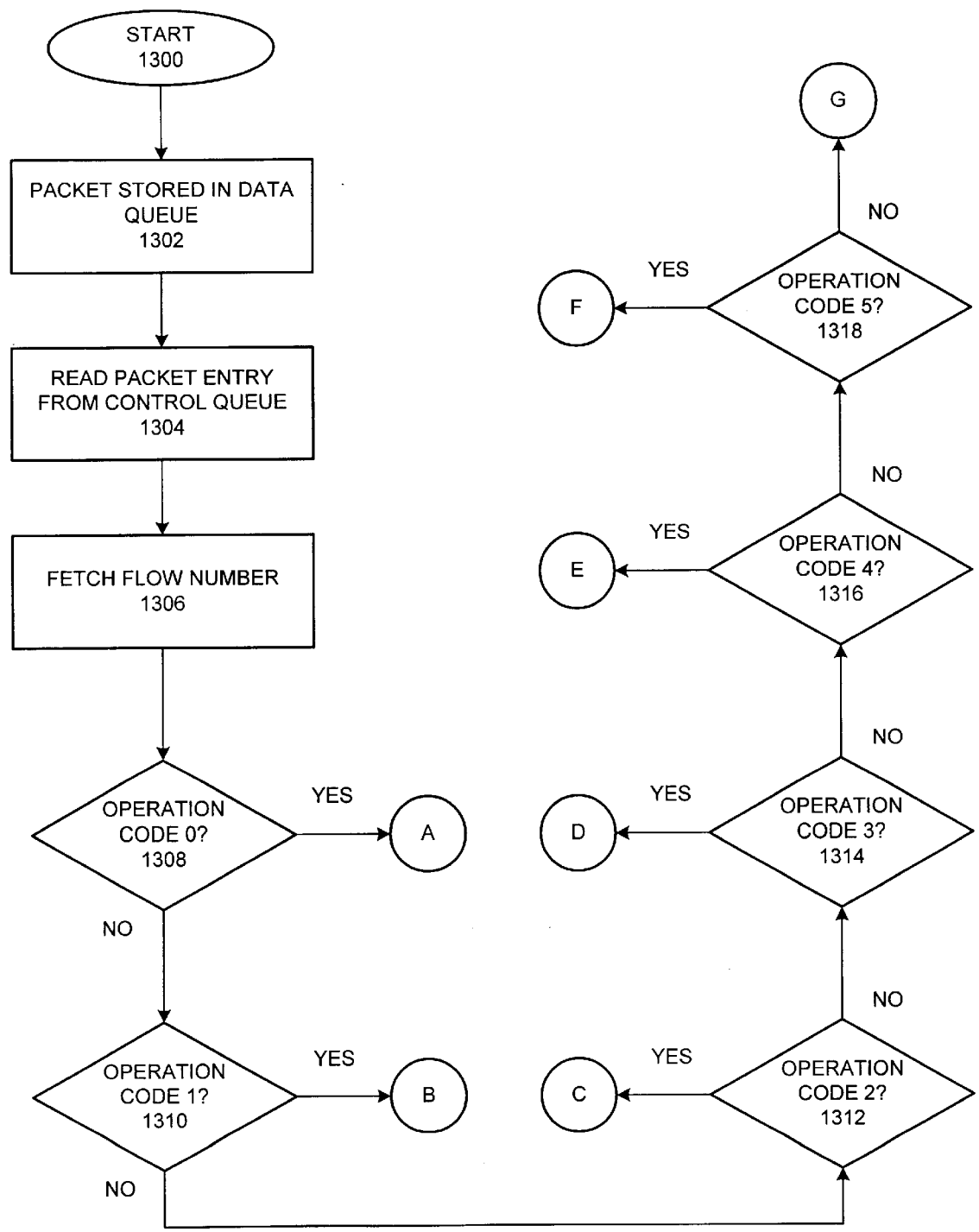
FIGS. 13–20 are flow charts demonstrating methods of transferring a packet received from a network to a buffer in a host computer memory in accordance with an embodiment of the invention.

FIG. 13 is a top-level view of the logic controlling DMA engine 120 in this embodiment of the invention. State 1300 is a start state.

In state 1302, a packet is stored in packet queue 116 and associated information is stored in control queue 118. One embodiment of a packet queue is depicted in FIG. 8 and one embodiment of a control queue is depicted in FIG. 9. DMA engine 120 may detect the existence of a packet in packet queue 116 by comparing the queue's read and write pointers. As long as they do not reference the same entry, then it is understood that a packet is stored in the queue. Alternatively, DMA engine 120 may examine control queue 118 to determine whether an entry exists there, which would indicate that a packet is stored in packet queue 116. As long as the control queue's read and write pointers do not reference the same entry, then an entry is stored in the control queue and a packet must be stored in the packet queue.

In state 1304, the packet's associated entry in the control queue is read. Illustratively, the control queue entry includes the packet's operation code, the status of the packet's No_Assist signal (e.g., indicating whether or not the packet is compatible with a pre-selected protocol), one or more indicators concerning the size of the packet (and/or its data portion), etc.

In state 1306, DMA engine 120 retrieves the packet's flow number. As described previously, a packet's flow number is the index of the packet's flow in flow database 110. A packet's flow number may, as described in a following section, be provided to and used by dynamic packet batching module 122 to enable the collective processing of headers from related packets. In one embodiment of the invention, a packet's flow number may be provided to any of a number of NIC modules (e.g., IPP module 104, packet batching module 122, DMA engine 120, control queue 118) after being generated by flow database manager 108. The flow number may also be stored in a separate data structure (e.g., a register) until needed by dynamic packet batching module 122 and/or DMA engine 120. In one embodiment of the invention DMA engine 120 retrieves a packet's flow number from dynamic packet batching module 122. In an alternative embodiment of the invention, the flow number may be retrieved from a different location or module.

Then, in states 1308–1318, DMA engine 120 determines the appropriate manner of processing the packet by examining the packet's operation code. The operation code may, for example, indicate which buffer the engine should transfer the packet into and whether a flow is to be set up or torn down in flow re-assembly buffer table 1004.

The illustrated procedure continues at state 1400 (FIG. 14) if the operation code is 0, state 1500 (FIG. 15) for operation code 1, state 1600 (FIG. 16) for operation code 2, state 1700 (FIG. 17) for operation code 3, state 1800 (FIG. 18) for operation code 4, state 1900 (FIG. 19) for operation code 5 and state 2000 (FIG. 20) for operation codes 6 and 7.

A Method of Transferring a Packet with Operation Code 0

Figure 14:
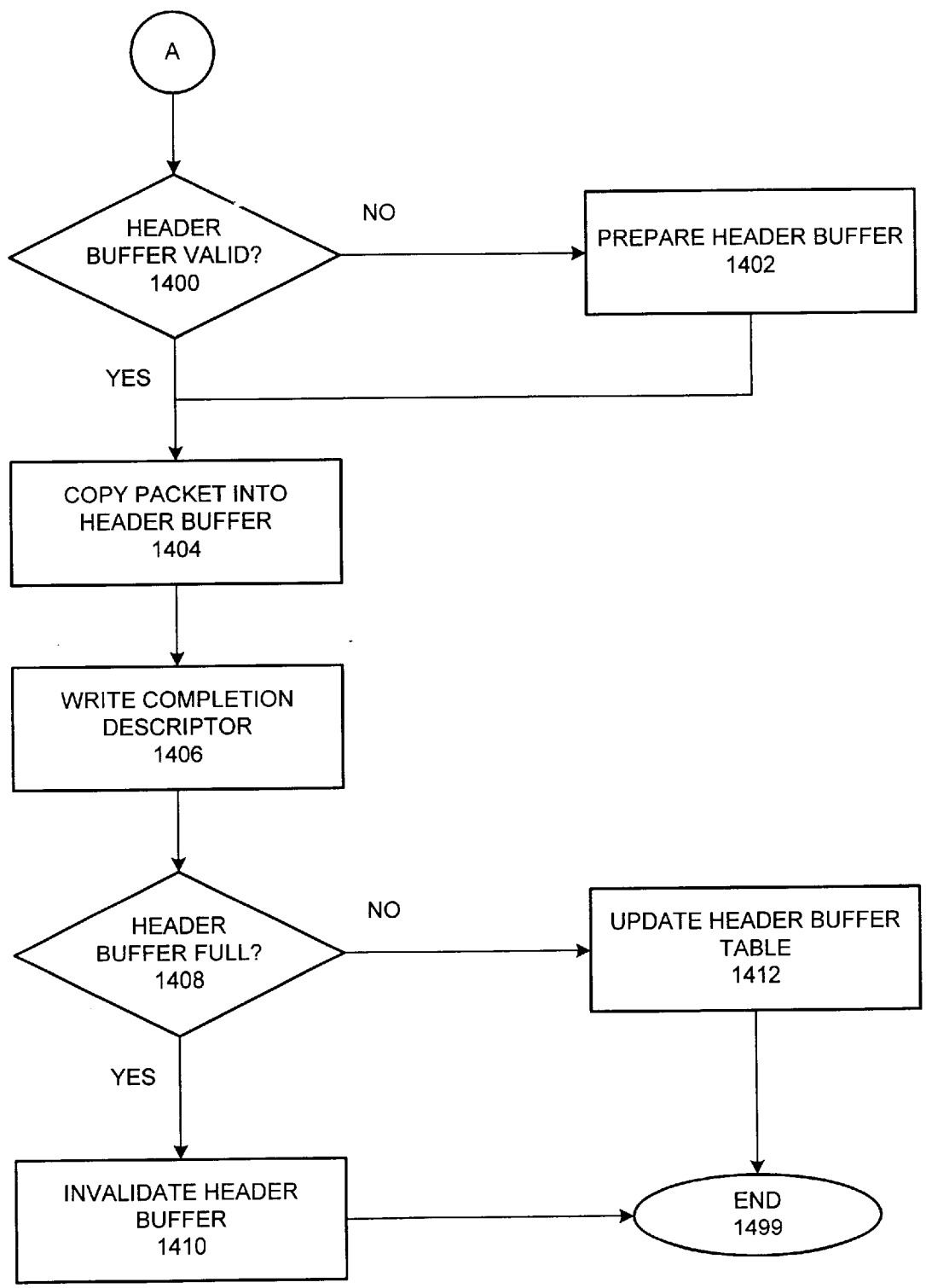

FIG. 14 depicts an illustrative procedure in which DMA engine 120 transfers a packet associated with operation code 0 to a host memory buffer. As reflected in TABLE 1, operation code 0 indicates in this embodiment that the packet is compatible with the protocols that may be parsed by NIC 100. As explained above, compatible packets are eligible for re-assembly, such that data from multiple packets of one flow may be stored in one buffer that can then be efficiently provided (e.g., via a page-flip) to a user or program's memory space. Packets having operation code 0, however, are small and contain no flow data for re-assembly. They are thus likely to be control packets. Therefore, no new flow is set up, no existing flow is torn down and the entire packet may be placed in a header buffer.

In state 1400, DMA engine 120 (e.g., DMA manager 1002) determines whether there is a valid (e.g., active) header buffer. Illustratively, this determination is made by examining validity indicator 1116 of header buffer table 1006, which manages the active header buffer. If the validity indicator is set (e.g., equal to one), then there is a header buffer ready to receive this packet and the procedure continues at state 1404.

Otherwise, in state 1402 a header buffer is prepared or initialized for storing small packets (e.g., packets less than 257 bytes in size) and headers of re-assembled packets (and, possibly, headers of other packets—such as jumbo packets). In the illustrated embodiment, this initialization process involves obtaining a free ring descriptor and retrieving its buffer identifier (e.g., its reference to an available host memory buffer). The buffer identifier may then be stored in a data structure such as free buffer array 1210 (shown in FIG. 12A). As described above, in one embodiment of the invention free ring manager 1012 maintains a cache of descriptors referencing empty buffers. Thus, a descriptor may be retrieved from this cache and its buffer allocated to header buffer table 1006. If the cache is empty, new descriptors may be retrieved from a free descriptor ring in host memory to replenish the cache.

When a new buffer identifier is retrieved from the cache or from the free descriptor ring, the buffer identifier's position in the free buffer array is placed in header buffer index 1112 of header buffer table 1006. Further, an initial storage location in the buffer identifier (e.g., its starting address) is stored in next address field 1114 and validity indicator 1116 is set to a valid state.

In state 1404, the packet is copied or transferred (e.g., via a DMA operation) into the header buffer at the address or location specified in the next address field of header buffer table 1006. As described above, in one embodiment of the invention pad bytes are inserted before the packet in order to align the beginning of the packet's layer three (e.g., IP) header with a sixteen-byte boundary. In addition, a header buffer may be logically partitioned into cells of predetermined size (e.g., 256 bytes), in which case the packet or padding may begin at a cell boundary.

In state 1406, a completion descriptor is written or configured to provide information to the host computer (e.g., a software driver) for processing the packet. In particular, the header buffer index (e.g. the index within the free buffer array of the buffer identifier that references the header buffer) and the packet's offset in the header buffer are placed in the descriptor. Illustratively, the offset may identify the location of the cell in which the header is stored, or it may identify the first byte of the packet. The size of the packet is also stored in the descriptor, illustratively within a header size field. A data size field within the descriptor is set to zero to indicate that the entire packet was placed in the header buffer (e.g., there was no data portion to store in a separate data buffer). A release header flag is set in the descriptor if the header buffer is full. However, the header buffer may not be tested to see if it is full until a later state of this procedure. In such an embodiment of the invention, the release header flag may be set (or cleared) at that time.

As described in a later section, in one embodiment of the invention a release flow flag may also be set, depending upon dynamic packet batching module 122. For example, if the packet batching module determines that another packet in the same flow will soon be transferred to the host computer, the release flow flag will be cleared (e.g., a zero will be stored). This indicates that the host computer should await the next flow packet before processing this one. Then, by collectively processing multiple packets from a single flow, the packets can be processed more efficiently while requiring less processor time.

In the descriptor type field, a value is stored to indicate that a flow packet as transferred to host memory. Also, a predetermined value (e.g., zero) is stored in the ownership indicator field to indicate that DMA engine 120 is done using the descriptor and/or is releasing a packet to the host computer. Illustratively, the host computer will detect the change in the ownership indicator (e.g., from one to zero) and use the stored information to process the packet. In one alternative embodiment of the invention, DMA engine 120 issues an interrupt or other signal to alert the host computer that a descriptor is being released. In another alternative embodiment, the host computer polls the NIC to determine when a packet has been received and/or transferred. In yet another alternative embodiment, the descriptor type field is used to inform the host computer that the DMA engine is releasing a descriptor. In this alternative embodiment, when a non-zero value is placed in the descriptor type field the host computer may understand that the DMA engine is releasing the descriptor.

In a present embodiment of the invention, the ownership indicator field is not changed until DMA engine 120 is finished with any other processing involving this packet or is finished making all entries in the descriptor. For example, as described below a header buffer or other buffer may be found to be full at some time after state 1406. By delaying the setting of the ownership indicator, a release header flag can be set before the descriptor is reclaimed by the host computer, thus avoiding the use of another descriptor.

In state 1408, it is determined whether the header buffer is full. In this embodiment of the invention, where each buffer is eight kilobytes in size and entries in the header buffer are no larger than 256 bytes, up to thirty-two entries may be stored in a header buffer. Thus, a counter may be used to keep track of entries placed in each new header buffer and the buffer can be considered full when thirty-two entries are stored. Other methods of determining whether a buffer is full are also suitable. For example, after a packet is stored in the header buffer a new next address field may be calculated and the difference between the new next address field and the initial address of the buffer may be compared to the size of the buffer (e.g., eight kilobytes). If less than a predetermined number of bytes (e.g., 256) are unused, the buffer may be considered full.

If the buffer is full, in state 1410 the header buffer is invalidated to ensure that it is not used again. Illustratively, this involves setting the header buffer table's validity indicator to invalid and communicating this status to the host computer via a descriptor. In this embodiment of the invention a release header flag in the descriptor is set. If the descriptor that was written in state 1406 was already released (e.g., its ownership indicator field changed), another descriptor may be used in this state. If another descriptor is used simply to report a full header buffer, the descriptor's header size and data size fields may be set to zero to indicate that no new packet was transferred with this descriptor.

If the header buffer is not full, then in state 1412 the next address field of header buffer table 1006 is updated to indicate the address at which to store the next header or small packet. The processing associated with a packet having operation code 0 then ends with end state 1499. In one embodiment of the invention, the ownership indicator field of a descriptor that is written in state 1406 is not changed, or an interrupt is not issued, until end state 1499. Delaying the notification of the host computer allows the descriptor to be updated or modified for as long as possible before turning it over to the host.

A Method of Transferring a Packet with Operation Code 1

Figure 15:
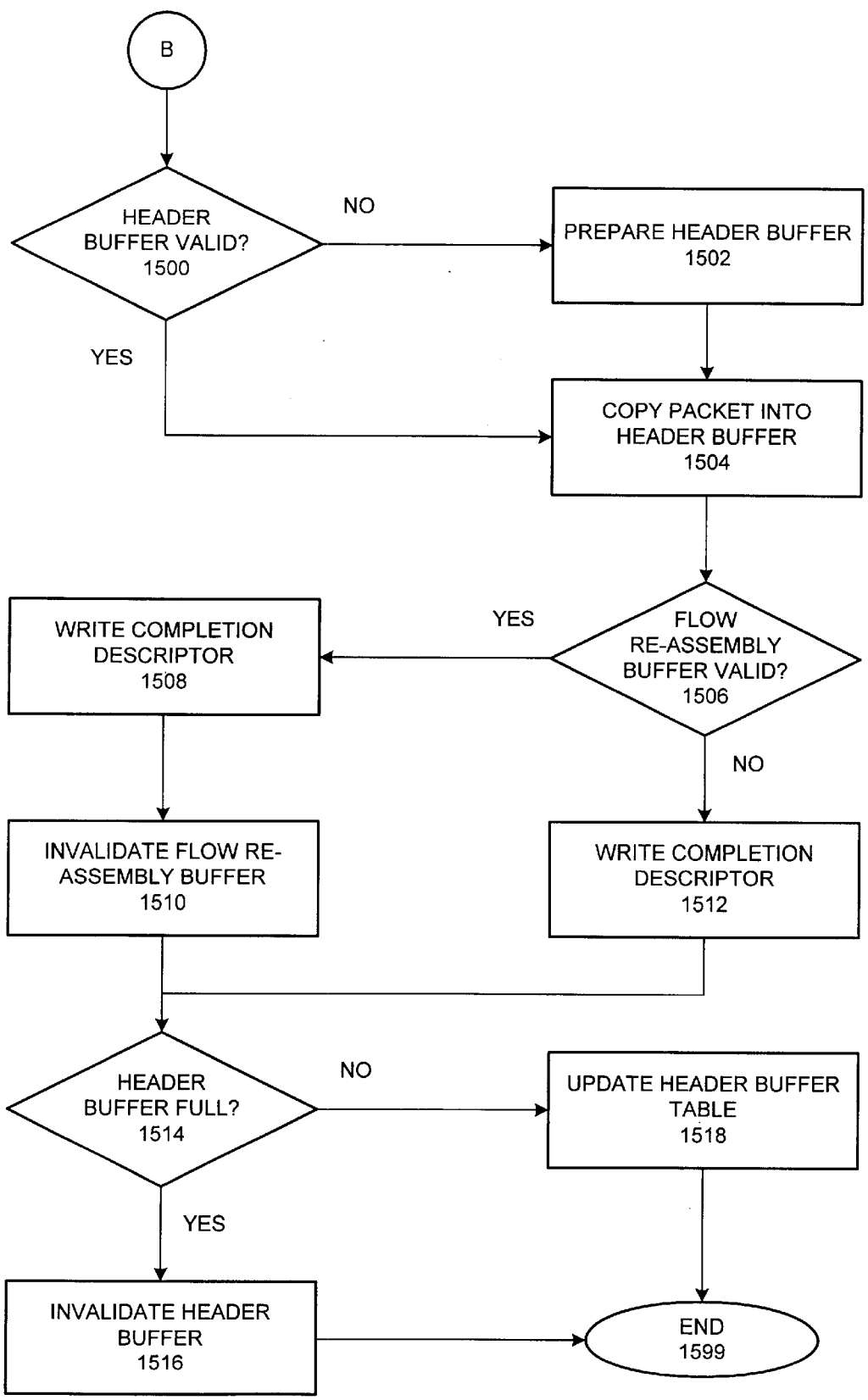
Figure 16A:
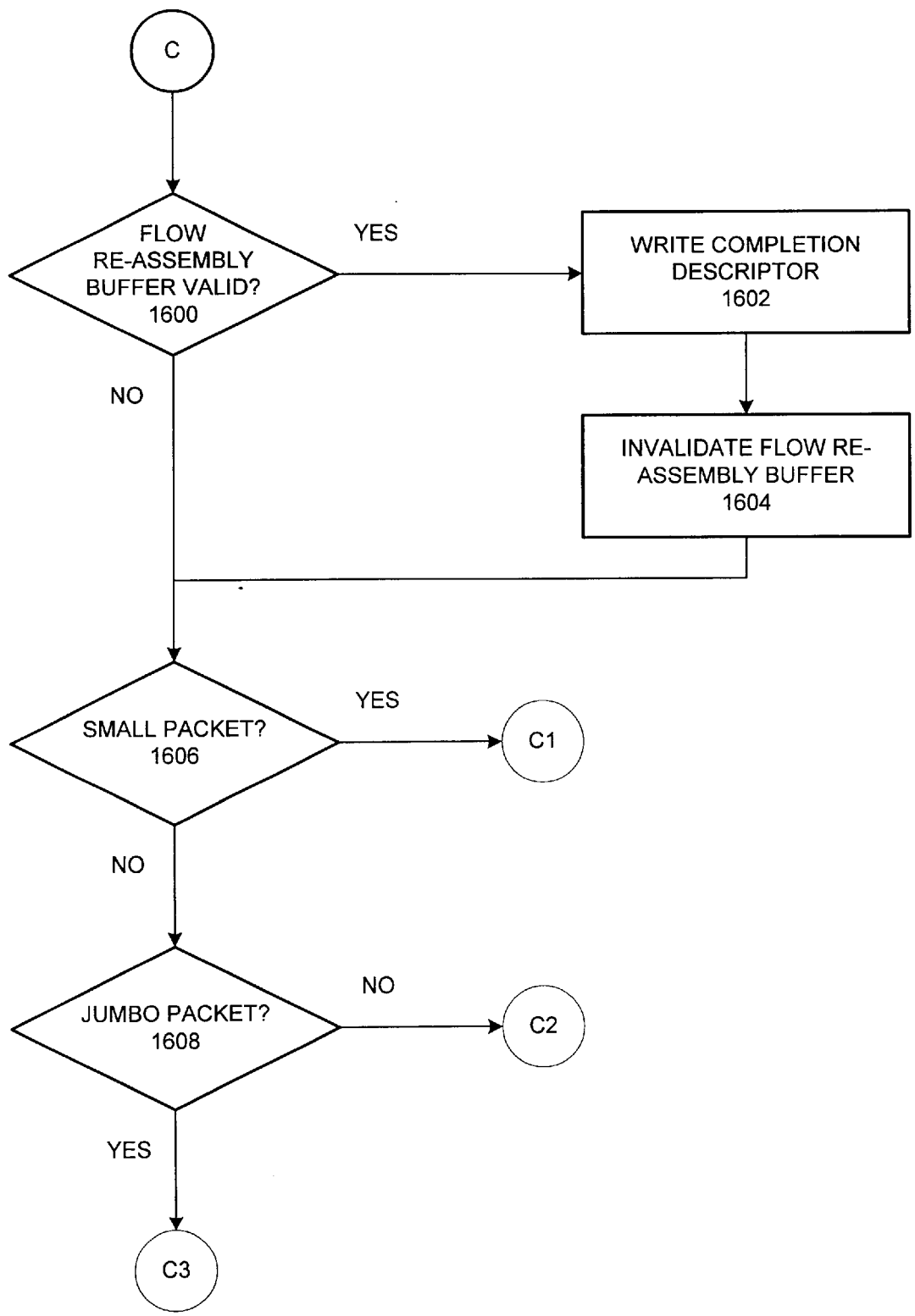
Figure 16B:
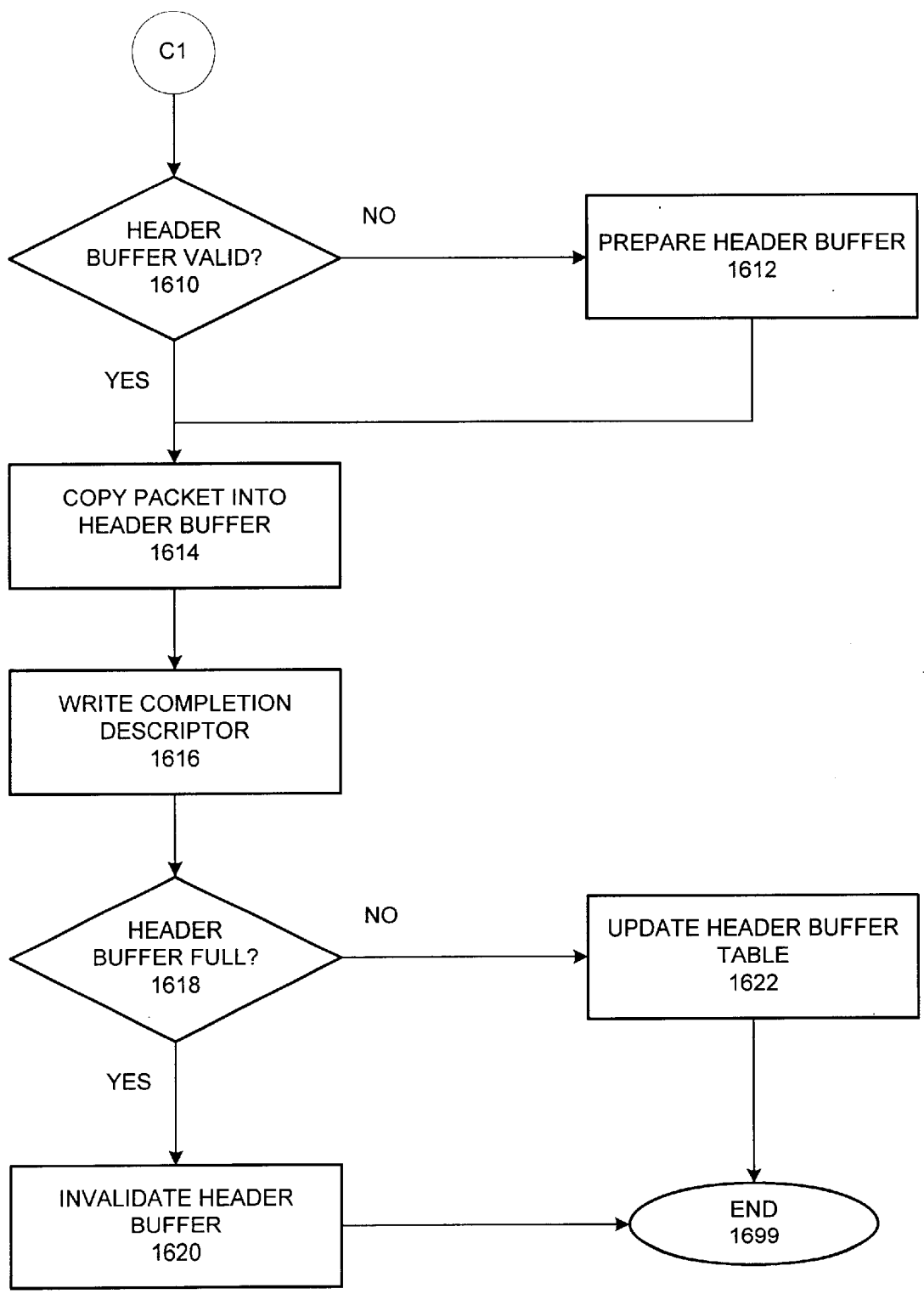
Figure 16C:
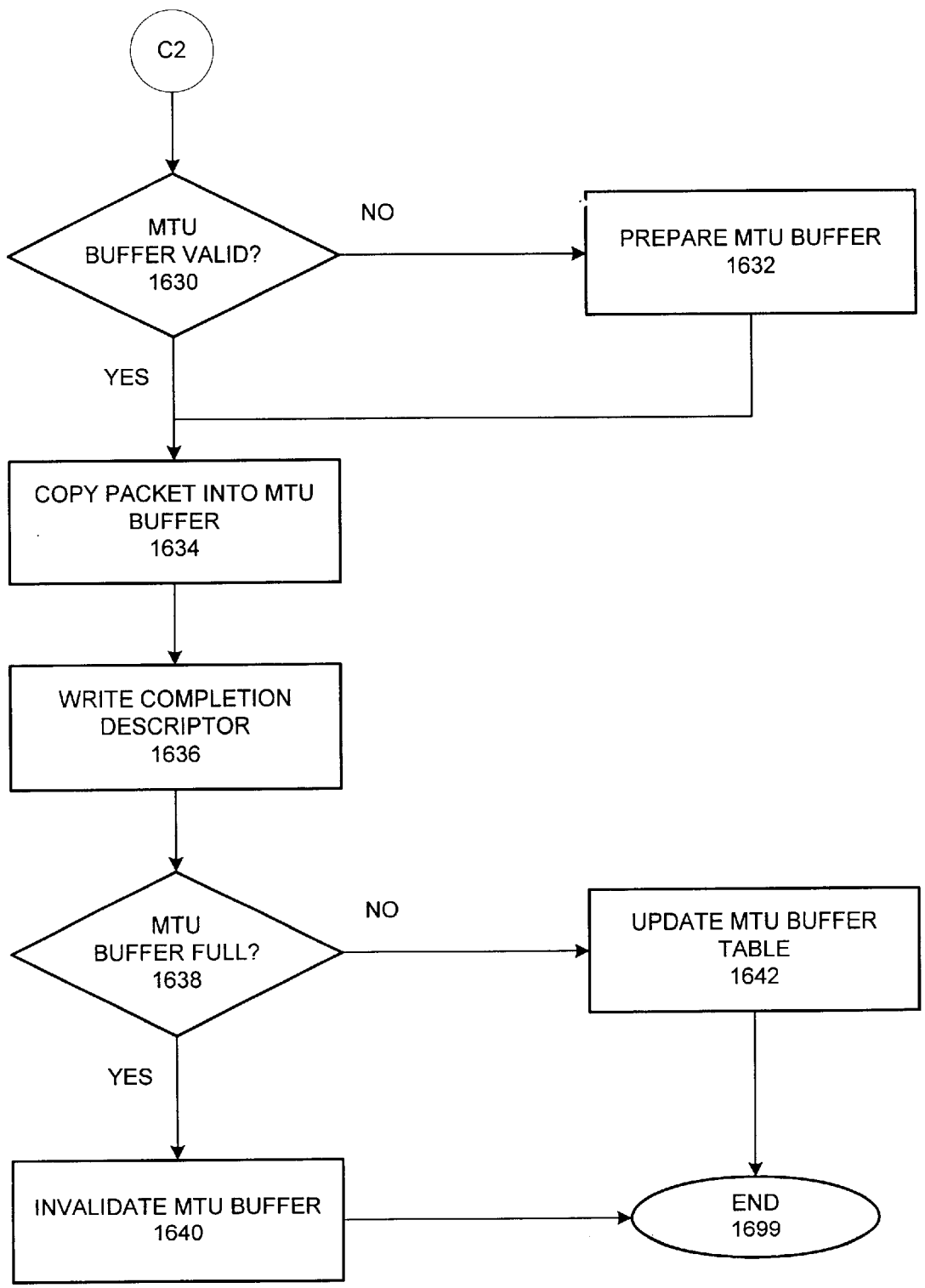
Figure 16D:
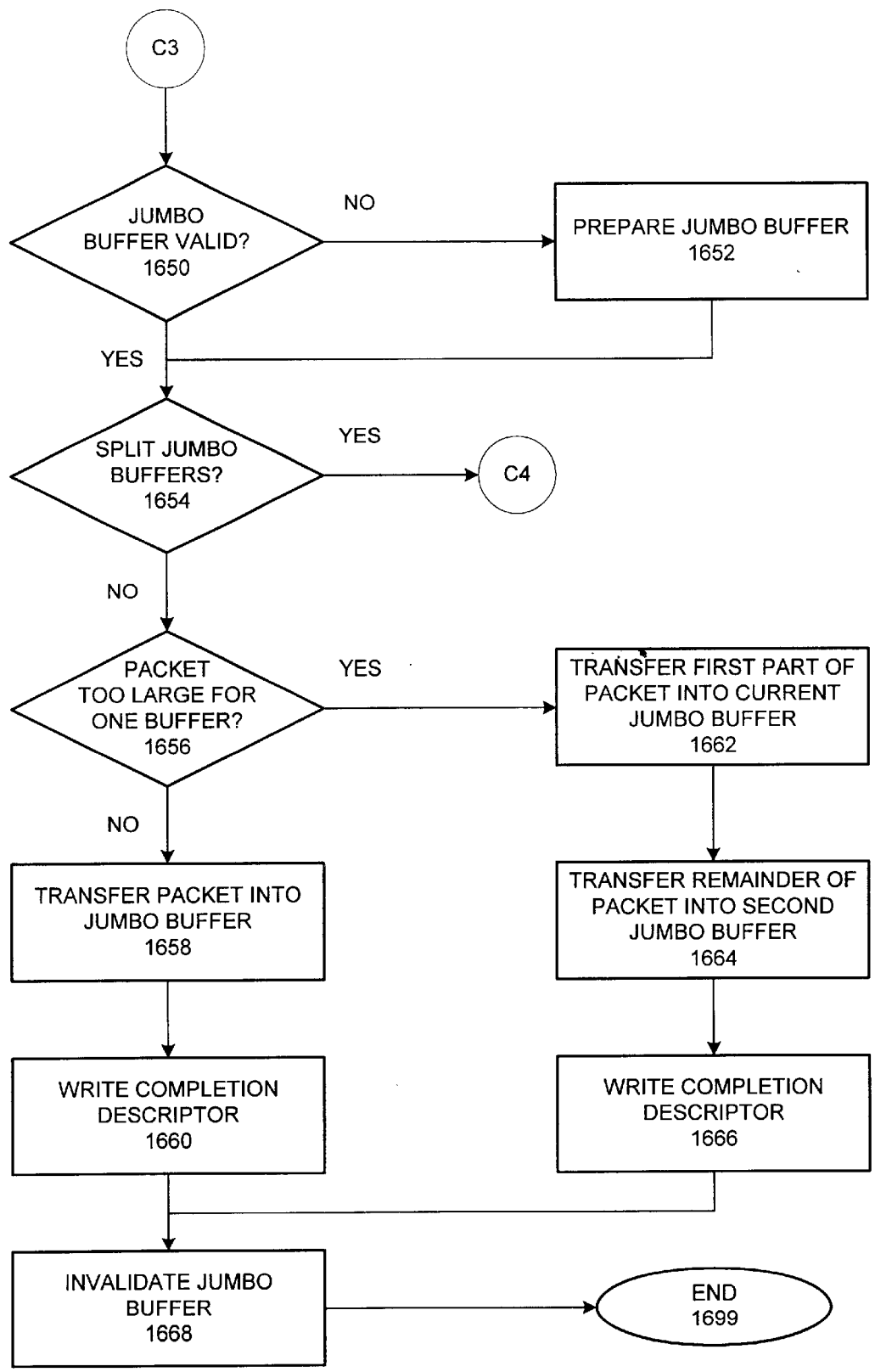
Figure 16E:
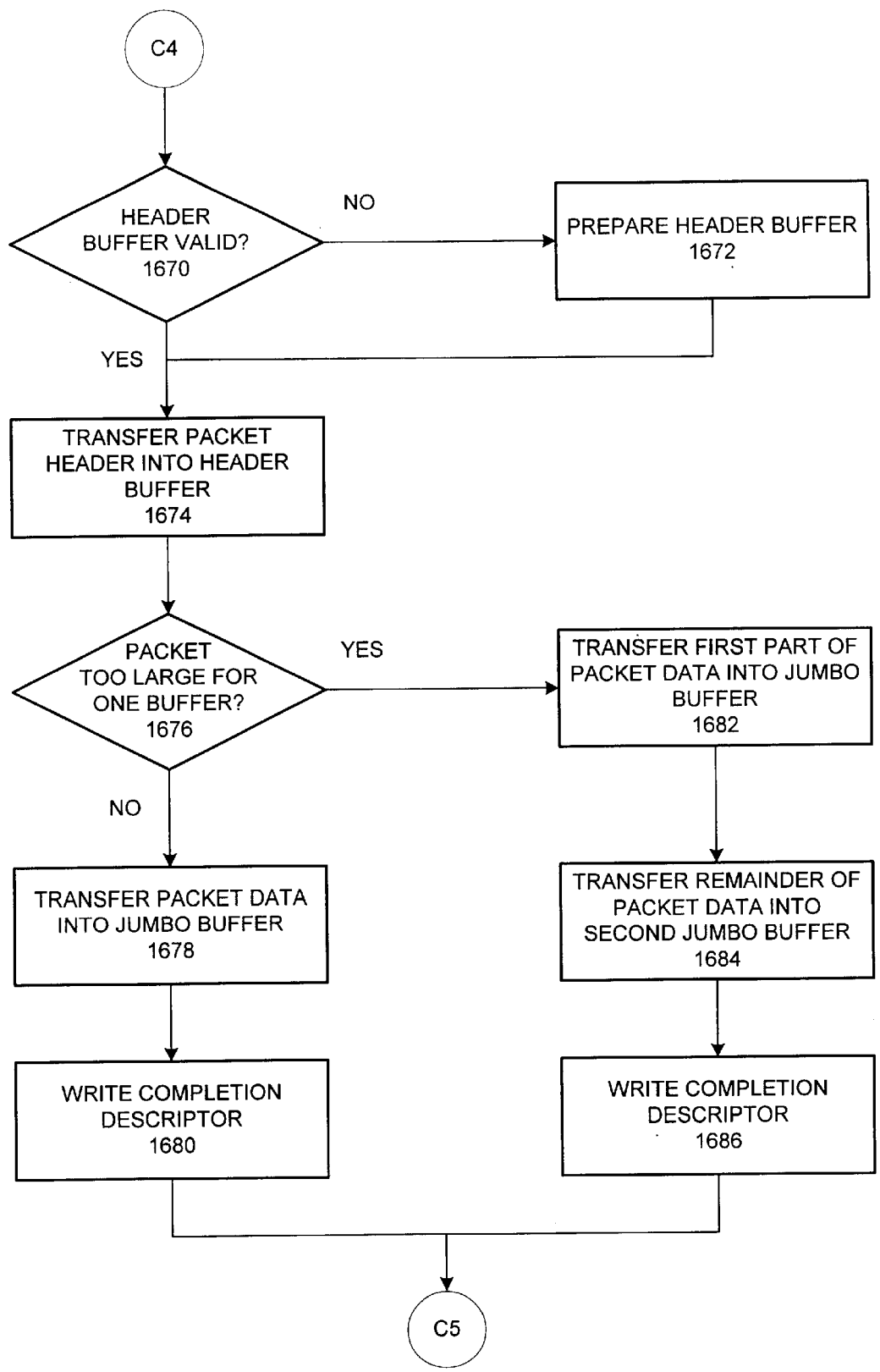
Figure 16F:
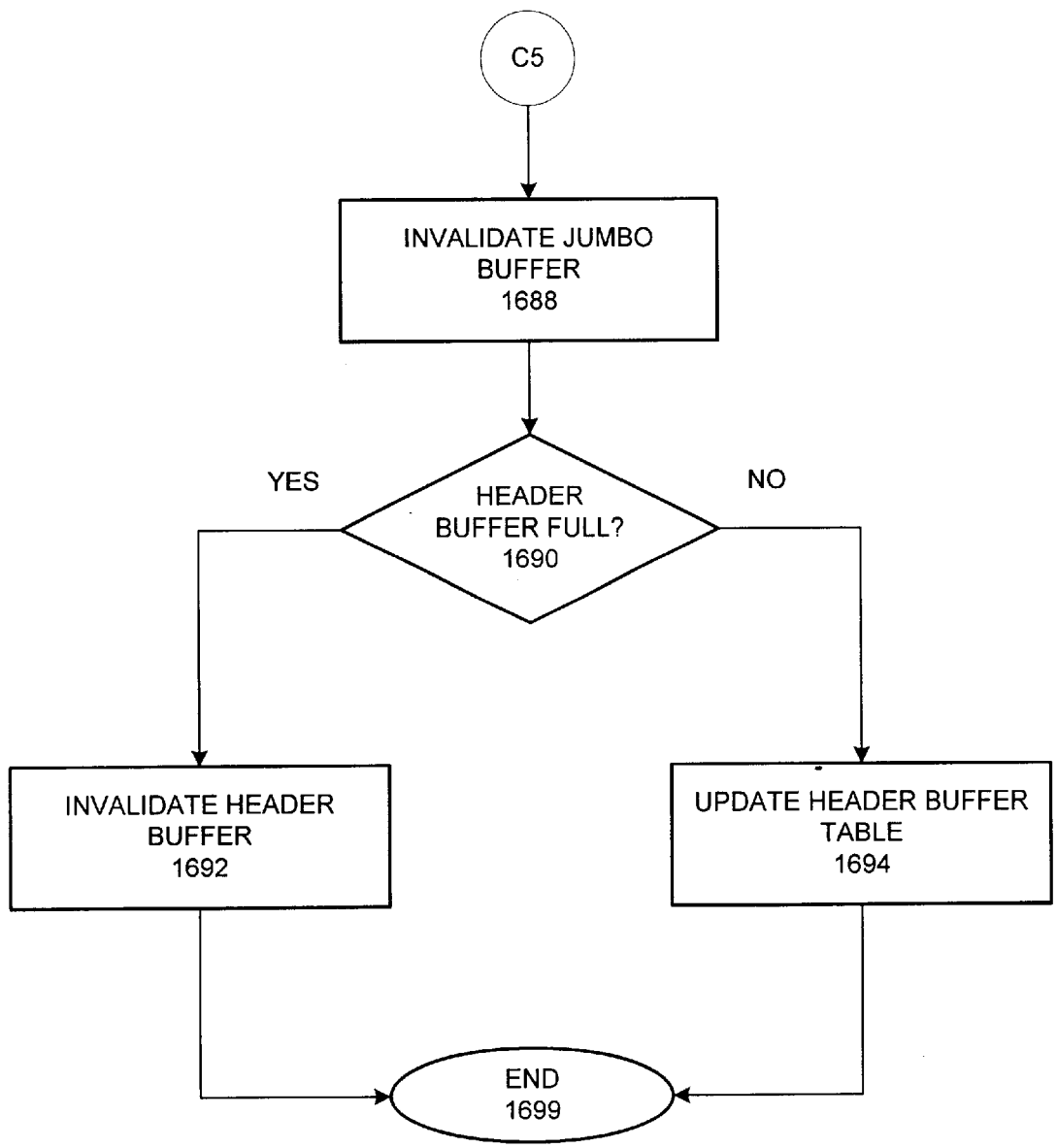

FIG. 15 depicts an illustrative procedure in which DMA engine 120 transfers a packet associated with operation code 1 to a host memory buffer. As reflected in TABLE 1, in this embodiment operation code 1 indicates that the packet is compatible with the protocols that may be parsed by NIC 100. A packet having operation code 1, however, may be a control packet having a particular flag set. No new flow is set up, but a flow should already exist and is to be torn down; there is no data to re-assemble and the entire packet may be stored in a header buffer.

In state 1500, DMA engine 120 (e.g., DMA manager 1002) determines whether there is a valid (e.g., active) header buffer. Illustratively, this determination is made by examining validity indicator 1116 of header buffer table 1006, which manages the active header buffer. If the validity indicator is set, then there is a header buffer ready to receive this packet and the procedure continues at state 1504.

Otherwise, in state 1502 a new header buffer is prepared or initialized for storing small packets and headers of re-assembled packets. Illustratively, this initialization process involves obtaining a free ring descriptor from a cache maintained by free ring manager 1012 and retrieving its reference to an empty buffer. If the cache is empty, new descriptors may be retrieved from the free descriptor ring in host memory to replenish the cache.

When a new descriptor is obtained from the cache or from the free descriptor ring, its buffer identifier (e.g., pointer, address, index) is stored in free buffer array 1210 and its initial storage location (e.g., address or cell location) is stored in next address field 1114 of header buffer table 1006. The index or position of the buffer identifier within the free buffer array is stored in header buffer index 1112. Finally, validity indicator 1116 is set to a valid state.

In state 1504 the packet is copied into the header buffer at the address or location specified in the next address field of header buffer table 1006. As described above, in one embodiment of the invention pad bytes are inserted before the packet in order to align the beginning of the packet's layer three (e.g., IP) header with a sixteen-byte boundary. And, the packet (with or without padding) may be placed into a pre-defined area or cell of the buffer.

In the illustrated embodiment, operation code 1 indicates that the packet's existing flow is to be torn down. Thus, in state 1506 it is determined whether a flow re-assembly buffer is valid (e.g., active) for this flow by examining the flow's validity indicator in flow re-assembly buffer table 1004. If, for example, the indicator is valid, then there is an active buffer storing data from one or more packets in this flow. Illustratively, the flow is torn down by invalidating the flow re-assembly buffer and releasing it to the host computer. If there is no valid flow re-assembly buffer for this flow, the illustrated procedure continues at state 1512. Otherwise, the procedure proceeds to state 1508.

In state 1508, a completion descriptor is configured to release the flow's re-assembly buffer and to provide information to the host computer for processing the current packet. In particular, the header buffer index and the offset of the first byte of the packet (or location of the packet's cell) within the header buffer are placed in the descriptor. The index within the free buffer array of the entry containing the re-assembly buffer's buffer identifier is stored in a data index field of the descriptor. The size of the packet is stored in a header size field and a data size field is set to zero to indicate that no separate buffer was used for storing this packet's data. A release header flag is set in the descriptor if the header buffer is full and a release data flag is set to indicate that no more data will be placed in this flow's present re-assembly buffer (e.g., it is being released). In addition, a release flow flag is set to indicate that DMA engine 120 is tearing down the packet's flow. The header buffer may not be tested to see if it is full until a later state of this procedure. In such an embodiment of the invention, the release header flag may be set at that time.

In state 1510, the flow's entry in flow re-assembly buffer table 1004 is invalidated. After state 1510, the procedure continues at state 1514.

In state 1512, a completion descriptor is configured with information somewhat different than that of state 1508. In particular, the header buffer index, the offset to this packet within the header buffer and the packet size are placed within the same descriptor fields as above. The data size field is set to zero, as above, but no data index needs to be stored and no release data flag is set (e.g., because there is no flow re-assembly buffer to release). A release header flag is still set in the descriptor if the header buffer is full and a release flow flag is again set to indicate that DMA engine 120 is tearing down the packet's flow. Also, the descriptor type field is changed to a value indicating that DMA engine 120 transferred a flow packet into host memory.

In state 1514, it is determined whether the header buffer is now full. In this embodiment of the invention, where each buffer is eight kilobytes in size and entries in the header buffer are no larger than 256 bytes, a counter is used to keep track of entries placed into each new header buffer. The buffer is considered full when thirty-two entries are stored.

If the buffer is full, in state 1516 the header buffer is invalidated.

Illustratively, this involves setting the header buffer table's validity indicator to invalid and communicating this status to the host computer via the descriptor configured in state 1508 or state 1512. In this embodiment of the invention a release header flag in the descriptor is set to indicate that the header buffer is full.

If the header buffer is not full, then in state 1518 the next address field of header buffer table 1006 is updated to indicate the address at which to store the next header or small packet.

The processing associated with a packet having operation code 1 then ends with end state 1599. In this end state, the descriptor used for this packet is turned over to the host computer by changing its ownership indicator field (e.g., from one to zero), issuing an interrupt, or some other mechanism.

One skilled in the art will appreciate that in an alternative embodiment of the invention a change in the descriptor type field to any value other than the value (e.g., zero) it had when DMA engine 120 was using it, may constitute a surrender of "ownership" of the descriptor to the host computer or software operating on the host computer. The host computer will detect the change in the descriptor type field and subsequently use the stored information to process the packet.

A Method of Transferring a Packet with Operation Code 2

FIGS. 16A–16F illustrate a procedure in which DMA engine 120 transfers a packet associated with operation code 2 to a host memory buffer. As reflected in TABLE 1, operation code 2 may indicate that the packet is compatible with the protocols that may be parsed by NIC 100, but that it is out of sequence with another packet in the same flow. It may also indicate an attempt to re-establish a flow, but that no more data is likely to be received after this packet. For operation code 2, no new flow is set up and any existing flow with the packet's flow number is to be torn down. The packet's data is not to be re-assembled with data from other packets in the same flow.

Because an existing flow is to be torn down (e.g., the flow's re-assembly buffer is to be invalidated and released to the host computer), in state 1600 it is determined whether a flow re-assembly buffer is valid (e.g., active) for the flow having the flow number that was read in state 1306. This determination may be made by examining the validity indicator in the flow's entry in flow re-assembly buffer table 1004. Illustratively, if the indicator is valid then there is an active buffer storing data from one or more packets in the flow. If there is a valid flow re-assembly buffer for this flow, the illustrated procedure continues at state 1602. Otherwise, the procedure proceeds to state 1606.

In state 1602, a completion descriptor is written or configured to release the existing flow re-assembly buffer. In particular, the flow re-assembly buffer's index (e.g., the location within the free buffer array that contains the buffer identifier corresponding to the flow re-assembly buffer) is written to the descriptor. In this embodiment of the invention, no offset needs to be stored in the descriptor's data offset field and the data size field may be set to zero because no new data was stored in the re-assembly buffer. Similarly, the header buffer is not yet being released, therefore the header index and header offset fields of the descriptor need not be used and a zero may be stored in the header size field.

Illustratively, the descriptor's release header flag is cleared (e.g., a zero is stored in the flag) because the header buffer is not to be released. The release data flag is set (e.g., a one is stored in the flag), however, because no more data will be placed in the released flow re-assembly buffer. Further, a release flow flag in the descriptor is also set, to indicate that the flow associated with the released flow re-assembly buffer is being torn down.

The descriptor type field may be changed to a value indicating that DMA engine 120 is releasing a stale flow buffer (e.g., a flow re-assembly buffer that has not been used for some time). Finally, the descriptor is turned over to the host computer by changing its ownership indicator field or by issuing an interrupt or using some other mechanism. In one embodiment of the invention, however, the descriptor is not released to the host computer until end state 1699.

Then, in state 1604, the flow re-assembly buffer is invalidated by modifying validity indicator 1106 in the flow's entry in flow re-assembly buffer table 1004 appropriately.

In state 1606, it is determined whether the present packet is a small packet (e.g., less than or equal to 256 bytes in size), suitable for storage in a header buffer. If so, the illustrated procedure proceeds to state 1610. Information stored in packet queue 116 and/or control queue 118 may be used to make this determination.

In state 1608, it is determined whether the present packet is a jumbo packet (e.g., greater than 1522 bytes in size), such that it should be stored in a jumbo buffer. If so, the illustrated procedure proceeds to state 1650. If not, the procedure continues at state 1630.

In state 1610 (reached from state 1606), it has been determined that the present packet is a small packet suitable for storage in a header buffer. Therefore, DMA engine 120 (e.g., DMA manager 1002) determines whether there is a valid (e.g., active) header buffer. Illustratively, this determination is made by examining validity indicator 1116 of header buffer table 1006, which manages the active header buffer. If the validity indicator is set, then there should be a header buffer ready to receive this packet and the procedure continues at state 1614.

Otherwise, in state 1612 a new header buffer is prepared or initialized for storing small packets and headers of re-assembled packets. This initialization process may involve obtaining a free ring descriptor from a cache maintained by free ring manager 1012 and retrieving its reference to an empty buffer. If the cache is empty, new descriptors may be retrieved from the free descriptor ring in host memory to replenish the cache.

When a new descriptor is obtained from the cache or from the free descriptor ring, the buffer identifier (e.g., pointer, address, index) contained in the descriptor is stored in a free buffer array. The buffer's initial address or some other indicator of the first storage location in the buffer is placed in next address field 1114 of header buffer table 1006. The buffer identifier's position or index within the free buffer array is stored in header buffer index 1112, and validity indicator 1116 is set to a valid state.

In state 1614 the packet is copied or transferred (e.g., via a DMA operation) into the header buffer at the address or location specified in the next address field of header buffer table 1006. As described above, in one embodiment of the invention pad bytes are inserted before the header in order to align the beginning of the packet's layer three protocol (e.g., IP) header with a sixteen-byte boundary. In addition, the packet may be positioned within a cell of predetermined size (e.g., 256 bytes) within the header buffer.

In state 1616, a completion descriptor is written or configured to provide necessary information to the host computer (e.g., a software driver) for processing the packet. In particular, the header buffer index (e.g. the position within the free buffer array of the header buffer's buffer identifier) and the packet's offset within the header buffer are placed in the descriptor. Illustratively, this offset may serve to identify the first byte of the packet, the first pad byte before the packet or the beginning of the packet's cell within the buffer. The size of the packet is also stored in the descriptor in a header size field. A data size field within the descriptor may be set to zero to indicate that the entire packet was placed in the header buffer (e.g., no separate data portion was stored). A release header flag is set in the descriptor if the header buffer is full. However, the header buffer may not be tested to see if it is full until a later state of this procedure. In such an embodiment of the invention, the release header flag may be set (or cleared) at that time. A release data flag is cleared (e.g., set to a value of zero), because there is no separate data portion being conveyed to the host computer.

Also, the descriptor type field is changed to a value indicating that DMA engine 120 transferred a non-reassembleable packet into host memory. And, a predetermined value (e.g., zero) is stored in the descriptor's ownership indicator field to indicate that DMA engine 120 is releasing a packet to the host computer and turning over ownership of the descriptor. In one embodiment of the invention the ownership indicator field is not changed until end state 1699 below. In one alternative embodiment of the invention, DMA engine 120 issues an interrupt or other signal to alert the host computer that a descriptor is being released.

In state 1618, it is determined whether the header buffer is full. In this embodiment of the invention, where each buffer is eight kilobytes in size and entries in the header buffer are no larger than 256 bytes, a counter may be used to keep track of entries placed into each new header buffer. The buffer is considered full when thirty-two entries are stored.

If the buffer is full, in state 1620 the header buffer is invalidated to ensure that it is not used again. Illustratively, this involves setting the header buffer table's validity indicator to an invalid state and communicating this status to the host computer. In this embodiment of the invention, a release header flag in the descriptor is set. The illustrated procedure then ends with end state 1699.

If the header buffer is not full, then in state 1622 the next address field of header buffer table 1006 is updated to indicate the address or cell boundary at which to store the next header or small packet. The illustrated procedure then ends with end state 1699.

In state 1630 (reached from state 1608), it has been determined that the packet is not a small packet or a jumbo packet. The packet may, therefore, be stored in a non-reassembly buffer (e.g., an MTU buffer) used to store packets that are up to MTU in size (e.g., 1522 bytes). Thus, in state 1630 DMA engine 120 determines whether a valid (e.g., active) MTU buffer exists. Illustratively, this determination is made by examining validity indicator 1126 of MTU buffer table 1008, which manages an active MTU buffer. If the validity indicator is set, then there is an MTU buffer ready to receive this packet and the procedure continues at state 1634.

Otherwise, in state 1632 a new MTU buffer is prepared or initialized for storing non-re-assembleable packets up to 1522 bytes in size. Illustratively, this initialization process involves obtaining a free ring descriptor from a cache maintained by free ring manager 1012 and retrieving its reference to an empty buffer (e.g., a buffer identifier). If the cache is empty, new descriptors may be retrieved from the free descriptor ring in host memory to replenish the cache.

When a new descriptor is obtained from the cache or from the free descriptor ring, the buffer identifier (e.g., pointer, address, index) contained in the descriptor is stored in the free buffer array. The buffer's initial address or some other indication of the first storage location in the buffer is placed in next address field 1124 of MTU buffer table 1008. Further, the position of the buffer identifier within the free buffer array is stored in MTU buffer index 1122 and validity indicator 1126 is set to a valid state.

In state 1634 the packet is copied or transferred (e.g., via a DMA operation) into the MTU buffer at the address or location specified in the next address field. As described above, in one embodiment of the invention pad bytes may be inserted before the header in order to align the beginning of the packet's layer three protocol (e.g., IP) header with a sixteen-byte boundary. In another embodiment of the invention packets may be aligned in an MTU buffer in cells of predefined size (e.g., two kilobytes), similar to entries in a header buffer.

In state 1636, a completion descriptor is written or configured to provide necessary information to the host computer (e.g., a software driver) for processing the packet. In particular, the MTU buffer index (e.g. the free buffer array element that contains the buffer identifier for the MTU buffer) and offset (e.g., the offset of the first byte of this packet within the MTU buffer) are placed in the descriptor in data index and data offset fields, respectively. The size of the packet is also stored in the descriptor, illustratively within a data size field. A header size field within the descriptor is set to zero to indicate that the entire packet was placed in the MTU buffer (e.g., no separate header portion was stored in a header buffer). A release data flag is set in the descriptor if the MTU buffer is full. However, the MTU buffer may not be tested to see if it is full until a later state of this procedure. In such an embodiment of the invention, the release data flag may be set (or cleared) at that time. A release header flag is cleared (e.g., set to zero), because there is no separate header portion being conveyed to the host computer.

Further, the descriptor type field is changed to a value indicating that DMA engine 120 transferred a non-re-assembleable packet into host memory. Also, a predetermined value (e.g., zero) is stored in the descriptor's ownership indicator field to indicate that DMA engine 120 is releasing a packet to the host computer and turning over ownership of the descriptor. In a present embodiment of the invention the ownership field is not set until end state 1699 below. In one alternative embodiment of the invention, DMA engine 120 issues an interrupt or other signal to alert the host computer that a descriptor is being released, or communicates this event to the host computer through the descriptor type field.

In state 1638, it is determined whether the MTU buffer is full. In this embodiment of the invention, where each buffer is eight kilobytes in size and entries in the MTU buffer are allotted two kilobytes, a counter may be used to keep track of entries placed into each new header buffer. The buffer may be considered full when a predetermined number of entries (e.g., four) are stored. In an alternative embodiment of the invention DMA engine 120 determines how much storage space within the buffer has yet to be used. If no space remains, or if less than a predetermined amount of space is still available, the buffer may be considered full.

If the MTU buffer is full, in state 1640 it is invalidated to ensure that it is not used again. Illustratively, this involves setting the MTU buffer table's validity indicator to invalid and communicating this status to the host computer. In this embodiment of the invention, a release data flag in the descriptor is set. The illustrated procedure then ends with end state 1699.

If the MTU buffer is not full, then in state 1642 the next address field of MTU buffer table 1008 is updated to indicate the address or location (e.g., cell boundary) at which to store the next packet. The illustrated procedure then ends with end state 1699.

In state 1650 (reached from state 1608), it has been determined that the packet is a jumbo packet (e.g., that it is greater than 1522 bytes in size). In this embodiment of the invention jumbo packets are stored in jumbo buffers and, if splitting of jumbo packets is enabled (e.g., as determined in state 1654 below), headers of jumbo packets are stored in a header buffer. DMA engine 120 determines whether a valid (e.g., active) jumbo buffer exists. Illustratively, this determination is made by examining validity indicator 1136 of jumbo buffer table 1010, which manages the active jumbo buffer. If the validity indicator is set, then there is a jumbo buffer ready to receive this packet and the procedure continues at state 1654. As explained above, a jumbo buffer table may not be used in an embodiment of the invention in which a jumbo buffer is used only once (e.g., to store just one, or just part of one, jumbo packet).

Otherwise, in state 1652 a new jumbo buffer is prepared or initialized for storing a non-re-assembleable packet that is larger than 1522 bytes. This initialization process may involve obtaining a free ring descriptor from a cache maintained by free ring manager 1012 and retrieving its reference to an empty buffer (e.g., a buffer identifier). If the cache is empty, new descriptors may be retrieved from the free descriptor ring in host memory to replenish the cache.

When a new descriptor is obtained from the cache or from the free descriptor ring, its buffer identifier (e.g., pointer, address, index) is stored in a free buffer array (or other data structure). The buffer's initial address or other indication of the first storage location in the buffer is placed in next address field 1134 of jumbo buffer table 1010. Also, the location of the buffer identifier within the free buffer array is stored in jumbo buffer index 1132 and validity indicator 1136 is set to a valid state.

Then, in state 1654 DMA engine 120 determines whether splitting of jumbo buffers is enabled. If enabled, the header of a jumbo packet is stored in a header buffer while the packet's data is stored in one or more jumbo buffers. If not enabled, the entire packet will be stored in one or more jumbo buffers. Illustratively, splitting of jumbo packets is enabled or disabled according to the configuration of a programmable indicator (e.g., flag, bit, register) that may be set by software operating on the host computer (e.g., a device driver). If splitting is enabled, the illustrated procedure continues at state 1670. Otherwise, the procedure continues with state 1656.

In state 1656, DMA engine 120 determines whether the packet will fit into one jumbo buffer. For example, in an embodiment of the invention using eight kilobyte pages, if the packet is larger than eight kilobytes a second jumbo buffer will be needed to store the additional contents. If the packet is too large, the illustrated procedure continues at state 1662.

In state 1658, the packet is copied or transferred (e.g., via a DMA operation) into the current jumbo buffer, at the location specified in the next address field 1134 of jumbo buffer table 1010. When the packet is transferred intact like this, padding may be added to align a header portion of the packet with a sixteen-byte boundary. One skilled in the art will appreciate that the next address field may not need to be updated to account for this new packet because the jumbo buffer will be released. In other words, in one embodiment of the invention a jumbo buffer may be used just once (e.g., to store one packet or a portion of one packet).

In state 1660, a completion descriptor is written or configured to release the jumbo buffer and to provide information to the host computer for processing the packet. The jumbo buffer index (e.g., the position within the free buffer array of the buffer identifier for the jumbo buffer) and the offset of the packet within the jumbo buffer are placed in the descriptor. Illustratively, these values are stored in data index and data offset fields, respectively. The size of the packet (e.g., the packet length) may be stored in a data size field.

A header size field is cleared (e.g., a zero is stored) to indicate that the header buffer was not used (e.g., the header was not stored separately from the packet's data). Because there is no separate packet header, header index and header offset fields are not used or are set to zero (e.g., the values stored in their fields do not matter). A release header flag is cleared and a release data flag is set to indicate that no more data will be placed in this jumbo buffer (e.g., because it is being released).

Also, the descriptor type field is changed to a value indicating that DMA engine 120 transferred a non-reassembleable packet into host memory. And, a predetermined value (e.g., zero) is stored in the descriptor's ownership indicator field to indicate that DMA engine 120 is releasing a packet to the host computer and turning over ownership of the descriptor. In an alternative embodiment, the descriptor may be released by issuing an interrupt or other alert. In yet another embodiment, changing the descriptor type field (e.g., to a non-zero value) may signal the release of the descriptor. In one embodiment of the invention the ownership indicator is not set until end state 1699 below. After state 1660, the illustrated procedure resumes at state 1668.

In state 1662, a first portion of the packet is stored in the present (e.g., valid) jumbo buffer, at the location identified in the buffer's next address field 1134. Then, because the fill packet will not fit into this buffer, in state 1664 a new jumbo buffer is prepared and the remainder of the packet is stored in that buffer.

In state 1666, a completion descriptor is written or configured. The contents are similar to those described in state 1660 but this descriptor must reflect that two jumbo buffers were used to store the packet.

Thus, the jumbo buffer index (e.g., the index, within the free buffer array, of the buffer identifier that identifies the header buffer) and the offset of the packet within the first jumbo buffer are placed in the descriptor, as above. The size of the packet (e.g., the packet length) is stored in a data size field.

A header size field is cleared (e.g., a zero is stored) to indicate that the header buffer was not used (e.g., the header was not stored separately from the packet's data). Because there is no separate packet header, header index and header offset fields are not used (e.g., the values stored in their fields do not matter).

A release header flag is cleared and a release data flag is set to indicate that no more data will be placed in these jumbo buffers (e.g., because they are being released). Further, a split packet flag is set to reflect the use of a second jumbo buffer, and the index (within the free buffer array) of the buffer identifier for the second buffer is stored in a next index field.

Further, the descriptor type field is changed to a value indicating that DMA engine 120 transferred a non-reassembleable packet into host memory. Finally, a predetermined value (e.g., zero) is stored in the descriptor's ownership indicator field, or some other mechanism is employed, to indicate that DMA engine 120 is releasing a packet to the host computer and turning over ownership of the descriptor. In one embodiment of the invention, the descriptor is not released to the host computer until end state 1699 below.

In state 1668, the jumbo buffer entry or entries in jumbo buffer table 1010 are invalidated (e.g., validity indicator 1136 is set to invalid) to ensure that they are not used again. In the procedure described above a jumbo packet was stored in, at most, two jumbo buffers. In an alternative embodiment of the invention a jumbo buffer may be stored across any number of buffers. The descriptor(s) configured to report the transfer of such a packet is/are constructed accordingly, as will be obvious to one skilled in the art.

After state 1668, the illustrated procedure ends with end state 1699.

In state 1670 (reached from state 1654), it has been determined that the present jumbo packet will be split to store the packet header in a header buffer and the packet data in one or more jumbo buffers. Therefore, DMA engine 120 (e.g., DMA manager 1002) determines whether there is a valid (e.g., active) header buffer. Illustratively, this determination is made by examining validity indicator 1116 of header buffer table 1006, which manages the active header buffer. If the validity indicator is set, then there is a header buffer ready to receive this packet and the procedure continues at state 1674.

Otherwise, in state 1672 a new header buffer is prepared or initialized for storing small packets and headers of other packets. Illustratively, this initialization process involves obtaining a free ring descriptor from a cache maintained by free ring manager 1012 and retrieving its reference to an empty buffer. If the cache is empty, new descriptors may be retrieved from the free descriptor ring in host memory to replenish the cache.

When a new descriptor is obtained from the cache or from the free descriptor ring, the buffer identifier (e.g., pointer, address, index) contained in the descriptor is stored in a free buffer array. The buffer's initial address or some other indication of the first storage location or cell in the buffer is placed in next address field 1114 of header buffer table 1006. Also, the index of the buffer identifier within the free buffer array is stored in header buffer index 1112 and validity indicator 1116 is set to a valid state.

In state 1674 the packet's header is copied or transferred (e.g., via a DMA operation) into the header buffer at the address or location specified in the next address field of header buffer table 1006. As described above, in one embodiment of the invention pad bytes are inserted before the header in order to align the beginning of the packet's layer three protocol (e.g., IP) header with a sixteen-byte boundary. In addition, the packet's header may be positioned within a cell of predetermined size (e.g., 256 bytes) within the buffer.

In state 1676, DMA engine 120 determines whether the packet's data (e.g., the TCP payload) will fit into one jumbo buffer. If the packet is too large, the illustrated procedure continues at state 1682.

In state 1678, the packet's data is copied or transferred (e.g., via a DMA operation) into the current jumbo buffer, at the location specified in the next address field 1134 of jumbo buffer table 1010. One skilled in the art will appreciate that the next address field may not need to be updated to account for this new packet because the jumbo buffer will be released. In other words, in one embodiment of the invention a jumbo buffer may be used just once (e.g., to store one packet or a portion of one packet).

In state 1680, a completion descriptor is written or configured to release the jumbo buffer and to provide information to the host computer for processing the packet. The header buffer index (e.g. the index of the header buffer's buffer identifier within the free buffer array) and offset of the packet's header within the buffer are placed in the descriptor in header index and header offset fields, respectively. Illustratively, this offset may serve to identify the first byte of the header, the first pad byte before the header or the location of the cell in which the header is stored. The jumbo buffer index (e.g., the position or index within the free buffer array of the buffer identifier that identifies the jumbo buffer) and the offset of the first byte of the packet's data within the jumbo buffer are placed in data index and data offset fields, respectively. Header size and data size fields are used to store the size of the packet's header (e.g., the offset of the payload within the packet) and data (e.g., payload size), respectively.

A release header flag is set in the descriptor if the header buffer is full. However, the header buffer may not be tested to see if it is full until a later state of this procedure. In such an embodiment of the invention, the release header flag may be set (or cleared) at that time. A release data flag is also set, because no more data will be placed in the jumbo buffer (e.g., it is being released to the host computer).

The descriptor type field is changed to a value indicating that DMA engine 120 transferred a non-re-assembleable packet into host memory. Also, a predetermined value (e.g., zero) is stored in the descriptor's ownership indicator field to indicate that DMA engine 120 is releasing a packet to the host computer and turning over ownership of the descriptor. In one embodiment of the invention the ownership indicator is not changed until end state 1699 below. In an alternative embodiment, the descriptor may be released by issuing an interrupt or other alert. In yet another alternative embodiment, changing the descriptor type value may signal the release of the descriptor.

After state 1680, the illustrated procedure proceeds to state 1688.

In state 1682, a first portion of the packet's data is stored in the present (e.g., valid) jumbo buffer, at the location identified in the buffer's next address field 1134.

Because all of the packet's data will not fit into this buffer, in state 1684 a new jumbo buffer is prepared and the remainder of the packet is stored in that buffer.

In state 1686, a completion descriptor is written or configured. The contents are similar to those described in states 1680 but this descriptor must reflect that two jumbo buffers were used to store the packet. The header buffer index (e.g. the index of the free buffer array element containing the header buffer's buffer identifier) and offset (e.g., the location of this packet's header within the header buffer) are placed in the descriptor in header index and header offset fields, respectively. The jumbo buffer index (e.g., the index, within the free buffer array, of the buffer identifier that references the jumbo buffer) and the offset of the first byte of the packet's data within the jumbo buffer are placed in data index and data offset fields, respectively. Header size and data size fields are used to store the size of the packet's header (e.g., as measured by the offset of the packet's payload from the start of the packet) and data (e.g., payload size), respectively.

A release header flag is set in the descriptor if the header buffer is full. However, the header buffer may not be tested to see if it is full until a later state of this procedure. In such an embodiment of the invention, the release header flag may be set (or cleared) at that time. A release data flag is also set, because no more data will be placed in the jumbo buffer (e.g., it is being released to the host computer). Further, a split packet flag is set to indicate that a second jumbo buffer was used, and the location (within the free buffer array or other data structure) of the second buffer's buffer identifier is stored in a next index field The descriptor type field is changed to a value indicating that DMA engine 120 transferred a non-re-assembleable packet into host memory. Finally, a predetermined value (e.g., zero) is stored in the descriptor's ownership indicator field to indicate that DMA engine 120 is releasing a packet to the host computer and turning over ownership of the descriptor. In one embodiment of the invention the ownership indicator is not changed until end state 1699 below.

In state 1688, the jumbo buffer's entry in jumbo buffer table 1010 is invalidated (e.g., validity indicator 1136 is set to invalid) to ensure that it is not used again. In the procedure described above, a jumbo packet was stored in, at most, two jumbo buffers. In an alternative embodiment of the invention a jumbo packet may be stored across any number of buffers. The descriptor that is configured to report the transfer of such a packet is constructed accordingly, as will be obvious to one skilled in the art.

In state 1690, it is determined whether the header buffer is full. In this embodiment of the invention, where each buffer is eight kilobytes in size and entries in the header buffer are no larger than 256 bytes, a counter may be used to keep track of entries placed into each new header buffer. The buffer may be considered full when thirty-two entries are stored.

If the buffer is full, in state 1692 the header buffer is invalidated to ensure that it is not used again. Illustratively, this involves setting the header buffer table's validity indicator to invalid and communicating this status to the host computer. In this embodiment of the invention, a release header flag in the descriptor is set. The illustrated procedure then ends with end state 1699.

If the header buffer is not full, then in state 1694 the next address field of header buffer table 1006 is updated to indicate the address at which to store the next header or small packet. The illustrated procedure then ends with end state 1699.

In end state 1699, a descriptor may be turned over to the host computer by changing a value in the descriptor's descriptor type field (e.g., from one to zero), as described above. Illustratively, the host computer (or software operating on the host computer) detects the change and understands that DMA engine 120 is returning ownership of the descriptor to the host computer.

A Method of Transferring a Packet with Operation Code 3

Figure 17A:
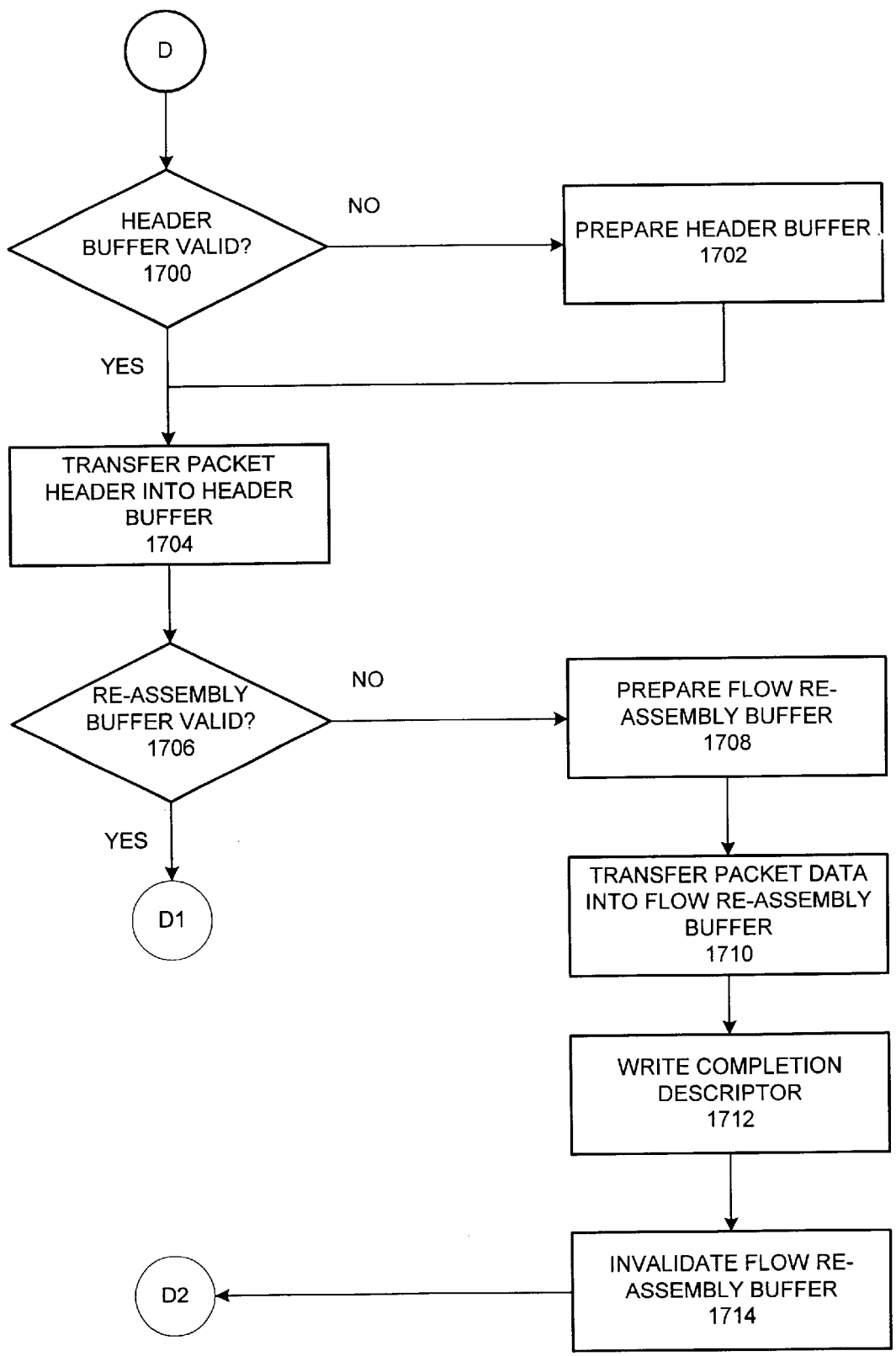
Figure 17B:
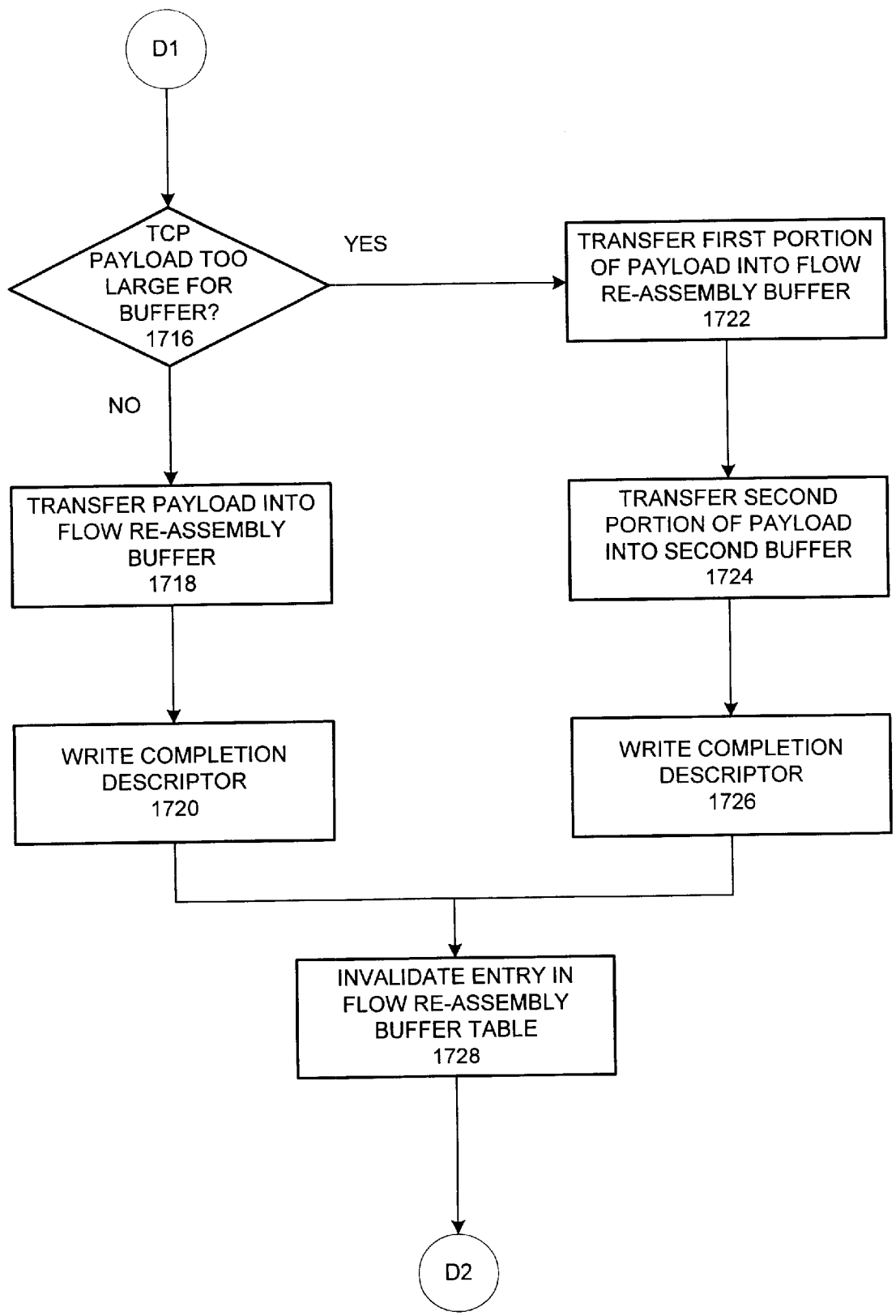
Figure 17C:
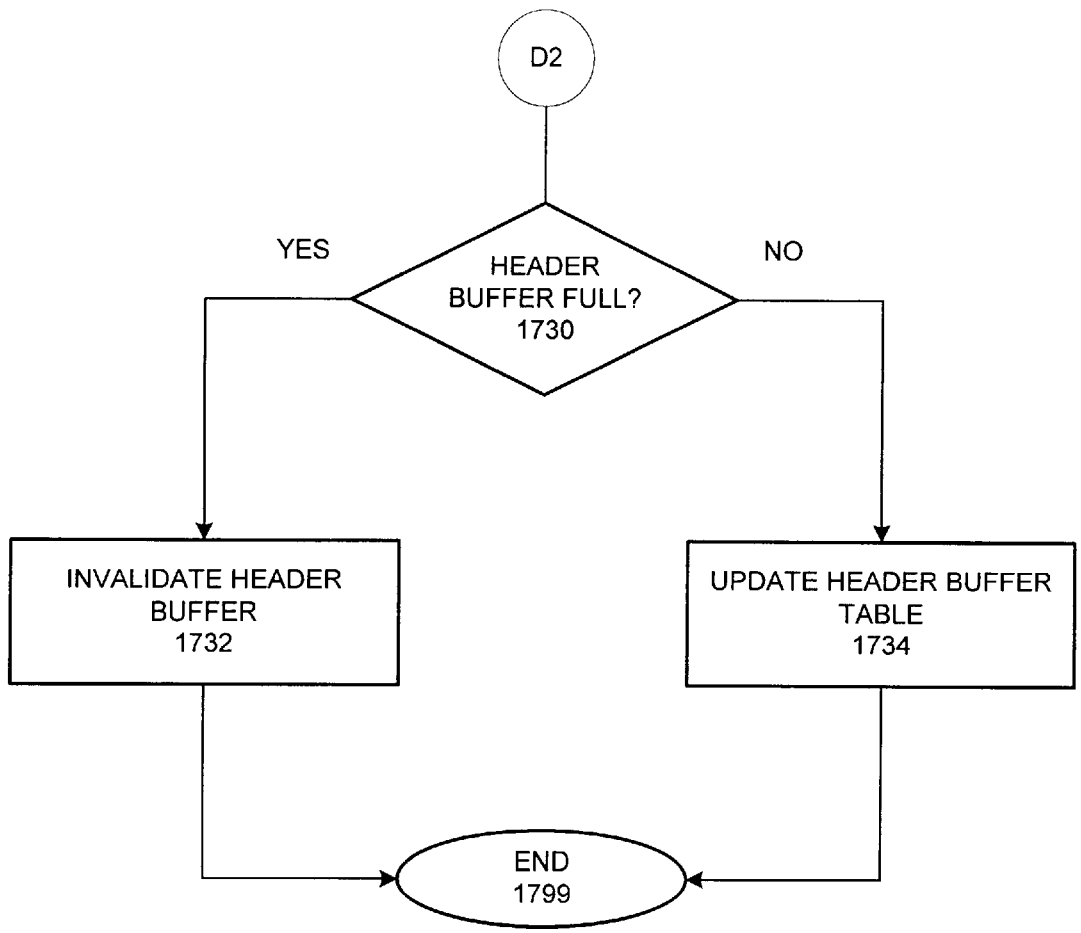
Figure 18A:
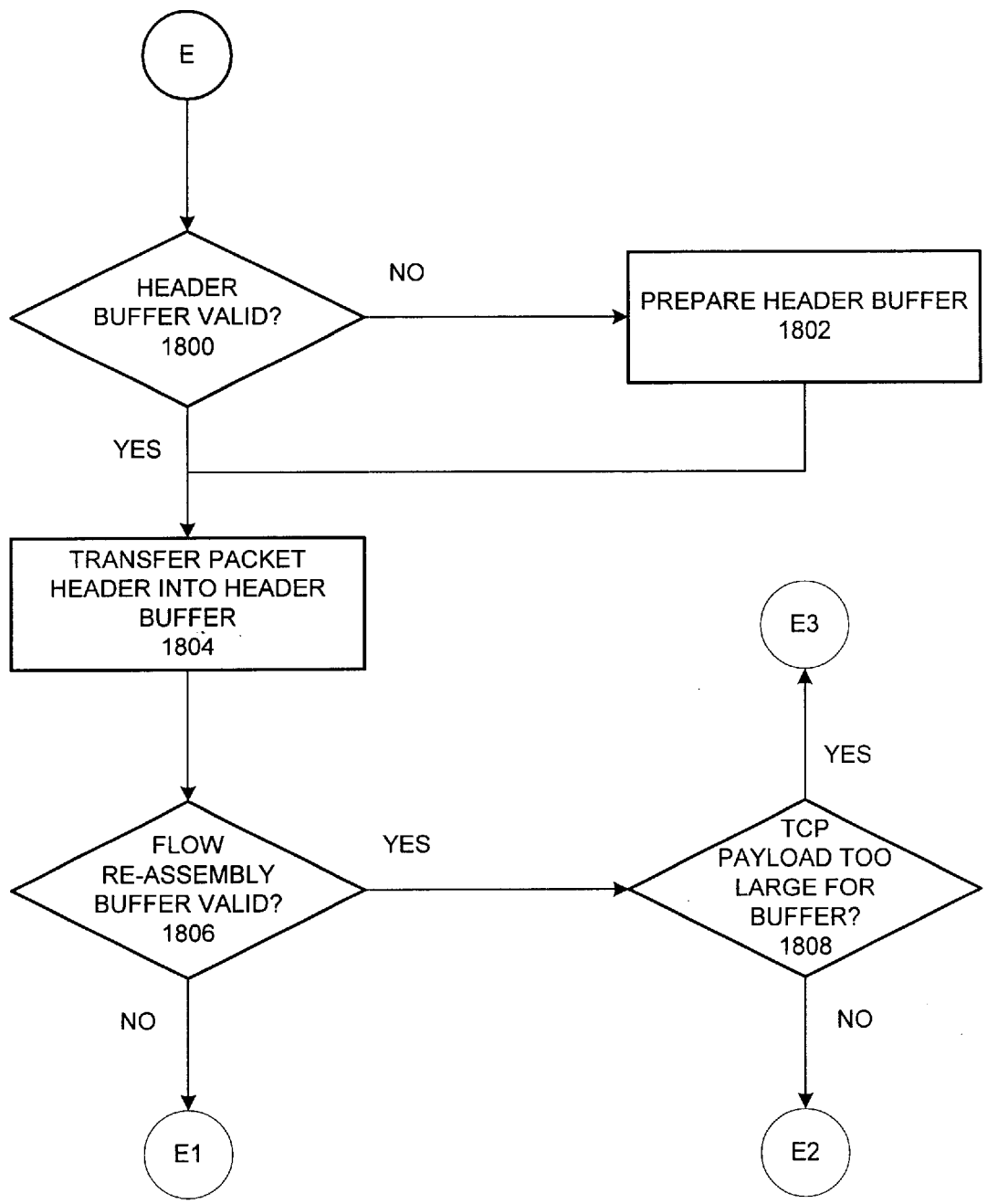
Figure 18B:
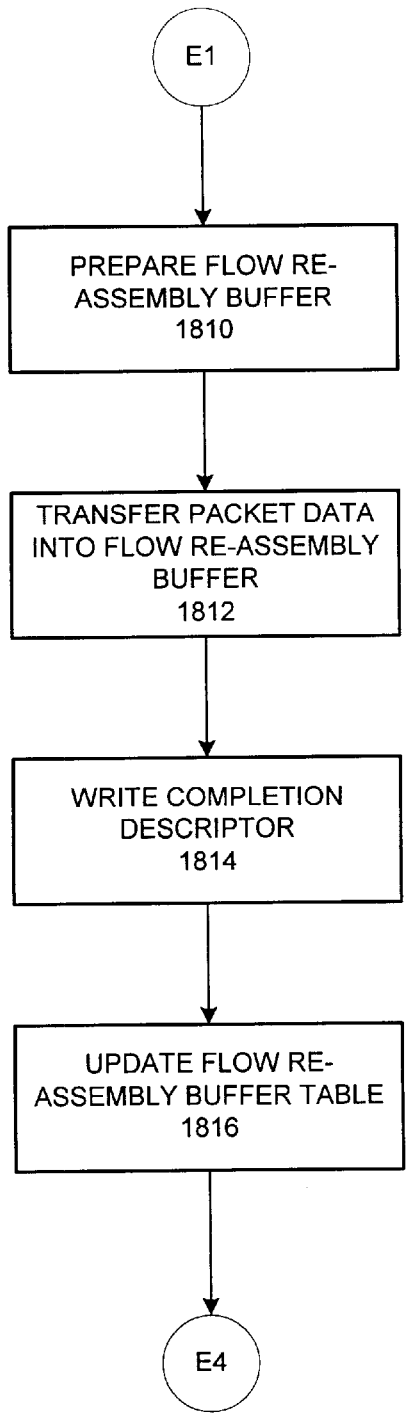
Figure 18C:
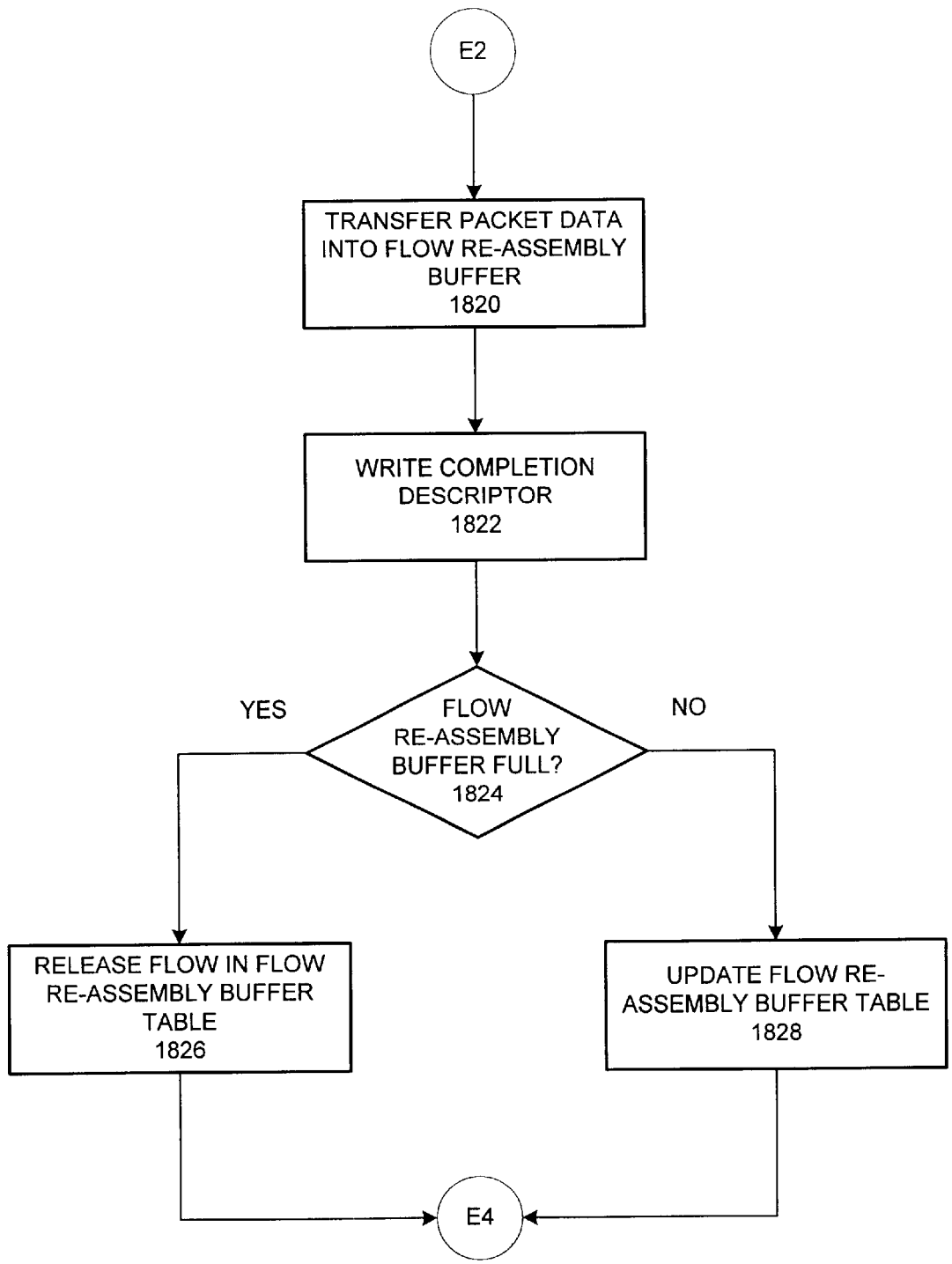
Figure 18D:
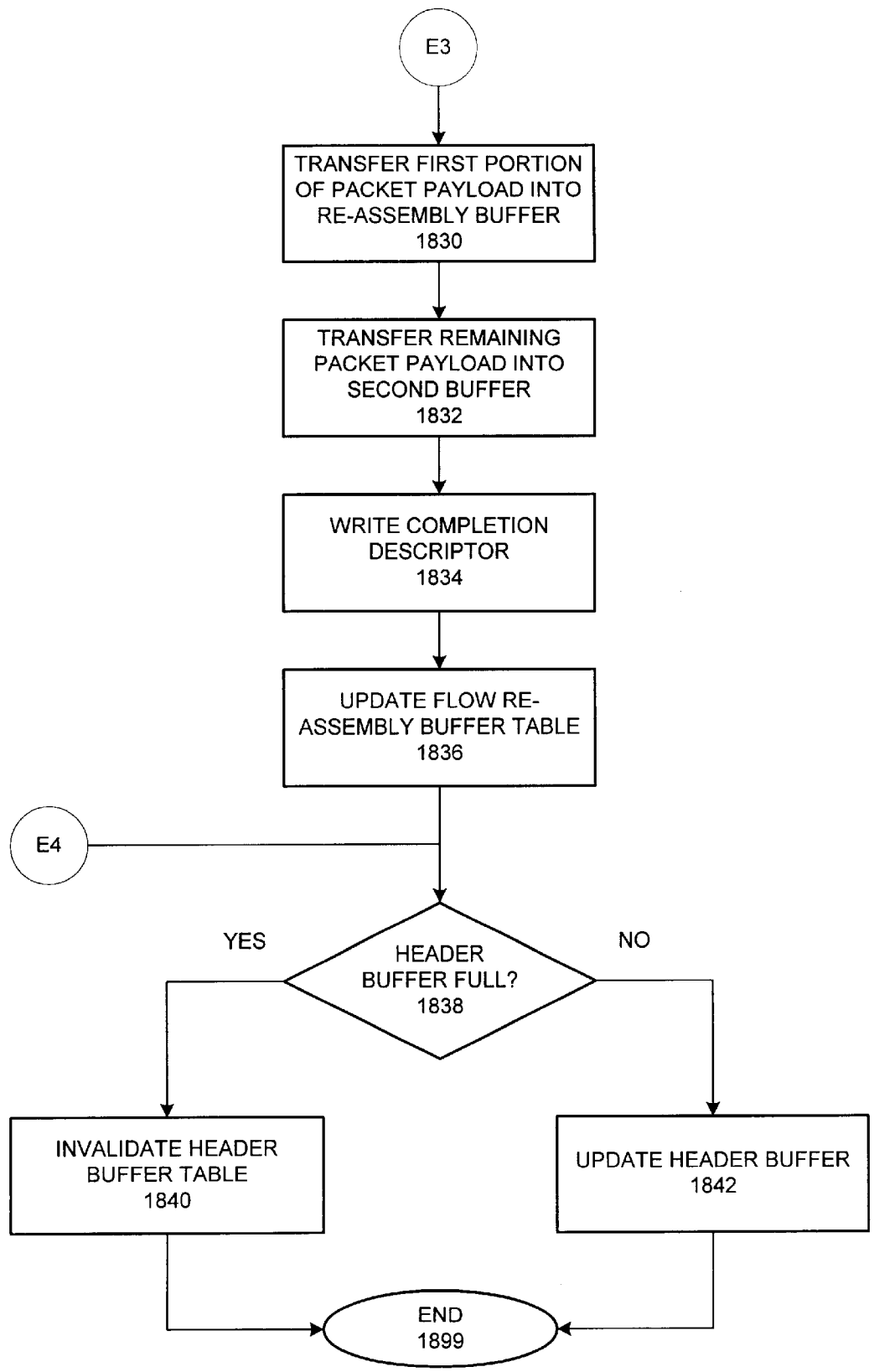
Figure 19A:
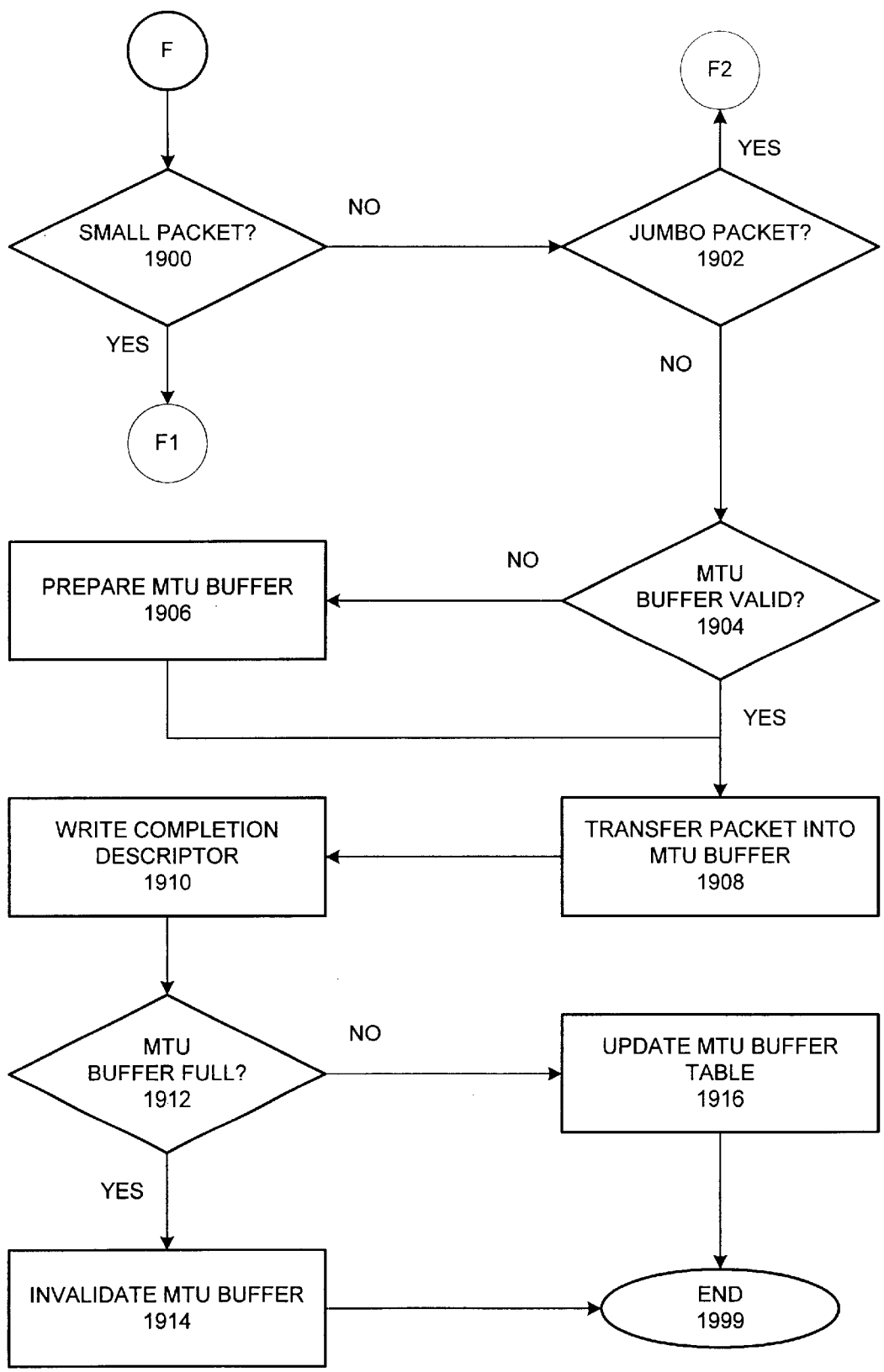
Figure 19B:
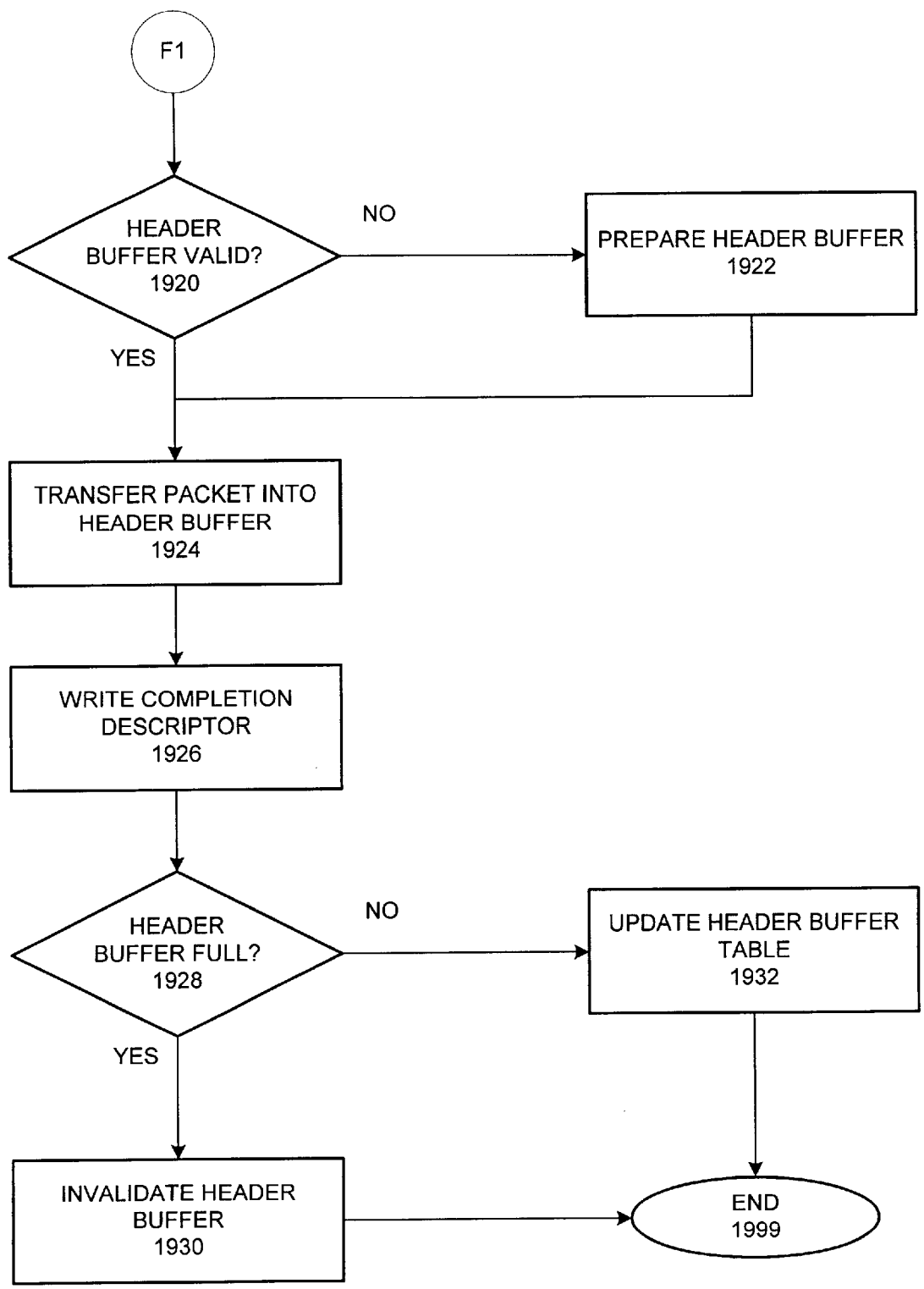
Figure 19C:
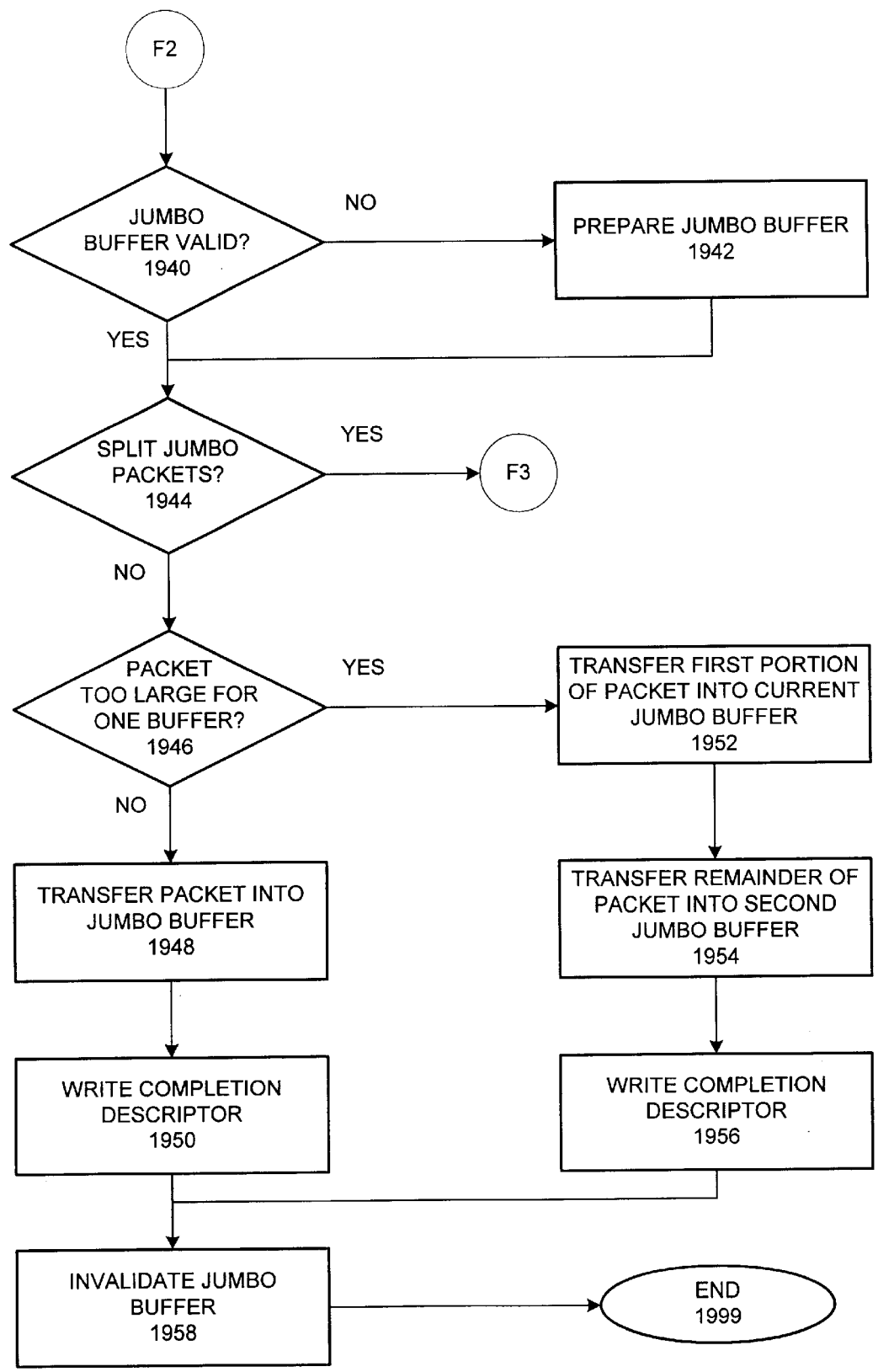
Figure 19D:
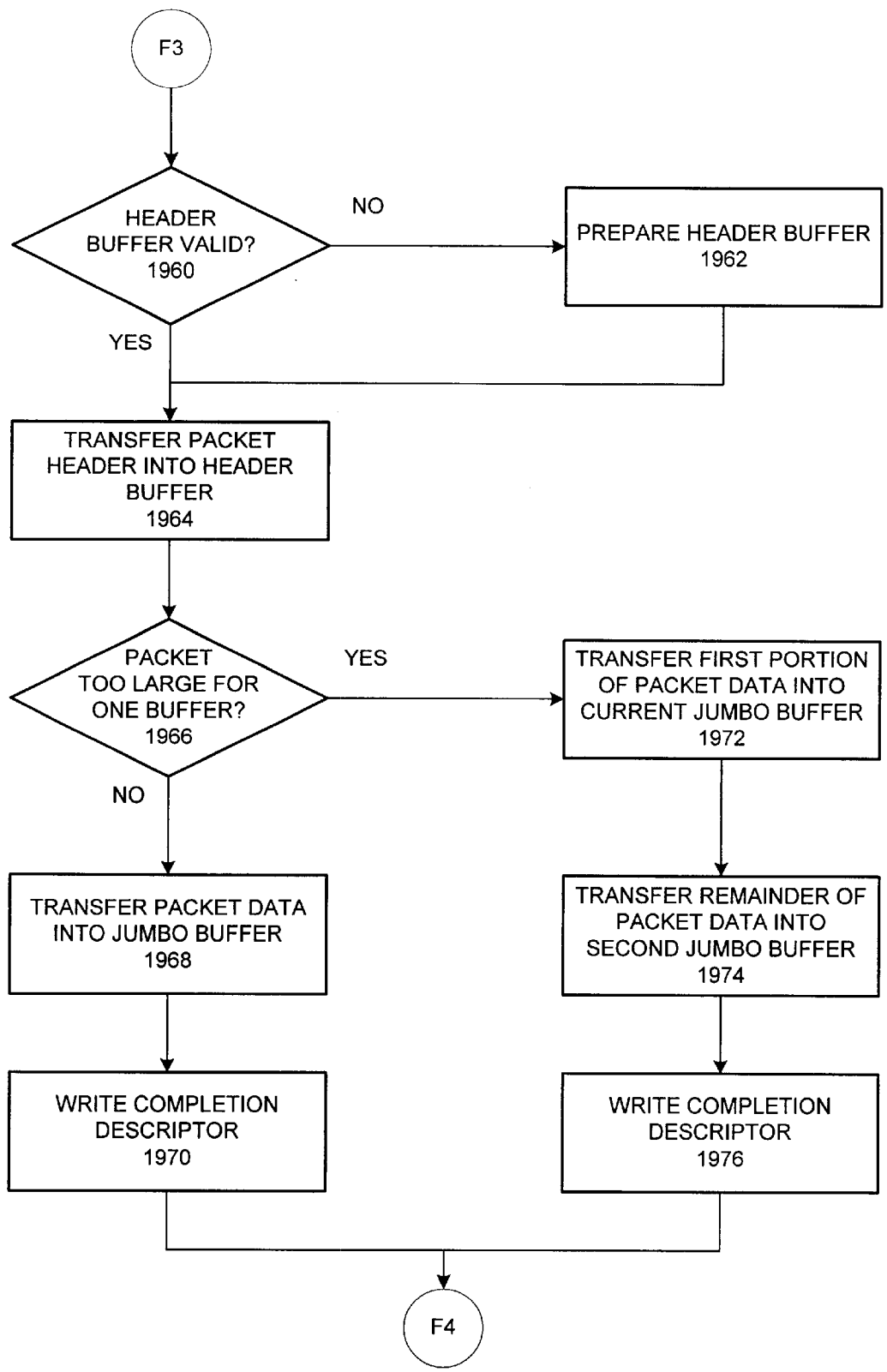
Figure 19E:
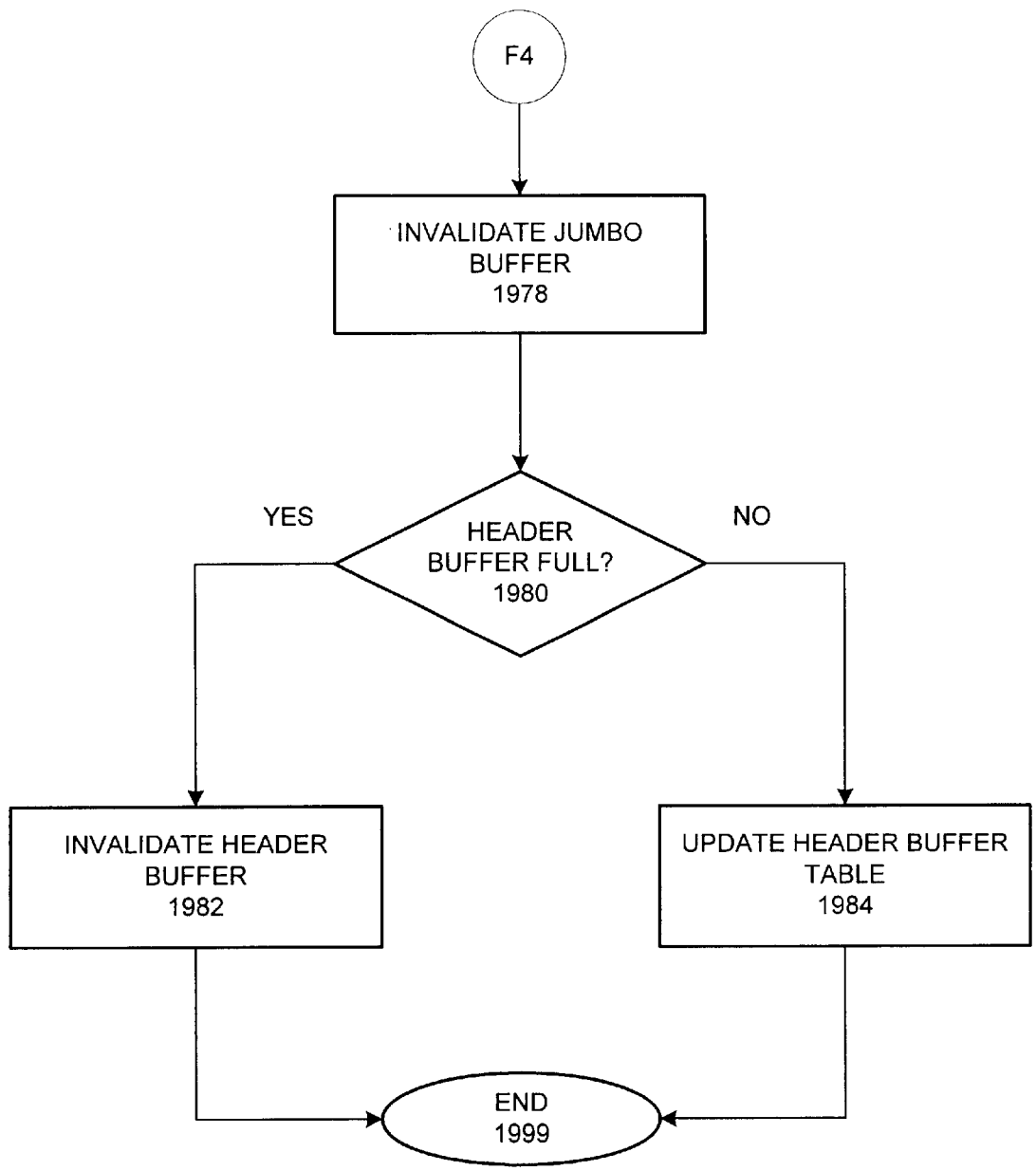

FIGS. 17A–17C illustrate one procedure in which DMA engine 120 transfers a packet associated with operation code 3 to a host memory buffer. As reflected in TABLE 1, operation code 3 may indicate that the packet is compatible with a protocol that can be parsed by NIC 100 and that it carries a final portion of data for its flow. No new flow is set up, but a flow should already exist and is to be torn down. The packet's data is to be re-assembled with data from previous flow packets. Because the packet is to be re-assembled, the packet's header should be stored in a header buffer and its data in the flow's re-assembly buffer. The flow's active re-assembly buffer may be identified by the flow's entry in flow re-assembly buffer table 1004.

In state 1700, DMA engine 120 (e.g., DMA manager 1002) determines whether there is a valid (e.g., active) header buffer. Illustratively, this determination is made by examining validity indicator 1116 of header buffer table 1006, which manages the active header buffer. If the validity indicator is set (e.g., equal to one), then it is assumed that there is a header buffer ready to receive this packet and the procedure continues at state 1704.

Otherwise, in state 1702 a new header buffer is prepared or initialized for storing small packets and headers of re-assembled packets. This initialization process may involve obtaining a free ring descriptor from a cache maintained by free ring manager 1012 and retrieving its buffer identifier (e.g., a reference to an available memory buffer). If the cache is empty, new descriptors may be retrieved from the free descriptor ring in host memory to replenish the cache.

Illustratively, when a new descriptor is obtained from the cache or from the free descriptor ring, the buffer identifier (e.g., pointer, address, index) contained in the descriptor is stored in a free buffer array. The buffer's initial address or some other indication of the first storage location or cell in the buffer is placed in next address field 1114 of header buffer table 1006. Further, the index of the buffer identifier within the free buffer array is stored in header buffer index 1112 and validity indicator 1116 is set to a valid state.

In state 1704 the packet's header is copied or transferred into the header buffer at the address or location specified in the next address field of header buffer table 1006. As described above, in one embodiment of the invention pad bytes may be inserted before the header in order to align the beginning of the packet's layer three protocol (e.g., IP) header with a sixteen-byte boundary. In addition, the header may be positioned within a cell of predetermined size (e.g., 256 bytes) within the header buffer.

In the illustrated embodiment, operation code 3 indicates that an existing flow is to be torn down (e.g., the flow re-assembly buffer is to be invalidated and released to the host computer). Thus, in state 1706 it is determined whether a flow re-assembly buffer is valid (e.g., active) for this flow by examining the validity indicator in the flow's entry in flow re-assembly buffer table 1004. Illustratively, if the indicator is valid then there should be an active buffer storing data from one or more packets in this flow. If there is a valid flow re-assembly buffer for this flow, the illustrated procedure continues at state 1712. Otherwise, the procedure proceeds to state 1708.

In state 1708, a new flow re-assembly buffer is prepared to store this packet's data. Illustratively, a free ring descriptor is obtained from a cache maintained by free ring manager 1012 and its reference to an empty buffer is retrieved. If the cache is empty, new descriptors may be retrieved from the free descriptor ring in host memory to replenish the cache.

When a new descriptor is obtained from the cache or from the free descriptor ring, the buffer identifier (e.g., pointer, address, index) contained in the descriptor is stored in a free buffer array. The buffer's initial address or other indication of its first storage location is placed in next address field 1104 of the flow's entry in flow re-assembly buffer table 1004. The flow's entry in the re-assembly buffer table may be recognized by its flow number. The location within the free buffer array of the buffer identifier is stored in re-assembly buffer index 1102, and validity indicator 1106 is set to a valid state.

In state 1710, the packet's data is copied or transferred (e.g., via a DMA operation) into the address or location specified in the next address field of the flow's entry in flow re-assembly buffer table 1004.

In state 1712, a completion descriptor is written or configured to release the flow's re-assembly buffer and to provide information to the host computer for processing the packet. In particular, the header buffer index (e.g., the index, within the free buffer array, of the header buffer's identifier) and the offset of the packet's header within the header buffer are placed in the descriptor. Illustratively, this offset serves to identify the first byte of the header, the first pad byte preceding the header or the cell in which the header is stored. The flow re-assembly buffer index (e.g., the index, within the free buffer array, of the flow re-assembly buffer's identifier) and the offset of the packet's data within that buffer are also stored in the descriptor.

The size of the packet's data (e.g., the size of the packet's TCP payload) and header (e.g., the offset of the TCP payload within the packet) portions are stored in data size and header size fields, respectively. The descriptor type field is given a value that indicates that a flow packet has been transferred to host memory. A release header flag may be set if the header buffer is full and a release data flag may be set to indicate that no more data will be placed in this flow re-assembly buffer (e.g., because it is being released). In addition, a release flow flag is set to indicate that DMA engine 120 is tearing down the packet's flow. The header buffer may not be tested to see if it is full until a later state of this procedure. In such an embodiment, the release header flag may be set (or cleared) at that time.

Then, in state 1714, the flow re-assembly buffer is invalidated by modifying validity indicator 1106 in the flow's entry in flow re-assembly buffer table 1004 appropriately. After state 1714, the procedure continues at state 1730.

In state 1716, DMA engine 120 determines whether the packet's TCP payload (e.g., the packet's data portion) will fit into the valid flow re-assembly buffer. If not, the illustrated procedure continues at state 1722.

In state 1718, the packet data is copied or transferred (e.g., via a DMA operation) into the flow's re-assembly buffer, at the location specified in the next address field 1104 of the flow's entry in flow re-assembly table 1004. One skilled in the art will appreciate that the next address field may or may not be updated to account for this new packet because the re-assembly buffer is being released.

In state 1720, a completion descriptor is written or configured to release the flow's re-assembly buffer and to provide information to the host computer for processing the packet. The header buffer index (e.g., the location or index, within the free buffer array, of the header buffer's identifier) and the offset of the packet's header within the header buffer are placed in the descriptor. The flow re-assembly buffer index (e.g., the location or index within the free buffer array of the flow re-assembly buffer's identifier) and the offset of the packet's data within that buffer are also stored in the descriptor.

The size of the packet's data (e.g., the size of the packet's TCP payload) and header (e.g., the offset of the TCP payload within the packet) are stored in data size and header size fields, respectively. The descriptor type field is given a value that indicates that a flow packet has been transferred to host memory. A release header flag is set if the header buffer is full and a release data flag is set to indicate that no more data will be placed in this flow re-assembly buffer (e.g., because it is being released). As explained above, the header buffer may not be tested to see if it is full until a later state of this procedure, at which time the release header flag may be set. Finally, a release flow flag is set to indicate that DMA engine 120 is tearing down the packet's flow. After state 1720, the illustrated procedure resumes at state 1728.

In state 1722, a first portion of the packet's payload (e.g., data) is stored in the flow's present (e.g., valid) re-assembly buffer, at the location identified in the buffer's next address field 1104.

Because the full payload will not fit into this buffer, in state 1724 a new flow re-assembly buffer is prepared and the remainder of the payload is stored in that buffer. In one embodiment of the invention information concerning the first buffer is stored in a completion descriptor. This information may include the position within the free buffer array of the first buffer's buffer identifier and the offset of the first portion of data within the buffer. The flow's entry in flow re-assembly buffer table 1004 may then be updated for the second buffer (e.g., store a first address in next address field 1104 and the location of buffer's identifier in the free buffer array in re-assembly buffer index 1102).

In state 1726, a completion descriptor is written or configured. The contents are similar to those described for states 1712 and 1720 but this descriptor must reflect that two re-assembly buffers were used.

Thus, the header buffer index (e.g., the position within the free buffer array of the buffer identifier corresponding to the header buffer) and the offset of the packet's header within the header buffer are placed in the descriptor, as above. The first flow re-assembly buffer index (e.g., the position, within the free buffer array, of the buffer identifier corresponding to the first flow re-assembly buffer used to store this packet's payload) and the offset of the packet's first portion of data within that buffer are also stored in the descriptor.

The size of the packet's data (e.g., the size of the packet's TCP payload) and header (e.g., the offset of the TCP payload within the packet) are stored in data size and header size fields, respectively. The descriptor type field is given a value that indicates that a flow packet has been transferred to host memory. A release header flag is set if the header buffer is full and a release data flag is set to indicate that no more data will be placed in this flow re-assembly buffer. A release flow flag is set to indicate that DMA engine 120 is tearing down the packet's flow.

Because two re-assembly buffers were used, a split packet flag is set and the index, within the free buffer array, of the re-assembly buffer's buffer identifier is stored in a next index field. Additionally, because the packet contains the final portion of data for the flow, a release next data buffer flag may also be set to indicate that the second flow re-assembly buffer is being released.

In state 1728, the flow's entry in flow re-assembly buffer table 1004 is invalidated to ensure that it is not used again.

In state 1730, it is determined whether the header buffer is full. In this embodiment of the invention, where each buffer is eight kilobytes in size and entries in the header buffer are no larger than 256 bytes, a counter is used to keep track of entries placed into each new header buffer. The buffer is considered full when thirty-two entries are stored.

If the buffer is full, in state 1732 the header buffer is invalidated to ensure that it is not used again. Illustratively, this involves setting the header buffer table's validity indicator to invalid and communicating this status to the host computer. In this embodiment of the invention a release header flag in the descriptor is set.

If the header buffer is not full, then in state 1734 the next address field of header buffer table 1006 is updated to indicate the address at which to store the next header or small packet.

The processing associated with a packet having operation code 3 then ends with end state 1799. In this end state, the descriptor used for this packet is turned over to the host computer by changing its ownership indicator field (e.g., from one to zero). Alternatively, some other mechanism may be used, such as issuing an interrupt or changing the descriptor' descriptor type field. Illustratively, the descriptor type field would be changed to a value indicating that DMA engine 120 transferred a flow packet into host memory.

In one alternative embodiment of the invention an optimization may be performed when processing a packet with operation code 3. This optimization takes advantage of the knowledge that the packet contains the last portion of data for its flow. In particular, instead of loading a descriptor into flow re-assembly buffer table 1004 the descriptor may be used where it is—in a descriptor cache maintained by free ring manager 1012.

For example, instead of retrieving a buffer identifier from a descriptor and storing it in an array in state 1708 above, only to store one packet's data in the identified buffer before releasing it, it may be more efficient to use the descriptor without removing it from the cache. In this embodiment, when a completion descriptor is written the values stored in its data index and data offset fields are retrieved from a descriptor in the descriptor cache. Similarly, when the first portion of a code 3 packet's data fits into the flow's active buffer but a new one is needed just for the remaining data, a descriptor in the descriptor cache may again be used without first loading it into a free buffer array and the flow re-assembly buffer table. In this situation, the completion descriptor's next index field is retrieved from the descriptor in the descriptor cache.

A Method of Transferring a Packet with Operation Code 4

FIGS. 18A–18D depict an illustrative procedure in which DMA engine 120 transfers a packet associated with operation code 4 to a host memory buffer. As reflected in TABLE 1, operation code 4 in this embodiment indicates that the packet is compatible with the protocols that may be parsed by NIC 100 and continues a flow that is already established. No new flow is set up, the existing flow is not to be torn down, and the packet's data is to be re-assembled with data from other flow packets. Because the packet is to be re-assembled, the packet's header should be stored in a header buffer and its data in the flow's re-assembly buffer.

In state 1800, DMA engine 120 determines whether there is a valid (e.g., active) header buffer. Illustratively, this determination is made by examining validity indicator 116 of header buffer table 1006, which manages the active header buffer. If the validity indicator is set, then there should be a header buffer ready to receive this packet and the procedure continues at state 1804.

Otherwise, in state 1802 a new header buffer is prepared or initialized for storing small packets and headers of re-assembled packets. Illustratively, this initialization process involves obtaining a free ring descriptor from a cache maintained by free ring manager 1012 and retrieving its reference to an empty buffer. If the cache is empty, new descriptors may be retrieved from the free descriptor ring in host memory to replenish the cache.

When a new descriptor is obtained from the cache or from the free descriptor ring, the buffer identifier (e.g., pointer, address, index) contained in the descriptor is stored in a free buffer array. The buffer's initial address or some other indication of the first storage location in the buffer is place in next address field 1114 of header buffer table 1006. Also, the position or index of the buffer identifier within the free buffer array is stored in header buffer index 1112 and validity indicator 1116 is set to a valid state.

In state 1804 the packet's header is copied or transferred into the header buffer at the address or location specified in the next address field of header buffer table 1006. As described above, in one embodiment of the invention pad bytes are inserted before the header in order to align the beginning of the packet's layer three protocol (e.g., IP) header with a sixteen-byte boundary. In addition, the packet's header may be positioned within a cell of predetermined size (e.g., 256 bytes) within the buffer.

In the illustrated embodiment, operation code 4 indicates that an existing flow is to be continued. Thus, in state 1806 it is determined whether a flow re-assembly buffer is valid (e.g., active) for this flow by examining the validity indicator in the flow's entry in flow re-assembly buffer table 1004. Illustratively, if the indicator is valid then there is an active buffer storing data from one or more packets in this flow. If there is a valid flow re-assembly buffer for this flow, the illustrated procedure continues at state 1808. Otherwise, the procedure proceeds to state 1810.

In state 1808, it is determined whether the packet's data (e.g., its TCP payload) portion is too large for the current flow re-assembly buffer. If the data portion is too large, two flow re-assembly buffers will be used and the illustrated procedure proceeds to state 1830. Otherwise, the procedure continues at state 1820.

In state 1810, because it was found (in state 1806) that there was no valid flow re-assembly buffer for this packet, a new flow re-assembly buffer is prepared. Illustratively, a free ring descriptor is obtained from a cache maintained by free ring manager 1012 and its reference to an empty buffer is retrieved. If the cache is empty, new descriptors may be retrieved from the free descriptor ring in host memory to replenish the cache.

When a new descriptor is obtained from the cache or from the free descriptor ring, the buffer identifier (e.g., pointer, address, index) contained in the descriptor is stored in a free buffer array. The buffer's initial address or other indicator of its first storage location is placed in next address field 1104 of the flow's entry in flow re-assembly buffer table 1004. The flow's entry in the table may be recognized by its flow number. The location of the buffer identifier in the free buffer array is stored in re-assembly buffer index 1102, and validity indicator 1106 is set to a valid state.

In state 1812, the packet's data is copied or transferred (e.g., via a DMA operation) into the address or location specified in the next address field of the flow's entry in flow re-assembly buffer table 1004.

In state 1814, a completion descriptor is written or configured to provide information to the host computer for processing the packet. In particular, the header buffer index (e.g., the index within the free buffer array of the buffer identifier that identifies the header buffer) and the offset of the packet's header within the header buffer are placed in the descriptor. Illustratively, this offset may serve to identify the first byte of the header, the first pad byte preceding the header or the header's cell within the header buffer. The flow re-assembly buffer index (e.g., the index within the free buffer array of the buffer identifier that identifies the flow re-assembly buffer) and the offset of the packet's data within that buffer are also stored in the descriptor.

The size of the packet's data (e.g., the size of the packet's TCP payload) and header (e.g., the offset of the TCP payload within the packet) are stored in data size and header size fields, respectively. The descriptor type field is given a value indicating that a flow packet has been transferred to host memory. A release header flag is set if the header buffer is full but a release data flag is not set, because more data will be placed in this flow re-assembly buffer. The header buffer may not be tested to see if it is full until a later state of this procedure. In such an embodiment, the release header flag may be set (or cleared) at that time.

In one embodiment of the invention a release flow flag may also be set, depending upon dynamic packet batching module 122. For example, if the packet batching module determines that another packet in the same flow will soon be transferred to the host computer, the release flow flag will be cleared (e.g., a zero will be stored). This indicates that the host computer should await the next flow packet before processing this one. By collectively processing multiple packets from a single flow, the packets can be processed more efficiently and less processor time is required. If, however, no other packets in the same flow are identified, the release flow flag may be set (e.g., a one is stored) to indicate that the host computer should process the flow packets it has received so far, without waiting for more.

In state 1816, the flow's entry in flow re-assembly buffer table 1004 is updated. In particular, next address field 1104 is updated to identify the. location in the re-assembly buffer at which the next flow packet's data should be stored. After state 1816, the illustrated procedure continues at state 1838.

In state 1820 (reached from state 1808), it is known that the packet's data, or TCP payload, will fit within the flow's current re-assembly buffer. Thus, the packet data is copied or transferred into the buffer at the location identified in next address field 1104 of the flow's entry in flow re-assembly buffer table 1004.

In state 1822, a completion descriptor is written or configured to provide information to the host computer for processing the packet. In particular, the header buffer index (e.g., the index within the free buffer array of the buffer identifier that identifies the header buffer) and the offset of the packet's header within the header buffer are placed in the descriptor. The flow re-assembly buffer index (e.g., the index within the free buffer array of the buffer identifier that identifies the flow re-assembly buffer) and the offset of the packet's data within that buffer are also stored in the descriptor.

The size of the packet's data (e.g., the size of the packet's TCP payload) and header (e.g., the offset of the TCP payload within the packet) are stored in data size and header size fields, respectively. The descriptor type field is given a value indicating that a flow packet has been transferred to host memory. A release header flag is set if the header buffer is full but a release data flag is set only if the flow re-assembly buffer is now full. The header and flow re-assembly buffers may not be tested to see if they are full until a later state of this procedure. In such an embodiment, the flags may be set (or cleared) at that time.

In one embodiment of the invention a release flow flag may also be set, depending upon dynamic packet batching module 122. For example, if the packet batching module determines that another packet in the same flow will soon be transferred to the host computer, the release flow flag will be cleared. This indicates that the host computer should await the next flow packet before processing this one. By collectively processing multiple packets from a single flow, the packets can be processed more efficiently and less processor time is required. If, however, no other packets in the same flow are identified, the release flow flag may be set to indicate that the host computer should process the flow packets received so far, without waiting for more.

In state 1824, the flow re-assembly buffer is examined to determine if it is full. In the presently described embodiment of the invention this test is conducted by first determining how much data (e.g., how many bytes) has been stored in the buffer. Illustratively, the flow's next address field and the amount of data stored from this packet are summed. Then, the initial buffer address (e.g., before any data was stored in it) is subtracted from this sum. This value, representing how much data is now stored in the buffer, is then compared to the size of the buffer (e.g., eight kilobytes).

If the amount of data currently stored in the buffer equals the size of the buffer, then it is full. In the presently described embodiment of the invention it is desirable to completely fill flow re-assembly buffers. Thus, a flow re-assembly buffer is not considered full until its storage space is completely populated with flow data. This scheme enables the efficient processing of network packets.

If the flow re-assembly buffer is full, in state 1826 the buffer is invalidated to ensure it is not used again. Illustratively, this involves setting the header buffer table's validity indicator to invalid and communicating this status to the host computer. In this embodiment of the invention, a release data flag in the descriptor is set. After state 1826, the procedure continues at state 1838.

If the flow re-assembly buffer is not full, then in state 1828 next address field 1104 in the flow's entry in flow re-assembly buffer table 1004 is updated to indicate the address at which to store the next portion of flow data. After state 1828, the procedure continues at state 1838.

In state 1830 (reached from state 1808), it is known that the packet's data will not fit into the flow's current re-assembly buffer. Therefore, some of the data is stored in the current buffer and the remainder in a new buffer. In particular, in state 1830 a first portion of data (e.g., an amount sufficient to fill the buffer) is copied or transferred into the current flow re-assembly buffer.

In state 1832, a new descriptor is loaded from a descriptor cache maintained by free ring manager 1012. Its identifier of a new buffer is retrieved and the remaining data from the packet is stored in the new buffer. In one embodiment of the invention, after the first portion of data is stored information from the flow's entry in flow re-assembly table 1004 is stored in a completion descriptor. Illustratively, this information includes re-assembly buffer index 1102 and the offset of the first portion of data within the full buffer. Then the new descriptor can be loaded—its index is stored in re-assembly buffer index 1102 and an initial address is stored in next address 1104.

In state 1834, a completion descriptor is written or configured to provide information to the host computer for processing the packet. In particular, the header buffer index (e.g., the location of the header buffer's buffer identifier within the free buffer array) and the offset of the packet's header within the header buffer are placed in the descriptor. The flow re-assembly buffer index (e.g., the location of the flow re-assembly buffer's buffer identifier within the free buffer array) and the offset of the packet's data within that buffer are also stored in the descriptor.

The size of the packet's data (e.g., the size of the packet's TCP payload) and header (e.g., the offset of the TCP payload within the packet) are stored in data size and header size fields, respectively. The descriptor type field is given a value indicating that a flow packet has been transferred to host memory. A release header flag is set if the header buffer is full and a release data flag is set because the first flow re-assembly buffer is being released. The header buffer may not be tested to see if it is full until a later state of this procedure. In such an embodiment, the release header flag may be set (or cleared) at that time.

Because two re-assembly buffers were used, a split packet flag in the descriptor is set and the index, within the free descriptor ring, of the descriptor that references the second re-assembly buffer is stored in a next index field.

In one embodiment of the invention a release flow flag may also be set, depending upon dynamic packet batching module 122. For example, if the packet batching module determines that another packet in the same flow will soon be transferred to the host computer, the release flow flag will be cleared. This indicates that the host computer should await the next flow packet before processing this one. By collectively processing multiple packets from a single flow, the packets can be processed more efficiently and less processor time is required. If, however, no other packets in the same flow are identified, the release flow flag may be set to indicate that the host computer should process the flow packets received so far, without waiting for more.

In state 1836, next address field 1104 in the flow's entry in flow re-assembly buffer table 1004 is updated to indicate the address in the new buffer at which to store the next portion of flow data.

In state 1838, it is determined whether the header buffer is full. In this embodiment of the invention, where each buffer is eight kilobytes in size and entries in the header buffer are no larger than 256 bytes, a counter may be used to keep track of entries placed into each new header buffer. The buffer is considered full when thirty-two entries are stored.

If the buffer is full, in state 1840 the header buffer is invalidated to ensure that it is not used again. Illustratively, this involves setting the header buffer table's validity indicator to invalid and communicating this status to the host computer. In this embodiment of the invention, a release header flag in the descriptor is set.

If the header buffer is not full, then in state 1842 the next address field of header buffer table 1006 is updated to indicate the address at which to store the next header or small packet.

The processing associated with a packet having operation code 4 then ends with end state 1899. In this end state, the descriptor used for this packet is turned over to the host computer by changing its ownership indicator field (e.g., from one to zero). In one alternative embodiment of the invention, DMA engine 120 issues an interrupt or uses other means to alert the host computer that a descriptor is being released.

In one alternative embodiment of the invention the optimization described above for packets associated with operation code 3 may be performed when processing a packet with operation code 4. This optimization is useful, for example, when a code 4 packet's data is too large to fit in the current flow re-assembly buffer. Instead of loading a new descriptor for the second portion of data, the descriptor may be used where it is—in a descriptor cache maintained by free ring manager 1012. This allows DMA engine 120 to finish transferring the packet and turn over the completion descriptor before adjusting flow re-assembly buffer table 1004 to reflect a new buffer.

In particular, instead of loading information from a new descriptor in state 1832 above, it may be more efficient to use the descriptor without removing it from the cache. In this embodiment a new buffer for storing a remainder of the packet's data is accessed by retrieving its buffer identifier from a descriptor in the free ring manager's descriptor cache. The data is stored in the buffer and, after the packet's completion descriptor is configured and released, the necessary information is loaded into the flow re-assembly table as described above.

Illustratively, re-assembly buffer index 1102 stores the buffer identifier's index within the free buffer array, and an initial memory address of the buffer, taking into account the newly stored data, is placed in next address 1104.

A Method of Transferring a Packet with Operation Code 5

FIGS. 19A–19E depict a procedure. in which DMA engine 120 transfers a packet associated with operation code 5 to a host memory buffer. As reflected in TABLE 1, operation code 5 in one embodiment of the invention may indicate that a packet is incompatible with the protocols that may be parsed by NIC 100. It may also indicate that a packet contains all of the data for a new flow (e.g., no more data will be received for the packet's flow). Therefore, for operation code 5, no new flow is set up and there should not be any flow to tear down. The packet's data, if there is any, is not to be re-assembled.

In state 1900, it is determined whether the present packet is a small packet (e.g., less than or equal to 256 bytes in size) suitable for storage in a header buffer. If so, the illustrated procedure proceeds to state 1920.

Otherwise, in state 1902 it is determined whether the present packet is a jumbo packet (e.g., greater than 1522 bytes in size), such that it should be stored in a jumbo buffer. If so, the illustrated procedure proceeds to state 1940. If not, the procedure continues at state 1904.

In state 1904, it has been determined that the packet is not a small packet or a jumbo packet. The packet may, therefore, be stored in a non-re-assembly buffer used to store packets that are no greater in size than MTU (Maximum Transfer Unit) in size, which is 1522 bytes in a present embodiment. This buffer may be called an MTU buffer. Therefore, DMA engine 120 determines whether a valid (e.g., active) MTU buffer exists. Illustratively, this determination is made by examining validity indicator 1126 of MTU buffer table 1008, which manages the active MTU buffer. If the validity indicator is set, then there should be a MTU buffer ready to receive this packet and the procedure continues at state 1908.

Otherwise, in state 1906 a new MTU buffer is prepared or initialized for storing non-re-assembleable packets up to 1522 bytes in size. Illustratively, this initialization process involves obtaining a free ring descriptor from a cache maintained by free ring manager 1012 and retrieving its buffer identifier (e.g., a reference to an empty host memory buffer). If the cache is empty, new descriptors may be retrieved from the free descriptor ring in host memory to replenish the cache.

When a new descriptor is obtained from the cache or from the free descriptor ring, the buffer identifier (e.g., pointer, address, index) contained in the descriptor is stored in a free buffer array. The buffer's initial address or some other indication of the first storage location in the buffer is placed in next address field 1124 of MTU buffer table 1008. The buffer identifier's index or position within the free buffer array is stored in MTU buffer index 1122, and validity indicator 1126 is set to a valid state.

In state 1908 the packet is copied or transferred (e.g., via a DMA operation) into the MTU buffer at the address or location specified in the next address field of MTU buffer table 1008. As described above, in one embodiment of the invention pad bytes may be inserted before the header in order to align the beginning of the packet's layer three protocol (e.g., IP) header with a sixteen-byte boundary. In addition, the packet may be positioned within a cell of predetermined size (e.g., two kilobytes) within the MTU buffer.

In state 1910, a completion descriptor is written or configured to provide necessary information to the host computer for processing the packet. In particular, the MTU buffer index (e.g. the location within the free buffer array of the buffer identifier for the MTU buffer) and offset (e.g., the offset to the packet or the packet's cell within the buffer) are placed in the descriptor in data index and data offset fields, respectively. The size of the packet is stored in a data size field. A header size field within the descriptor may be set to zero to indicate that the entire packet was placed in the MTU buffer (e.g., no separate header portion was stored in a header buffer). A release data flag is set in the descriptor if the MTU buffer is full. The MTU buffer may not, however, be tested to see if it is full until a later state of this procedure. In such an embodiment of the invention, the release data flag may be set (or cleared) at that time. A release header flag may be cleared (e.g., not set), because there is no separate header portion being conveyed to the host computer.

Further, the descriptor type field is changed to a value indicating that DMA engine 120 transferred a non-re-assembleable packet into host memory. Also, a predetermined value (e.g., zero) is stored in the descriptor's ownership indicator field to indicate that DMA engine 120 is releasing a packet to the host computer and turning over ownership of the descriptor. In one embodiment of the invention, the ownership indicator is not set until end state 1999 below. In an alternative embodiment of the invention, the descriptor may be released by issuing an interrupt or other alert. In yet another alternative embodiment, changing the descriptor's descriptor type field may signal the descriptor's release.

In state 1912, DMA engine 120 determines whether the MTU buffer is full. In this embodiment of the invention, where each buffer is eight kilobytes in size, each entry in the MTU buffer may be allotted two kilobytes of space and a counter may be used to keep track of entries placed into an MTU buffer. The buffer may be considered full when a predetermined number of entries (e.g., four) are stored. In an alternative embodiment of the invention entries in an MTU buffer may or may not be allocated a certain amount of space, in which case DMA engine 120 may calculate how much storage space within the buffer has yet to be used. If no space remains, or if less than a predetermined amount of space is still available, the buffer may be considered full.

If the MTU buffer is full, in state 1914 the buffer is invalidated to ensure that it is not used again. Illustratively, this involves setting the MTU buffer table's validity indicator to invalid and communicating this status to the host computer. In this embodiment of the invention a release data flag in the descriptor is set. The illustrated procedure then ends with end state 1999.

If the MTU buffer is not full, then in state 1916 the next address field of MTU buffer table 1008 is updated to indicate the address at which to store the next packet. The illustrated procedure then ends with end state 1999.

In state 1920 (reached from state 1900), it has been determined that the present packet is a small packet suitable for storage in a header buffer. Therefore, DMA engine 120 (e.g., DMA manager 1002) determines whether there is a valid (e.g., active) header buffer. Illustratively, this determination is made by examining validity indicator 1116 of header buffer table 1006, which manages the active header buffer. If the validity indicator is set, then there is a header buffer ready to receive this packet and the procedure continues at state 1924.

Otherwise, in state 1922 a new header buffer is prepared or initialized for storing small packets and headers of re-assembled packets. Illustratively, this initialization process involves obtaining a free ring descriptor from a cache maintained by free ring manager 1012 and retrieving its reference to an empty buffer. If the cache is empty, new descriptors may be retrieved from the free descriptor ring in host memory to replenish the cache.

When a new descriptor is obtained from the cache or from the free descriptor ring, the buffer identifier (e.g., pointer, address, index) contained in the descriptor is stored in a free buffer array. The buffer's initial address or some other indicator of the first storage location or cell in the buffer is placed in next address field 1114 of header buffer table 1006. Further, the buffer identifier's position within the free buffer array is stored in header buffer index 1112 and validity indicator 1116 is set to a valid state.

In state 1924 the packet is copied or transferred (e.g., via a DMA operation) into the header buffer at the address or location specified in the next address field of header buffer table 1006. As described above, in one embodiment of the invention pad bytes may be inserted before the header in order to align the beginning of the packet's layer three protocol (e.g., IP) header with a sixteen-byte boundary. In addition, the packet may be positioned within a cell of predetermined size (e.g., 256 bytes) within the buffer.

In state 1926, a completion descriptor is written or configured to provide necessary information to the host computer (e.g., a software driver) for processing the packet. In particular, the header buffer index (e.g. the index of the free buffer array element that contains the header buffer's identifier) and offset are placed in the descriptor, in header index and header offset fields, respectively. Illustratively, this offset serves to identify the first byte of the packet, the first pad byte preceding the packet or the location of the packet's cell within the buffer. The size of the packet is also stored in the descriptor, illustratively within a header size field. A data size field within the descriptor may be set to zero to indicate that the entire packet was placed in the header buffer (e.g., no separate data portion was stored in another buffer). A release header flag may be set in the descriptor if the header buffer is full. However, the header buffer may not be tested to see if it is full until a later state of this procedure. In such an embodiment of the invention, the release header flag may be set (or cleared) at that time. A release data flag may be cleared (e.g., not set), because there is no separate data portion being conveyed to the host computer.

The descriptor type field is changed to a value indicating that DMA engine 120 transferred a non-re-assembleable packet into host memory. Also, a predetermined value (e.g., zero) is stored in the descriptor's ownership indicator field to indicate that DMA engine 120 is releasing a packet to the host computer and turning over ownership of the descriptor. In one embodiment of the invention the ownership indicator is not set until end state 1999 below.

In state 1928 it is determined whether the header buffer is full. In this embodiment of the invention, where each buffer is eight kilobytes in size and entries in the header buffer are no larger than 256 bytes, a counter is used to keep track of entries placed into each new header buffer. The buffer is considered full when thirty-two entries are stored.

If the buffer is full, in state 1930 the header buffer is invalidated to ensure that it is not used again. Illustratively, this involves setting the header buffer table's validity indicator to invalid and communicating this status to the host computer. In this embodiment of the invention a release header flag in the descriptor is set. The illustrated procedure then ends with end state 1999.

If the header buffer is not full, then in state 1932 the next address field of header buffer table 1006 is updated to indicate the address at which to store the next header or small packet. The illustrated procedure then ends with end state 1999.

In state 1940 (reached from state 1902), it has been determined that the packet is a jumbo packet (e.g., that it is greater than 1522 bytes in size). In this embodiment of the invention a jumbo packet's data portion is stored in a jumbo buffer. Its header is also stored in the jumbo buffer unless splitting of jumbo packets is enabled, in which case its header is stored in a header buffer. DMA engine 120 thus determines whether a valid (e.g., active) jumbo buffer exists. Illustratively, this determination is made by examining validity indicator 1136 of jumbo buffer table 1010, which manages an active jumbo buffer. If the validity indicator is set, then there is a jumbo buffer ready to receive this packet and the procedure continues at state 1944.

Otherwise, in state 1942 a new jumbo buffer is prepared or initialized for storing a non-re-assembleable packet that is larger than 1522 bytes. Illustratively, this initialization process involves obtaining a free ring descriptor from a cache maintained by free ring manager 1012 and retrieving its reference to an empty buffer. If the cache is empty, new descriptors may be retrieved from the free descriptor ring in host memory to replenish the cache.

When a new descriptor is obtained from the cache or from the free descriptor ring, the buffer identifier (e.g., pointer, address, index) contained in the descriptor is stored in a free buffer array. The buffer's initial address or other indication of the first storage location within the buffer is placed in next address field 1134 of jumbo buffer table 1010. The position of the buffer identifier within the free buffer array is stored in jumbo buffer index 1132, and validity indicator 1136 is set to a valid state.

Then, in state 1944, DMA engine 120 determines whether splitting of jumbo buffers is enabled. If enabled, the header of a jumbo packet is stored in a header buffer while the packet's data is stored in one or more jumbo buffers. If not enabled, the entire packet will be stored in one or more jumbo buffers. Illustratively, splitting of jumbo packets is enabled or disabled according to the configuration of a programmable indicator (e.g., flag, bit, register) that is set by software operating on the host computer (e.g., a device driver). If splitting is enabled, the illustrated procedure continues at state 1960. Otherwise, the procedure proceeds to state 1946.

In state 1946, DMA engine 120 determines whether the packet will fit into one jumbo buffer. For example, in an embodiment of the invention using eight kilobyte pages, if the packet is larger than eight kilobytes a second jumbo buffer will be needed to store the additional contents. If the packet is too large, the illustrated procedure continues at state 1952.

Otherwise, in state 1948 the packet is copied or transferred (e.g., via a DMA operation) into the current jumbo buffer, at the location specified in the next address field 1134 of jumbo buffer table 1010. When the packet is transferred intact like this, padding may be added to align a header portion of the packet with a sixteen-byte boundary. One skilled in the art will appreciate that the next address field may not need to be updated to account for this new packet because the jumbo buffer will be released. In other words, in one embodiment of the invention a jumbo buffer is only used once (e.g., to store one packet or a portion of one packet). In an alternative embodiment of the invention a jumbo buffer may store portions of two or more packets, in which case next address field 1134 may need to be updated.

In state 1950, a completion descriptor is written or configured to release the jumbo buffer and to provide information to the host computer for processing the packet. The jumbo buffer index (e.g., the index, within the free buffer array, of the buffer identifier that corresponds to the jumbo buffer) and the offset of the first byte of the packet within the jumbo buffer are placed in the descriptor, in data index and data size fields, respectively. The size of the packet (e.g., the packet length) is stored in a data size field.

A header size field may be cleared (e.g., a zero is stored) to indicate that the header buffer was not used (e.g., the header was not stored separately from the packet's data). Because the packet was stored intact, header index and header offset fields may or may not be used (e.g., the values stored in their fields do not matter). A release header flag is cleared and a release data flag is set to indicate that no more data will be placed in this jumbo buffer (e.g., because it is being released).

The descriptor type field is changed to a value indicating that DMA engine 120 transferred a non-re-assembleable packet into host memory. Finally, a predetermined value (e.g., zero) is stored in the descriptor's ownership indicator field to indicate that DMA engine 120 is releasing a packet to the host computer and turning over ownership of the descriptor. In one embodiment of the invention, the ownership indicator is not changed until end state 1999 below.

After state 1950, the illustrated procedure resumes at state 1958. In one alternative embodiment of the invention, DMA engine 120 issues an interrupt or uses some other means, possibly not until end state 1999, to alert the host computer that a descriptor is being released.

In state 1952, a first portion of the packet is stored in the present (e.g., valid) jumbo buffer, at the location identified in the buffer's next address field 134. Because the whole packet will not fit into this buffer, in state 1954 a new jumbo buffer is prepared and the remainder of the packet is stored in that buffer.

In state 1956, a completion descriptor is written or configured. The contents are similar to those described in state 1950 but this descriptor must reflect that two jumbo buffers were used to store the packet. Thus, the jumbo buffer index (e.g., the index, within the free buffer array, of the array element containing the header buffer's buffer identifier) and the offset of the first byte of the packet within the first jumbo buffer are placed in the descriptor, as above. The size of the packet (e.g., the packet length) is stored in a data size field.

A header size field may be cleared (e.g., a zero is stored) to indicate that the header buffer was not used (e.g., the header was not stored separately from the packet's data). Because there is no separate packet header, header index and header offset fields may or may not be used (e.g., the values stored in their fields do not matter).

A release header flag is cleared and a release data flag is set to indicate that no more data will be placed in these jumbo buffers (e.g., because they are being released). Further, a split packet flag is set to indicate that a second jumbo buffer was used, and the index (within the free buffer array) of the buffer identifier for the second buffer is stored in a next index field.

The descriptor type field is changed to a value indicating that DMA engine 120 transferred a non-re-assembleable packet into host memory. And, a predetermined value (e.g., zero) is stored in the descriptor's ownership indicator field to indicate that DMA engine 120 is releasing a packet to the host computer and turning over ownership of the descriptor. In one embodiment of the invention the ownership indicator is not changed until end state 1999 below.

In state 1958, the jumbo buffer's entry in jumbo buffer table 1010 is invalidated (e.g., validity indicator 1136 is set to invalid) to ensure that it is not used again. In the procedure described above, a jumbo packet was stored in, at most, two jumbo buffers. In an alternative embodiment of the invention, a jumbo buffer may be stored across any number of buffers. The descriptor that is configured to report the transfer of such a packet is constructed accordingly, as will be obvious to one skilled in the art.

After state 1958, the illustrated procedure ends at end state 1999.

In state 1960 (reached from state 1944), it has been determined that the present jumbo packet will be split to store the packet header in a header buffer and the packet data in one or more jumbo buffers. Therefore, DMA engine 120 (e.g., DMA manager 1002) first determines whether there is a valid (e.g., active) header buffer. Illustratively, this determination is made by examining validity indicator 1116 of header buffer table 1006, which manages the active header buffer. If the validity indicator is set, then there is a header buffer ready to receive this packet and the procedure continues at state 1964.

Otherwise, in state 1962 a new header buffer is prepared or initialized for storing small packets and headers of other packets. Illustratively, this initialization process involves obtaining a free ring descriptor from a cache maintained by free ring manager 1012 and retrieving its reference to an empty buffer. If the cache is empty, new descriptors may be retrieved from the free descriptor ring in host memory to replenish the cache.

When a new descriptor is obtained from the cache or from the free descriptor ring, the buffer identifier (e.g., pointer, address, index) contained in the descriptor is stored in a free buffer array. The buffer's initial address or some other indication of the first storage location or cell in the buffer is placed in next address field 1114 of header buffer table 1006. The index or position of the buffer identifier within the free buffer array is stored in header buffer index 1112, and validity indicator 1116 is set to a valid state.

In state 1964 the packet's header is copied or transferred (e.g., via a DMA operation) into the header buffer at the address or location specified in the next address field of header buffer table 1006. As described above, in one embodiment of the invention pad bytes may be inserted before the header in order to align the beginning of the packet's layer three protocol (e.g., IP) header with a sixteen-byte boundary. In addition, the header may be positioned within a cell of predetermined size (e.g., 256 bytes) in the buffer.

In state 1966, DMA engine 120 determines whether the packet's data (e.g., the TCP payload) will fit into one jumbo buffer. If the packet is too large to fit into one (e.g., the current jumbo buffer), the illustrated procedure continues at state 1972.

In state 1968, the packet's data is copied or transferred (e.g., via a DMA operation) into the current jumbo buffer, at the location specified in the next address field 1134 of jumbo buffer table 1010. One skilled in the art will appreciate that the next address field may not need to be updated to account for this new packet because the jumbo buffer will be released. In other words, in one embodiment of the invention a jumbo buffer is only used once (e.g., to store one packet or a portion of one packet).

In state 1970, a completion descriptor is written or configured to release the jumbo buffer and to provide information to the host computer for processing the packet. The header buffer index (e.g. the free buffer array position of the buffer identifier corresponding to the header buffer) and offset of the packet's header are placed in the descriptor in header index and header offset fields, respectively. Illustratively, this offset serves to identify the first byte of the header, the first pad byte preceding the header or the cell in which the header is stored. The jumbo buffer index (e.g., the index within the free buffer array of the buffer identifier that references the jumbo buffer) and the offset of the first byte of the packet's data within the jumbo buffer are placed in data index and data offset fields, respectively. Header size and data size fields are used to store the size of the packet's header (e.g., the offset of the payload within the packet) and data (e.g., payload size), respectively.

A release header flag may be set in the descriptor if the header buffer is full. However, the header buffer may not be tested to see if it is full until a later state of this procedure. In such an embodiment of the invention, the release header flag may be set (or cleared) at that time. A release data flag is also set, because no more data will be placed in the jumbo buffer (e.g., it is being released to the host computer).

The descriptor type field is changed to a value indicating that DMA engine 120 transferred a non-re-assembleable packet into host memory. Also, a predetermined value (e.g., zero) is stored in the descriptor's ownership indicator field to indicate that DMA engine 120 is releasing a packet to the host computer and turning over ownership of the descriptor. In one embodiment of the invention the ownership indicator is not set until end state 1999 below.

After state 1970, the illustrated procedure proceeds to state 1978.

In state 1972, a first portion of the packet's data is stored in the present (e.g., valid) jumbo buffer, at the location identified in the buffer's next address field 1134. Because all of the packet's data will not fit into this buffer, in state 1974 a new jumbo buffer is prepared and the remainder of the packet is stored in that buffer.

In state 1976, a completion descriptor is written or configured. The contents are similar to those described in states 1970 but this descriptor must reflect that two jumbo buffers were used to store the packet. The header buffer index (e.g. the free buffer array element that contains the header buffer's identifier) and offset of the header are placed in the descriptor in header index and header offset fields, respectively. The jumbo buffer index (e.g., the free buffer array element containing the jumbo buffer's buffer identifier) and the offset of the first byte of the packet's data within the jumbo buffer are placed in data index and data offset fields, respectively. Header size and data size fields are used to store the size of the packet's header (e.g., the offset of the payload within the packet) and data (e.g., payload size), respectively.

A release header flag is set in the descriptor if the header buffer is full. However, the header buffer may not be tested to see if it is full until a later state of this procedure. In such an embodiment of the invention, the release header flag may be set (or cleared) at that time. A release data flag is also set, because no more data will be placed in the jumbo buffer (e.g., it is being released to the host computer). Further, a split packet flag is set to indicate that a second jumbo buffer was used, and the position or index within the free buffer array of the second buffer's buffer identifier is stored in a next index field.

The descriptor type field is changed to a value indicating that DMA engine 120 transferred a non-re-assembleable packet into host memory. Finally, a predetermined value (e.g., zero) is stored in the descriptor's ownership indicator field to indicate that DMA engine 120 is releasing a packet to the host computer and turning over ownership of the descriptor. In one embodiment of the invention the ownership indicator is not set until end state 1999 below. In an alternative embodiment of the invention DMA engine 120 issues an interrupt or uses some other signal to alert the host computer that a descriptor is being released.

In state 1978, the jumbo buffer's entry in jumbo buffer table 1010 is invalidated (e.g., validity indicator 1136 is set to invalid) to ensure that it is not used again. In the procedure described above, a jumbo packet was stored in, at most, two jumbo buffers. In an alternative embodiment of the invention a jumbo buffer may be stored across any number of buffers. The descriptor that is configured to report the transfer of such a packet is constructed accordingly, as will be obvious to one skilled in the art.

In state 1980, it is determined whether the header buffer is full. In this embodiment of the invention, where each buffer is eight kilobytes in size and entries in the header buffer are no larger than 256 bytes, a counter may be used to keep track of entries placed into each new header buffer. The buffer is considered full when thirty-two entries are stored.

If the buffer is full, in state 1982 the header buffer is invalidated to ensure that it is not used again. Illustratively, this involves setting the header buffer table's validity indicator to invalid and communicating this status to the host computer. In this embodiment of the invention a release header flag in the descriptor is set. The illustrated procedure then ends with end state 1999.

If the header buffer is not full, then in state 1984 the next address field of header buffer table 1006 is updated to indicate the address at which to store the next header or small packet. The illustrated procedure then ends with end state 1999.

In end state 1999, a descriptor may be turned over to the host computer by storing a particular value (e.g., zero) in the descriptor's ownership indicator field as described above. Illustratively, the host computer (or software operating on the host computer) detects the change and understands that DMA engine 120 is returning ownership of the descriptor to the host computer.

A Method of Transferring a Packet with Operation Code 6 or Operation Code 7

Figure 20A:
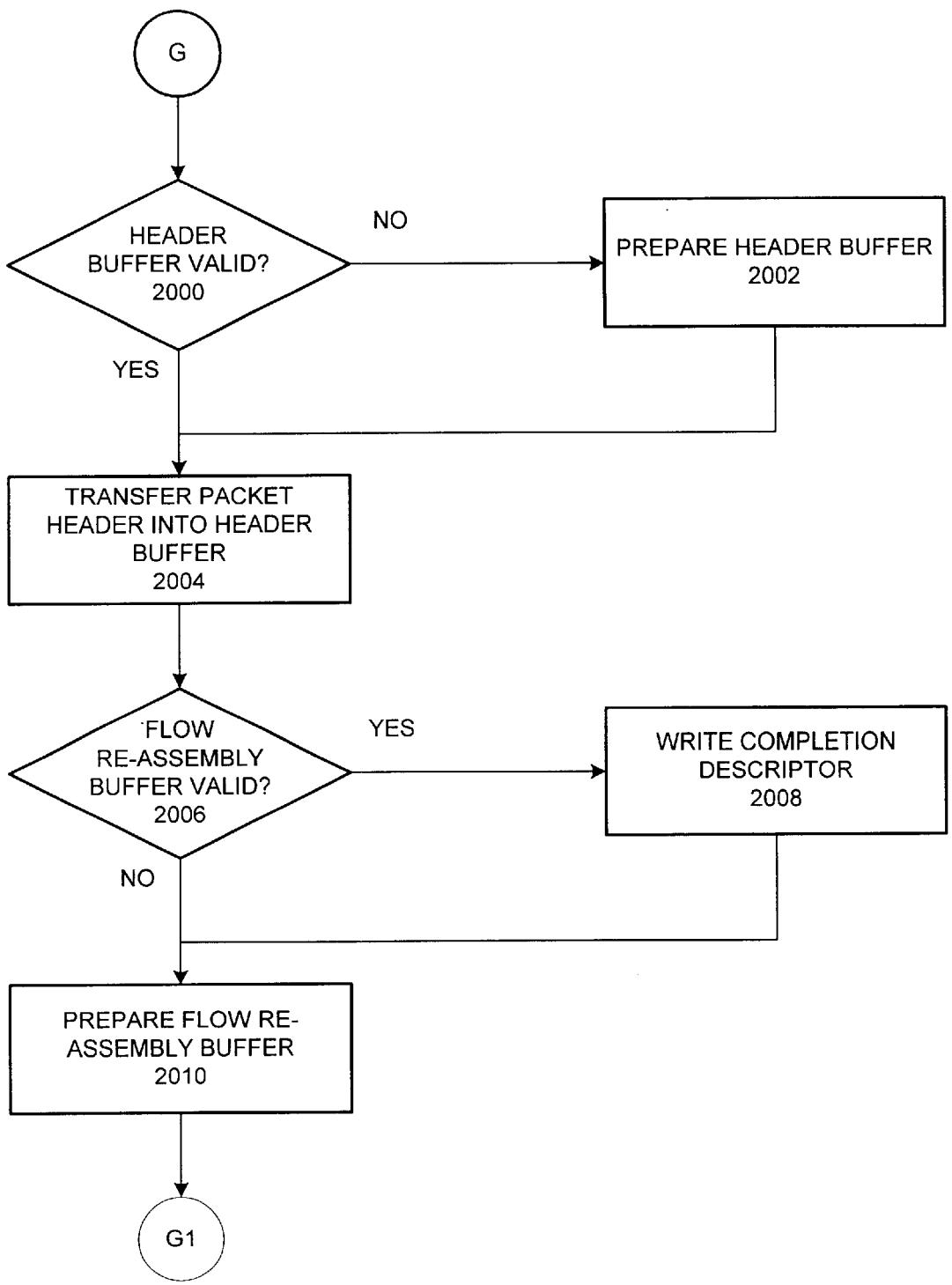
Figure 20B:
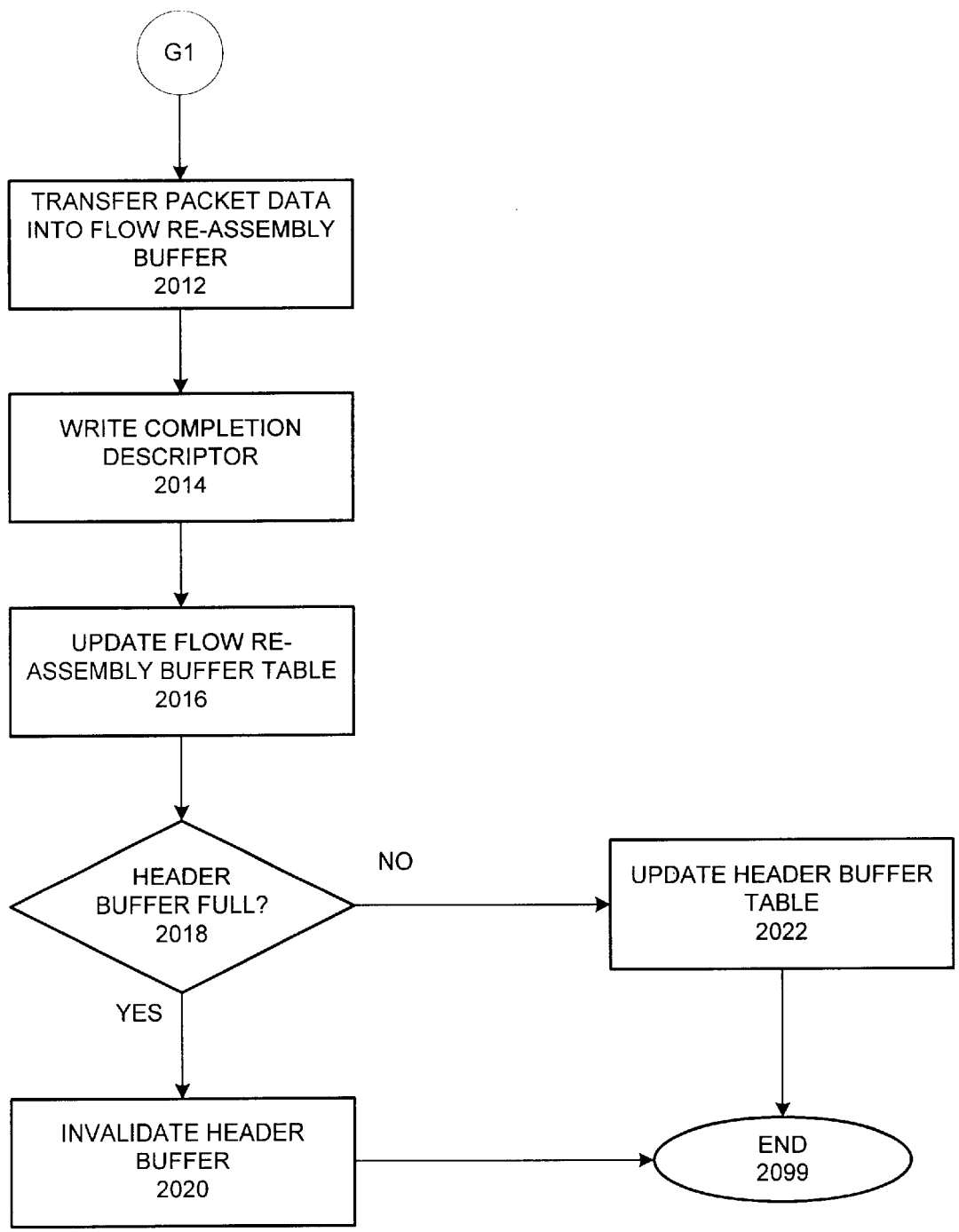

FIGS. 20A–20B depict an illustrative procedure in which DMA engine 120 transfers a packet associated with operation code 6 or 7 to a host memory buffer. As reflected in TABLE 1, operation codes 6 and 7 may indicate that a packet is compatible with the protocols pre-selected for NIC 100 and is the first packet of a new flow. The difference between these operation codes in this embodiment of the invention is that operation code 7 is used when an existing flow is to be replaced (e.g., in flow database 110 and/or flow re-assembly buffer table 1004) by the new flow. With operation code 6, in contrast, no flow needs to be torn down. For both codes, however, a new flow is set up and the associated packet's data may be re-assembled with data from other packets in the newly established flow. Because the packet data is to be re-assembled, the packet's header should be stored in a header buffer and its data in a new flow re-assembly buffer.

As described in a previous section, the flow that is torn down to make room for a new flow (in the case of operation code 7) may be the least recently used flow. Because flow database 110 and flow re-assembly buffer table 1004 contain only a limited number of entries in the presently described embodiment of the invention, when they are full and a new flow arrives an old one must be torn down. Choosing the least recently active flow for replacement is likely to have the least impact on network traffic through NIC 100. In one embodiment of the invention DMA engine 120 tears down the flow in flow re-assembly buffer table 1004 that has the same flow number as the flow that has been replaced in flow database 110.

In state 2000, DMA engine 120 determines whether there is a valid (e.g., active) header buffer. Illustratively, this determination is made by examining validity indicator 1116 of header buffer table 1006, which manages the active header buffer. If the validity indicator is set, then there is a header buffer ready to receive this packet and the procedure continues at state 2004.

Otherwise, in state 2002 a new header buffer is prepared or initialized for storing small packets and headers of re-assembled packets. Illustratively, this initialization process involves obtaining a free ring descriptor from a cache maintained by free ring manager 1012 and retrieving its reference to an empty buffer. If the cache is empty, new descriptors may be retrieved from the free descriptor ring in host memory to replenish the cache.

When a new descriptor is obtained from the cache or from the free descriptor ring, the buffer identifier (e.g., pointer, address, index) contained in the descriptor is stored in a free buffer array. The buffer's initial address or some other indication of the first storage location or cell in the buffer is placed in next address field 1114 of header buffer table 1006. The position or index of the buffer identifier within the free buffer array is stored in header buffer index 1112, and validity indicator 1116 is set to a valid state.

In state 2004 the packet's header is copied or transferred into the header buffer at the address or location specified in the next address field of header buffer table 1006. As described above, in one embodiment of the invention pad bytes may be inserted before the header in order to align the beginning of the packet's layer three protocol (e.g., IP) header with a sixteen-byte boundary. In addition, the packet's header may be positioned in a cell of predetermined size (e.g., 256 bytes) within the buffer.

As discussed above, operation code 7 indicates that an old flow is to be torn down in flow re-assembly buffer table 1004 to make room for a new flow. This requires the release of any flow re-assembly buffer that may be associated with the flow being torn down.

Thus, in state 2006 it is determined whether a flow re-assembly buffer is valid (e.g., active) for a flow having the flow number that was read from control queue 118 for this packet. As explained in a previous section, for operation code 7 the flow number represents the entry in flow database 110 (and flow re-assembly buffer table 1004) that is being replaced with the new flow. DMA engine 120 thus examines the validity indicator in the flow's entry in flow re-assembly buffer table 1004. Illustratively, if the indicator is valid then there is an active buffer storing data from one or more packets in the flow that is being replaced. If there is a valid flow re-assembly buffer for this flow, the illustrated procedure continues at state 2008. Otherwise, the procedure proceeds to state 2010. It will be understood that the illustrated procedure will normally proceed to state 2008 for operation code 7 and state 2010 for operation code 6.

In state 2008, a completion descriptor is written or configured to release the replaced flow's re-assembly buffer. In particular, the flow re-assembly buffer index (e.g., the index within the free buffer array of the flow re-assembly buffer's buffer identifier) is written to the descriptor. In this embodiment of the invention, no offset needs to be stored in the descriptor's data offset field and the data size field is set to zero because no new data was stored in the buffer that is being released. Similarly, the header buffer is not yet being released, and therefore the header index and header offset fields of the descriptor need not be used and a zero may be stored in the header size field.

The descriptor's release header flag is cleared (e.g., a zero is stored in the flag) because the header buffer is not being released. The release data flag is set (e.g., a one is stored in the flag), however, because no more data will be placed in the released flow re-assembly buffer. Further, a release flow flag in the descriptor is set to indicate that the flow associated with the released flow re-assembly buffer is being torn down.

The descriptor type field is changed to a value indicating that DMA engine 120 is releasing a stale flow buffer (e.g., a flow re-assembly buffer that has not been used for some time). Finally, the descriptor used to release the replaced flow's re-assembly buffer and terminate the associated flow is turned over to the host computer by changing its ownership indicator field (e.g., from one to zero). In one alternative embodiment of the invention, DMA engine 120 issues an interrupt or employs some other means of alerting the host computer that a descriptor is being released.

In state 2010, a new flow re-assembly buffer is prepared for the flow that is being set up. Illustratively, a free ring descriptor is obtained from a cache maintained by free ring manager 1012 and its buffer identifier (e.g., a reference to an empty memory buffer) is retrieved. If the cache is empty, new descriptors may be retrieved from the free descriptor ring in host memory to replenish the cache.

When a new descriptor is obtained from the cache or from the free descriptor ring, the buffer identifier (e.g., pointer, address, index) contained in the descriptor is stored in a free buffer array. The buffer's initial address or other indication of the first storage location in the buffer is placed in next address field 1104 of the flow's entry in flow re-assembly buffer table 1004. The flow's entry in the table may be recognized by its flow number. The position or index of the buffer identifier within the free buffer array is stored in re-assembly buffer index 1102, and validity indicator 1106 is set to a valid state.

In state 2012, the packet's data is copied or transferred (e.g., via a DMA operation) into the address or location specified in the next address field of the flow's entry in flow re-assembly buffer table 1004.

In state 2014, a completion descriptor is written or configured to provide information to the host computer for processing the packet. In particular, the header buffer index (e.g., the location or position within the free buffer array of the buffer identifier that references the header buffer) and the offset of the packet's header within the header buffer are placed in the descriptor. Illustratively, the offset identifies the first byte of the header, the first pad byte preceding the header or the location of the header's cell in the header buffer.

The flow re-assembly buffer index (e.g., the location or position, within the free buffer array, of the buffer identifier that references the flow re-assembly buffer) and the offset of the packet's data within that buffer are also stored in the descriptor. It will be recognized, however, that the offset reported for this packet's data may be zero, because the packet data is stored at the very beginning of the new flow re-assembly buffer.

The size of the packet's data (e.g., the size of the packet's TCP payload) and header (e.g., the offset of the TCP payload within the packet) are stored in data size and header size fields, respectively. The descriptor type field is changed to a value indicating that DMA engine 120 transferred a flow packet into host memory. A release header flag is set if the header buffer is full but a release data flag is not set, because more data will be placed in this flow re-assembly buffer. The header buffer may not be tested to see if it is full until a later state of this procedure. In such an embodiment, the release header flag may be set (or cleared) at that time.

In one embodiment of the invention a release flow flag may also be set, depending upon dynamic packet batching module 122. For example, if the packet batching module determines that another packet in the same flow will soon be transferred to the host computer, the release flow flag will be cleared (e.g., a zero will be stored). This indicates that the host computer should await the next flow packet before processing this one. By collectively processing multiple packets from a single flow, the packets can be processed more efficiently and less processor time will be required for network traffic. If, however, no other packets in the same flow are identified, the release flow flag may be set to indicate that the host computer should process the flow packets received so far, without waiting for more.

In state 2016, the flow's entry in flow re-assembly buffer table 1004 is updated. In particular, next address field 1104 is updated to identify the location in the re-assembly buffer at which the next flow packet's data should be stored.

In state 2018, it is determined whether the header buffer is full. In this embodiment of the invention, where each buffer is eight kilobytes in size and entries in the header buffer are no larger than 256 bytes, a counter may be used to keep track of entries placed into each new header buffer. The buffer is considered full when thirty-two entries are stored.

If the buffer is full, in state 2020 the header buffer is invalidated to ensure that it is not used again. Illustratively, this involves setting the header buffer table's validity indicator to invalid and communicating this status to the host computer. In this embodiment of the invention, a release header flag in the descriptor is set.

If the header buffer is not full, then in state 2022 the next address field of header buffer table 1006 is updated to indicate the address at which to store the next header or small packet.

The processing associated with a packet having operation codes 6 and 7 then ends with end state 2099. In this end state, the descriptor used for this packet (e.g., the descriptor that was configured in state 2014) is turned over to the host computer by changing its ownership indicator field (e.g., from one to zero). In one alternative embodiment of the invention, DMA engine 120 issues an interrupt or employs other means (e.g., such as the descriptor's descriptor type field) to alert the host computer that a descriptor is being released.

One Embodiment of a Packet Batching Module

Figure 21:
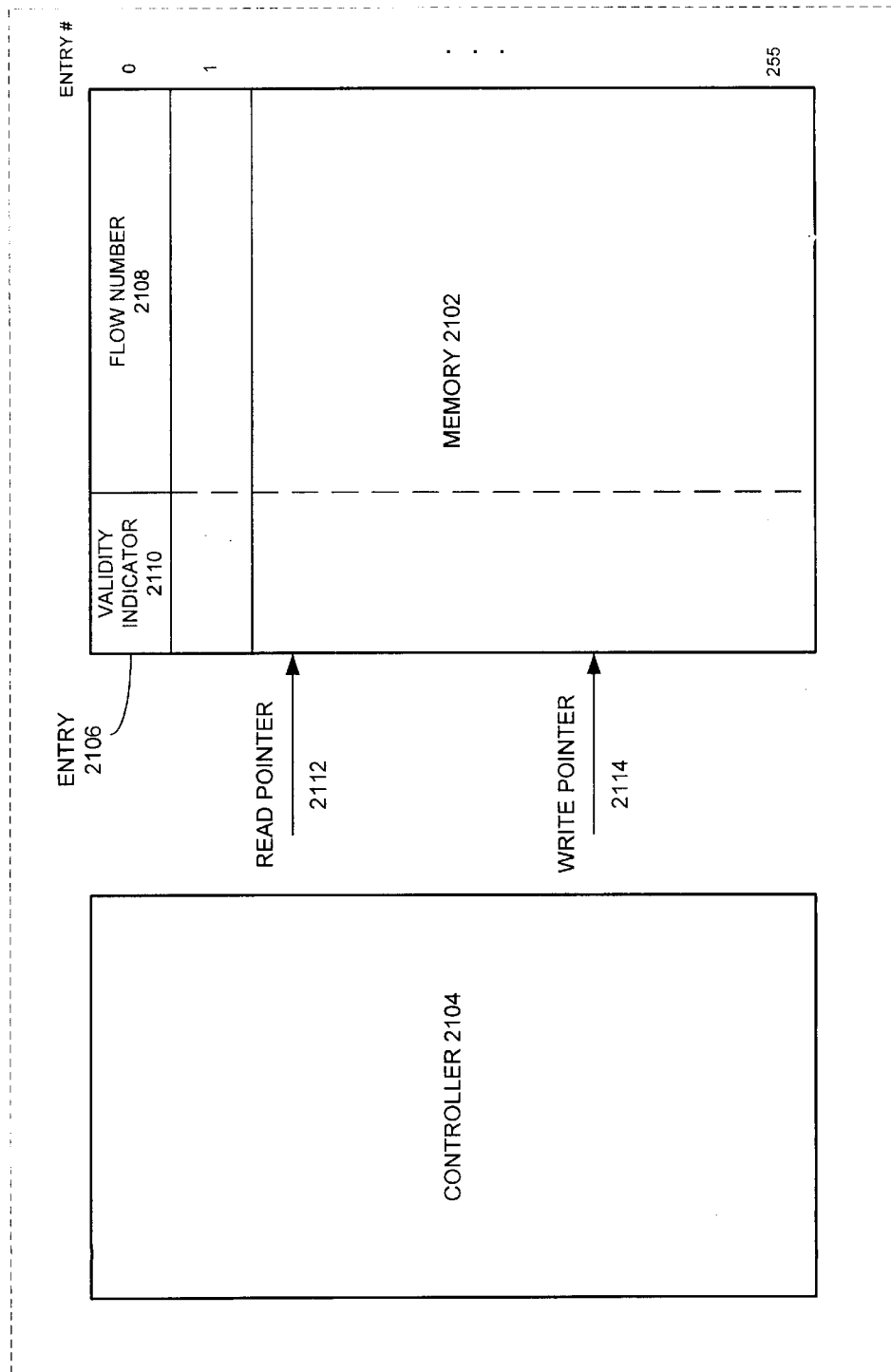
FIG. 21 is a diagram of a dynamic packet batching module in accordance with an embodiment of the invention.

FIG. 21 is a diagram of dynamic packet batching module 122 in one embodiment of the invention. In this embodiment, packet batching module 122 alerts a host computer to the transfer, or impending transfer, of multiple packets from one communication flow. The related packets may then be processed through an appropriate protocol stack collectively, rather than processing one at a time. As one skilled in the art will recognize, this increases the efficiency with which network traffic may be handled by the host computer.

In the illustrated embodiment, a packet is transferred from NIC 100 to the host computer by DMA engine 120 (e.g., by copying its payload into an appropriate buffer). When a packet is transferred, packet batching module 122 determines whether a related packet (e.g., a packet in the same flow) will soon be transferred as well. In particular, packet batching module 122 examines packets that are to be transferred after the present packet. One skilled in the art will appreciate that the higher the rate of packet arrival at NIC 100, the more packets that are likely to await transfer to a host computer at a given time. The more packets that await transfer, the more packets that may be examined by the dynamic packet batching module and the greater the benefit it may provide. In particular, as the number of packets awaiting transfer increases, packet batching module 122 may identify a greater number of related packets for collective processing. As the number of packets processed together increases, the amount of host processor time required to process each packet decreases.

Thus, if a related packet is found the packet batching module alerts the host computer so that the packets may be processed as a group. As described in a previous section, in one embodiment of the invention dynamic packet batching module 122 alerts the host computer to the availability of a related packet by clearing a release flow flag in a completion descriptor associated with a transferred packet. The flag may, for example, be cleared by DMA engine 120 in response to a signal or alert from dynamic packet batching module 122.

In contrast, in an alternative embodiment of the invention dynamic packet batching module 122 or DMA engine 120 may alert the host computer when no related packets are found or when, for some other reason, the host processor should not delay processing a transferred packet. In particular, a release flow flag may be set when the host computer is not expected to receive a packet related to a transferred packet in the near future (e.g., thus indicating that the associated flow is being released or torn down). For example, it may be determined that the transferred packet is the last packet in its flow or that a particular packet doesn't even belong to a flow (e.g., this may be reflected in the packet's associated operation code).

With reference now to FIG. 21, packet batching module 122 in one embodiment of the invention includes memory 2102 and controller 2104. Illustratively, each entry in memory 2102, such as entry 2106, comprises two fields:

flow number 2108 and validity indicator 2110. In alternative embodiments of the invention, other information may be stored in memory 2102. Read pointer 2112 and write pointer 2114 serve as indices into memory 2102.

In the illustrated embodiment, memory 2102 is an associative memory (e.g., a CAM) configured to store up to 256 entries. Each entry corresponds to and represents a packet stored in packet queue 116. As described in a previous section, packet queue 116 may also contain up to 256 packets in one embodiment of the invention. When a packet is, or is about to be transferred, by DMA engine 120 from packet queue 116 to the host computer, memory 2102 may be searched for an entry having a flow number that matches the flow number of the transferred packet. Because memory 2102 is a CAM in this embodiment, all entries in the memory may be searched simultaneously or nearly simultaneously. In this embodiment, memory 2102 is implemented in hardware, with the entries logically arranged as a ring. In alternative embodiments, memory 2102 may be virtually any type of data structure (e.g., array, table, list, queue) implemented in hardware or software. In one particular alternative embodiment, memory 2102 is implemented as a RAM, in which case the entries may be examined in a serial manner.

The maximum of 256 entries in the illustrated embodiment matches the maximum number of packets that may be stored in a packet queue. Because the depth of memory 2102 matches the depth of the packet queue, when a packet is stored in the packet queue its flow number may be automatically stored in memory 2102. Although the same number of entries are provided for in this embodiment, in an alternative embodiment of the invention memory 2102 may be configured to hold a smaller or greater number of entries than the packet queue. And, as discussed in a previous section, for each packet stored in the packet queue, related information may also be stored in the control queue.

In the illustrated embodiment of the invention, flow number 2108 is the index into flow database 110 of the flow comprising the corresponding packet. As described above, in one embodiment of the invention a flow includes packets carrying data from one datagram sent from a source entity to a destination entity. Illustratively, each related packet has the same flow key and the same flow number. Flow number 2108 may comprise the index of the packet's flow key in flow database 110.

Validity indicator 2110 indicates whether the information stored in the entry is valid or current. In this embodiment, validity indicator 2110 may store a first value (e.g., one) when the entry contains valid data, and a second value (e.g., zero) when the data is invalid. For example, validity indicator 2110 in entry 2106 may be set to a valid state when the corresponding entry in packet queue 116 contains a packet awaiting transfer to the host computer and belongs to a flow (e.g., which may be indicated by the packet's operation code). Similarly, validity indicator 2110 may be set to an invalid state when the entry is no longer needed (e.g., when the corresponding packet is transferred to the host computer).

Flow validity indicator 2110 may also be set to an invalid state when a corresponding packet's operation code indicates that the packet does not belong to a flow. It may also be set to an invalid state when the corresponding packet is a control packet (e.g., contains no data) or is otherwise non-re-assembleable (e.g., because it is out of sequence, incompatible with a pre-selected protocol, has an unexpected control flag set). Validity indicator 2110 may be managed by controller 2104 during operation of the packet batching module.

In the illustrated embodiment of the invention, an entry's flow number is received from a register in which it was placed for temporary storage. A packet's flow number may be temporarily stored in a register, or other data structure, in order to facilitate its timely delivery to packet batching module 122. Temporary storage of the flow number also allows the flow database manager to turn its attention to a later packet. A flow number may, for example, be provided to dynamic packet batching module 122 at nearly the same time that the associated packet is stored in packet queue 116. Illustratively, the flow number may be stored in the register by flow database manager 108 or by IPP module 104. In an alternative embodiment, the flow number is received from control queue 118 or some other module of NIC 100.

In the illustrated embodiment of the invention, memory 2102 contains an entry corresponding to each packet in packet queue 116. When a packet in the packet queue is transferred to a host computer (e.g., when it is written to a re-assembly buffer), controller 2104 invalidates the memory entry that corresponds to that packet. Memory 2102 is then searched for another entry having the same flow number as the transferred packet. Afterwards, when a new packet is stored in packet queue 116, perhaps in place of the transferred packet, a new entry is stored in memory 2102.

In an alternative embodiment of the invention, memory 2102 may be configured to hold entries for only a subset of the maximum number of packets stored in packet queue 116 (e.g., just re-assembleable packets). Entries in memory 2102 may still be populated when a packet is stored in the packet queue. However, if memory 2102 is full when a new packet is received, then creation of an entry for the new packet must wait until a packet is transferred and its entry in memory 2102 invalidated. Therefore, in this alternative embodiment entries in memory 2102 may be created by extracting information from entries in control queue 118 rather than packet queue 116. Controller 2104 would therefore continually attempt to copy information from entries in control queue 118 into memory 2102. The function of populating memory 2102 may be performed independently or semi-independently of the function of actually comparing the flow numbers of memory entries to the flow number of a packet being transferred to the host computer.

In this alternative embodiment a second read pointer may be used to index control queue 118 to assist in the population of memory 2102. In particular, the second read pointer may be used by packet batching module 122 to find and fetch entries for memory 2102. Illustratively, if the second, or "lookahead" read pointer references the same entry as the control queue's write pointer, then it could be determined that no new entries were added to control queue 118 since the last check by controller 2104. Otherwise, as long as there is an empty (e.g., invalid) entry in memory 2102, the necessary information (e.g., flow number) may be copied into memory 2102 for the packet corresponding to the entry referenced by the lookahead read pointer. The lookahead read pointer would then be incremented.

Returning now to FIG. 21, read pointer 2112 of dynamic packet batching module 122 identifies the current entry in memory 2102 (e.g., the entry corresponding to the packet at the front of the packet queue or the next packet to be transferred). Illustratively, this pointer is incremented each time a packet is transferred to the host computer. Write pointer 2114 identifies the position at which the next entry in memory 2102 is to be stored. Illustratively, the write pointer is incremented each time an entry is added to memory 2102. One manner of collectively processing headers from related packets is to form them into one "super- "header. In this method, the packets' data portions are stored separately (e.g., in a separate memory page or buffer) from the super-header.

Illustratively, a super-header comprises one combined header for each layer of the packets' associated protocol stack (e.g., one TCP header and one IP header). To form each layer's portion of a super-header, the packet's individual headers may be merged to make a regular-sized header whose fields accurately reflect the assembled data and combined headers. For example, merged header fields relating to payload or header length would indicate the size of the aggregated data or aggregated headers, the sequence number of a merged TCP header would be set appropriately, etc. The super-header portion may then be processed through its protocol stack similar to the manner in which a single packet's header is processed.

This method of collectively processing related packets' headers (e.g., with "super-"headers) may require modification of the instructions for processing packets (e.g., a device driver). For example, because multiple headers are merged for each layer of the protocol stack, the software may require modification to recognize and handle the super-headers. In one embodiment of the invention the number of headers folded or merged into a super-header may be limited. In an alternative embodiment of the invention the headers of all the aggregated packets, regardless of number, may be combined.

In another method of collectively processing related packets' header portions, packet data and headers may again be stored separately (e.g., in separate memory pages). But, instead of combining the packets' headers for each layer of the appropriate protocol stack to form a super-header, they may be submitted for individual processing in quick succession. For example, all of the packets' layer two headers may be processed in a rapid sequence—one after the other— then all of the layer three headers, etc. In this manner, packet processing instructions need not be modified, but headers are still processed more efficiently. In particular, a set of instructions (e.g., for each protocol layer) may be loaded once for all related packets rather than being separately loaded and executed for each packet.

As discussed in a previous section, data portions of related packets may be transferred into storage areas of predetermined size (e.g., memory pages) for efficient transfer from the host computer's kernel space into application or user space. Where the transferred data is of memory page size, the data may be transferred using highly efficient "page-flipping," wherein a full page of data is provided to application or user memory space.

Figure 22A:
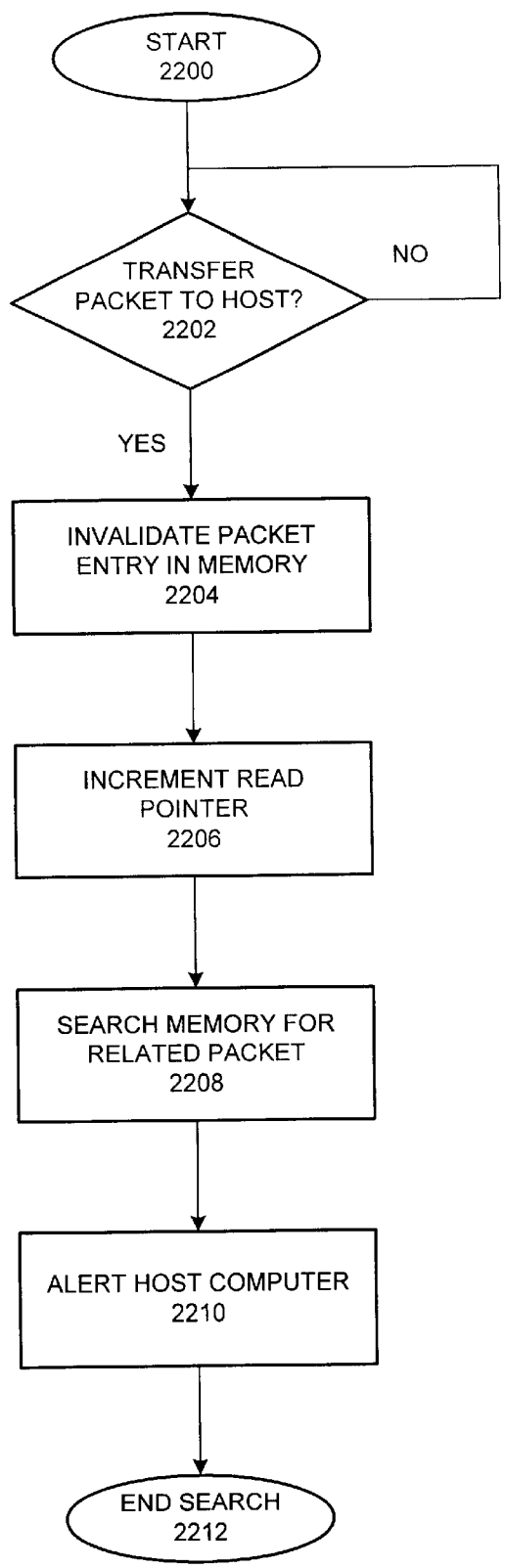
FIGS. 22A–22B comprise a flow chart demonstrating one method of dynamically searching a memory containing information concerning packets awaiting transfer to a host computer in order to locate a packet in the same communication flow as a packet being transferred, in accordance with an embodiment of the invention.
Figure 22B:
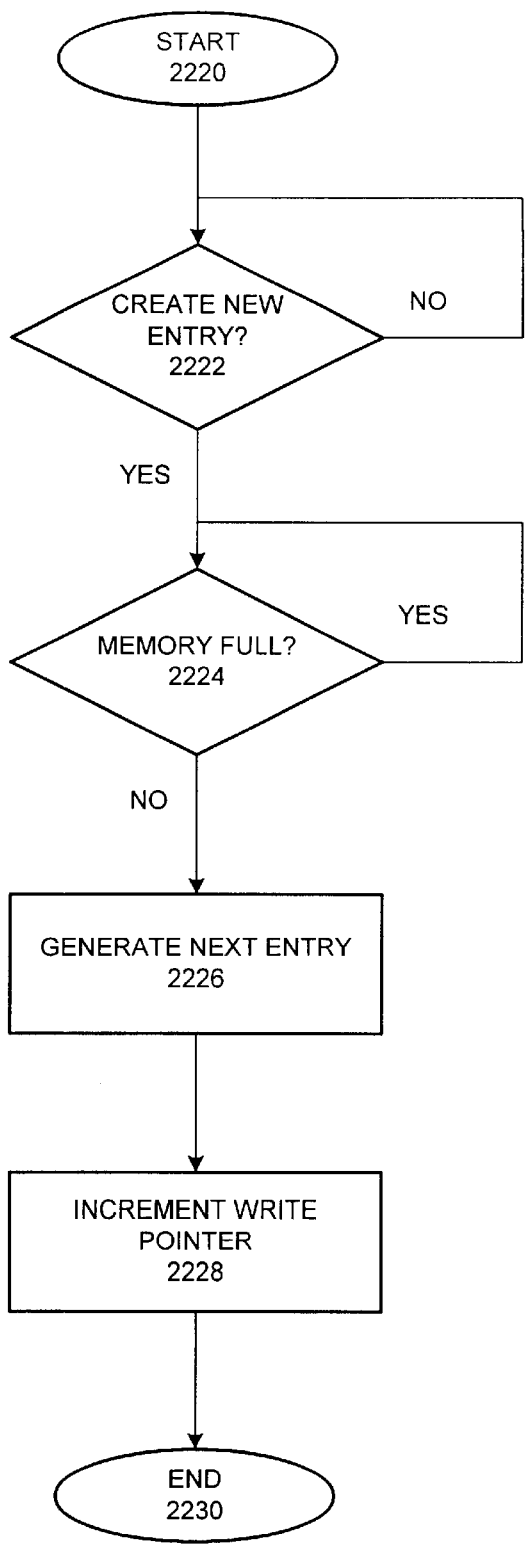

FIGS. 22A–22B present one method of dynamic packet batching with packet batching module 122. In the illustrated method, memory 2102 is populated with flow numbers of packets stored in packet queue 116. In particular, a packet's flow number and operation code are retrieved from control queue 118, IPP module 104, flow database manager 108 or other module(s) of NIC 100. The packet's flow number is stored in the flow number portion of an entry in memory 2102, and validity indicator 2110 is set in accordance with the operation code. For example, if the packet is not re-assembleable (e.g., codes 2 and 5 in TABLE 1), the validity indicator may be set to zero; otherwise it may be set to one.

The illustrated method may operate in parallel to the operation of DMA engine 120. In other words, dynamic packet batching module 122 may search for packets related to a packet in the process of being transferred to a host memory buffer. Alternatively, a search may be conducted shortly after or before the packet is transferred. Because memory 2102 may be associative in nature, the search operation may be conducted quickly, thus introducing little, if any, delay into the transfer process.

FIG. 22A may be considered a method of searching for a related packet, while FIG. 22B may be considered a method of populating the dynamic packet batching module's memory.

FIGS. 22A–22B each reflect one "cycle" of a dynamic packet batching operation (e.g., one search and creation of one new memory entry). Illustratively, however, the operation of packet batching module 122 runs continuously. That is, at the end of one cycle of operation another cycle immediately begins. In this manner, controller 2104 strives to ensure memory 2102 is populated with entries for packets as they are stored in packet queue 116. If memory 2102 is not large enough to store an entry for each packet in packet queue 116, then controller 2104 attempts to keep the memory as full as possible and to quickly replace an invalidated entry with a new one.

State 2200 is a start state for a memory search cycle. In state 2202, it is determined whether a packet (e.g., the packet at the front of the packet queue) is being transferred to the host computer. This determination may, for example, be based on the operation of DMA engine 120 or the status of a pointer in packet queue 116 or control queue 118. Illustratively, state 2202 is initiated by DMA engine 120 as a packet is copied into a buffer in the host computer. One purpose of state 2202 is simply to determine whether memory 2102 should be searched for a packet related to one that was, will be, or is being transferred. Until a packet is transferred, or about to be transferred, the illustrated procedure continues in state 2202.

When, however, it is time for a search to be conducted (e.g., a packet is being transferred), the method continues at state 2204. In state 2204, the entry in memory 2102 corresponding to the packet being transferred is invalidated. Illustratively, this consists of storing a predetermined value (e.g., zero) in validity indicator 2110 for the packet's entry. In a present embodiment of the invention read pointer 2112 identifies the entry corresponding to the packet to be transferred. As one skilled in the art will recognize, one reason for invalidating a transferred packet's entry is so that when memory 2102 is searched for an entry associated with a packet related to the transferred packet, the transferred packet's own entry will not be identified.

In one embodiment of the invention the transferred packet's flow number is copied into a register (e.g., a hardware register) when dynamic packet batching module 122 is to search for a related packet. This may be particularly helpful (e.g., to assist in comparing the flow number to flow numbers of other packets) if memory 2102 is implemented as a RAM instead of a CAM.

In state 2206, read pointer 2112 is incremented to point to the next entry in memory 2102. If read pointer is incremented to the same entry that is referenced by write pointer 2114, and that entry is also invalid (as indicated by validity indicator 2110), it may be determined that memory 2102 is now empty.

Then, in state 2208, memory 2102 is searched for a packet related to the packet being transferred (e.g., the memory is searched for an entry having the same flow number). As described above, entries in memory 2102 are searched associatively in one embodiment of the invention. Thus, the result of the search operation may be a single signal indicating whether or not a match was found.

In the illustrated embodiment of the invention, only valid entries (e.g., those having a value of one in their validity indicators) are searched. As explained above, an entry may be marked invalid (e.g., its validity indicator stores a value of zero) if the associated packet is considered incompatible. Entries for incompatible packets may be disregarded because their data is not ordinarily reassembled and their headers are not normally batched. In an alternative embodiment of the invention, all entries may be searched but a match is reported only if a matching entry is valid.

In state 2210, the host computer is alerted to the availability or non-availability of a related packet. In this embodiment of the invention, the host computer is alerted by storing a predetermined value in a specific field of the transferred packet's completion descriptor (described in a previous section). As discussed in the previous section, when a packet is transferred a descriptor in a descriptor ring in host memory is populated with information concerning the packet (e.g., an identifier of its location in host memory, its size, an identifier of a processor to process the packet's headers). In particular, a release flow flag or indicator is set to a first value (e.g., zero) if a related packet is found, and a second value if no related packet is found. Illustratively, DMA engine 120 issues the alert or stores the necessary information to indicate the existence of a related packet in response to notification from dynamic packet batching module 122. Other methods of notifying the host computer of the presence of a related packet are also suitable (e.g., an indicator, flag, key), as will be appreciated by one skilled in the art.

In FIG. 22B, state 2220 is a start state for a memory population cycle.

In state 2222, it is determined whether a new packet has been received at the network interface. Illustratively, a new entry is made in the packet batching module's memory for each packet received from the network. The receipt of a new packet may be signaled by IPP module 104. For example, the receipt of a new packet may be indicated by the storage of the packet's flow number, by IPP module 104, in a temporary location (e.g., a register). Until a new packet is received, the illustrated procedure waits. When a packet is received, the procedure continues at state 2224.

In state 2224, if memory 2102 is configured to store fewer entries than packet queue 116 (and, possibly, control queue 118), memory 2102 is examined to determine if it is full.

In one embodiment of the invention memory 2102 may be considered fill if the validity indicator is set (e.g., equal to one) for each entry or for the entry referenced by write pointer 2114. If the memory is full, the illustrated procedure waits until the memory is not full. As one skilled in the art will recognize, memory 2102 and other data structures in NIC 100 may be tested for saturation (e.g., whether they are filled) by comparing their read and write pointers.

In state 2226, a new packet is represented in memory 2102 by storing its flow number in the entry identified by write pointer 2114 and storing an appropriate value in the entry's validity indicator field. If, for example, the packet is not re-assembleable (e.g., as indicated by its operation code), the entry's validity indicator may be set to an invalid state. For purposes of the operation of dynamic packet batching module 122, a TCP control packet may or may not be considered re-assembleable. Thus, depending upon the implementation of a particular embodiment the validity indicator for a packet that is a TCP control packet may be set to a valid or invalid state.

In an alternative embodiment of the invention an entry in memory 2102 is populated with information from the control queue entry identified by the second read pointer described above. This pointer may then be incremented to the next entry in control queue 118.

In state 2228, write pointer 2114 is incremented to the next entry of memory 2102, after which the illustrated method ends at end state 2230. If write pointer 2114 references the same entry as read pointer 2112, it may be determined that memory 2102 is full. One skilled in the art will recognize that many other suitable methods of managing pointers for memory 2102 may be employed.

As mentioned above, in one embodiment of the invention one or both of the memory search and memory population operations run continuously. Thus, end state 2230 may be removed from the procedure illustrated in FIG. 22B, in which case the procedure would return to state 2222 after state 2228.

Advantageously, in the illustrated embodiment of the invention the benefits provided to the host computer by dynamic packet batching module 122 increase as the host computer becomes increasingly busy. In particular, the greater the load placed on a host processor, the more delay that will be incurred until a packet received from NIC 100 may be processed. As a result, packets may queue up in packet queue 116 and, the more packets in the packet queue, the more entries that can be maintained in memory 2102.

The more entries that are stored in memory 2102, the further ahead dynamic packet batching module can look for a related packet. The further ahead it scans, the more likely it is that a related packet will be found. As more related packets are found and identified to the host computer for collective processing, the amount of processor time spent on network traffic decreases and overall processor utilization increases.

One skilled in the art will appreciate that other systems and methods may be employed to identify multiple packets from a single communication flow or connection without exceeding the scope of the present invention.

Early Random Packet Discard in One Embodiment of the Invention

Packets may arrive at a network interface from a network at a rate faster than they can be transferred to a host computer. When such a situation exists, the network interface must often drop, or discard, one or more packets. Therefore, in one embodiment of the present invention a system and method for randomly discarding a packet are provided. Systems and methods discussed in this section may be applicable to other communication devices as well, such as gateways, routers, bridges, modems, etc.

As one skilled in the art will recognize, one reason that a packet may be dropped is that a network interface is already storing the maximum number of packets that it can store for transfer to a host computer. In particular, a queue that holds packets to be transferred to a host computer, such as packet queue 116 (shown in FIG. 1A), may be fully populated when another packet is received from a network. Either the new packet or a packet already stored in the queue may be dropped.

Partly because of the bursty nature of much network traffic, multiple packets may often be dropped when a network interface is congested. And, in some network interfaces, if successive packets are dropped one particular network connection or flow (e.g., a connection or flow that includes all of the dropped packets) may be penalized even if it is not responsible for the high rate of packet arrival. If a network connection or flow is penalized too heavily, the network entity generating the traffic in that connection or flow may tear it down in the belief that a "broken pipe" has been encountered. As one skilled in the art will recognize, a broken pipe occurs when a network entity interprets a communication problem as indicating that a connection has been severed.

For certain network traffic (e.g., TCP traffic), the dropping of a packet may initiate a method of flow control in which a network entity's window (e.g., number of packets it transmits before waiting for an acknowledgement) shrinks or is reset to a very low number. Thus, every time a packet from a TCP communicant is dropped by a network interface at a receiving entity, the communicant must re-synchronize its connection with the receiving entity. If one or a subset of communicants are responsible for a large percentage of network traffic received at the entity, then it seems fair that those communicants should be penalized in proportion to the amount of traffic that it is responsible for.

In addition, it may be wise to prevent certain packets or types of packets from being discarded. For example, discarding a small control packet may do very little to alleviate congestion in a network interface and yet have a drastic and negative effect upon a network connection or flow. Further, if a network interface is optimized for packets adhering to a particular protocol, it may be more efficient to avoid dropping such packets. Even further, particular connections, flows or applications may be prioritized, in which case higher priority traffic should not be dropped.

Thus, in one embodiment of a network interface according to the present invention, a method is provided for randomly discarding a packet when a communication device's packet queue is full or is filled to some threshold level. Intelligence may be added to such a method by selecting certain types of packets for discard (e.g., packets from a particular flow, connection or application) or excepting certain types of packets from being discarded (e.g., control packets, packets conforming to a particular protocol or set of protocols).

A provided method is random in that discarded packets are selected randomly from those packets that are considered discardable. Applying a random discard policy may be sufficient to avoid broken pipes by distributing the impact of dropped packets among multiple connections or flows. In addition, if a small number of transmitting entities are responsible for a majority of the traffic received at a network interface, dropping packets randomly may ensure that the offending entities are penalized proportionately. Different embodiments of the invention that are discussed below provide various combinations of randomness and intelligence, and one of these attributes may be omitted in one or more embodiments.

Figure 24:
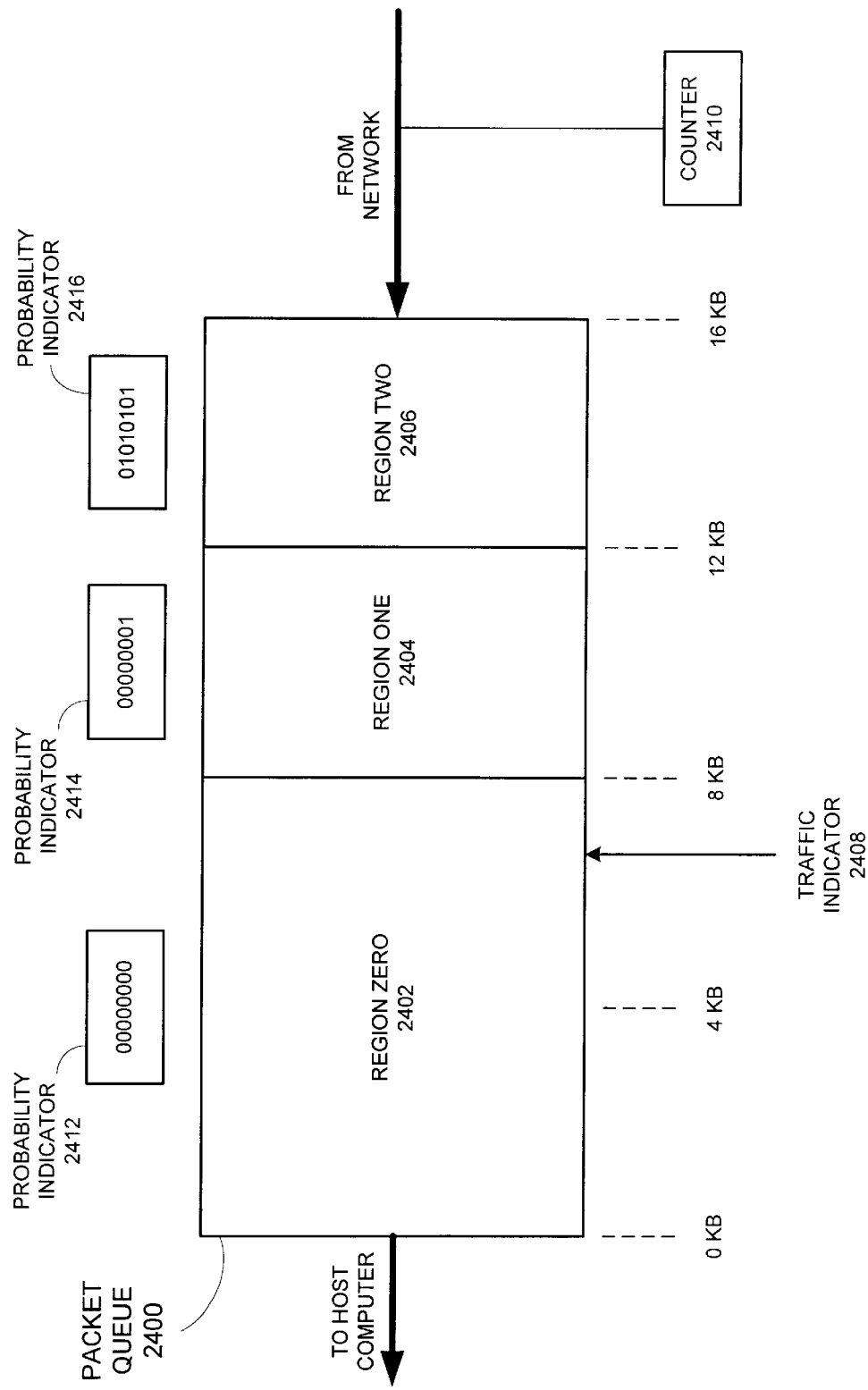
FIG. 24 depicts a system for randomly discarding a packet from a network interface in accordance with an embodiment of the invention.

FIG. 24 depicts a system and method for randomly discarding packets in a present embodiment of the invention. In this embodiment, packet queue 2400 is a hardware FIFO (e.g., first-in first-out) queue that is 16 KB in size. In other embodiments of the invention the packet queue may be smaller or larger or may comprise another type of data structure (e.g., list, array, table, heap) implemented in hardware or software.

Similar to packet queue 116 discussed in a previous section, packet queue 2400 receives packets from a network and holds them for transfer to a host computer. Packets arriving from a network may arrive from the network at a high rate and may be processed or examined by one or more modules (e.g., header parser 106, flow database manager 108) prior to being stored in packet queue 2400. For example, where the network is capable of transmitting one gigabit of traffic per second, packets conforming to one set of protocols (e.g., Ethernet, IP and TCP) may be received at a rate of approximately 1.48 million packets per second. After being stored in packet queue 2400, packets are transferred to a host computer at a rate partially dependent upon events and conditions internal to the host computer. Thus, the network interface may not be able to control the rate of packet transmittal to the host computer.

In the illustrated embodiment, packet queue 2400 is divided into a plurality of zones or regions, any of which may overlap or share a common boundary. Packet queue 2400 may be divided into any number of regions, and the invention is not limited to the three regions depicted in FIG. 24. Illustratively, region zero (represented by the numeral 2402) encompasses the portion of packet queue 2400 from 0 KB (e.g., no packets are stored in the queue) to 8 KB (e.g., half full). Region one (represented by the numeral 2404) encompasses the portion of the packet queue from 8 KB to 12 KB. Region two (represented by the numeral 2406) encompasses the remaining portion of the packet queue, from 12 KB to 16 KB. In an alternative embodiment, regions may only be defined for a portion of packet queue 2400. For example, only the upper half (e.g., above 8 KB) may be divided into one or more regions.

The number and size of the different regions and the location of boundaries between the regions may vary according to several factors. Among the factors are the type of packets received at the network interface (e.g., the protocols according to which the packets are configured), the size of the packets, the rate of packet arrival (e.g., expected rate, average rate, peak rate), the rate of packet transfer to the host computer, the size of the packet queue, etc. For example, in another embodiment of the invention, packet queue 2400 is divided into five regions. A first region extends from 0 KB to 8 KB; a second region ranges from 8 KB to 10 KB; a third from 10 KB to 12 KB; a fourth from 12 KB to 14 KB;, and a final region extends from 14 KB to 16 KB.

During operation of a network interface according to a present embodiment, traffic indicator 2408 indicates how full packet queue 2400 is. Traffic indicator 2408, in one embodiment of the invention, comprises read pointer 810 and/or write pointer 812 (shown in FIG. 8). In the presently discussed embodiment in which packet queue 2400 is fully partitioned, traffic indicator 2408 will generally be located in one of the regions into which the packet queue was divided or at a dividing boundary. Thus, during operation of a network interface appropriate action may be taken, as described below, depending upon how full the packet queue is (e.g., depending upon which region is identified by traffic indicator 2408).

In FIG. 24, counter 2410 is incremented as packets arrive at packet queue 2400. In the illustrated embodiment, counter 2410 continuously cycles through a limited range of values, such as zero through seven. In one embodiment of the invention, each time a new packet is received the counter is incremented by one. In an alternative embodiment, counter 2410 may not be incremented when certain "non-discardable" packets are received. Various illustrative criteria for identifying non-discardable packets are presented below.

For one or more regions of packet queue 2400, an associated programmable probability indicator indicates the probability that a packet will be dropped when traffic indicator 2408 indicates that the level of traffic in the packet queue has reached the associated region. Therefore, in the illustrated embodiment probability indicator 2412 indicates the probability that a packet will be dropped while the packet queue is less than half full (e.g., when traffic indicator 2408 is located in region zero). Similarly, probability indicators 2414 and 2416 specify the probability that a new packet will be dropped when traffic indicator 2408 identifies regions one and two, respectively.

In the illustrated embodiment, probability indicators 2412, 2414 and 2416 each comprise a set, or mask, of sub-indicators such as bits or flags. Illustratively, the number of sub-indicators in a probability indicator matches the range of counter values—in this case, eight. In one embodiment of the invention, each sub-indicator may have one of two values (e.g., zero or one) indicating whether a packet is dropped. Thus, the sub-elements of a probability indicator may be numbered from zero to seven (illustratively, from right to left) to correspond to the eight possible values of counter 2410. For each position in a probability indicator that stores a first value (e.g., one), when the value of counter 2410 matches the number of that bit, the next discardable packet received for packet queue 2400 will be dropped. As discussed above, certain types of packets (e.g., control packets) may not be dropped. Illustratively, counter 2410 is only incremented for discardable packets.

In FIG. 24, probability indicator 2412 (e.g., 00000000) indicates that no packets are to be dropped as long as the packet queue is less than half full (e.g., as long as traffic indicator 2408 is in region zero). Probability indicator 2414 (e.g., 00000001) indicates that every eighth packet is to be dropped when there is at least 8 KB stored in the packet queue. In other words, when traffic indicator 2408 is located in region one, there is a 12.5% probability that a discardable packet will be dropped. In particular, when counter 2410 equals zero the next discardable packet, or a packet already stored in the packet queue, is discarded. Probability indicator 2416 (e.g., 01010101) specifies that every other discardable packet is to be dropped. There is thus a 50% probability that a discardable packet will be dropped when the queue is more than three-quarters full. Illustratively, when a packet is dropped, counter 2410 is still incremented.

As another example, in the alternative embodiment described above in which the packet queue is divided into five regions, suitable probability indicators may include the following. For regions zero and one, 00000000; for region two, 00000001; for region three, 00000101; and for region four, 01111111. Thus, in this alternative embodiment, region one is treated as an extension to region zero. Further, the probability of dropping a packet has a wider range, from 0% to 87.5%.

In one alternative embodiment described above, only a portion of a packet queue is partitioned into regions. In this alternative embodiment, a default probability or null probability (e.g., 00000000) of dropping a packet may be associated with the un-partitioned portion. Illustratively, this ensures that no packets are dropped before the level of traffic stored in the queue reaches a first threshold. Even in an embodiment where the entire queue is partitioned, a default or null probability may be associated with a region that encompasses or borders a 0 KB threshold.

Just as a packet queue may be divided into any number of regions for purposes of the present invention, probability indicators may comprise bit masks of any size or magnitude, and need not be of equal size or magnitude. Further, probability indicators are programmable in a present embodiment, thus allowing them to be altered even during the operation of a network interface.

One skilled in the art will recognize that discarding packets on the basis of a probability indicator injects randomness into the discard process. A random early discard policy may be sufficient to avoid the problem of broken pipes discussed above. In particular, in one embodiment of the invention, all packets are considered discardable, such that all packets are counted by counter 2410 and all are candidates for being dropped. As already discussed, however, in another embodiment of the invention intelligence is added in the process of excluding certain types of packets from being discarded.

It will be understood that probability indicators and a counter simply constitute one system for enabling the random discard of packets in a network interface. Other mechanisms are also suitable. In one alternative embodiment, a random number generator may be employed in place of a counter and/or probability indicators to enable a random discard policy. For example, when a random number is generated, such as M, the Mth packet (or every Mth packet) after the number is generated may be dropped. Or, the random number may specify a probability of dropping a packet. The random number may thus be limited to (e.g., hashed into) a certain range of values or probabilities. As another alternative, a random number generator may be used in tandem with multiple regions or thresholds within a packet queue. In this alternative embodiment a programmable value, represented here as N, may be associated with a region or queue threshold. Then, when a traffic indicator reaches that threshold or region, the Nth packet (or every Nth packet) may be dropped until another threshold or boundary is reached.

In yet another alternative embodiment of the invention, the probability of dropping a packet is expressed as a binary fraction. As one skilled in the art will recognize, a binary fraction consists of a series of bits in which each bit represents one half of the magnitude of its more significant neighbor. For example, a binary fraction may use four digits in one embodiment of the invention. From left to right, the bits may represent 0.5, 0.25, 0.125 and 0.0625, respectively. Thus, a binary fraction of 1010 would be interpreted as indicating a 62.5% probability of dropping a packet (e.g., 50% plus 12.5%). The more positions (e.g., bits) used in a binary fraction, the greater precision that may be attained.

In one implementation of this alternative embodiment a separate packet counter is associated with each digit. The counter for the leftmost bit increments at twice the rate of the next counter, which increments twice as fast as the next counter, etc. In other words, when the counter for the most significant (e.g., left) bit increments from 0 to 1 the other counters do not change. When the most significant counter increments again, from 1 back to 0, then the next counter increments from 0 to 1. Likewise, the counter for the third bit does not increment from 0 to 1 until the second counter returns to 0. In summary, the counter for the most significant bit changes (i.e., increments) each time a packet is received. The counter for the next most significant bit maintains each value (i.e., 0 or 1) for two packets before incrementing. Similarly, the counter for the third most significant bit maintains each counter value for four packets before incrementing and the counter for the least significant bit maintains its values for eight packets before incrementing.

Each time a packet is received or a counter is incremented the counters are compared to the probability indicator (e.g., the specified binary fraction). In one embodiment the determination of whether a packet is dropped depends upon which of the fraction's bits are equal to one. Illustratively, for each fraction bit equal to one a random packet is dropped if the corresponding counter is equal to one and the counters for any bits of higher significance are equal to zero. Thus for the example fraction 1010, whenever the most significant bit's counter is equal to one a random packet is dropped. In addition, a random packet is also dropped whenever the counter for the third bit is equal to one and the counters for the first two bits are equal to zero.

A person skilled in the art may also derive other suitable mechanisms for specifying and enforcing a probability of dropping a packet received at a network interface without exceeding the scope of the present invention.

As already mentioned, intelligence may be imparted to a random discard policy in order to avoid discarding certain types of packets. In a previous section, methods of parsing a packet received from a network were described. In particular, in a present embodiment of the invention a packet received from a network is parsed before it is placed into a packet queue such as packet queue 2400. During the parsing procedure various information concerning the packet may be gleaned. This information may be used to inject intelligence into a random discard policy. In particular, one or more fields of a packet header may be copied, an originating or destination entity of the packet may be identified, a protocol may be identified, etc.

Thus, in various embodiments of the invention, certain packets or types of packets may be immune from being discarded. In the embodiment illustrated in FIG. 24, for example, control packets are immune. As one skilled in the art will appreciate, control packets often contain information essential to the establishment, re-establishment or maintenance of a communication connection. Dropping a control packet may thus have a more serious and damaging effect than dropping a packet that is not a control packet. In addition, because control packets generally do not contain data, dropping a control packet may save very little space in the packet queue.

Many other criteria for immunizing packets are possible. For example, when a packet is parsed according to a procedure described in a previous section, a No_Assist flag or signal may be associated with the packet to indicate whether the packet is compatible with a set of pre-selected communication protocols. Illustratively, if the flag is set to a first value (e.g., one) or the signal is raised, the packet is considered incompatible and is therefore ineligible for certain processing enhancements (e.g., re-assembly of packet data, batch processing of packet headers, load-balancing). Because a packet for which a No_Assist flag is set to the first value may be a packet conforming to an unexpected protocol or unique format, it may be better not to drop such packets. For example, a network manager may want to ensure receipt of all such packets in order to determine whether a parsing procedure should be augmented with the ability to parse additional protocols.

Another reason for immunizing a No_Assist packet (e.g., packets that are incompatible with a set of selected protocols) from being discarded concerns the reaction to dropping the packet. Because the packet's protocols were not identified, it may not be known how the packet's protocols respond to the loss of a packet. In particular, if the sender of the packet does not lower its transmission rate in response to the dropped packet (e.g., as a form of congestion control), then there is no benefit to dropping it.

A packet's flow number may be used to immunize certain packets in another alternative embodiment of the invention. As discussed in a previous section, a network interface may include a flow database and flow database manager to maintain a record of multiple communication flows received by the network interface. It may be efficacious to prevent packets from one or more certain flows from being discarded. Immunized flows may include a flow involving a high-priority network entity, a flow involving a particular application, etc. For example, it may be considered relatively less damaging to discard packets from an animated or streaming graphics application in which a packet, or a few packets, may be lost without seriously affecting the destination entity and the packets may not even need to be retransmitted. In contrast, the consequences may be more severe if a few packets are dropped from a file transfer connection. The packets will likely need to be retransmitted, and the transmitting entity's window may be shrunk as a result—thus decreasing the rate of file transfer.

In yet another alternative embodiment of the invention, a probability indicator may comprise a bit mask in which each bit corresponds to a separate, specific flow through the network interface. In particular, the bits may correspond to the flows maintained in the flow database described in a previous section.

Although embodiments of the invention discussed thus far in this section involve discarding packets as they arrive at a packet queue, in an alternative embodiment packets may be discarded from within the packet queue. In particular, as the packet queue is filled (e.g., as a traffic indicator reaches pre-defined regions or thresholds), packets already stored in the queue may be discarded at random according to one or more probability indicators. In the embodiment illustrated in FIG. 24, for example, when traffic indicator 2408 reaches a certain threshold, such as the boundary between regions one and two or the end of the queue, packets may be deleted in one or more regions according to related probability indicators. Such probability indicators would likely have different values than those indicated in FIG. 24.

In a present embodiment of the invention, probability indicators and/or the specifications (e.g., boundaries) into which a packet queue is partitioned are programmable and may be adjusted by software operating on a host computer (e.g., a device driver). Criteria for immunizing packets may also be programmable. Methods of discarding packets in a network interface or other communication device may thus be altered in accordance with the embodiments described in this section, even during continued operation of such a device. Various other embodiments and criteria for randomly discarding packets and/or applying criteria for the intelligent discard of packets will be apparent to those skilled in the art.

Figure 25A:
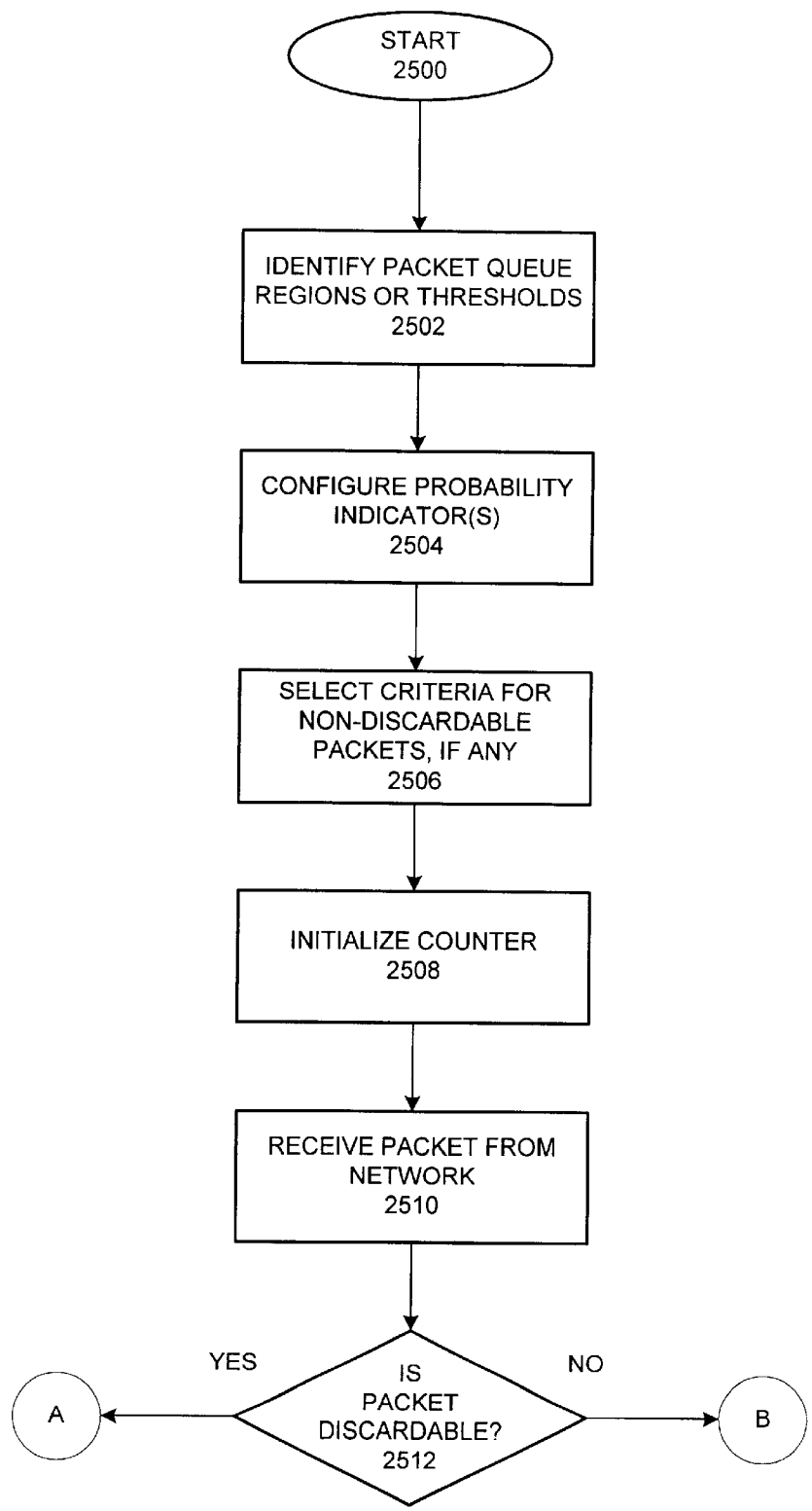
FIGS. 25A–25B comprise a flow chart demonstrating one method of discarding a packet from a network interface in accordance with an embodiment of the invention.
Figure 25B:
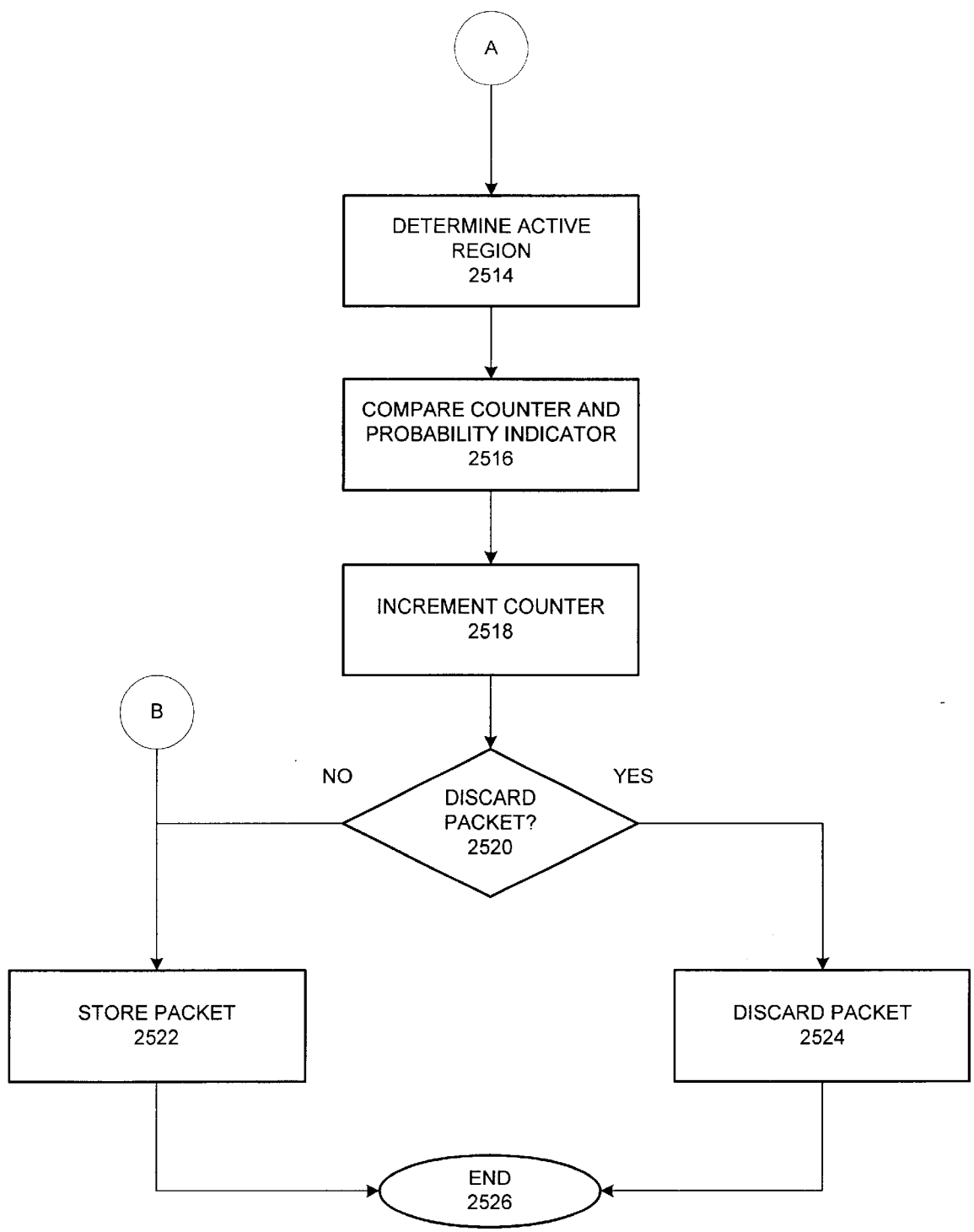

FIGS. 25A–25B comprise a flow chart demonstrating one method of implementing a policy for randomly discarding packets in a network interface according to the embodiment of the invention substantially similar to the embodiment illustrated in FIG. 24. In this embodiment, a packet is received while packet queue 2400 is not yet full. As one skilled in the will appreciate, this embodiment provides a method of determining whether to discard the packet. Once packet queue 2400 is full, when another packet is received the network interface generally must drop a packet—either the one just received or one already stored in the queue—in which case the only decision is which packet to drop.

In FIG. 25A, state 2500 is a start state. State 2500 may reflect the initialization of the network interface (and packet queue 2400) or may reflect a point in the operation of the network interface at which one or more parameters or aspects concerning the packet queue and the random discard policy are to be modified.

In state 2502, one or more regions are identified in packet queue 2400, perhaps by specifying boundaries such as the 8 KB and 12 KB boundaries depicted in FIG. 24. Although the regions depicted in FIG. 24 fully encompass packet queue 2400 when viewed in unison, regions in an alternative embodiment of the invention may encompass less than the entire queue.

In state 2504, one or more probability indicators are assigned and configured. In the illustrated embodiment, one probability indicator is associated with each region. Alternatively, multiple regions may be associated with one probability indicator. Even further, one or more regions may not be explicitly associated with a probability indicator, in which case a default or null probability indicator may be assumed. As described above, a probability indicator may take the form of a multi-bit mask, whereby the number of bits in the mask reflect the range of possible values maintained by a packet counter. In another embodiment of the invention, a probability indicator may take the form of a random number or a threshold value against which a randomly generated number is compared when a decision must be whether to discard a packet.

In state 2506, if certain types of packets are to be prevented from being discarded, criteria are expressed to identify the exempt packets. Some packets that may be exempted are control packets, packets conforming to unknown or certain known protocols, packets belonging to a particular network connection or flow, etc. In one embodiment of the invention, no packets are exempt from being discarded.

In state 2508, a packet or traffic counter is initialized. As described above, the counter may be incremented, possibly through a limited range of values, when a discardable packet is received for storage in packet queue 2400. The limited range of counter values may correspond to the number of bits in a mask form of a probability indicator. Alternatively, the counter may be configured to increment through a greater range, in which case a counter value may be filtered through a modulus or hash function prior to being compared to a probability indicator as described below.

In state 2510, a packet is received from a network and may be processed through one or more modules (e.g., a header parser, an IPP module) prior to its arrival at packet queue 2400. Thus, in state 2510 the packet is ready to be stored in the packet queue. One or more packets may already be stored in the packet queue and a traffic indicator (e.g., a pointer or index) identifies the level of traffic stored in the queue (e.g., by a storage location and/or region in the queue).

In state 2512, it may be determined whether the received packet is discardable. For example, if the random discard policy that is in effect allows for the exemption of some packets from being discarded, in state 2512 it is determined whether the received packet meets any of the exemption criteria. If so, the illustrated procedure continues at state 2522. Otherwise, the procedure continues at state 2514.

In state 2514, an active region of packet queue 2400 is identified. In particular, the region of the packet queue to which the queue is presently populated with traffic is determined. The level of traffic stored in the queue depends upon the number and size of packets that have been stored in the queue to await transfer to a host computer. The slower the transfer process, the higher the level of traffic may reach in the queue. Although the level of traffic stored in the queue rises and falls as packets are stored and transferred, the level may be identified at a given time by examining the traffic indicator. The traffic indicator may comprise a pointer identifying the position of the last or next packet to be stored in the queue. Such a pointer may be compared to another pointer that identifies the next packet to be transferred to the host computer in order to reveal how much traffic is stored in the queue.

In state 2516, the counter value (e.g., a value between zero and seven in the embodiment of FIG. 24) is compared to the probability indicator associated with the active region. As previously described, the counter is incremented as discardable packets are received at the queue. This comparison is conducted so as to determine whether the received packet should be discarded. As explained above, in the embodiment of FIG. 24 the setting of the probability indicator bit corresponding to the counter value is examined. For example, if the counter has a value of N, then bit number N of the probability indicator mask is examined. If the bit is set to a first state (e.g., one) the packet is to be discarded; otherwise it is not to be discarded.

In state 2518, the counter is incremented to reflect the receipt of a discardable packet, whether or not the packet is to be discarded. In the presently discussed embodiment of the invention, if the counter contains its maximum value (e.g., seven) prior to being incremented, incrementing it entails resetting it to its minimum value (e.g., zero).

In state 2520, if the packet is to be discarded the illustrated procedure continues at state 2524. Otherwise, the procedure continues at state 2522. In state 2522, the packet is stored in packet queue 2400 and the illustrated procedure ends with end state 2526. In state 2524, the packet is discarded and the illustrated procedure ends with end state 2526.

Sun, Sun Microsystems, SPARC and Solaris are trademarks or registered trademarks of Sun Microsystems, Incorporated in the United States and other countries.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A method of managing a communication flow comprising one or more packets received by a network interface, the method comprising:

identifying a flow index of a packet received at a network interface, wherein said flow index identifies a communication flow comprising said packet;

searching a flow database for a flow record comprising said flow index;

at a flow database manager, generating an operation code representing an eligibility of said packet for one or more predetermined processes; and forwarding said operation code to a reassembly engine configured to reassemble a data portion of the packet with a data portion of another packet in the communication flow.

2. The method of claim 1, further comprising storing said operation code.

3. The method of claim 1, further comprising receiving packet information extracted from a header of said packet.

4. The method of claim 3, wherein said packet information comprises a sequence number of said packet.

5. The method of claim 3, wherein said packet information comprises an indicator configured to indicate whether said packet includes a data portion.

6. The method of claim 3, wherein said packet information comprises an identifier of a source of said packet and an identifier of a destination of said packet.

7. The method of claim 1, further comprising updating said flow record.

8. The method of claim 7, wherein said updating comprises incrementing a flow activity indicator in said flow record.

9. The method of claim 8, wherein said updating further comprises modifying a flow sequence number in said flow record.

10. The method of claim 1, further comprising adding a flow record to said flow database comprising said flow index if a flow record comprising said flow index is not found in said flow database.

11. The method of claim 1, further comprising replacing said flow record.

12. The method of claim 1, wherein said identifying comprises receiving said flow index from a network interface module configured to examine a header portion of said packet.

13. The method of claim 1, wherein said generating comprises:

determining whether said packet is suitable for a function that said network interface is configured to perform; and assigning an operation code for said packet to indicate whether said function is to be performed.

14. The method of claim 13, wherein said generating further comprises determining whether said packet includes a data portion.

15. The method of claim 14, wherein said generating further comprises determining whether said data portion exceeds a pre-determined size.

16. The method of claim 13, wherein said generating further comprises determining whether said packet was received out of order.

17. The method of claim 13, wherein said generating further comprises determining whether said flow database is full.

18. The method of claim 1, further comprising:

determining whether said flow database is full;

for each flow record in said flow database, examining a flow activity indicator configured to indicate a recency of traffic in an associated communication flow;

selecting an aged flow record having a flow activity indicator indicating least recent traffic among said associated communication flows; and replacing said aged flow record with a new flow record comprising said flow index.

19. A method of managing a communication flow comprising a collection of data directed from a source entity to a destination entity, the method comprising:

receiving a first packet at a network interface, said first packet comprising a first portion of a collection of data;

identifying a first flow key, said first flow key comprising an identifier of a source of said first packet and an identifier of a destination of said first packet;

setting up a first communication flow for said collection of data, wherein said first communication flow is identifiable by said first flow key; and assigning an operation code to said first packet, said operation code indicating whether said first portion of data is reassembleable with another portion of data in said collection of data;

wherein said first communication flow is configured to be terminated after said collection of data is received at said network interface.

20. The method of claim 19, further comprising:

receiving a second packet at said network interface, said second packet comprising a second portion of said collection of data;

determining whether said second portion of said collection of data comprises a final portion of said collection of data; and terminating said first communication flow if said second portion comprises said final portion.

21. The method of claim 20, wherein said setting up comprises:

storing said first flow key in a database; and indicating that said first communication flow is valid.

22. The method of claim 21, wherein said indicating comprises configuring a validity indicator in said database.

23. The method of claim 22, wherein said terminating comprises modifying said validity indicator to indicate that said first communication flow is invalid.

24. The method of claim 21, wherein said terminating comprises removing said first flow key from said database.

25. The method of claim 19, further comprising:

receiving a second packet at said network interface; and associating an operation code with said second packet to indicate whether said first communication flow is to be terminated.

26. The method of claim 25, wherein said associating comprises:

receiving information extracted from a header portion of said second packet; and examining said information to determine whether said first communication flow is to be terminated.

27. The method of claim 26, wherein said associating further comprises examining said information to determine whether a second communication flow is to be established and whether a data portion of said second packet is to be re-assembled with a data portion of another packet.

28. A method of managing a network flow received at a network interface, comprising:

parsing a packet received at a network interface;

assembling a flow identifier configured to identify a network flow comprising said packet;

searching a flow database on said network interface for said flow identifier;

updating a flow sequence number in a flow database record comprising said flow identifier;

setting a flow activity indicator in said flow database record to reflect receipt of said packet; and setting a flow validity indicator in said flow database to indicate said network flow is valid.

29. A method of processing a packet received at a network interface, comprising:

receiving a packet at a network interface, wherein said packet was sent from a source entity to a destination entity;

parsing said packet to identify a flow between said source entity and said destination entity that comprises said packet;

receiving a status indicator extracted from said packet;

searching a flow database for said flow;

generating an operation code based on said status indicator, wherein said operation code is configured to: indicate whether said packet is a control packet; and indicate whether a header portion of said packet conforms to one of a set of pre-selected communication protocols; and updating said flow database by:

updating a flow activity indicator associated with said flow to reflect receipt of said packet; and updating a flow validity indicator associated with said flow to indicate said flow is valid.

30. The method of claim 29, wherein said generating comprises determining whether said status indicator has a predetermined value.

31. The method of claim 29, wherein said generating comprises determining whether said packet includes a data portion.

32. The method of claim 29, wherein said generating comprises determining whether a data portion of said packet exceeds a predetermined size.

33. The method of claim 29, wherein said generating comprises determining whether a sequence number of said packet correlates with a sequence number associated with said flow in said flow database.

34. The method of claim 29, wherein said generating comprises determining whether said packet comprises a request to reset a flow.

35. The method of claim 29, further comprising determining whether said flow database is full.

36. The method of claim 29, wherein said parsing comprises assembling a flow key configured to identify a communication flow between said source entity and said destination entity.

37. The method of claim 36, wherein said searching comprises searching a flow database for said flow key.

38. A network interface for receiving a communication flow from a network, comprising:
- a parser for examining a header portion of a first packet received from a network, said first packet comprising a first portion of data transmitted from a source entity to a destination entity;
- a data structure comprising:
  - a flow key for identifying said communication flow, wherein said flow key comprises identifiers of said source entity and said destination entity;
  - an activity indicator for indicating a recency with which a packet in said communication flow has been received; and
  - a validity indicator for indicating whether said communication flow is valid;
- a data manager for managing said data structure; and
- a generator configured to generate an operation code for every packet in said communication flow, to facilitate forwarding of said data toward the destination entity from the network interface;
- wherein said data manager establishes said communication flow and stores said flow key in said data structure upon receipt of said first portion of data, and terminates said communication flow upon receipt of a final portion of said data.

39. A network interface, comprising:
- a database configured to facilitate management of a network flow, said network flow comprising one or more packets sent from a source entity to a destination entity, said database comprising:
  - a flow key configured to identify said network flow; and
  - a validity indicator configured to indicate whether said network flow is valid;
- a database manager configured to manage said database; and
- an operation code generator configured to generate an operation code for every packet within said network flow, wherein said operation code is configured to specify an operation to be performed with said packet;
- wherein said database manager receives said flow key and updates said database when said packet is received.

40. The network interface of claim 39, further comprising:
- a control memory;
- wherein said database manager further stores said operation code in said control memory when said packet is received.

41. The network interface of claim 39, wherein said database manager comprises said operation code generator.

42. A computer readable storage medium storing instructions that, when executed by a computer, cause the computer to perform a method of managing a network flow database storing information relating to a network flow received by a network interface, the method comprising:
- identifying a flow index of a packet received at a network interface, wherein said flow index identifies a communication flow comprising said packet;
- searching a flow database for a flow record comprising said flow index;
- at a flow database manager, generating an operation code representing an eligibility of said packet for one or more predetermined processes; and
- forwarding said operation code to a reassembly engine configured to reassemble a data portion of the packet with a data portion of another packet in the communication flow.

43. The network interface of claim 39, wherein said database further comprises an activity indicator for indicating a recency with which a packet in said network flow has been received.

44. The method of claim 1, wherein said one or more predetermined processes include reassembly of a data portion of the packet with a data portion of another packet in the communication flow.

45. The method of claim 1, wherein said one or more predetermined processes include batch processing of headers of multiple packets in the communication flow, including the packet.

46. The method of claim 1, wherein said one or more predetermined processes include distributing packets of different communication flows to different host computer processors.

47. The method of claim 1, further comprising forwarding said operation code to a packet batching module configured to facilitate batch processing of headers of multiple packets in the communication flow.

48. A computer readable storage medium storing instructions that, when executed by a computer, cause the computer to perform a method of managing a communication flow comprising a collection of data directed from a source entity to a destination entity, the method comprising:
- receiving a first packet at a network interface, said first packet comprising a first portion of a collection of data;
- identifying a first flow key, said first flow key comprising an identifier of a source of said first packet and an identifier of a destination of said first packet;
- setting up a first communication flow for said collection of data, wherein said first communication flow is identifiable by said first flow key; and
- assigning an operation code to said first packet, said operation code indicating whether said first portion of data is reassembleable with another portion of data in said collection of data;
- wherein said first communication flow is configured to be terminated after said collection of data is received at said network interface.

49. A computer readable storage medium storing instructions that, when executed by a computer, cause the computer to perform a method of processing a packet received at a network interface, the method comprising:

receiving a packet at a network interface, wherein said packet was sent from a source entity to a destination entity;

parsing said packet to identify a flow between said source entity and said destination entity that comprises said packet;

receiving a status indicator extracted from said packet;

searching a flow database for said flow;

generating an operation code based on said status indicator, wherein said operation code is configured to:
        indicate whether said packet is a control packet; and
        indicate whether a header portion of said packet conforms to one of a set of pre-selected communication protocols; and updating said flow database by:
        updating a flow activity indicator associated with said flow to reflect receipt of said packet; and
        updating a flow validity indicator associated with said flow to indicate said flow is valid.

50. The method of claim 28, wherein said flow sequence number comprises a sequence number of said packet.

51. The method of claim 28, wherein said flow activity indicator is configured to indicate how recently said network flow was active.

52. The method of claim 28, wherein said setting a flow activity indicator comprises incrementing said flow activity indicator.

53. The method of claim 28, further comprising:

generating an operation code configured to identify a status of said packet.

54. The method of claim 53, wherein said operation code is configured to indicate whether said packet includes a data portion.

55. The method of claim 53, wherein said operation code is configured to indicate whether said packet includes a data portion larger than a pre-determined size.

56. The method of claim 53, wherein said operation code is configured to indicate whether said packet was received out of order.

57. The method of claim 53 wherein said operation code is configured to indicate whether said packet is reassembleable with another packet in said network flow.

58. The method of claim 53, said operation code is configured to indicate whether said network flow is to be terminated.

59. A computer readable storage medium storing instructions that, when executed by a computer, cause the computer to perform a method of managing a network flow received at a network interface, the method comprising:

parsing a packet received at a network interface;

assembling a flow identifier configured to identify a network flow comprising said packet;

searching a flow database on said network interface for said flow identifier;

updating a flow sequence number in a flow database record comprising said flow identifier;

setting a flow activity indicator in said flow database record to reflect receipt of said packet; and setting a flow validity indicator in said flow database to indicate said network flow is valid.

\* \* \* \* \*